United States Patent [19] [11] 4,261,035
Raymond [45] Apr. 7, 1981

[54] BROADBAND HIGH LEVEL DATA LINK COMMUNICATION LINE ADAPTER

[75] Inventor: James C. Raymond, Framingham, Mass.

[73] Assignee: Honeywell Information Systems Inc., Waltham, Mass.

[21] Appl. No.: 79,961

[22] Filed: Sep. 28, 1979

[51] Int. Cl.³ .................... G06F 3/00; G06F 11/00
[52] U.S. Cl. .................................... 364/200; 364/900
[58] Field of Search .................. 364/200, 900; 371/37

[56] References Cited
U.S. PATENT DOCUMENTS

| 4,124,888 | 11/1978 | Washburn | 364/200 |
| 4,133,030 | 1/1979 | Huettner et al. | 364/200 |
| 4,204,888 | 5/1980 | Raymond et al. | 364/200 |

Primary Examiner—Charles E. Atkinson

Attorney, Agent, or Firm—Gerald E. Lester; Nicholas Prasinos; Ronald T. Reiling

[57] ABSTRACT

A hardware/firmware communication line adapter for interfacing a communication processor to a broadband high level data link communication channel. Transmit and receive data and control characters received either from the processor or from a communication channel device are processed under the control of the adapter firmware to effectuate CRC checking, byte size control, extended and variable field format control, partial last byte control, and block transfer control functions on the transmitted/received data stream. First-in-first-out (FIFO) buffer memories are employed in the transmit circuits to queue a frame of transmit data and control characters at the adapter whereby the communication processor/adapter interface control is simplified. Similarly, a FIFO buffer is employed in the receive circuits to reduce the frequency of receive interrupts and to enable block transfer of received data to the processor.

11 Claims, 42 Drawing Figures

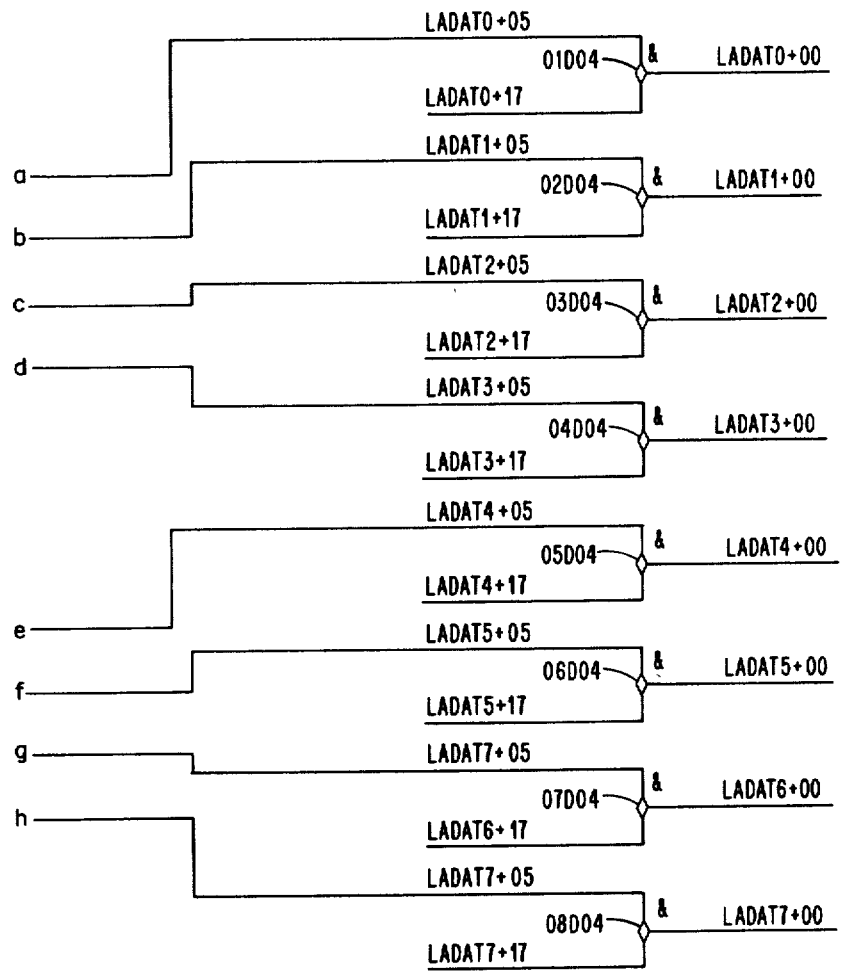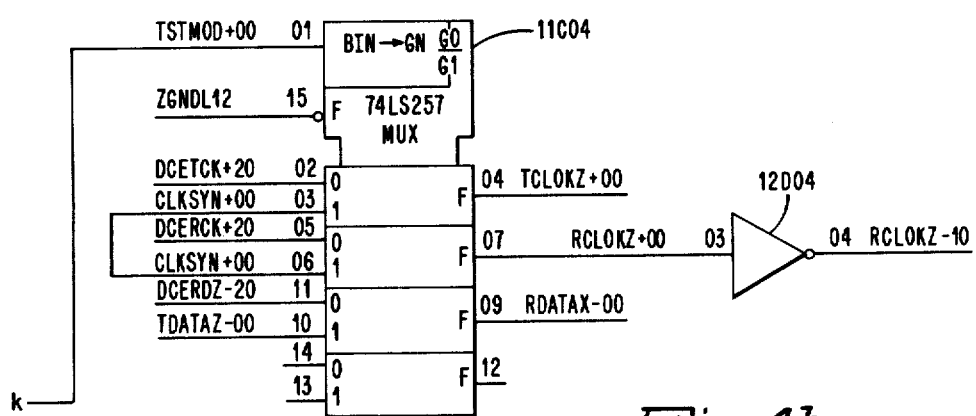
Fig. 4b.

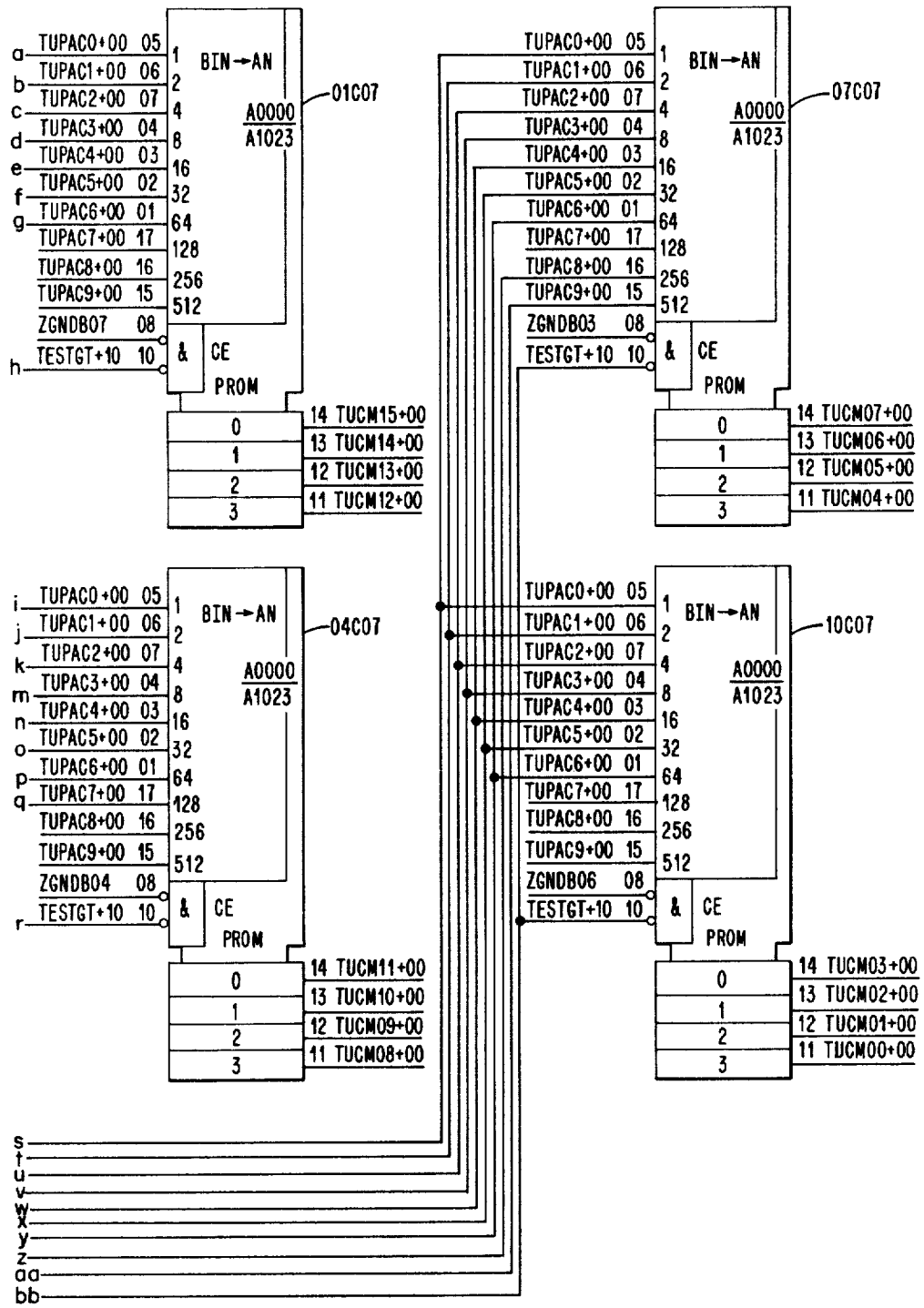
Fig. 7b. (sheet 1 of 2)

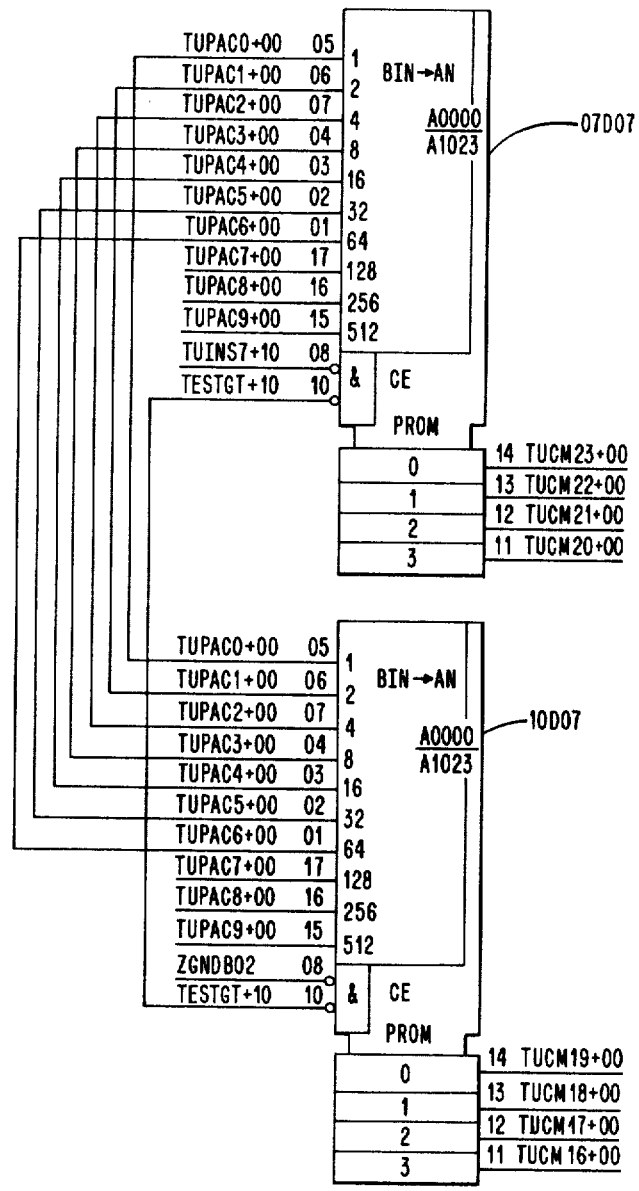
Fig. 7b. (sheet 2 of 2)

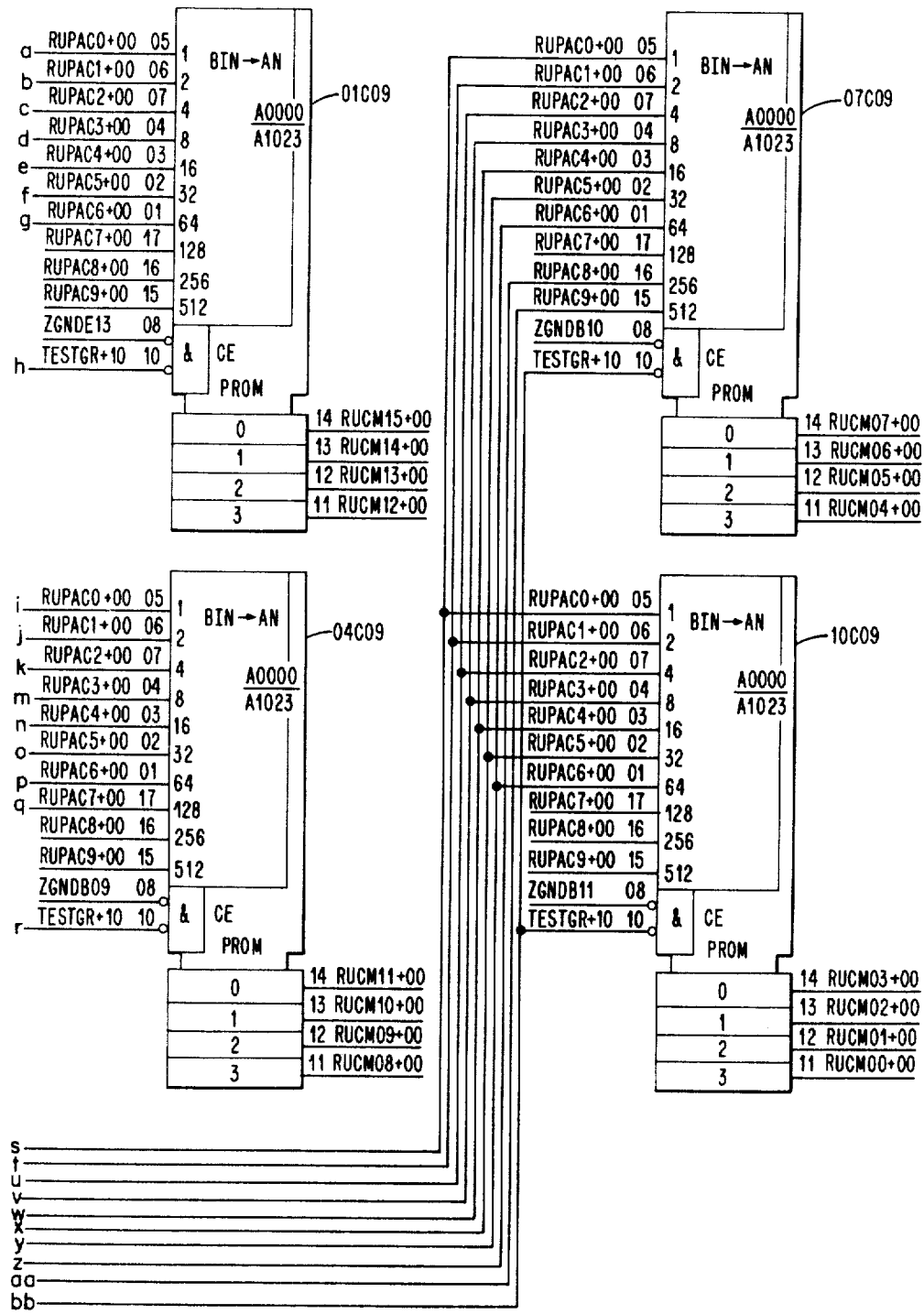
Fig. 9b. (sheet 1 of 2)

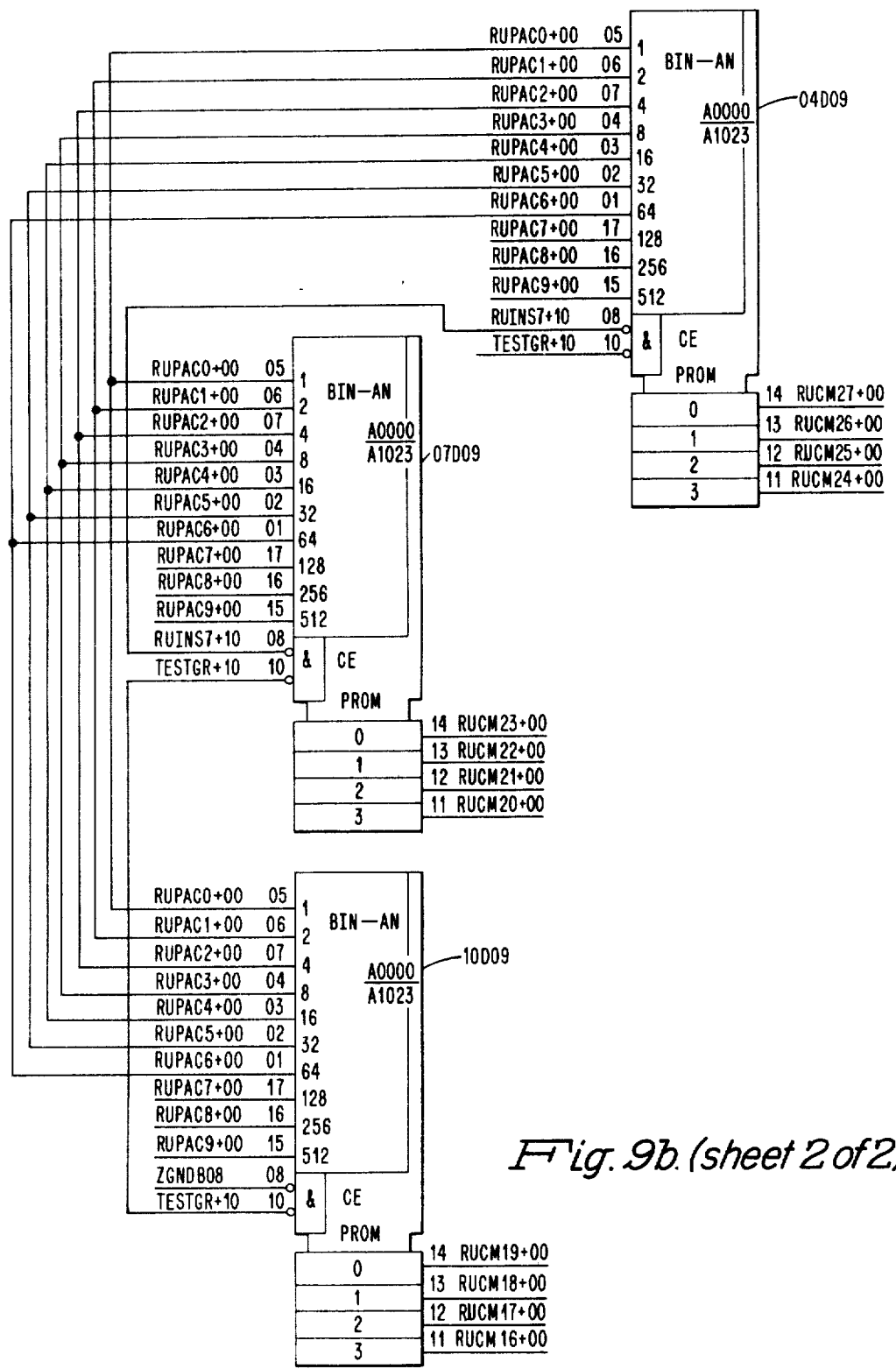
Fig. 9b. (sheet 2 of 2)

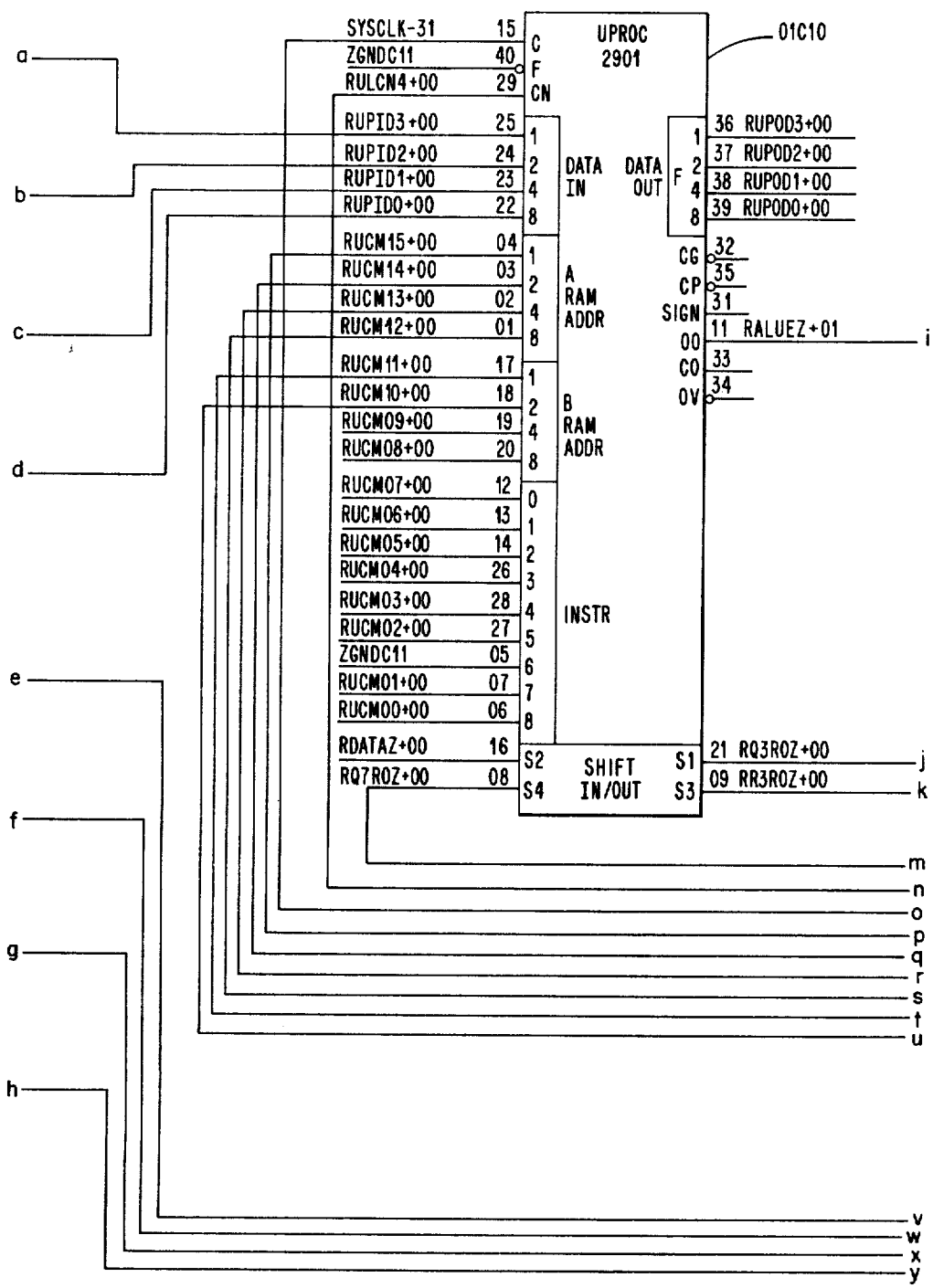
Fig. 10b. (sheet 1 of 2)

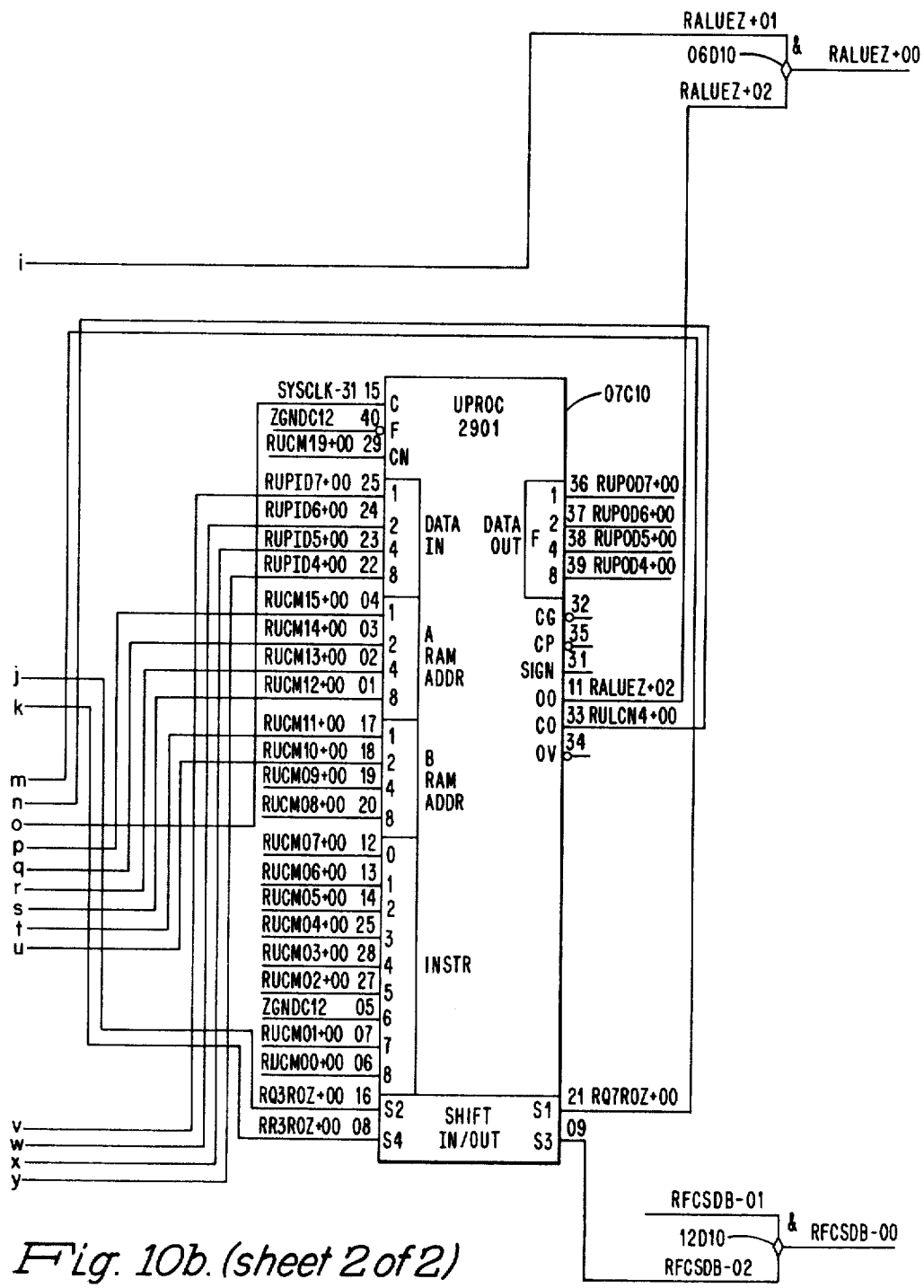
Fig. 10b. (sheet 2 of 2)

Fig. 15a. TRANSMIT EXTENDED CONTROL WORD
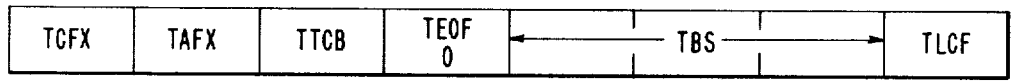
Fig. 15b. TRANSMIT CONTROL WORD-START FRAME FORMAT
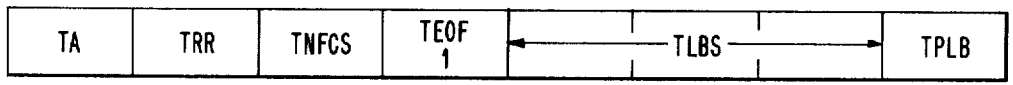
Fig. 15c. TRANSMIT CONTROL WORD-END FRAME FORMAT
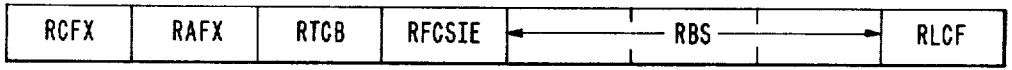
Fig. 15d. RECEIVE CONTROL WORD
Fig. 15e. RECEIVE STATUS WORD
Fig. 15f. DCE CONTROL WORD
Fig. 15g. DCE STATUS WORD
Fig. 15h. HDLC FRAME FORMAT
FIELDS ARE VARIABLE LENGTH
TCB, LCF, TEXT FIELDS OPTIONAL

Fig. 18a.

| SIGNAL NAME | ROW/COL /FIG | SIGNAL NAME | ROW/COL /FIG | SIGNAL NAME | ROW/COL /FIG | SIGNAL NAME | ROW/COL /FIG |
|---|---|---|---|---|---|---|---|
| ADDRS1-00 | 01B01 | DCEDSR+20 | 06B05 | LADAT4+00 | 05D04 | RALUEZ+01 | 01C10 | RFMDZ3+00 | 06B12 |
| ADDRS1+10 | 07A02 | DCEDTR-00 | 08B04 | LADAT4+05 | 04B04 | RALUEZ+02 | 07C10 | RFMDZ4+00 | 08B12 |
| ADDRS2-00 | 01B01 | DCEDTR+00 | 08B04 | LADAT4+17 | 06C12 | RARZZZ+00 | 11B12 | RFMDZ5+00 | 08B12 |
| ADDRS3-00 | 01B01 | DCEDTR+10 | 01C05 | LADAT5+00 | 06D04 | RCLOKZ-10 | 12D04 | RFMDZ6+00 | 08B12 |
| ARZZZZ-00 | 03A04 | DCERCK+00 | 02D01 | LADAT5+05 | 04B04 | RCLOKZ+00 | 11C04 | RFMDZ7+00 | 08B12 |
| ARZZZZ+10 | 05A04 | DCERCK+10 | 04A05 | LADAT5+17 | 06C12 | RCRCDB+00 | 04C11 | RFMIR0+00 | 01B12 |
| CLKSNR-00 | 10D01 | DCERCK+20 | 04B05 | LADAT6+00 | 07D04 | RCR1XX-00 | 11C12 | RFMIR1+00 | 03B12 |
| CLKSNT-00 | 10C01 | DCERDZ-00 | 02D01 | LADAT6+05 | 04B04 | RCR1XX+00 | 11C12 | RFMIR2+00 | 06B12 |
| CLKSYN-50 | 01B01 | DCERDZ-10 | 05A05 | LADAT6+17 | 06C12 | RCR1ZZ-00 | 11D12 | RFMIR3+00 | 08B12 |
| CLKSYN+00 | 01C03 | DCERDZ-20 | 05B05 | LADAT7+00 | 08D04 | RCWBZ0+00 | 01A10 | RFMIRZ+00 | 12B12 |
| CLKSYN+60 | 01B03 | DCERIZ-10 | 01A05 | LADAT7+05 | 04B04 | RCWBZ1+00 | 01A10 | RFMOR0+00 | 01B12 |
| CLKSYN+61 | 01D03 | DCERIZ+00 | 02D01 | LADAT7+17 | 06C12 | RCWBZ2+00 | 01A10 | RFMOR1+00 | 03B12 |
| CLKSYN+62 | 02D03 | DCERIZ+20 | 01B05 | LR05AD-00 | 02D02 | RCWBZ3+00 | 05A10 | RFMOR2+00 | 06B12 |
| CNTRL1-00 | 01B01 | DCERTS-00 | 08B04 | LROADD-00 | 01D02 | RCWBZ4+00 | 05A10 | RFMOR3+00 | 08B12 |
| CNTRL2-00 | 01B01 | DCERTS+00 | 08B04 | LR2ADD-00 | 03B02 | RCWBZ5+00 | 05A10 | RFMSZ0+00 | 01B12 |
| CNTRL3-00 | 01B01 | DCERTS+10 | 02C05 | LR2DTR-00 | 08A04 | RCWBZ6+00 | 05A10 | RFMSZ1+00 | 01B12 |
| CNTRL4-00 | 01C01 | DCERTS+20 | 02D05 | LR2DTR+00 | 08A04 | RCWBZ7+00 | 11C04 | RFMSZ2+00 | 01B12 |
| CPDAT0+00 | 01C01 | DCESP2-00 | 08B04 | LR2RTS-00 | 08A04 | RDATAX-00 | 02C11 | RFMSZ3+00 | 01B12 |
| CPDAT1+00 | 01C01 | DCESP2+00 | 08B04 | LR2RTS+00 | 08A04 | RDATAY-00 | 02C11 | RFMSZ4+00 | 03B12 |
| CPDAT2+00 | 01C01 | DCESP3+00 | 08B04 | LR2SP2-00 | 08A04 | RDATAY+00 | 02C11 | RFMSZ5+00 | 03B12 |
| CPDAT3+00 | 01C01 | DCESP3+00 | 08B04 | LR2SP2+00 | 08A04 | RDATAZ+00 | 02D11 | RFMSZ6+00 | 03B12 |
| CPDAT4+00 | 01C01 | DCETCK+00 | 02D01 | LR2SP3-00 | 08A04 | RDATZE+00 | 03C11 | RFMSZ7+00 | 03B12 |
| CPDAT5+00 | 07A04 | DCETCK+20 | 03A05 | LR2SP3+00 | 08A04 | RDRDAT+00 | 02B02 | RLROAD-00 | 04A02 |
| CPDAT6+00 | 01C01 | DCETDZ-10 | 03B05 | LR3ADD+00 | 07B02 | RESYNC-00 | 07D02 | RLR1A-00 | 04D02 |
| CPDAT7+00 | 01C01 | DCETDZ-20 | 04C05 | LR5ADD-00 | 03D02 | RESYNC+00 | 07D02 | RLR1AD-00 | 04A02 |
| CTSXXX+00 | 10B06 | DIRCON-00 | 04D05 | MSTCLR-10 | 09B02 | RFCSCK+00 | 06C11 | RLR2AD-00 | 04A02 |
| DCECDZ+00 | 02D01 | DIRCON+00 | 11A04 | MSTCLR-11 | 10B02 | RFCSDB-00 | 12D10 | RLR3AD-00 | 04A02 |
| DCECD2+10 | 08A05 | LADAT0+00 | 11A04 | MSTCLR-30 | 09D02 | RFCSDB-01 | 04D11 | RLR4AD-00 | 04A02 |
| DCECD2+20 | 08B05 | LADAT0+05 | 01D04 | MSTCLR-50 | 10A02 | RFCSDB-02 | 07C10 | RLR5AD-00 | 04A02 |
| DCECTS-30 | 12C05 | LADAT1+00 | 01B04 | MSTCLR+00 | 01B01 | RFMBZ0+00 | 04A12 | RLR6AD-00 | 04A02 |
| DCECTS+00 | 02D01 | LADAT1+05 | 02D04 | MSTCLR+20 | 09C02 | RFMBZ1+00 | 04A12 | RLR7AD-00 | 04A02 |
| DCECTS+10 | 07A05 | LADAT1+17 | 01B04 | MSTCLR+61 | 11B02 | RFMBZ2+00 | 04A12 | RMSTCL-00 | 08D02 |
| DCECTS+20 | 07B05 | LADAT2+00 | 02C12 | MSTCLR+62 | 12B02 | RFMBZ3+00 | 04A12 | RONZZZ-00 | 11A04 |
| DCECC+11 | 06C05 | LADAT2+05 | 03D04 | PULUPA+00 | 08B01 | RFMBZ4+00 | 04A12 | RONZZZ+00 | 11A04 |
| DCECC+12 | 08C05 | LADAT2+17 | 01B04 | PULUPB+00 | 08B01 | RFMBZ5+00 | 04A12 | RQ3R0Z+00 | 01C10 |
| DCECC+21 | 06D05 | LADAT3+00 | 02C12 | PULUPX+00 | 10A05 | RFMBZ6+00 | 04A12 | RQ7R0Z+00 | 07C10 |
| DCECC+22 | 08D05 | LADAT3+05 | 04D04 | PULUPY+00 | 11A05 | PFMBZ7+00 | 04A12 | RR3R0Z+00 | 01C10 |
| DCEDSR+00 | 02D01 | LADAT3+17 | 01B04 | PULUPZ+00 | 12A05 | RFMDZ0+00 | 06B12 | RREADY-00 | 01C11 |
| DCEDSR+10 | 06A05 | LADAT3+17 | 02C12 | RALUEZ-10 | 13A11 | RFMDZ1+00 | 06B12 | RREADY+00 | 01C11 |
| | | | | RALUEZ+00 | 06D10 | RFMDZ2+00 | 06B12 | RSCMD0-00 | 08C11 |

Fig. 18b.

| SIGNAL NAME | ROW/COL /FIG | SIGNAL NAME | ROW/COL /FIG | SIGNAL NAME | ROW/COL /FIG | SIGNAL NAME | ROW/COL /FIG |
|---|---|---|---|---|---|---|---|
| RSCMD1-00 | 08C11 | RUCM24+00 | 04D09 | RUPOD3+00 | 01C10 | TDATAZ+00 | 02D08 | TFMMC0+00 | 02C06 |
| RSCMD2-00 | 08C11 | RUCM25+00 | 04D09 | RUPOD4+00 | 07C10 | TESTGC-00 | 06A03 | TFMMC1+00 | 02C06 |
| RSCMD3-00 | 08C11 | RUCM26+00 | 04D09 | RUPOD5+00 | 07C10 | TESTGC-20 | 06B03 | TFMMC2+00 | 02C06 |
| RSCMD4-00 | 08C11 | RUCM27+00 | 04D09 | RUPOD6+00 | 07C10 | TESTGC+10 | 06A03 | TFMMC3+00 | 02C06 |
| RSCMD5-00 | 03C11 | RUINS3+00 | 08B11 | RUPOD7+00 | 07C10 | TESTGR+00 | 12X09 | TFMMCE-00 | 06D08 |
| RSCMD6-00 | 08C11 | RUINS6+00 | 06B11 | SRESYN+00 | 07C02 | TESTGR+10 | 12X09 | TFMMD0+00 | 06C06 |
| RSCMD7-00 | 08C11 | RUINS0-00 | 06A11 | SRUINE-00 | 09A11 | TESTGT-00 | 12X07 | TFMMD1+00 | 06C06 |
| RSPCR1-00 | 05B02 | RUINS1-00 | 06A11 | SRUINE+00 | 09A11 | TESTGT+10 | 12X07 | TFMMD2+00 | 06C06 |
| RSRCR1-50 | 13B12 | RUINS2-00 | 06A11 | STROBE-00 | 01B01 | TFCSCK+00 | 07C08 | TFMMD3+00 | 06C06 |
| RSTCR1-00 | 04B02 | RUINS3-00 | 06A11 | STROBE-20 | 08B02 | TFCSDB-00 | 03D08 | TFMMDE-00 | 07D08 |
| RSTCR1-50 | 12C06 | RUINS4-00 | 06A11 | STROBE+10 | 08A02 | TFMCB0+00 | 01A06 | TFMNEZ-00 | 13A06 |
| RSTFMF-00 | 09D08 | RUINS5-00 | 06A11 | STUINE-00 | 10A08 | TFMCB1+00 | 01A06 | TFMNEZ+00 | 13A06 |
| RSTFMF+00 | 09D08 | RUINS5+10 | 07B11 | STUINE+00 | 10A08 | TFMCB2+00 | 01A06 | TFMOR0+00 | 01B06 |
| RUACC3+00 | 01A09 | RUINS6-00 | 06A11 | SYSCKR+00 | 10D01 | TFMCB3-10 | 04A06 | TFMOR1+00 | 03B06 |
| RUACC7+00 | 04A09 | RUINS7+00 | 06A11 | SYSCKT+00 | 10C01 | TFMCB3+00 | 01A06 | TFMOR2+00 | 05B06 |
| RUCM00+00 | 10C09 | RUINS7+10 | 09B11 | SYSCLK-10 | 08B03 | TFMCB4+00 | 01A06 | TFMOR3+00 | 07B06 |
| RUCM01-10 | 03B11 | RUINSE-00 | 08A11 | SYSCLK-11 | 10B03 | TFMCB5+00 | 01A06 | TFMORZ+00 | 11A06 |
| RUCM01+00 | 10C09 | RUINSE+00 | 08A11 | SYSCLK-30 | 08D03 | TFMCB6+00 | 01A06 | TFMRZ+00 | 01A02 |
| RUCM02+00 | 10C09 | RULCN4+00 | 07C10 | SYSCLK-31 | 10D03 | TFMCB7+00 | 01A06 | TFLOAD-00 | 01A02 |
| RUCM03+00 | 10C09 | RUPAC0+00 | 01A09 | SYSCLK-50 | 04A03 | TFMCZ0+00 | 01B06 | TLR1AD-00 | 01A02 |
| RUCM04+00 | 07C09 | RUPAC1+00 | 01A09 | SYSCLK-60 | 04B03 | TFMCZ1+00 | 01B06 | TLR2AD-00 | 01A02 |
| RUCM05+00 | 07C09 | RUPAC2+00 | 01A09 | SYSCLK-61 | 04D03 | TFMCZ2+00 | 01B06 | TLR3AD-00 | 01A02 |
| RUCM06+00 | 07C09 | RUPAC3+00 | 01A09 | SYSCLK-62 | 05D03 | TFMCZ3+00 | 01B06 | TLR4AD-00 | 01A02 |
| RUCM07+00 | 07C04 | RUPAC4+00 | 04A09 | SYSCLK+00 | 04C03 | TFMCZ4+00 | 03B06 | TLR5AD-00 | 01A02 |
| RUCM08+00 | 04C09 | RUPAC5+00 | 04A09 | SYSCLK+20 | 08C03 | TFMCZ5+00 | 03B06 | TLR6AD-00 | 03B06 |
| RUCM09+00 | 04C09 | RUPAC6+00 | 04A09 | SYSCLK+21 | 10C03 | TFMCZ6+00 | 03B06 | TLR7AD-00 | 11A04 |
| RUCM10+00 | 04C09 | RUPAC7+00 | 04A09 | SYSCLK+40 | 01B01 | TFMCZ7+00 | 05B06 | TONZZZ-00 | 11A04 |
| RUCM11+00 | 04C09 | RUPAC8+00 | 07A09 | SYSCLK+50 | 04A03 | TFMDZ0+00 | 05B06 | TONZZZ+00 | 01B08 |
| RUCM12+00 | 01C09 | RUPAC9+00 | 07A09 | TALUB0+00 | 01B08 | TFMDZ1+00 | 05B06 | TGRQZZ-00 | 01D08 |
| RUCM13+00 | 01C09 | RUPID0+00 | 01B10 | TALUEZ-10 | 13A08 | TFMDZ2+00 | 05B06 | TREADY-00 | 01D08 |
| RUCM14+00 | 01C09 | RUPID1+00 | 02B10 | TALUEZ+00 | 01B08 | TFMDZ3+00 | 05B06 | TREADY+00 | 01D08 |
| RUCM15+00 | 01C09 | RUPID2+00 | 03B10 | TARZZZ+00 | 11C06 | TFMDZ4+00 | 07B06 | TSCMD0-00 | 09C08 |
| RUCM16+00 | 10D09 | RUPID3+00 | 04B10 | TBITBF-00 | 02C08 | TFMDZ5+00 | 07B06 | TSCMD1-00 | 09C08 |
| RUCM17+00 | 10D09 | RUPID4+00 | 05B10 | TBITBF+00 | 02C08 | TFMDZ6+00 | 07B06 | TSCMD2-00 | 09C08 |
| RUCM18+00 | 10D09 | RUPID5+00 | 06B10 | TCLOKZ+00 | 11C04 | TFMDZ7+00 | 07B06 | TSCMD3-00 | 09C08 |
| RUCM19+00 | 10D09 | RUPID6+00 | 07B10 | TCRCDB+00 | 03C08 | TFMIR0-00 | 01B06 | TSCMD4-00 | 09C08 |
| RUCM20+00 | 07D09 | RUPID7+00 | 03B10 | TCRIXX-00 | 11D06 | TFMIR1+00 | 03B06 | TSCMD5-00 | 09C08 |
| RUCM21+00 | 07D09 | RUPOD0+00 | 01C10 | TCRIXX+00 | 11D06 | TFMIR2+00 | 05B06 | TSCMD6-00 | 09C08 |
| RUCM22+00 | 07D09 | RUPOD1+00 | 01C10 | TCRIZZ-00 | 12D06 | TFMIR3+00 | 07B06 | TSCMD7-00 | 09C08 |
| RUCM23+00 | 07D09 | RUPOD2+00 | 01C10 | TDATAZ-00 | 02D08 | TFMIRZ-00 | 12A06 | TSTCLR-00 | 10D01 |
|  |  |  |  |  |  |  |  | TSTCLT-00 | 10C01 |

| SIGNAL NAME | ROW/COL /FIG | SIGNAL NAME | ROW/COL /FIG | SIGNAL NAME | ROW/COL /FIG |
|---|---|---|---|---|---|
| TSTCLZ-00 | 09A02 | TUINS3-00 | 09B08 | WRRFMS+00 | 08D11 |
| TSTE1R+00 | 10D01 | TUINS4-00 | 09B08 | WRTDAT-10 | 01C02 |
| TSTE1T+00 | 10C01 | TUINS5-00 | 09B08 | WRTDAT+00 | 01B02 |
| TSTE2R+00 | 10D01 | TUINS5+10 | 12C08 | WRTFCB-00 | 06B02 |
| TSTE2T+00 | 10C01 | TUINS6-00 | 09B08 | | |
| TSTEN2-00 | 02A03 | TUINS7-00 | 13C08 | | |
| TSTEN2+10 | 02B03 | TUINS7+10 | 09A08 | | |
| TSTMOD-00 | 11A04 | TUINSE-00 | 09A08 | | |
| TSTMOD+00 | 11A04 | TUINSE+00 | 09A08 | | |
| TUACC3+00 | 01A07 | TUNDRN-00 | 06A04 | | |
| TUACC7+00 | 04A07 | TUNDRN+00 | 06A04 | | |
| TUCM00+00 | 10C07 | TUPAC0+00 | 01A07 | | |
| TUCM01+00 | 10C07 | TUPAC1+00 | 01A07 | | |
| TUCM02+00 | 10C07 | TUPAC2+00 | 01A07 | | |
| TUCM03+00 | 10C07 | TUPAC3+00 | 01A07 | | |
| TUCM04+00 | 07C07 | TUPAC4+00 | 04A07 | | |
| TUCM05+00 | 07C07 | TUPAC5+00 | 04A07 | | |
| TUCM06+00 | 07C07 | TUPAC6+00 | 04A07 | | |
| TUCM07+00 | 07C07 | TUPAC7+00 | 04A07 | | |
| TUCM08+00 | 04C07 | TUPAC8+00 | 07A07 | | |
| TUCM09+00 | 04C07 | TUPAC9+00 | 07A07 | | |
| TUCM10+00 | 04C07 | TUPID0+00 | 07A08 | | |
| TUCM11+00 | 04C07 | TUPID1+00 | 05A08 | | |
| TUCM12+00 | 01C07 | TUPID2+00 | 03A08 | | |
| TUCM13+00 | 01C07 | TUPID3+00 | 01A08 | | |
| TUCM14+00 | 01C07 | TUPOD0+00 | 01B08 | | |
| TUCM15+00 | 01C07 | TUPOD1+00 | 01B08 | | |
| TUCM16+00 | 10D07 | TUPOD2+00 | 01B08 | | |
| TUCM17+00 | 10D07 | TUPOD3+00 | 01B08 | | |
| TUCM18+00 | 10D07 | TXCWB0+00 | 06A06 | | |
| TUCM19+00 | 10D07 | TXCWC1+00 | 06A06 | | |
| TUCM20+00 | 07D07 | TXCWB2+00 | 06A06 | | |
| TUCM21+00 | 07D07 | TXCWB3+00 | 06A06 | | |
| TUCM22+00 | 07D07 | TXCWBE-00 | 05D08 | | |
| TUCM23+00 | 07D07 | WRLCB2-00 | 07B04 | | |
| TUIN23-00 | 11C08 | WRLCB5-00 | 03C02 | | |
| TUIN56-00 | 07B08 | WRRFMB-00 | 10D11 | | |
| TUINS0-00 | 09B08 | WRRFMD-00 | 09D11 | | |
| TUINS1-00 | 09B08 | WRRFMD+00 | 09D11 | | |
| TUINS2-00 | 09B08 | WRRFMS-00 | 08D11 | | |

Fig. 18c.

BROADBAND HIGH LEVEL DATA LINK COMMUNICATION LINE ADAPTER

FIELD OF THE INVENTION

This invention pertains to communication channel controllers in a computer system and, more particularly, to a communication line adapter for electrically interfacing a data processing system, or a communication processor thereof, with a broadband high level data link communication channel.

BACKGROUND OF THE INVENTION

Hardware adapters have been used in the communications field to accommodate the transfer of information between a communication transmission line and a data processing system. Changes in communication protocol have placed great demands on the adapters. Such demands have been met by increasing the amount of hardware, thereby increasing manufacturing costs and physical size.

The essence of communication is a concurrent bidirectional transfer of information. Hardware adapters have required two separate systems, one for receive operations and one for transmit operations. It also is recognized that messages may be varying lengths and may be comprised of data bytes of varying bit sizes. Hardware has provided a highly limited flexibility at high cost and space sacrifice. The potential for cost expansion of hardware functionality is low.

The problems associated with hardware communication adapters have been overcome partially by the advent of communication controllers comprised of hardware and some form of firmware control system. While the duplication of entire systems to accommodate both transmit and receive operations has been obviated, the amount of hardware used is still significant because of an inefficient marriage of firmware and hardware functionalities. This has resulted in somewhat of a compromise as to the information transfer rates that the system can handled.

Further, the data processing capacity of communication controllers have been relatively limited such that the accommodation of broadband communication links has been difficult, if not impossible.

OBJECTS AND SUMMARY OF THE INVENTION

This invention is directed to an improved hardware/firmware communication line control system for accommodating the concurrent bidirectional transfer of data messages to and from a broadband, high level data link communication channel.

Another object is to provide an improved hardware/firmware communication line control system for accommodating data messages at high data transfer rates in the message format of a bit-oriented HDLC.

Still a further object is to provide an improved hardware/firmware communication line adapter for accommodating messages in the bit-oriented HDLC format and which provides increased data processing capacity to reduce the processing load of the main communication processor to thereby increase the throughput of the system.

Another object is provide an improved hardward/firmware communication line adapter which has the capability of monitoring the address field, link control field, text control byte, logical control field, text field, and frame check sequence field in transferred messages.

Yet another object is to provide an improved hardward/firmware communication line adapter which is capable of monitoring, switching, and controlling variable byte size messages.

Still another object is to provide an improved hardware/firmware communication line adapter which is capable of generating CRC checks during both transmit and receive operations and of forwarding an appropriate check character with messages that it handles.

To achieve the foregoing objects and in accordance with the invention, unique hardware/firmware controls are embodied in a hardware/firmware communication line adapter for receiving transmit and receive control words from the communications processor at the start of a data transfer operation and for performing appropriate firmware-controlled processing operations on the data stream to effectuate CRC checking, byte size control, extended and variable field format control, partial last byte control, and block transfer control with respect to transmitted and received data.

The accompanying drawings which are incorporated in and constitute a part of the specification, illustrate a preferred embodiment of the invention, and, together with the description, serve to explain the principles of the invention.

BRIEF DESCRIPTION OF THE DRAWINGS

In the drawings:

FIG. 1 illustrates the multiline communication processor (MLCP) and data communication equipment (DCE) interface connectors for the BHCLA. FIG. 2 generally depicts the LCP address and control decode logic. FIG. 3 represents the system and test clock control logic. FIG. 4 depicts the MLCP input multiplexer and test multiplexer logic. FIG. 5 illustrates the DCE receivers and driver circuits. FIG. 6 shows the transmit FIFO memory and control logic. FIG. 7 illustrates the transmit address counter and control memory logic. FIG. 8 shows the transmit microprocessor and instruction control logic. FIG. 9 illustrates the receive address counter and control memory logic. FIG. 10 illustrates the receive microprocessor and associated logic. FIG. 11 depicts the receive instruction control logic, and FIG. 12 shows the receive FIFO memory and control logic.

FIGS. 15a–15g illustrate the format of various control and status words used with the system of the invention.

FIG. 15h illustrates the HDLC frame format used for messages handled by the system.

FIGS. 18a, 18b, and 18c represent a signal source table wherein every signal employed in the system of the invention is alphabetically listed along with a designation of the circuit element from which the signal emanates.

Appendix A is a microprogram instruction listing, including applicable instruction and parameter definition information, for the transmit control firmware employed with the communication line adapter of the invention.

Appendix B is a microprogram instruction listing, including applicable instruction and parameter definition information, for the receive control firmware used with the communication line adapter of the invention.

GENERAL DESCRIPTION OF EMBODIMENT

Figure 13:
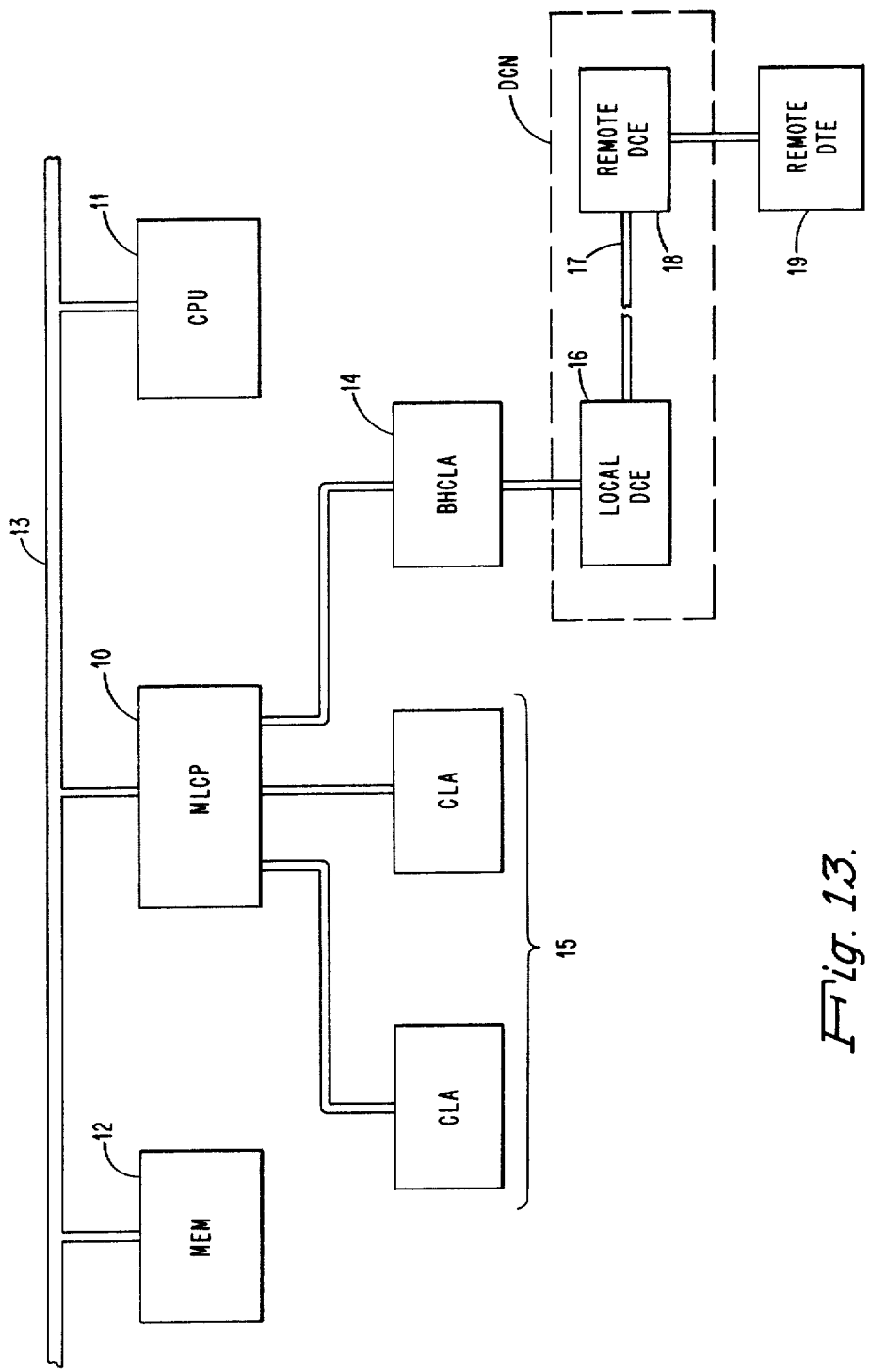
FIG. 13 is a functional block diagram of a system within which the invention may operate.

FIG. 13 illustrates in functional block diagram form a computer system having a multiline communications processor MLCP 10 in electrical communication with a central processor unit CPU 11 and a main memory unit MEM 12 by way of a common communication bus hereinafter referred to as "megabus" 13.

The megabus 13 provides an information path between any two units in the system. The paths are asynchronous in design, thereby enabling units of various speeds to operate efficiently. The bus accommodates information transfers including communication requests, control commands, status signals and data transfers between main memory unit 12 and MLCP 10.

Any system unit requiring communication with any other system unit issues a bus cycle request. When the bus cycle is granted, the requesting unit becomes the master and the addressed unit becomes the slave. Some bus interchanges require a response cycle as well as a request cycle. By was of example, the master unit may identify itself to a slave unit and indicate that a response is required. When the required information becomes available, the slave assumes the role of master and initiates a transfer to the requesting unit. A more detailed background description of the megabus system of FIG. 13 is given in U.S. Pat. No. 3,993,981 which is assigned to the assignee of the present invention, and which is incorporated by reference herein.

In the servicing of bus cycle requests, the CPU 11 has the lowest priority, the MLCP 10 has the next to the lowest priority and the memory unit 12 has the highest priority. The MLCP 10 further communicates with a broadband high level data link control communication line adapter BHCLA 14 and other communication line adapters 15. The BHCLA 14 in turn may be directly connected to data processing equipment such as a CPU, or to any type of data terminal equipment DTE. In a remote connect mode, the BHCLA may be connected by way of a local data communications equipment unit DCE 16 and a communications cable 17 to a remote DCE 18 within the data communication network DCN. The remote DCE 18 in turn may be connected to remote DTE 19. The DCEs have a capacity to both modulate and demodulate binary information streams, and thus may either receive or transmit information.

The BHCLA 14 may be made compatible with any DCE interface type conforming to the well-known EIA RS-232-C, MIL 18-C or EIA RS-XYZ, CCITT V.35 or BELL 301 or 303 type data sets. The preferred embodiment of the invention as described hereinafter is compatible with the BELL 301 or 303 type interface units.

The MLCP 10 with which the preferred embodiment of the present invention is adapted to operate in a known type of multiline communication processor manufactured by Honeywell Information Systems Inc. and is generally described in copending patent application Ser. No. 911,635, filed June 1, 1978 and now U.S. Pat. No. 4,204,888 entitled "Hardware/Firmware Communication Line Adapter" by James C. Raymond, R. A. Lemay and R. P. Kelly. Operation of the MLCP is described in the Customer Programming Manual designated "Honeywell Series 60 (Level 6) Communications Handbook", Order No. AT 97 REV. 2, October, 1978. The BHCLA of the present invention is shown in the schematic block diagram of FIGS. 14a and 14b and in the detailed schematic logic block diagrams of FIGS. 1-12.

Figure 14A:
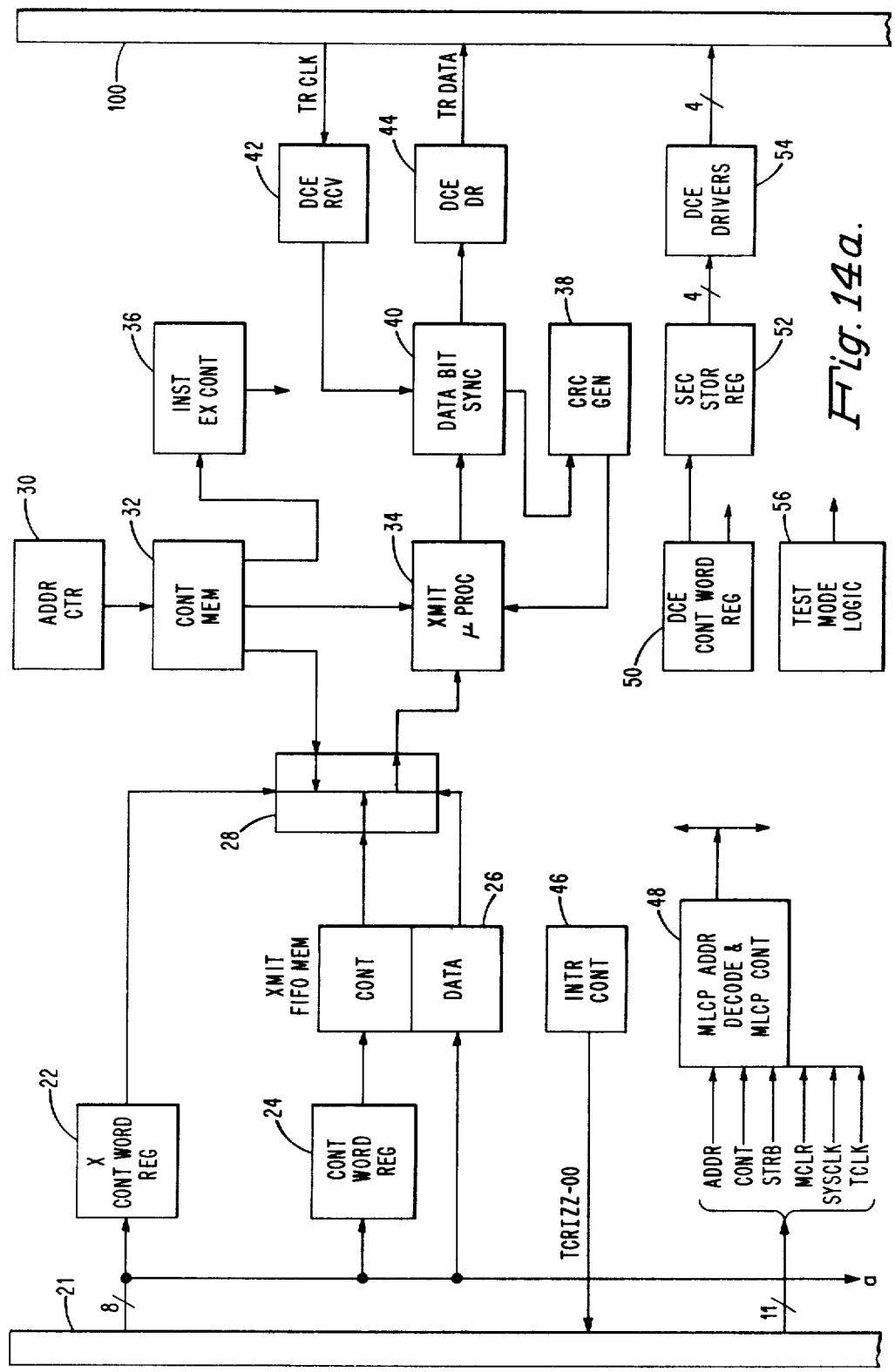
FIGS. 14a and 14b, when arranged side-by-side with FIG. 14a at the top, provide a schematic block diagram illustrating the BHCLA of the invention.
Figure 14B:
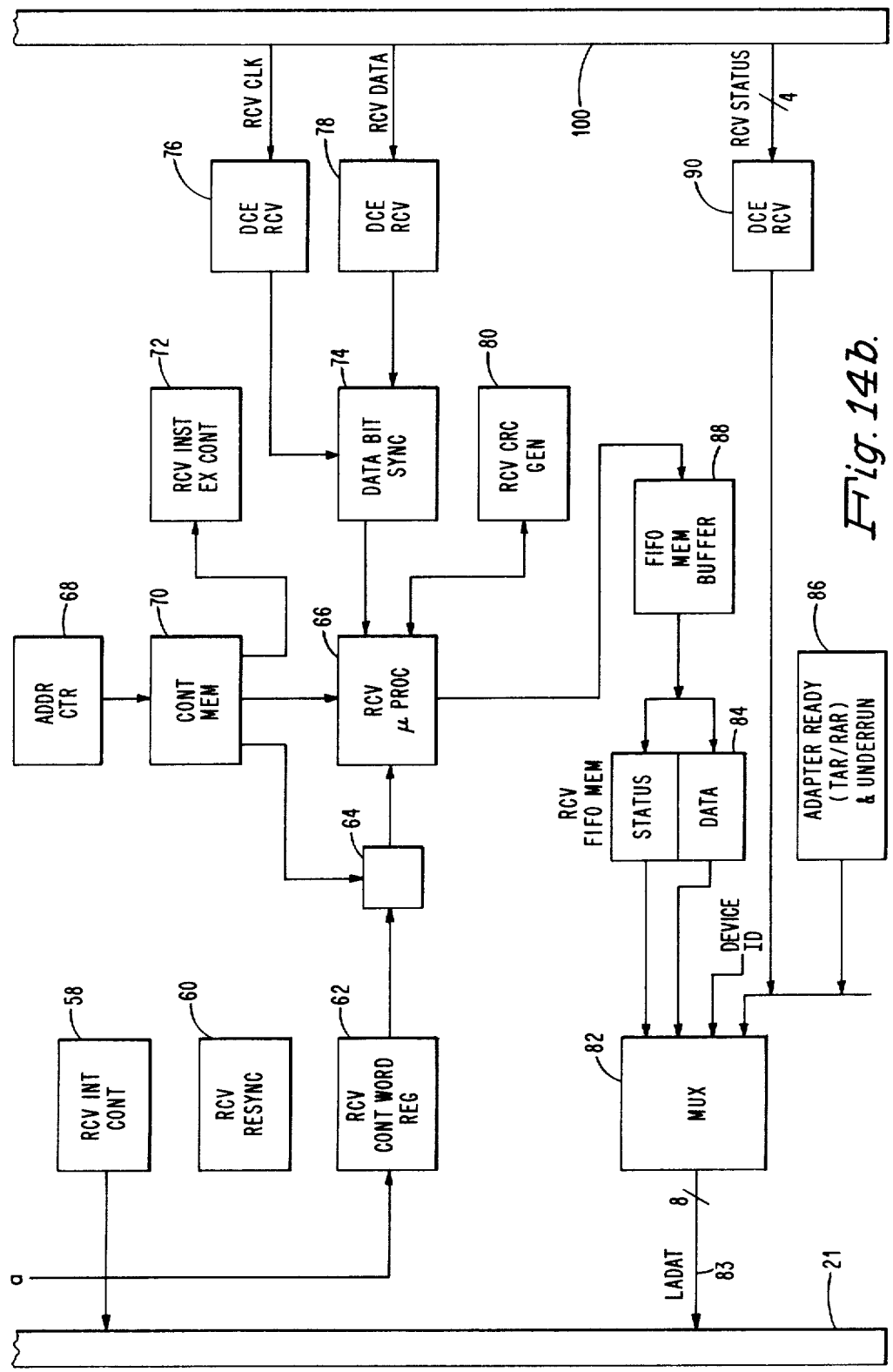

Referring to FIGS. 14a and 14b, the structure and operation of the line adapter of the invention is hereafter described in general. The BHCLA includes a pair of interface connectors 21 and 100 which are coupled, respectively, to the MLCP 10 and to the local DCE 16 (FIG. 13). Basically, FIG. 14a depicts the transmit circuits of the BHCLA and FIG. 14b shows the receive circuits.

The MLCP exercises control over the system through a set of MLCP address decode and control logic circuits 48 which receive from the MLCP address signals ADDR, control signals CONT, a strobe signal STRB, a master clear signal MCLR, and clock signals SYSCLK and TCLK via interface connector 21. In response to these signals, the logic circuits 48 output a variety of control and timing signals to the remaining circuits of the transmit and receive system to effectate necessary timing and control functions. The transmit circuits include a transmit control word register 24 and a transmit extended control word register 22. These registers receive 8-bit and 4-bit control words, respectively, from the MLCP. The format of the transmit extended control word is shown in FIG. 15a and the two formats for the transmit control word are shown in FIGS. 15b (start of frame format) and FIG. 15c (end of frame format).

A transmit FIFO (first-in first-out) buffer memory 26 operates to temporarily store control word data and message data received from the MLCP. The operation of the FIFO memory circuits is such that received 8-bit data and control bytes ripple from the input to the output in a rapid fashion such that a queue of data and control bytes is formed. These bytes are transferred via multiplexer 28 to the transmit microprocessor 34 and from there are shifted in bit-serial fashion onto the communication channel via DCE interface connector 100. Control of this operation is effected by control firmware stored in control memory 32. An address counter 30 and instruction execution control circuit 36 control the execution of the firmware to carry out appropriate transmit control operations in accordance with the invention. The transmitted bit-serial data stream is channeled to connector 100 by a data bit synchronization circuit 40 and a DCE driver circuit 42. A transmit clock signal obtained from the DCE is received by receiver circuit 42 and supplied to data bit sync circuit 40 for synchronizing the data stream to the communication channel. A cyclic redundancy check (CRC) generator 38 monitors the bit stream and provides CRC check data to the microprocessor 34 for error correction purposes.

Control information is also provided to the communication channel via the DCE control word register 50, secondary storage register 52, and a 4-bit DCE driver circuits 54. An interrupt control circuit 46 operates to feed an interrupt signal TCRIZZ the the MLCP through connector 21 to provide appropriate interrupt and response commands thereto. Test mode logic circuits 5 are also provided in the system but do not form an essential function of the present invention and thus are not described further herein.

The receive circuits of the BHCLA, shown in FIG. 14b include DCE receivers 76, 78 and 90 for receiving from the DCE via connector 100 receive clock signals, receive data bit signals, and a 4-bit receive status signal. Data bits are transmitted from receiver 78 to data bit sync circuit 74 and from there are transferred to the receive microprocessor 66. The latter operates under the control of receiver firmware stored in control memory 70 to assemble the data bits into parallel bytes, to perform CRC error checking via the operation of CRC generator 80 and to perform a variety of additional monitoring, formatting, and controlling functions in accordance with the present invention. A receive address counter 68 and instruction execution control circuit 72 operate to provide necessary firmware execution control.

The MLCP provides control information via a receive control word which is stored in the receive control word register 62 and applied to microprocessor 66 through a multiplexer 64. A receive interrupt control circuit 58 operates to provide interrupt and response commands from the receiver circuits to the MCP via interface connector 21.

Assembled receive data bytes are transferred from microprocessor 66 to a FIFO memory buffer circuit 88 and are thence channeled into the receive FIFO memory circuits 84. The latter, like the transmit FIFO memory 26, includes a section for message data and a section for status data. The FIFO memory 84 also operates to ripple received bytes to the output in rapid fashion to automatically provide a queue of bytes for transfer through multiplexer 82 to the MLCP in the form of LADAT signals on the 8-bit output line 83.

Multiplexer 82 also operates to enable the MLCP to read the device ID when it first responds to a receiver interrupt command and to read the receive status signal provided by the DCE through receivers 90. In addition, adapter ready and underrun control signals generated by control circuit 86 are also provided to the MLCP via multiplexer 82. A receiver resynchronization circuit 60 operates on command of either the transmit or receive firmware to automatically resync the receiver circuits to the communication channel in anticipation of a data receive operation. This function preconditions the receiver circuits such that the MLCP does not have to respond as quickly to a receive interrupt command.

In general, operation of the BHCLA transmit circuits as is follows. The MLCP initializes the system by activating decode logic 48 at the start of a transmit operation. The MLCP selects a particular adapter and sets up appropriate registers via the address and control lines coupled to decode logic 48. Device ID information is transmitted to the MLCP via multiplexer 82 at the outset to signal the identify of the responding adapter. The MLCP transfers DCE control bits to the DCE via DCE control word register 50 to provide an appropriate response to the DCE. Thereafter, the MLCP reads the DCE status through receivers 90 and multiplexer 82 to determine that the DCE is ready to receive transmitted data.

Next the MLCP loads control word registers 22 and 24 and then begins transferring data and control bytes to the FIFO memory 26. The MLCP continues to load the FIFO memory with transmit data until the memory is full, as indicated by the transmit adapter ready signal TAR generated by circuit 86. When this occurs, interrupt control 46 signals the MLCP to cease supplying transmit data.

As soon as the DCE is ready to receive data, the transmit microprogram in control memory 32 operates the transmit circuits to take data and control bytes from the output of FIFO memory 26 and to transmit them to the communication channel.

During this operation, data is transmitted into the communication channel in bit-serial fashion a frame at a time in accordance with the frame format shown in FIG. 15h. The transmit firmware, operating through microprocessor 34, keeps track of the frame sequence and controls the system accordingly. At the beginning of each frame time the microprogram checks to see if valid data is present at the output of FIFO memory 26 and if it is, an initial flag sequence is transmitted and CRC generator 38 is initialized.

If valid data is not present at the output of the FIFO memory, the program transmits flag or abort bit sequences as specified by the TIFM bit stored in register 22 (FIG. 15a). When transmitting a message frame, the program transfers bytes from the FIFO memory into the microprocessor 34 and causes the data to be shifted out of the microprocessor a bit at a time onto the communication channel through the bit sync circuit 40 and driver 44. At the end of each byte interval, a new set of data and control characters is shifted into the microprocessor from the FIFO memory. A transmit byte size counter located in the microprocessor random access memory (RAM) is reloaded with a byte size code developed from the TBS bits in the transmit control word (FIG. 15b) to enable the microprocessor to control the byte size in accordance with the TBS code.

When the program detects a TEOF bit of 1 in the control byte transferred from the FIFO memory (FIG. 15c), it initiates the end of frame transmit sequence. The next character transmitted to the channel is known to be the last character of the text field of the frame. After this character has been transmitted, the first 8-bit half of the CRC check character is transferred from CRC generator 38, complemented and transmitted to the channel. Thereafter the second 8-bit half of the CRC check character is transmitted to complete the FCS field.

Next the program controls the system to transmit a closing flag sequence during the next byte interval to complete transmission of the frame. Interrupt control circuit 46 is set to generate an interrupt to the MLCP and the control word registers 22 and 24 are reset. In response to the interrupt, the MLCP reads the DCE status through multiplexer 82 and examines the TU bit in the DCE status word (FIG. 15g) to determine if an underrun condition occurred. If TU is reset, no underrun is indicated.

If during the frame transmit interval valid data bytes were not found to be available at the output of the FIFO memory, an underrun condition is declared and the microprocessor sends out an abort sequence followed by a series of flag sequences. When valid data is later detected at the FIFO output, it is discarded until the TEOF 1-bit is detected in the transmit control word, whereupon the underrun bit TU of the DCE status word is set along with interrupt control circuit 46 for generation of the interrupt command to the MLCP.

During the receive mode, the general operation of the system is as follows. The MLCP loads a receive control word (FIG. 15d) into register 62 and a resync command issues from decode logic 48 to trigger resync circuit 60 for initializing the receiver hardware. This clears out the FIFO memory circuits and prepares the system for a receive cycle.

During each negative transition of the receive clock signal at receiver 76 a data bit at receiver 78 is copied into a bit buffer circuit in data bit sync logic 74. Thereafter, the receive firmware shifts the data bit into the microprocessor and checks for the presence of a flag sequence 01111110. When the flag is detected, the program looks for the first subsequent non-flag character, which is determined to be the first character of the received message frame. At this time, the system presets the CRC generator 80 to the all-one state to prepare it for generating the CRC check character and enters a shift register microprogram control sub-routine to being assembling receive characters.

After a delay of 32 bit times, the receive program enters a data transfer sub-routine whereupon an assembled character is loaded in parallel into the FIFO buffer 88. The program then transfers the character into the data section of the FIFO memory 84, resets buffer 88 and loads an all-zero status character from buffer 88 into the status section of the FIFO memory 84.

Reentry of the shift register microprogram sub-routine assembles the next received character and thereafter reiteration of the data transfer control subroutine loads the character into buffer 88 and thence into the FIFO memory 84 along with an all-zero status byte.

This series of operations continues until a flag sequence denoting the end of the received frame is detected. The program then shifts to the flush control subroutine whereupon the last received character is right justified and tested for the partial byte condition. The program generates the status word associated with the last character and extracts the byte size and partial byte size information from it to determine the presence of the partial byte condition. Thereafter, the accumulated CRC check character is read from the CRC generator 80 eight bits at a time and a remainder check is performed. If the value of the CRC remainder is incorrect, the RFCSE bit of the receive status word is set along with the REOF bit to indicate the FCS error condition and to indicate that the end of the frame has been reached. Thereafter, the last data and status bytes are loaded into the FIFO memory 84. The program then completes the frame sequence by transferring the FCS (as two 8-bit bytes) received from the DCE to the FIFO memory (if the receive control word so specifies).

If before any received characters are loaded into the FIFO memory, a FIFO full indication is present, an overrun condition is indicated. In response to this, the BHCLA processes the rest of the frame, discarding the remaining characters. When the end of frame bit is detected, a receive status word is loaded into the FIFO memory including RO and REOF bits in the set state to indicate the overrun and end of frame conditions.

If a received frame is ended by an abort sequence (eight 1-bits) the CRC character is not inspected and the RA bit of the receive status word is set together with the REOF bit to signal the indicated situation to the MLCP.

Each time data and status characters are available at the output of FIFO memory 84, the receive interrupt control 58 is set to generate an interrupt command to the MLCP. The MLCP responds through decode control circuits 48 by reading the receive status and data words through multiplexer 82. Each such read operation shifts the FIFO memory to make the next status and data characters available. The MLCP next reads the DCE status via receiver 90 and inspects the output of control circuit 86. If the latter presents an RAR bit in the set state, the MLCP reads another pair of data and status characters from the FIFO memory 84. The MLCP continues with this cycle as long as the RAR bit remains true. When RAR shifts false, the receive interrupt control 58 is reset and the MLCP ceases reading data from the FIFO memory. Whenever another character appears at the FIFO output, RAR goes true again and interrupt control 58 generates another MLCP interrupt to resume transfer of received data and status characters to the MLCP.

When the REOF bit in the receive status word is set indicating an end of frame condition, the MLCP knows that the last character of the text field of the frame is at the FIFO output. The MLCP reads the last character along with the last status character and inspects the latter to determine if an overrun condition exists or if a frame abort or FCS error condition was detected. Also, the status character is inspected to determine the presence of a partial last byte and the appropriate last byte size. The MLCP then concludes the frame sequence by reading the FCS check character (as two 8-bit bytes) from the FIFO output (if so specified).

EXPLANATION OF LBD FIGS. 1-12

The logic block diagrams of FIGS. 1-12 are not described herein in exhaustive element-by-element detail in an effort to avoid unnecessarily lengthening and complicating the specification. The elements shown in FIGS. 1-12 are referenced to the more general hardware schematic of FIG. 14 through the below-listed cross-reference table setting forth the circuit elements shown in FIG. 14 and giving the corresponding hardware elements illustrated in FIGS. 1-12. In the latter figures, element reference codes such as, for example, "01B01" and "08B04" are employed to designate the circuit elements. The last two digits of such five-digit codes indicate the figure in which the element appears. Thus, all element designations ending in "01" appear in FIG. 1, those ending in "04" appear in FIG. 4, etc. Each of the blocks shown in the FIG. 14 general schematic diagram is referenced to the detailed FIG. 1-12 schematics as follows:

| CROSS-REFERENCE TABLE | |
|---|---|
| FIG. 14 CIRCUITS | CORRESPONDING CIRCUITS OF FIGS. 1-12 |
| 21 | 01B01, 01C01 |

-continued

| CROSS-REFERENCE TABLE | |
|---|---|
| FIG. 14 CIRCUITS | CORRESPONDING CIRCUITS OF FIGS. 1-12 |
| 22 | 06A06 |
| 24 | 01A06 |
| 26 | 01B06, 03B06, 05B06, 07B06 |
| 28 | 02C06, 06C06, 01A08-08A08 |
| 30 | 01A07, 04A07, 07A07 |
| 32 | 01C07, 04C07, 07C07, 10C07, 07D07, 10D07 |
| 34 | 01B08 |
| 36 | 07B04, 09A08, 10A08, 12A08, 07B08, 09B08, 03D08, 07C08, 05D08, 06D08, 07D08, 09C08, 09D08, 11C08, 12C08, 13C08, 11A06, 13A06 |
| 38 | 03C08 |
| 40 | 02C08, 01D08, 02D08 |
| 42 | 03A05, 03B05 |
| 44 | 04C05, 04D05, 05D05 |
| 46 | 04A06, 12A06, 10B06, 11C06, 12C06, 11D06, 12D06 |
| 48 | 01A02, 04A02, 07A02, 08A02, 10A02, 01B02-10B02, 01C02, 03C02, 07C02, 09C02, 01D02, 02D02, 03D02, 04D02, 09D02, 01B03, 01C03, 04B03, 04C03, 08B03, 08C03, 08D03, 10B03, 10C03, 10D03, 07A04 |
| 50 | 08A04, 11A04 |
| 52 | 08B04 |
| 54 | 01C05, 01D05, 02C05, 02D05, 03D05, 06C05, 06D05, 07D05, 08C05, 08D05, 09D05 |
| 56 | 08B01, 10C01, 10D01, 09A02, 11B02, 12B02, 02A03, 02B03, 01D03, 02D03, 04A03, 06A03, 06B03, 04D03, 05D03, 11C04, 10A05, 11A05, 12A05, 12X07, 12X09 |
| 58 | 11B12, 13B12, 11C12, 11D12 |
| 60 | 07D02, 08D02 |
| 62 | 01A10, 05A10 |
| 64 | 01B10-08B10 |
| 66 | 01C10, 07C10 |
| 68 | 01A09, 04A09, 07A09 |
| 70 | 01C09, 04C09, 07C09, 10C09, 04D09, 07D09, 10D09 |
| 72 | 06D10, 12D10, 06A11, 08A11, 09A11, 13A11, 03B11, 06B11, 07B11, 08B11, 09B11, 03C11, 02D11, 06C11, 04D11, 08C11, 08D11, 09D11, 10D11, 12B12 |
| 74 | 12D04, 01C11, 02C11 |
| 76 | 04A05, 04B05 |
| 78 | 05A05, 05B05 |
| 80 | 04C11 |
| 82 | 01B04, 04B04, 01D04-08D04, 02C12, 06C12 |
| 84 | 01B12, 03B12, 06B12, 08B12 |
| 86 | 03A04, 05A04, 06A04 |
| 88 | 04A12 |
| 90 | 01A05, 01B05, 02A05, 06A05, 06B05, 07A05, 07B05, 08A05, 08B05, 12C05 |
| 100 | 02D01 |

Figure 1A:
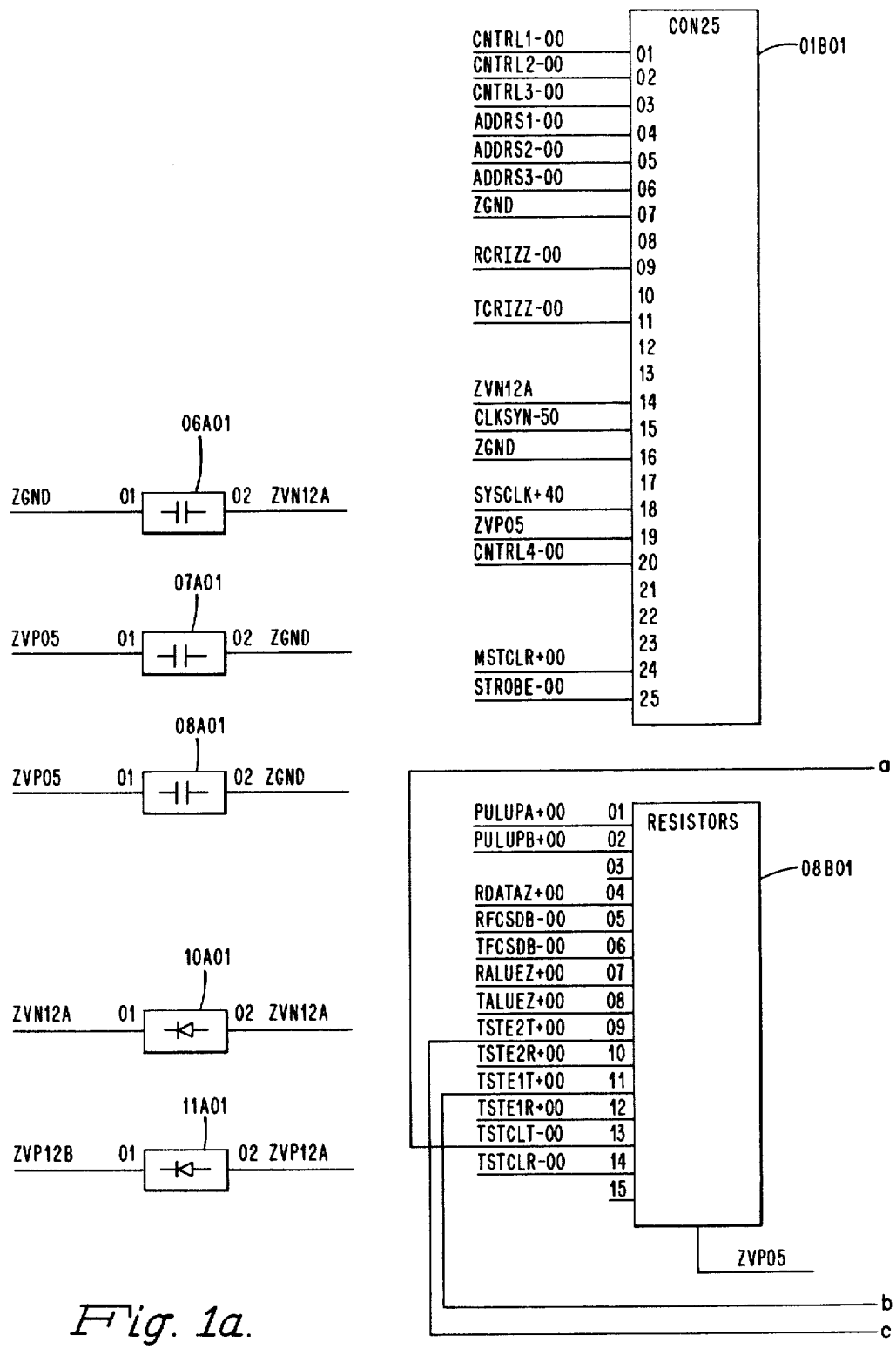
FIGS. 1–12 represent twelve sheets of LBDs (logic block diagrams) providing detailed circuit schematics of the broadband high-level data link communication line adapter (BHCLA) of the invention. Each of the FIGS. 1 through 12 is divided into two halves (e.g., FIG. 1a and FIG. 1b) which, arranged in side-by-side fashion with the "a" half on the left, depict one LBD sheet.

The interconnections between the hardware elements shown in FIGS. 1-12, where not specifically illustrated by means of a connecting line or lines, are disclosed by the use of signal identifiers such as "CNTRL1-00" as shown at the pin 01 input to connector 01B01 of FIG. 1a. The source of this signal, as well as all other signals, can be readily determined by reference to the signal source table provided in FIGS. 18a-18c. Thus, it is noted from FIG. 18a that the signal CNTRL1-00 emanates from element 01B01 (see column 1, line 14 of FIG. 18a).

The detailed logic schematics of FIGS. 1-12 illustrate known, standard integrated circuit logic chips available from commercial IC suppliers. The individual part identification code is provided on each element shown. For example, JK flip-flop 07D02 (FIG. 2b) is a standard 74LS112 integrated circuit chip. Some of the illustrated circuit elements are available only from particular suppliers. Microprocessors 01B08, 01C110 and 07C10 are similar parts 2901 available from Advanced Micro-Devices (A.M.D.). Also, the PROMs shown in FIGS. 7b and 9b are available as part Nos. 82S137 from the Signetics Corporation.

When referring to the LBDs of FIGS. 1-12, it is recommended that each of the sheets be separated and arranged in side-by-side fashion such that the "a" and "b" halves of each figure can be viewed simultaneously to permit more convenient reference thereto.

DETAILED DESCRIPTION OF EMBODIMENT

Referring to the FIGS. 1 through 12 and Appendix A, the operation of the BHCLA in response to output control functions for initialization received from the MLCP will be described.

Before beginning the description of the LBDs, a brief description of the firmware micro-programs used in the system shall be provided. The first micro-program to be described is the transmit program set forth in Appendix A.

TRANSMIT FIRMWARE

Referring to line #22500 of Appendix A, a first column beginning with a $ mark indicates the start of an instruction. The INIT001 following the $ is an address tag. The address tag is used as a reference in branch instructions. The next column which in this case is "MMP" is the instruction itself. There are 10 basic instructions in the firmware program as defined in the dictionary section between lines #18800 and 20800 of Appendix A. Referring again to the line #22500, the third column is reserved for the operand fields of the instruction. In this case, there are five operands beginning with 0# and ending with QR. The fourth column beginning with a backslash ( ) mark is the comments field for the instruction, and the fifth, sixth and seventh columns refer to the hexadecimal address of the instruction in the PROM (Programmable Read Only Memory) in the preferred embodiment disclosed herein. The sixth and seventh columns refer to the contents in hexadecimal at the indicated address. The transmit firmware thus is seen to be 24-bits wide. More particularly, the contents at hexadecimal address 070000 would be as follows: 0000 followed by 0111 followed by 0000 followed by 0000 followed by 0000 followed by 0000. These correspond to bits specified as bits 00 thru 23, respectively.

Referring to the instruction dictionary beginning with line 18800, it is seen that the first instruction MMP (line 19000) is preceded by the word "MICRO". This identifies the instruction as a microinstruction. The MMP instruction is an acronym meaning "modify microprocessor"; the MMP instruction effects a change in either the contents of the RAM of the microprocessor used in a transmit operation, or a change in the Q register of the microprocessor.

Figure 16A:
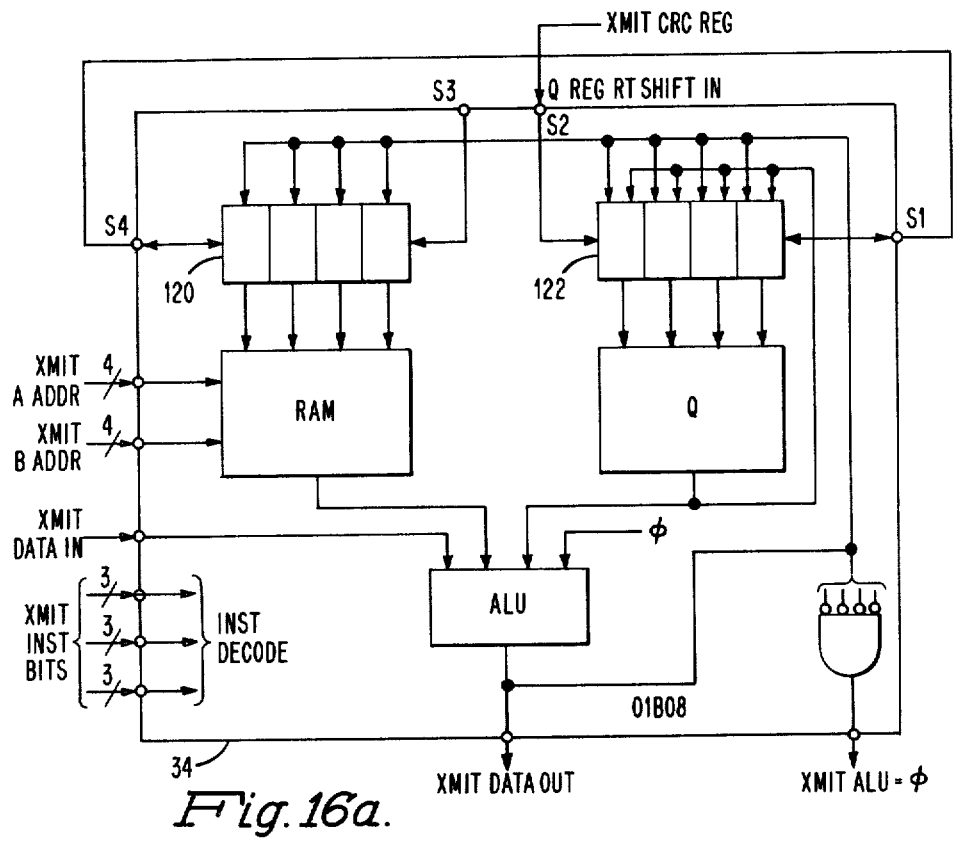
FIG. 16a is a schematic block diagram of the 4-bit transmit microprocessor used in the system of the invention.
Figure 16B:
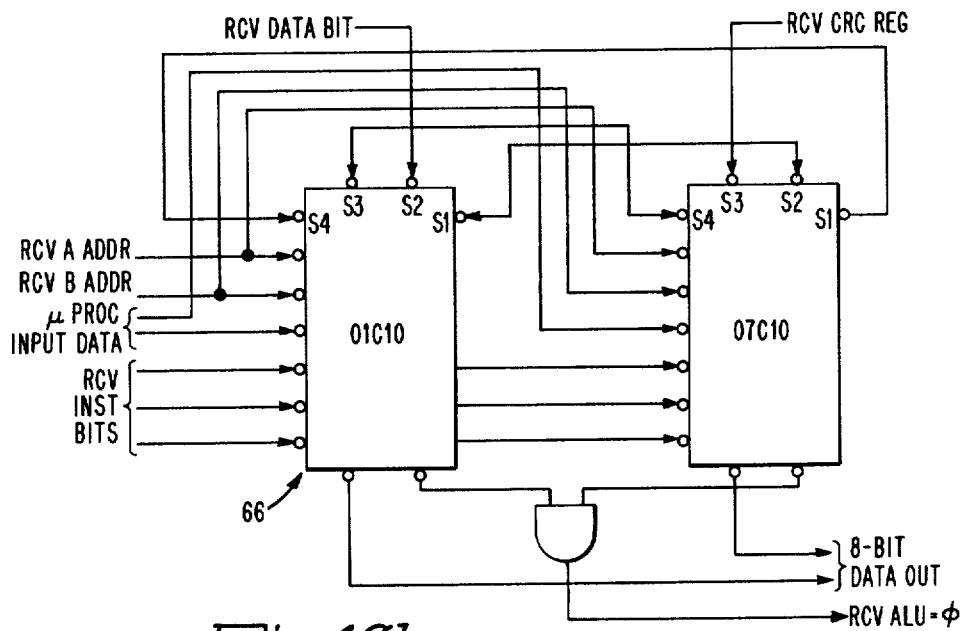
FIG. 16b shows the receive microprocessor circuit employed in the system, illustrating the manner in which two of the 4-bit microprocessors shown in FIG. 16a are cascaded to provide an 8-bit microprocessor for handling received data.
Figure 17A:
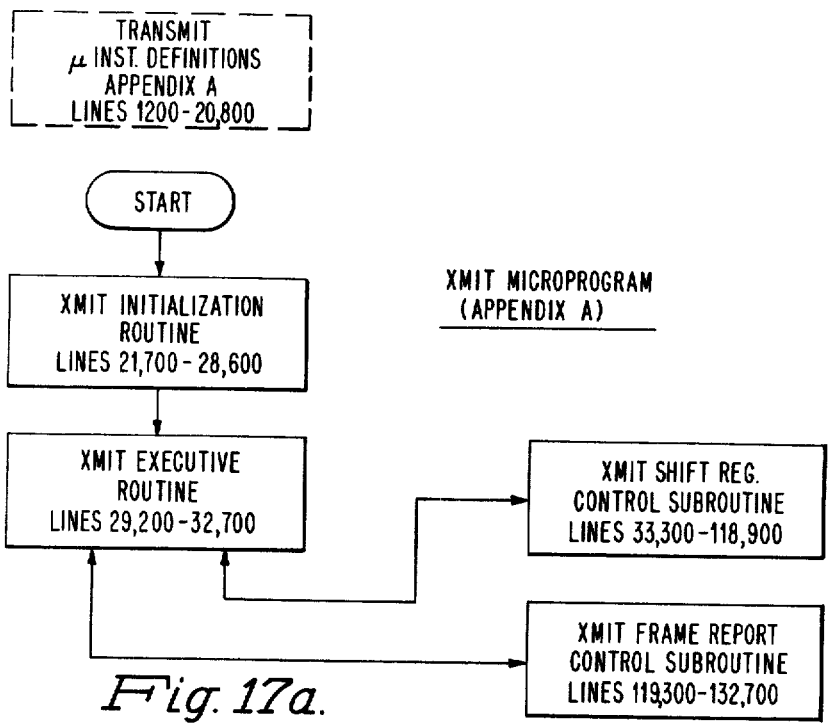
FIG. 17a is a block diagram illustrating the basic functions performed by the transmit microprogram set forth in detail in Appendix A.
Figure 17B:
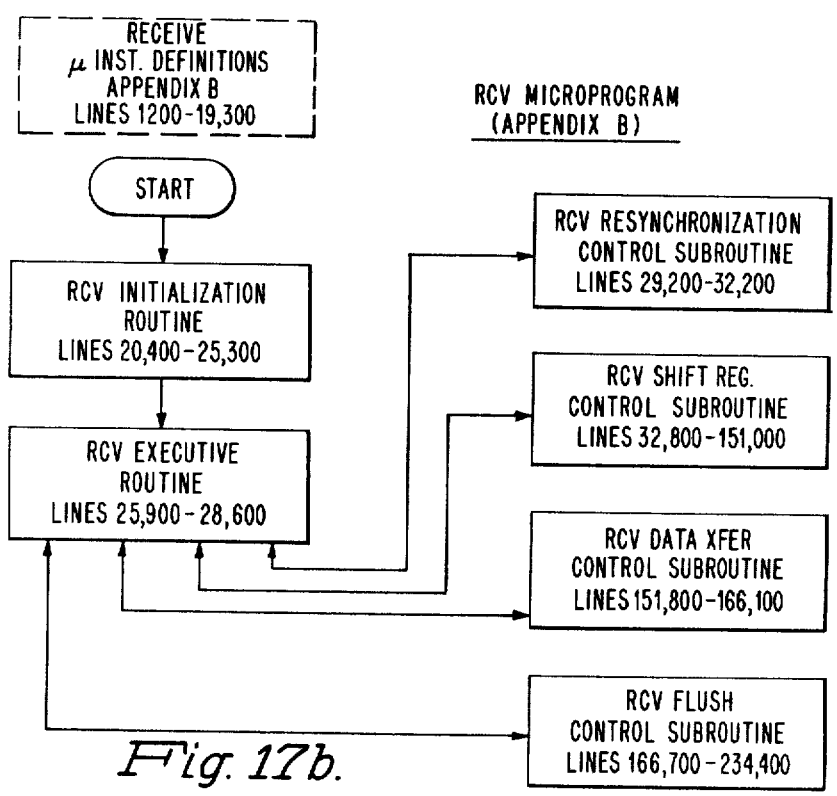
FIG. 17b is a block diagram illustrating the basic functions performed by the receive microprogram illustrated in detail in Appendix B.

It should be noted that the microprocessor used during a transmit operation is a 4-bit microprocessor as shown in FIG. 16a. In a receive operation, two 4-bit microprocessors are cascaded to form an 8-bit microprocessor as shown in FIG. 16b. At line #19200, a TAMN instruction is indicated which is an acronym for "test and modify next". The function of this instruction is to test and modify a next sequentially occurring microinstruction. In operation this test instruction performs a test on a function specified by a test field operand, and based upon the results of that test, a next sequentially occurring microinstruction is either executed or ignored.

At line #19400, an instruction SC refers to a subcommand. This command sets, resets or loads, as indicated by the SC operand field, indicated flip-flops in the hardware of the present invention.

Referring to line #19600, the instruction BR refers to a branch instruction for branching from a current address to an indicated address to an address specified in the BRADDR operand field.

Referring to line #19800, the instruction BRSC refers to a branch and subcommand instruction which combines the functions of the SC and the BR instructions.

Referring to line #20000, the instruction UDSCR refers to the updating of a data set control register. In operation, the instruction effects the writing of an MLCP signal into a register of the BHCLA.

Referring to line #20200, the instruction RCRCR refers to a reset of the cyclic redundancy check register. The instruction effects the loading of the transmit CRC register with all logic ones.

Referring to line #20400, the instruction UCRCR indicates an update of the CRC register. In operation, the next transmit data bit is applied to the CRC register.

At line #20600, the instruction RER refers to a reading of an external register (i.e., a register external to the microprocessor). Information which has been received from the MLCP thereby is read into the microprocessor.

Referring to line #20800, the instruction ZERO is merely a tool to set all unused locations in the firmware program to all logic zeroes.

The operand fields of the instruction set will now be described. In each of the operand fields of the various instructions, the WTFLD or word type field distinguishes one instruction from the other for the benefit of the hardware. For example, it is seen that as far as the hardware is concerned, the BR and the BRSC instructions are the same. The instruction sets beginning with the MMP instruction through the RER instruction differ as seen by the word type fields. For example, the MMP instruction has an operand field (WTFLD/0) indicating that the word type field is set to all logic zeroes. The instruction TAMN indicates that the three-bit word type field is set to a 001. For the instruction SC, the word type field is set to a 010. Continuing, the word type field for the instruction RER is set to a 111. The word type field is defined at line #2400 of Appendix A wherein it is seen that the field begins with bit 16 and is a 3-bit field. More particularly, bits 16, 17 and 18 of any location in the PROM refers to the word type field. Referring to the LBD of FIG. 8, the decoder 09B08 decodes the bits 16, 17 and 18 to indicate one of the eight instruction types. That is, instructions 0 through 7.

It is noted that each of the instructions has two lines of operand fields. The first line of operand fields refers to fields which are specified when each instruction is written. The second line of operand fields indicates permanently defined operand fields that are not specified where the instruction is written. It is noted that the word type field occurs in the second line of operand fields, and thus is a field which is permanently established and not altered by the program. A second operand field in the second line of operand fields, is the ISCFLD field which occurs in the case of instructions SC, BR and BRSC. The ISCFLD field is an acronym referring to an inhibit of a subcommand. This one bit field is a logic zero in the case of a SC or a BRSC instruction which enables the execution of the subcommand. In the BR instruction only, however, the one-bit ISC field is at a logic one level which inhibits the subcommand instruction. Referring to line #2600, it is seen that the ISC field is defined to occur at bit 12 of locations occurring in the PROM.

Figure 8A:
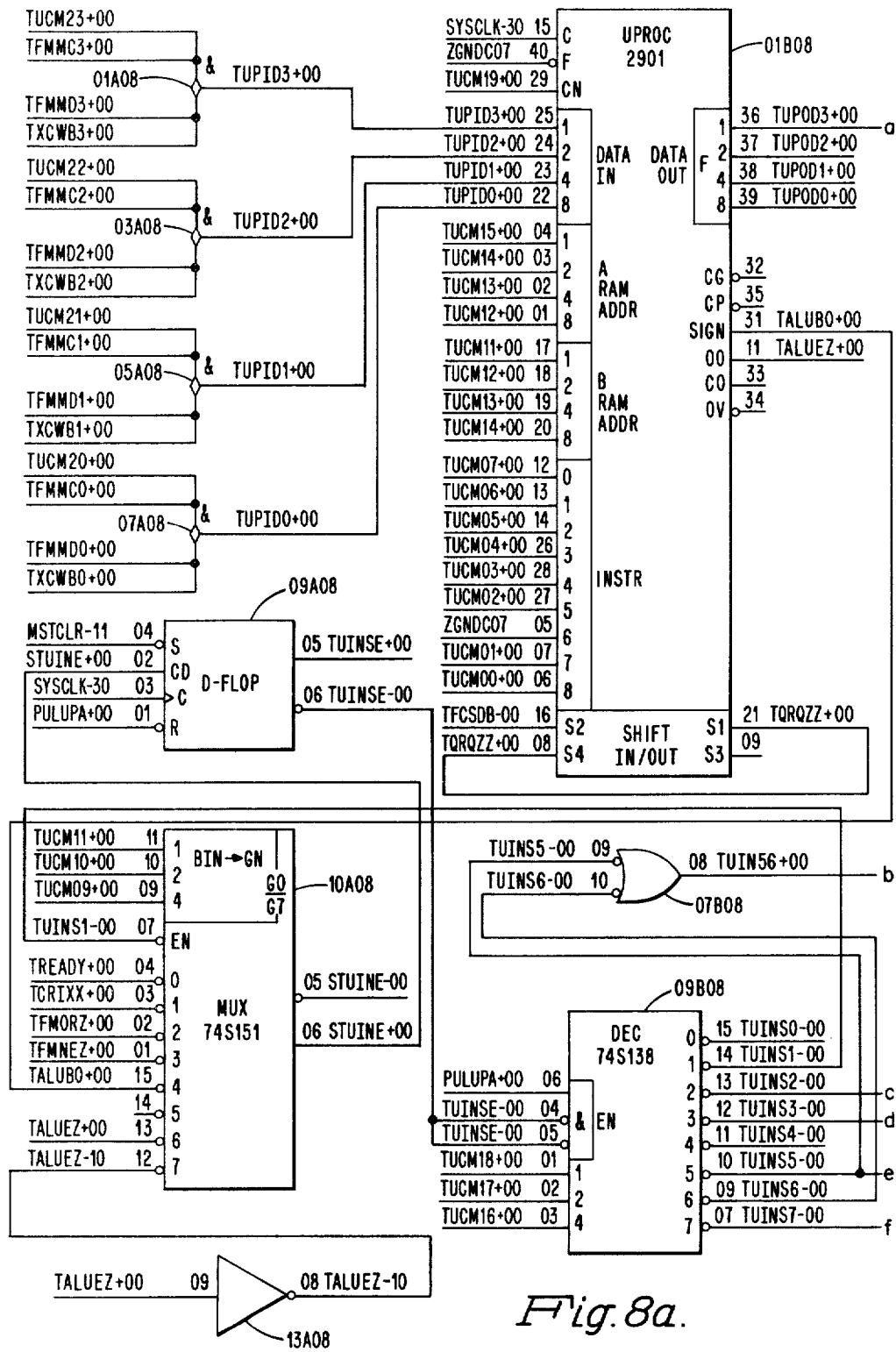
Figure 8B:
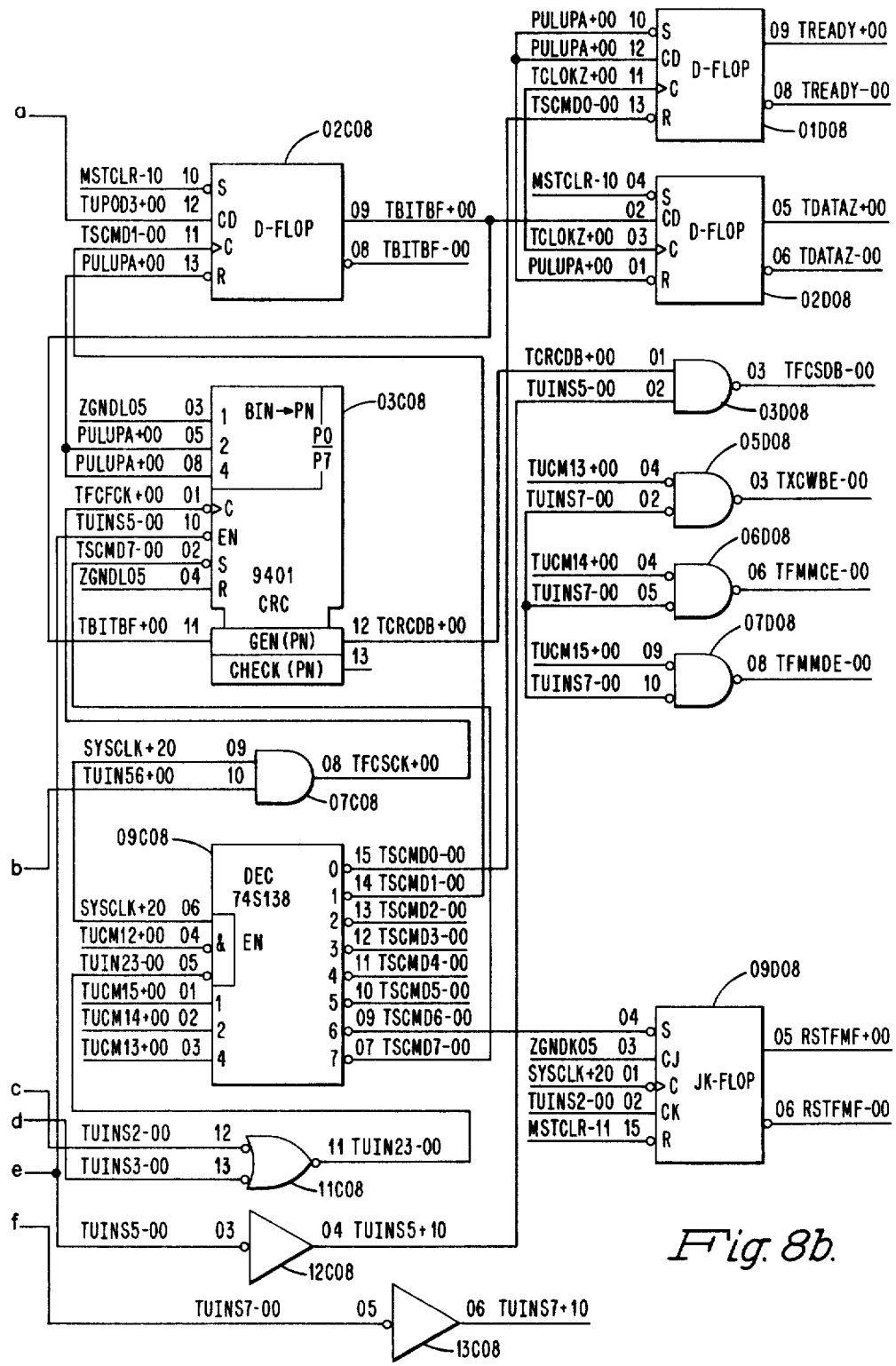

Referring to FIG. 8, it is seen that the ISC field bit TUCM13+00 is applied to a decoder 09C08 at pin 4.

The IFWFLD field is an inhibit file write field used in the BR and the BRSC instructions. In each of the instructions, this 2-bit field is set to a logic zero. Referring to the line 2700 of the micro-program, it is seen that the IFWFLD field is a 2-bit field beginning with bit 0. The two bits of the IFWFLD are applied to the microprocessor 01B08 of FIG. 8. More particularly, the bits are applied to pins 6 and 7 of the microprocessor. A logic zero occurring at pins 5, 6 and 7 of the microprocessor 01B08 prohibits the writing of information into the RAM of the microprocessor.

The KFLD field is a constant field which is used both as an invariable field in the second line of operand fields for the instruction RER, and as a variable field in many of the other instructions such as the MMP instruction. The K field provides means for supplying a constant value to the system in order to provide constants for logic or arithmetic functions. Referring to line #2500 of Appendix A, it is seen that the constant field is a 4-bit field beginning with bit 20.

In the case of the RER instruction, the K field is in an all logic 1 state.

Figure 7A:
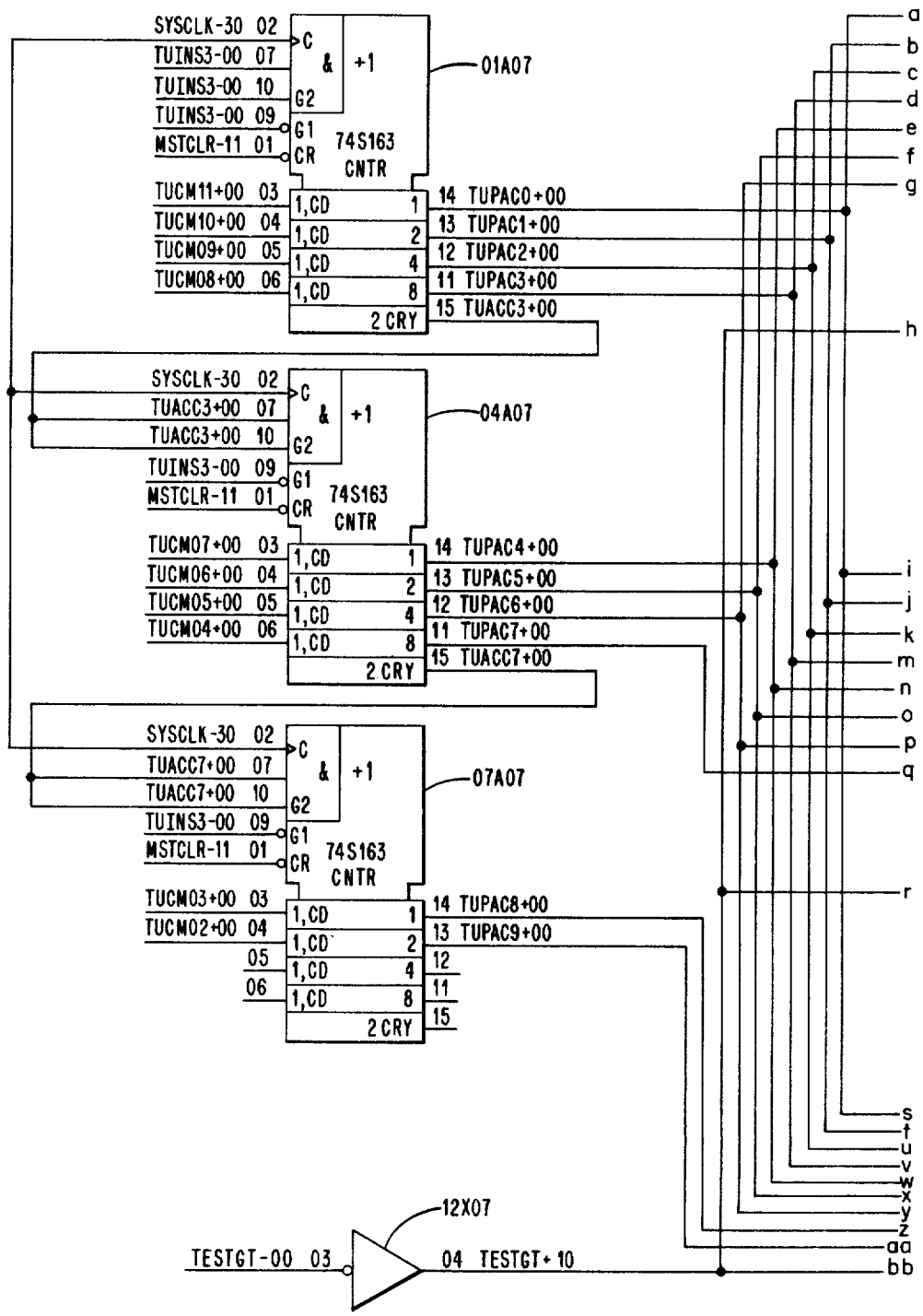

The transmit micro-program resides in the six PROMs 01C07, 04C07, 07C07, 10C07, 07D07, 10D07 shown in FIG. 7. Referring to FIG. 7, it is noted that the mnemonics TUCM00 through TUCM23 refer to the twenty-four outputs of the control memory PROMs 10C07, 07C07, 04C07, 01C07, 10D07, and 07D07.

Referring now to the transmit instructions at lines 19000 through 20800 of Appendix A, we will now discuss the operand fields which are used as each instruction is executed.

The first field to be discussed is the KFLD field, which is referred to as the constant field. This field is used to allow the program to introduce a constant or a mask into the operation. As indicated at location 2500, the KFLD field occurs between bits 20 and 23. The four-bit constant field is reflected in the circuit of FIG. 8 by the signals TUCM20, 21, 22, and 23. The signals are reflected in the output of the PROM 07D07. The KFLD signals are applied through the wired AND tri-state nodes 07A08, 05A08, 03A08, and 01A08 of FIG. 8 to the data inputs of the microprocessor 01B08.

The KFLD field is used by the following instructions: MMP, TAMN, SC, UDSCR, RCRCR, UCRCR.

The FAFLD and FBFLD fields are used to address the internal 64-bit RAM of the microprocessor 01B08. The internal RAM is compressed of 16 four-bit words. The internal RAM of the microprocessor has two output ports, identified as the A and B output ports as shown in FIG. 16a. In order to address the internal RAM, therefore, two address fields are required. Hence, the FA field and the FB field are identified. The FA field and FB field are applied respectively to the A address and B address inputs to the RAM and control the A and B output ports. Referring to lines 3300 through 4900 of the micro-program, it is seen that the FAFLD and FBFLD fields are each four-bit fields. The FAFLD field occurs inclusively between bits 12 and 15 while the FBFLD field occurs inclusively between bits 8 and 11. Referring to the four columns associated with each of the identified fields, it is seen that at line 3600, for example, that upon a program identifier A0 being used by a progammer, the program assembler would generate a hexadecimal 0. In like manner, if a program identifier A4 is used, the program assembler would generate a hexadecimal 4 ("0100"). These hexadecimal numbers would appear in bits 12 through 15. The A field signals occur at the output of PROM 1C07 of FIG. 7, while the B field signals occur at the output of PROM 04C07. These FA and FB FLD signals are applied respectively to the ARAM address inputs and BRAM address inputs of the microprocessor 01B08 of FIG. 8.

The FAFLD field is used with the following instructions: MMP, PAMN, UDSCR, RCRCR, UCRCR. The FBFLD field is used with the MMP instruction, USC instruction, the UDSCR instruction, the RCRCR instruction, the UCRCR instruction, and the RAR instruction.

The OPFLD field is the operation code field referenced at line 5400 of the micro-program. The OP field occurs in two different fields, bits 2 through 7, and bit 19. The bits in the operation code field specify the arithmetic or logic function to be performed by the microprocessor. The logical functions which may be performed by the microprocessor are defined between lines 5600 and 8500 of Appendix A. The arithmetic functions are defined between lines 8800 and 12700. Referring to the logic functions, for example line 5900, the logical function A0RB indicates that the data occurring in the input RAM of the microprocessor addressed by the address inputs is logically ORed with the data occurring at the location addressed by the B address inputs of the microprocessor. In the second column occurring at line 5900, in the term "062C" the C indicates that the 062 is an octal value. The octal value is applied to bits 2 through 7 and bit 19 as indicated on line 5400. The logical functions to be performed are described in the comment field occurring in the third column of the logical functions of the OPFLD field. Such comments also occur in the third column of the arithmetic functions of lines 8800 through 12700.

Referring to lines 7200–8500 of the transmit program, D refers to the data on the data input lines of the microprocessor 01B08 of FIG. 8, and the Q refers to data stored in the internal Q register of the microprocessor. The logic function AND refers to a logical AND, NOT refers to a logic inversion, XOR refers to a logic exclusive OR, XNOR refers to a logical exclusive NOR, and the term "ALUZ" indicates that the internal ALU of the microprocessor is forced to an all zero output.

Referring to the arithmetic functions of the OPFLD field between locations 8800 and 12700 of the transmit program, the P indicates a + or an addition operation, M indicates a − or a subtraction operation, 1C indicates a 1's complement, and 2C indicates a 2's complement. As a further example, referring to line 11000, the function QM1 indicates that a 1 is subtracted from the contents of the Q register of the microprocessor.

The OPFLD signals occur at the outputs of PROMs 10C07, 07C07, and 10D07 (FIG. 7). These signals are the TUCM02 through TUCM07 signals, and the TUCM19 signal. These signals are applied to the instruction bit inputs 0 through 5 of the microprocessor 01B08, and to the carry-in input CN of the microprocessor.

Referring to the instruction dictionary beginning at line 18800 of Appendix A, it is seen that the OPFLD field is used in execution of all instructions except the BR, BRSC and 0 instructions.

The FDFLD field is referred to as the file destination field. Referring to lines 13200 through 13700, it is seen that the FDFLD field is a two-bit field beginning at bit 0. The FDFLD fields specifies where the output of the ALU of the microprocessor is stored, and whether a shift is to occur before the data is stored. For example, a QR instruction indicates that the data is stored in the Q register of the microprocessor without shift. The FR instruction indicates that the ALU output is stored in the internal RAM address specified by the B RAM address input lines of the microprocessor. The instruction SRQF indicates that the Q registers shall be shifted right and then stored back in itself, and the output of the ALU is loaded into the internal RAM after being right shifted. The SLQF instruction indicates that the information stored in the Q register of the microprocessor is shifted left one bit and then stored in the Q register, and that the ALU output is shifted left one bit and stored into the internal RAM.

Referring to the microprocessor 01B08 of FIG. 8, the signal TQRQZZ at the S1 output of the microprocessor refers to the rightmost bit of the Q register. The S1 output is connected to the S4 input or leftmost input of the internal RAM of the microprocessor (FIG. 16a). Thus, during an SRQF or an SLQF instruction, in a shift right instruction, the S1 output is applied to the S4 input to the microprocessor, and in a shift left instruction, the S4 output is applied to the S1 input.

It is noted that the S1 and S4 terminals are bidirectional pins. In this manner, an eight-bit shift register has been formed by connecting the four-bit Q register with a four-bit location in the internal RAM. During an SRQF instruction, the output of AND gate 03D08 is applied to the S2 input of the microprocessor. In this manner, a cyclic redundancy check character from the CRC generator 03C08 is shifted into the microprocessor. The two bits comprising the FDFLD field correspond to the signals TUCM00 and TUCM01 at the outputs of PROM 10C07 of FIG. 7. These signals are applied to instruction bits 7 and 8 of the microprocessor 01B08. This FD FLD field is used by each of the instructions except the BR, BRSC and the 0 instructions.

The TSTFLD field refers to a test field used only by the TAMN instruction. Referring to lines 14400 through 15400 of the Appendix A, the first column identifies seven hardware functions which may be tested by the TAMN instruction. The test field is comprised of four bits, bits 8 through 11 as indicated at line 14400. The four-bits correspond to the TUCM08 through TUCM11 signals at the output of the PROM 04C07 (FIG. 7). The signals TUCM09 through 11 are applied to the select inputs of the multiplexer 10A08 of FIG. 8. Referring again to lines 14400 through 15400 of the program, the hardware function TRDY is indicated by the occurrence of all logic zeros on the TUCM signals 8 through 11. The hardware function indicating that the next transmit bit is ready is tested. If it is found that the bit is not ready, then the next sequential instruction will be executed. If it is found that the next transmit bit is ready, however, the next sequential instruction is treated as a NO OP. The hardware function TFMNE is tested when an octal three occurs on the TUCM lines 8 through 11. More particularly, if the transmit FIFO memory is empty, the next sequential instruction is executed. If the transmit FIFO memory is not empty, however, the next sequential instruction is treated as a NO OP. The TSTFLD field is used only with the TAMN instruction.

The SCFLD field refers to the subcommand field used only by the SC instruction of line 19400 of the program. The SCFLD field is defined at lines 15900 through 17000 of Appendix A. The field is a three-bit field beginning with bit 13, and specifies one of 8 different functions. The signals TUCM13 through TUCM15 of the subcommand field appear at the outputs of PROMs 01C07 of FIG. 7, and are applied to the select inputs of the decoder 09C08 of FIG. 8. Referring to lines 15900 through 17000 of the program, it is seen that the occurrence of a hexadecimal 0 on the TUCM13-15 lines indicates the occurrence of a reset transmit bit ready function. The occurrence of a hexadecimal one on the TUCM13-15 lines indicates a write transmit bit buffer signal as indicated by the comment field at column three.

It is thus seen that the TUCM signals 13-15 applied to the decoder 09C08 result in one of the outputs of the decoder being lowered to a logic zero level. This occurs during execution of either an SC or a BRSC instruction as identified by the instruction dictionary at lines 18800 through 20800. Note that the SCFLD field is used during the SC, and the BRSC instructions.

The XRFLD field refers to the external register field which is used only during the execution of the RER instruction as indicated at line 20600 of Appendix A. Referring to line 17700 through 17800, it is indicated that the transfer or XRFLD field specifies one of five different registers to be copied into the microprocessor 01B08 via the data input lines to the micro-processor. The XRFLD bit field is specified by the bits 12 through 15 indicated by the TUCM12 through TUCM15 lines at the output of PROM 01C07. The TUCM12 signal is applied to the selector inputs of multiplexers 02C06 and 06C06 of FIG. 6. The TUCM13-15 signals are applied respectively to AND gates 05D08, 06D08 and 07D08 (FIG. 8).

The BRADDR field, used only by the BR and the BRSC instructions as indicated at lines 19600 and 19800 of the instruction dictionary of the Appendix A, refers to a location to which a branch shall be made. Referring to line 1700 of the program, it is seen that the branch address of BRADDR field is a ten-bit field beginning with bit 2. Referring to FIG. 7, the BRADDR field is characterized by the TUCM02 through TUCM11 signals at the outputs of PROMs 10C07, 07C07 and 04C07. These signals in turn are applied to the four-bit up counters 01A07, 04A07 and 07A07 to address the six PROMs of the program control memory of FIG. 7.

RECEIVE FIRMWARE

Figure 9A:
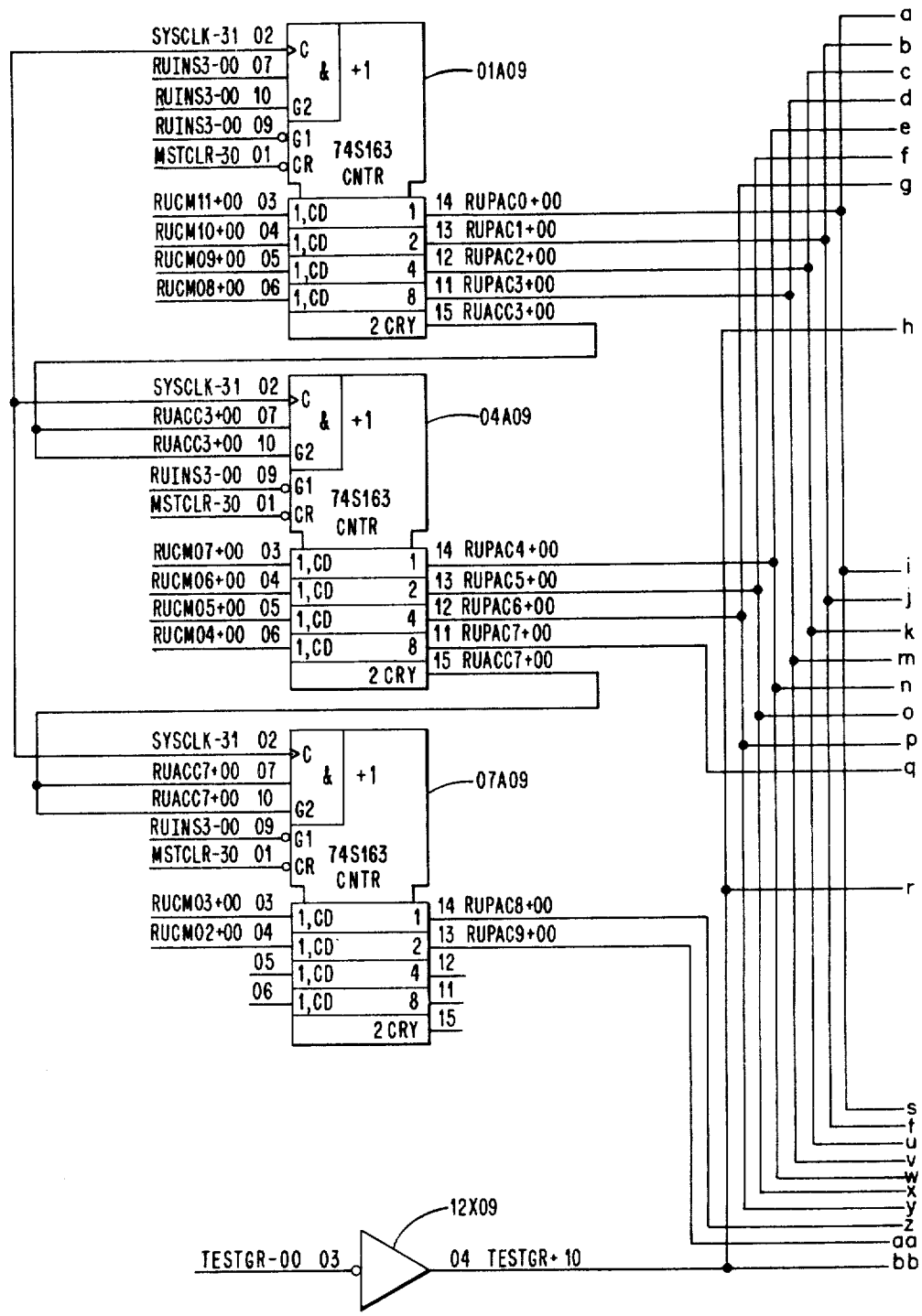
Figure 10A:
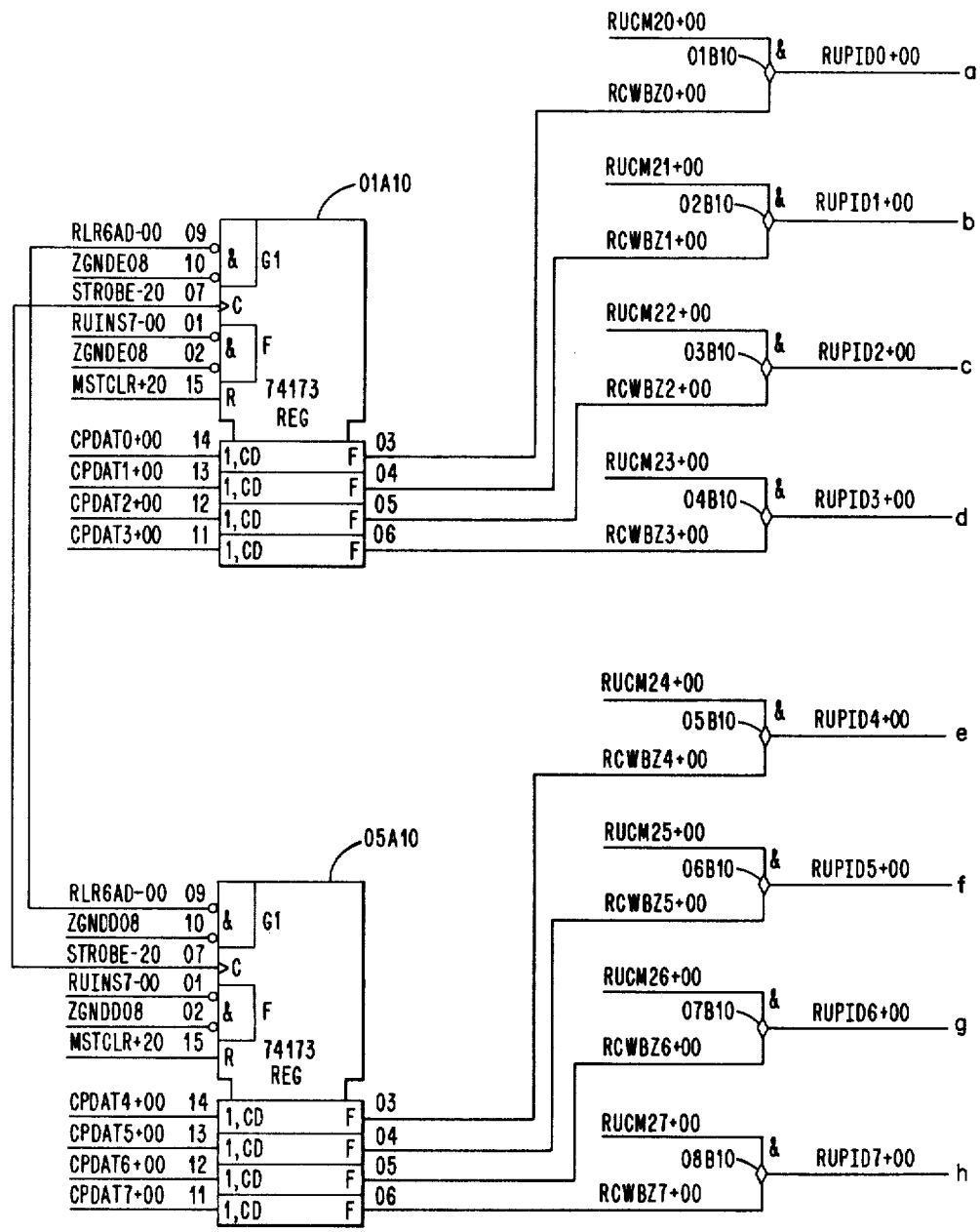

The format of the receive micro-program is similar to that of the transmit micro-program, and thus only differences between the programs which may be encountered by one of ordinary skill in the art shall be addressed. The receive firmware is stored in the PROMs illustrated in FIG. 9, more particularly PROMs 01C09, 04C09, 07C09, 10C09, 04D09, 07D09, and 10D09. It is noted that in the case of the receive firmware, there are seven PROMs as compared to the six PROMs used for the transmit firmware. The additional PROM is required because the receive control word is a 28-bit word rather than a 24-bit word as in the case of the transmit control word. The receiver uses two four-bit microprocessors cascaded as shown in FIGS. 16b and 10b to form an eight-bit data path in the receiver. The additional PROM used by the receiver corresponds to the additional four-bits required by the KFLD field used by the receiver. The two microprocessors used by the receiver are the microprocessors 01C10 and 07C10 of FIG. 10.

The receive micro-program is set forth in Appendix B and commences at line 21100 therein. The instruction dictionary is located at lines 17500 through 19300 of Appendix B, and the operand fields are defined between locations 1700 and 17000.

The bits of each of the operand fields correspond on a one-to-one basis to the RUCM signals of the receiver. For example, the KFLD field defined at line 2500 of Appendix B indicates that the K field is eight bits in length beginning with bit 20 of the receive program control memory. These bits correspond to the signals RUCM 20 through RUCM 27 appearing at the outputs of PROMS 07D09 and 04D09 (FIG. 9).

These RUCM signals are applied through the logic AND nodes 01B10 through 08B10 (FIG. 10) to the data inputs of the microprocessors 01C10 and 07C10. More particularly, the signals RUCM20 through RUCM23 are applied through the logic AND nodes to the data inputs of the microprocessor 01C10, while the signals RUCM24 through RUCM27 are applied to the data inputs of the microprocessor 07C10. The FAFLD and FBFLD field signals defined at lines 3300 through 4900 of Appendix B are applied to each of the microprocessors 01C10 and 07C10. More particularly, the FAFLD field signals are applied to the A RAM address inputs of both microprocessors, and the FBFLD field signals are applies to the B RAM address inputs of the microprocessors. The OPFLD field signals and the FDFLD signals area applied to each of the microprocessors. More particularly, the OPFLD buit signals corresponding to signals RUCM02 through RUCM07 are applied to the instruction bits 0 through 5 of the microprocessor 01C10, and to the instruction bits 0 through 5 of the microprocessor 07C10. The bit 19 of the OPFLD field corresponding to the RUCM 19 signal, however, is applies to the carry-in input CN of the microprocessor 07C10 only. The carry-in input of the microprocessor 01C10 is connected to the carry-out output of the microprocessor 07C10. The bits 0 and 1 of the FDFLD field are applied to the instruction bits 7 and 8 of each of the microprocessors.

Figure 11A:
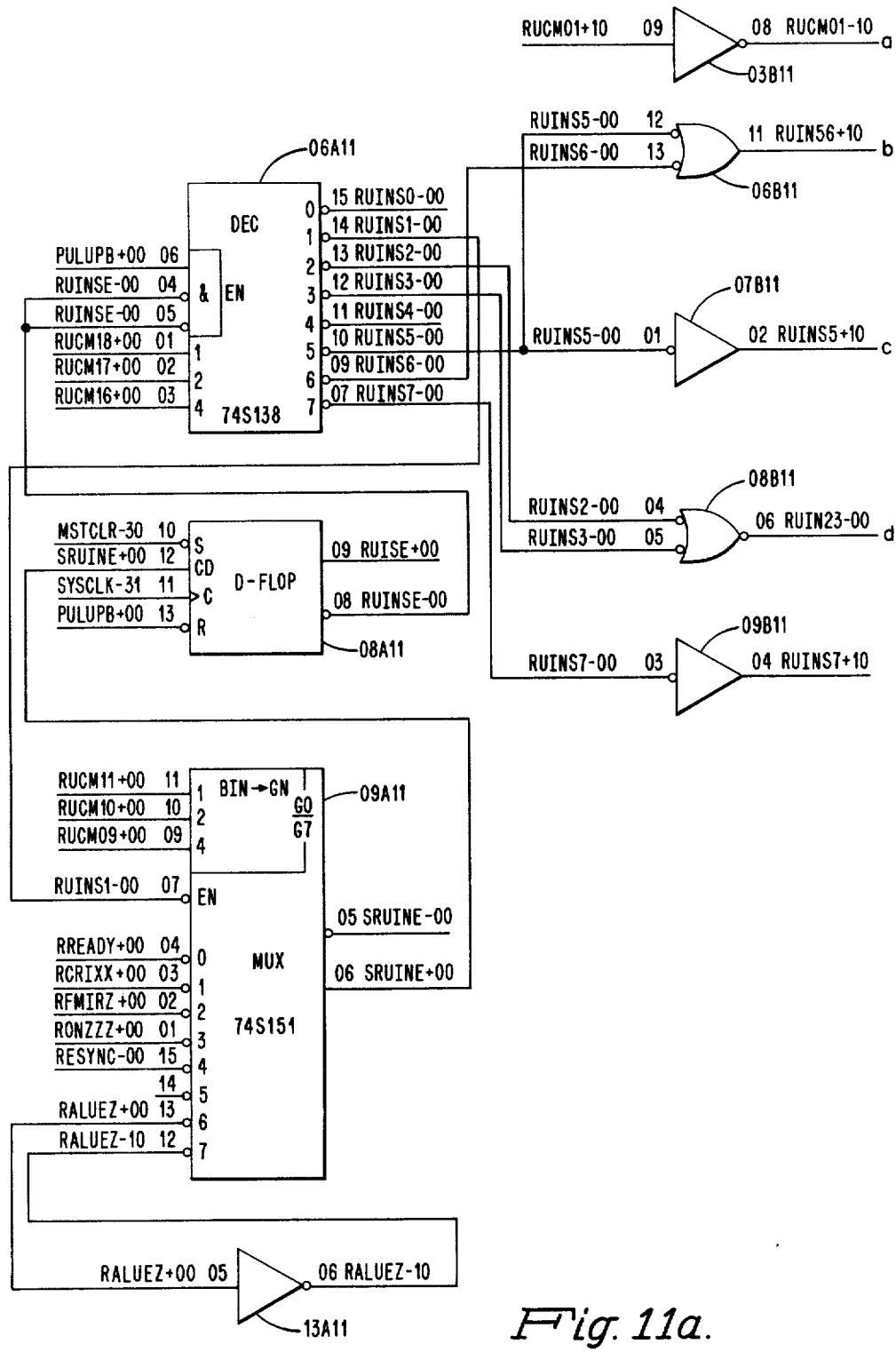
Figure 11B:
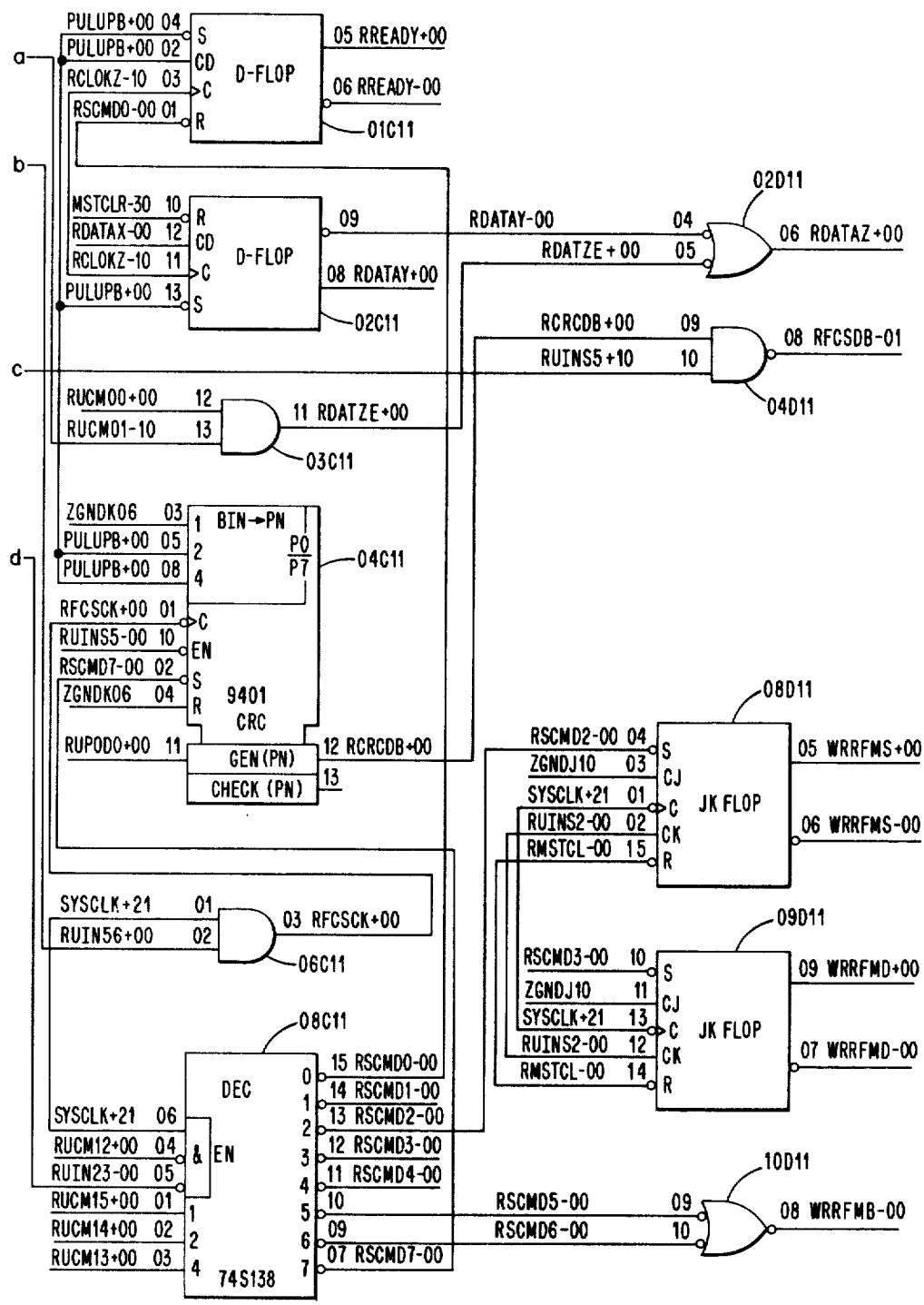

The TSTFLD field bits and the SCFLD field bits defined at lines 14400 through 17000 of Appendix B will be described subsequently during the description of the operation of the system in connection with FIGS. 1-12. The TSTFLD bits 8 through 11 correspond to the RUCM08 through RUCM11 signals applied to the B RAM address inputs of the micro-processor 01C10 and 07C10, and the SCFLD field bits 13 through 15 correspond to the RUCM signals 13 through 15 applied to the A RAM address inputs of the microprocessors. The signals RUCM 13-15 are applied to the inputs of a decoder 08C11 (FIG. 11). The hardware functions specified by the TSTFLD field are described in the comments field of the third column of Appendix B. The SCFLD field may specify one of eight numbers as indicated by the second column. The effect of such a number being applied by the RUCM lines 13-15 is indicated by the commentary field in the third column, where the mnemonic RCX refers to a receiver.

A further difference between the receive and transmit firmware is indicated in the FDFLD field of the receive program. That is, the SRQF and SLQF instructions are applied differently in the receive microprocessors 01C10 and 07C10. For example, during the execution of the SRQF instruction, the rightmost bit of the Q register of the microprocessor is supplied to the S2 port connected to the leftmost bit of the Q register of the microprocessors 07C10. In addition, the rightmost bit of the internal RAM of the microprocessor 01C10 is applied through the S3 port of the microprocessor to the S4 port of microprocessor 07C10 leading to the leftmost bit of the internal RAM of the microprocessor 07C10.

Further, the rightmost bit of the Q register in microprocessor 07C10 is supplied through the S1 port to the S4 port of the microprocessor 01C10, which is connected to the leftmost bit of the internal RAM of the microprocessor 01C10. A 16-bit shift register thereby is formed comprised of an eight-bit Q register and an 8-bit RAM which is operable for both the left shift and right shift operations. During a right shift or SRQF operation, a receive data bit is received from the DCE at the S2 port of the microprocessor 01C10 which is shifted into the leftmost bit of the Q register of the microprocessor 01C10.

During a left shift or SLQF instruction execution, the output of NAND gate 04D11 of (FIG. 11) is applied through a logic AND tri-state node 12D10 to the S3 port of the microprocessor 07C10 which is connected to the rightmost bit position of the internal RAM of the microprocessor 07C10. It is thus seen that during a right shift, the S1 and S3 ports of the microprocessor 01C10 are applied to the S2 and S4 ports, respectively of microprocessor 07C10. During the left shift, the S2 and S4 ports of the microprocessor 07C10 are applied respectively to the S1 and S3 ports of the microprocessor 01C10. The S4 port of the microprocessor 01C10 and the S1 port of the microprocessor 07C10 likewise are bidirectional.

OPERATION-INITIALIZATION

Figure 1B:
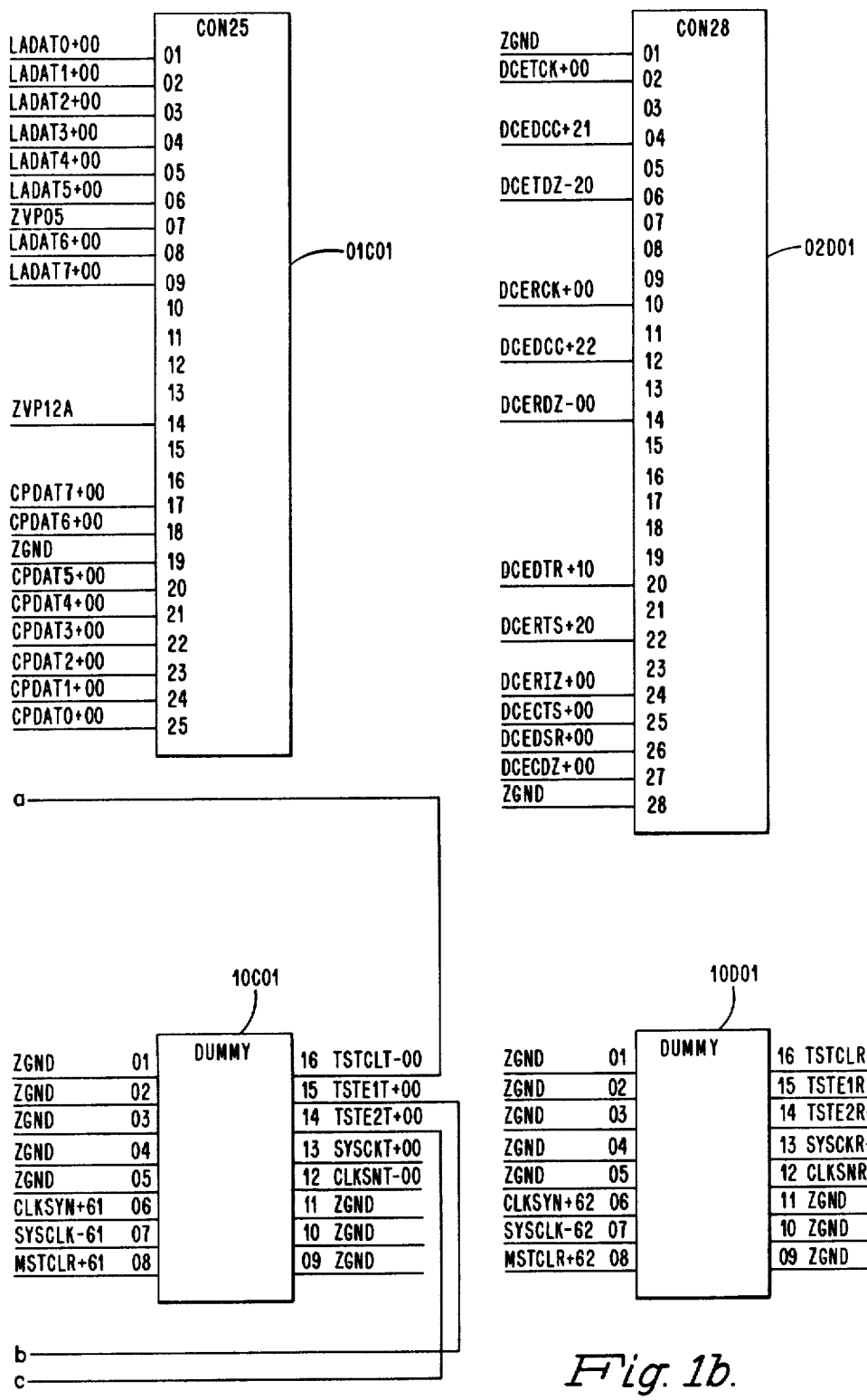

We will first describe the MLCP output control functions for initializing the BHCLA. System initialization begins when a master clear signal is received from the MLCP at pin 24 of the connector 01B01 (FIG. 1). The signal thereafter is applied through the inverter 10A02 (FIG. 2) and NOR gates 09B02 and 10B02 to reset registers and flip-flops within the BHCLA. In addition, the counters 01A07, 04A07, and 07A07 (FIG. 7) are reset to an all-zero state. The counters comprise a ten-bit counter providing address inputs to the transmit control memory comprising PROMS 01C07, 04C07, 07C07, 10C07, 07D07, and 10D07. The transmit firmware thereby is initialized and advanced to lines 22300 and 22400 (Appendix A).

Figure 3A:
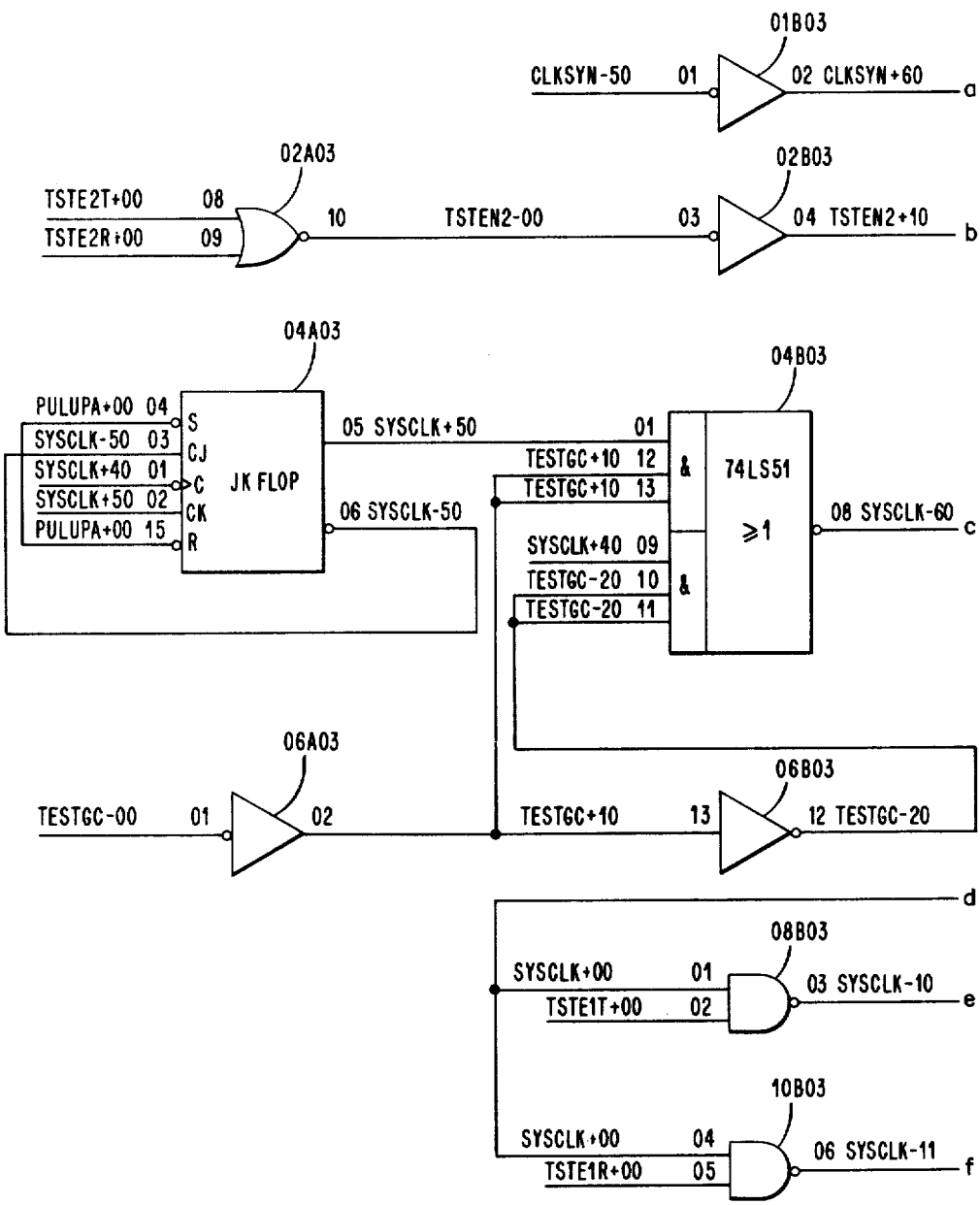
Figure 3B:
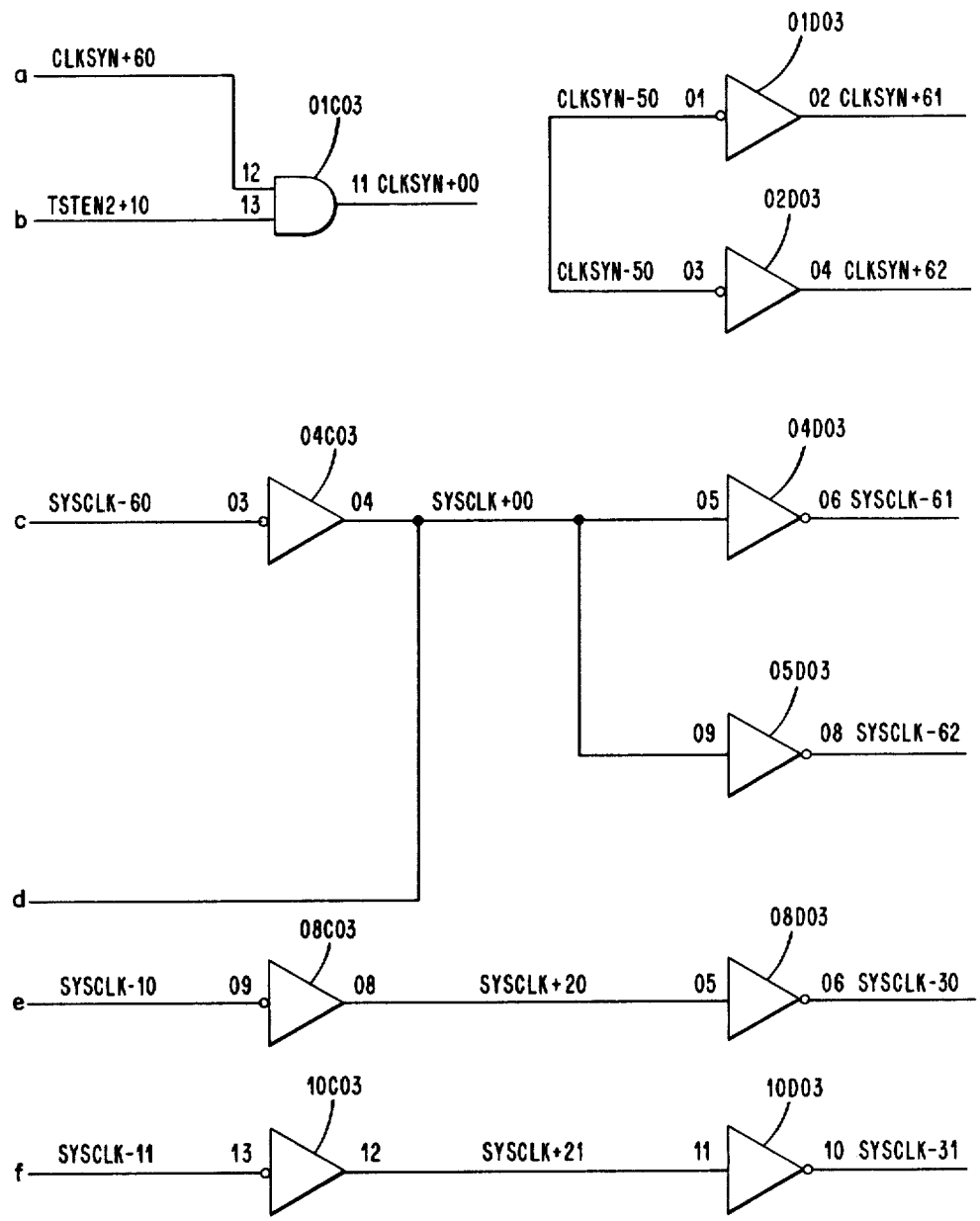

A 238 nanosecond system clock signal is received from the MLCP at pin 18 of the connector 01B01 and applied to inputs of the OR gates 04D03 (FIG. 3). The output of the gate 04D03 is applied through the inverter 04C03 throughout the system. In particular, the system clock is applied to the clock inputs of the counters 01A07, 04A07, and 07A07. In response to the system clock, the counters normally are incremented to address sequential locations in the transmit program control memory.

TUCM bits 16, 17 and 18 at the output of the PROM 10D07 specify which of eight instruction types are being executed. The bits are applied to the decoder 09B08 (FIG. 8) to force a logic zero on one of eight output lines of the decoder. During a branch (BR) instruction, or a branch subcommand instruction (BRSC), the bit 3 output of the decoder 09B08 transitions to a logic zero which is applied to the load inputs of the transmit program counters of FIG. 7. The ten-bit branch address specified by signals TUCM02 through TUCM11 thereupon are loaded into the transmit program counters. Referring to line 24500 of the transmit micro-program of Appendix A, it is seen that the microprocessor branches from location hex 010 to location hex 022 rather than to the next sequential instruction indicated by hex 011.

It is to be understood that the transmit program remains in a single program loop as indicated by lines 23100 through 23400 until the MLCP provides initialization information in addition to the master clear signal.

The master clear signal from the MLCP further is applied to the reset inputs of the counters 01A09, 04A09 and 07A09 (FIG. 9) to reset the counters. The counters comprise the receiver program counters for addressing the receiver program control memory comprising PROMs 01C09, 04C09, 07C09, 10C09, 04D09, 07D09, and 10D09. The program counters thereupon are set to point to line 21900 of the receive micro-program (Appendix B). The RUCM bits 16, 17 and 18 at the output of the PROM 10D09 specify the instruction type being executed. These bits are applied to the decoder 06A11 (FIG. 11) to force one of eight outputs of the decoder to a logic zero level. During a BR or a BRSC instruction, the bit 3 output of the decoder is forced to a logic zero level. The counters of 01A09, 04A09 and 07A09 thereupon are loaded with the bits indicated by the signals RUCM02 through RUCM11 pointing to a next address in the receiver program control memory. An address other than the next sequential address thereby is provided during a branch type instruction.

Referring to line 22400 of the Appendix B receive program, an example branch instruction is shown. From the last three columns, it is seen that a branch is made from the hex location 009 to the hex location 012 rather than the next sequential location 00A. After receiving the master clear signal from the MLCP, the receiver remains in a program loop as indicated at lines 21600 through 21800 until further initialization information is received. The MLCP next determines the type of BHCLA to which it is connected. Since the MLCP is connected to a plurality of units other than the BHCLA, the MLCP must supply a particular address to the BHCLA. For example, the ADDRS1 through ADDRS3 signals are applied by the MLCP to the pins 4 through 6 of the connector 01B01. The ADDRS3 signal must be a logic zero to address either the transmit address decoder or the receiver address decoder. The transmit address decoder is the decoder 01A02 (FIG. 2), while the receiver address decoder is the decoder 04A02. In addition, the ADDRS2 signal must be at a logic one level and the ADDRS1 signal must be at a logic zero level to address the transmit address decoder. If the ADDRS2 signal is at a logic one and the ADDRS1+10 signal is at a logic 0, however, the receiver address decoder is addressed.

The MLCP next supplies the control signals indicated by the signals CNTRL1 through CNTRL3 applied respectively to the pins 1 through 3 of the connector 01B01 to indicate the type of function to be performed by the BHCLA. Basically, these control signals indicate which registers are to be loaded or unloaded. The control signals are applied to the decoders 01A02 and 04A02. During an MLCP operation, therefore, an output of one of the two decoders transitions to a logic zero level. Since a plurality of devices are connected to the MLCP, the MLCP first must determine what type of device is connected at this address. A logic one on each of the control lines causes the bit 7 output of the decoder to go to a logic zero state. This may occur on either the transmit or the receive decoder. When the logic zero occurs at the bit 7 output of either of the two decoders, it is applied to the OR gate 01D02 causing the output of the OR gate to transition to a logic zero state. The output of OR gate 02D02 thereupon also transitions to a logic zero level. The output of gate 01D02 is applied to the select inputs of the multiplexers 01B04 and 04B04. When the select input is at a logic zero, the multiplexers are selected to their "0" inputs. The "0" inputs of the multiplexer 01B04 are at a logic one level. The four-bit input to the multiplexer 04B04, however, would be a logic 0110. For other devices, different codes would be wired into the multiplexers to identify the device.

Figure 2A:
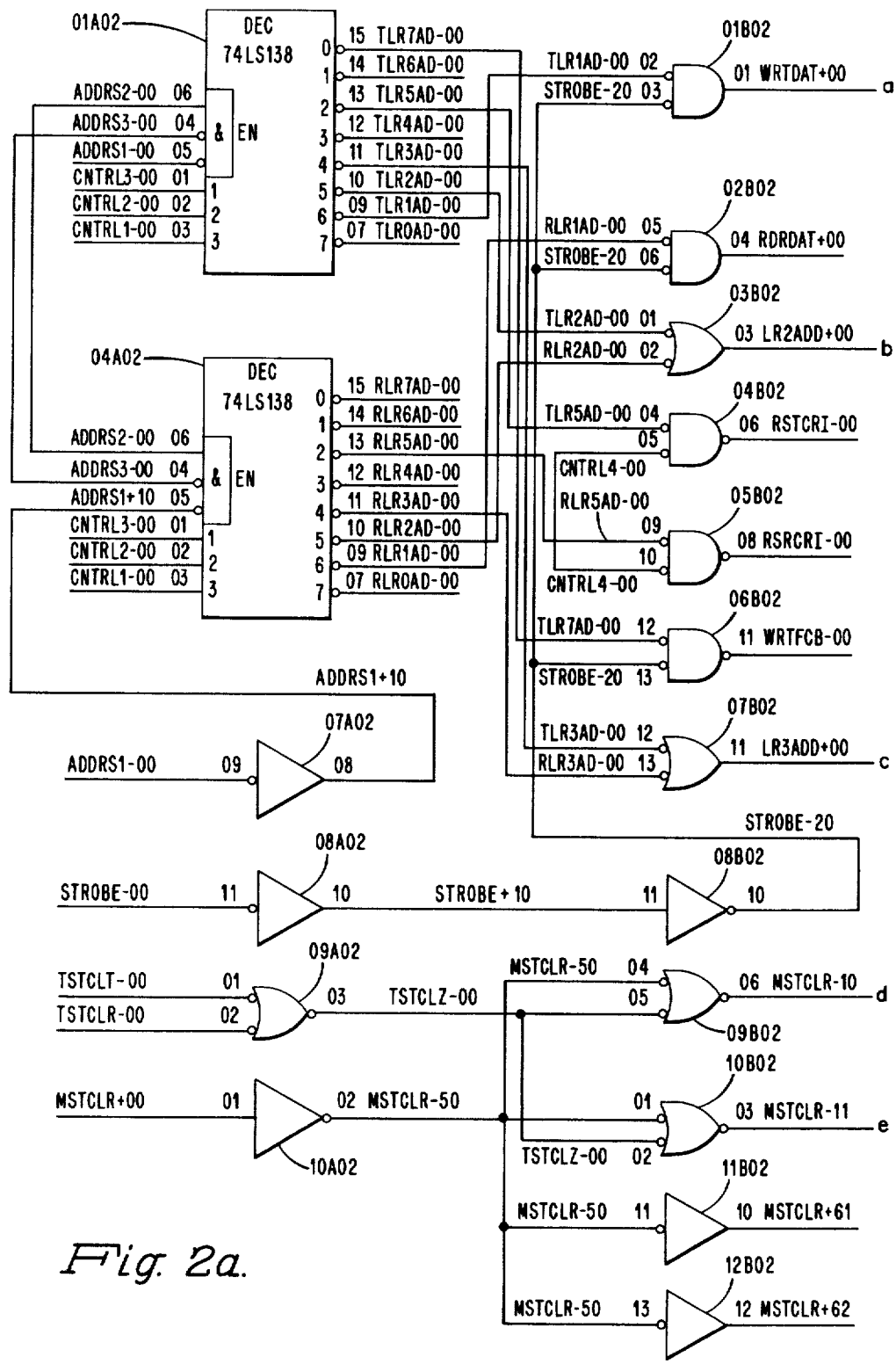
Figure 2B:
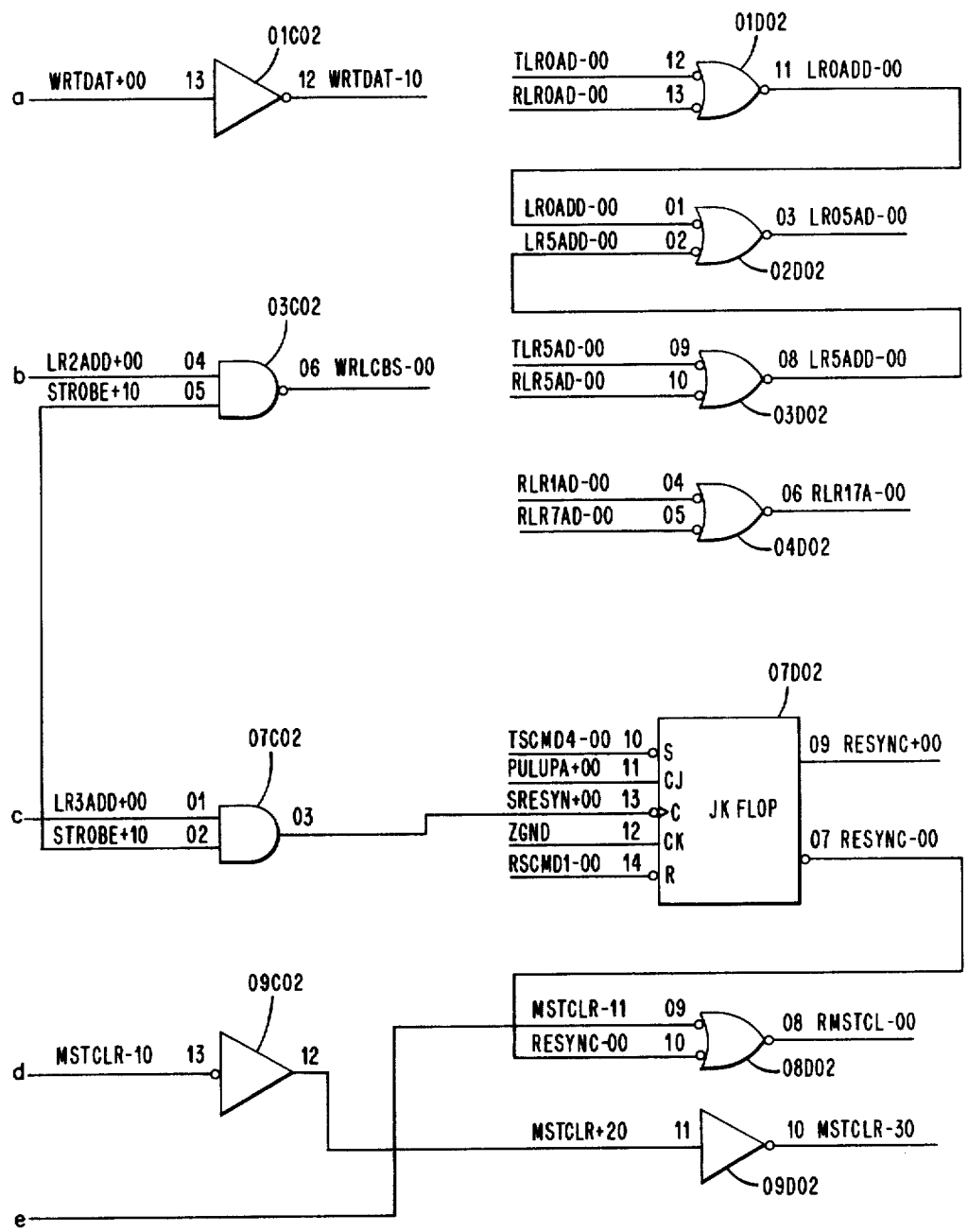

The output of the gate 02D02 of FIG. 2 is applied to the output enable (F) inputs to the multiplexers 01B04 and 04B04. When the output enable input of the multiplexer is at a logic zero level, the aforedescribed codes are applied through the multiplexers to the LADAT0 through LADAT7 lines (line adapter data) through the wired logic and tri-state nodes 01D04 through 08D04 to the connector 01C01 of FIG. 1. The signals thereby are supplies to the MLCP to identify the device being addressed. The MLCP thereby determines the type of device being addressed, and then may proceed with the initialization process.

The MLCP next loads the DCE control word register comprised of four-bit registers 08A04 and 11A04. The address and control lines of the transmit address and receiver address decoders of (FIG. 2) thereby are set up as described above. Depending upon which of the decoders is enabled, the bit 5 output of the decoder is transitioned to a logic zero level. In response thereto, the output of NOR gate 03B02 is transitioned to a logic 1 level which is applied to the AND gate 03C02. The MLCP further supplies a strobe through the pin 25 of connector 01B01 of FIG. 1 and inverter 08A02 to a second input of the AND gate 03C02. The output of the AND gate thereupon transitions to a logic zero state which is applied to the clock input of registers 08A04 and 11A04. The MLCP supplies DCE control data (FIG. 15f) through pins 17, 18 and 20-25 of connector 01C01 to the data inputs of the registers 08A04 and 11A04. Upon the registers being clocked, the data is loaded into the registers.

Periodically, the micro-program as indicated, for example, at Appendix A line 23100 by a UDSCR instruction, clocks register 08B04 to load the contents of the register 08A04. It is to be noted that the UDSCR instruction causes the bit 4 output of the decoder 09B08 (FIG. 8) to transition to a logic zero. This logic zero is applied to one input of the AND gate 07B04. The output of this gate which is responsive to the system clock is applied to the clock input of the register 08B04. The output of the register 08B04 supplies control signals to the DCE, the local DCE. Such signals are applied to the drivers 01C05, 02C05, 06C05, and 08C05 (FIG. 5), and the outputs of such drivers are applied through the logic elements of FIG. 5 and through the connector 02D01 to the local DCE.

Figure 5A:
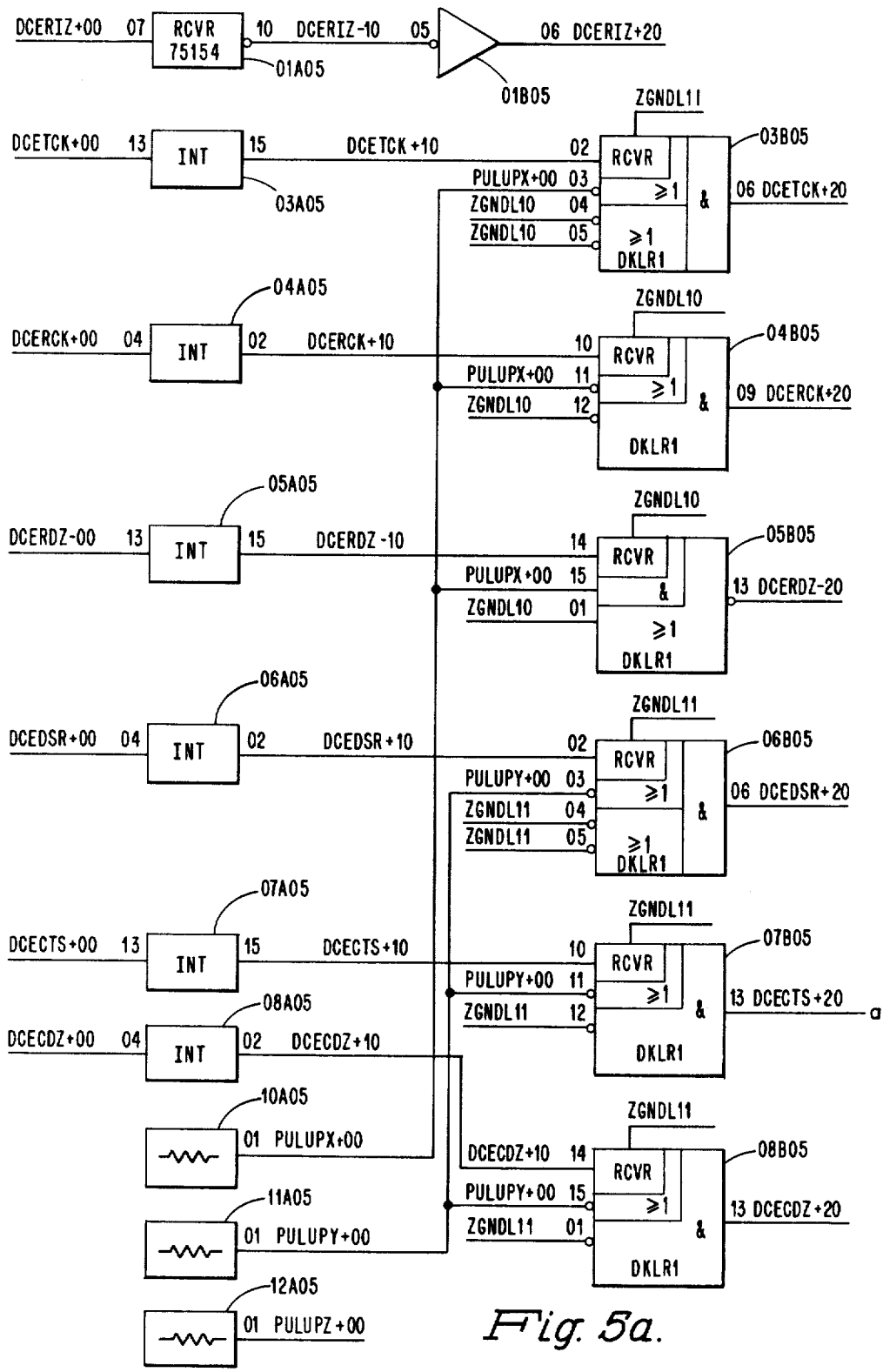
Figure 5B:
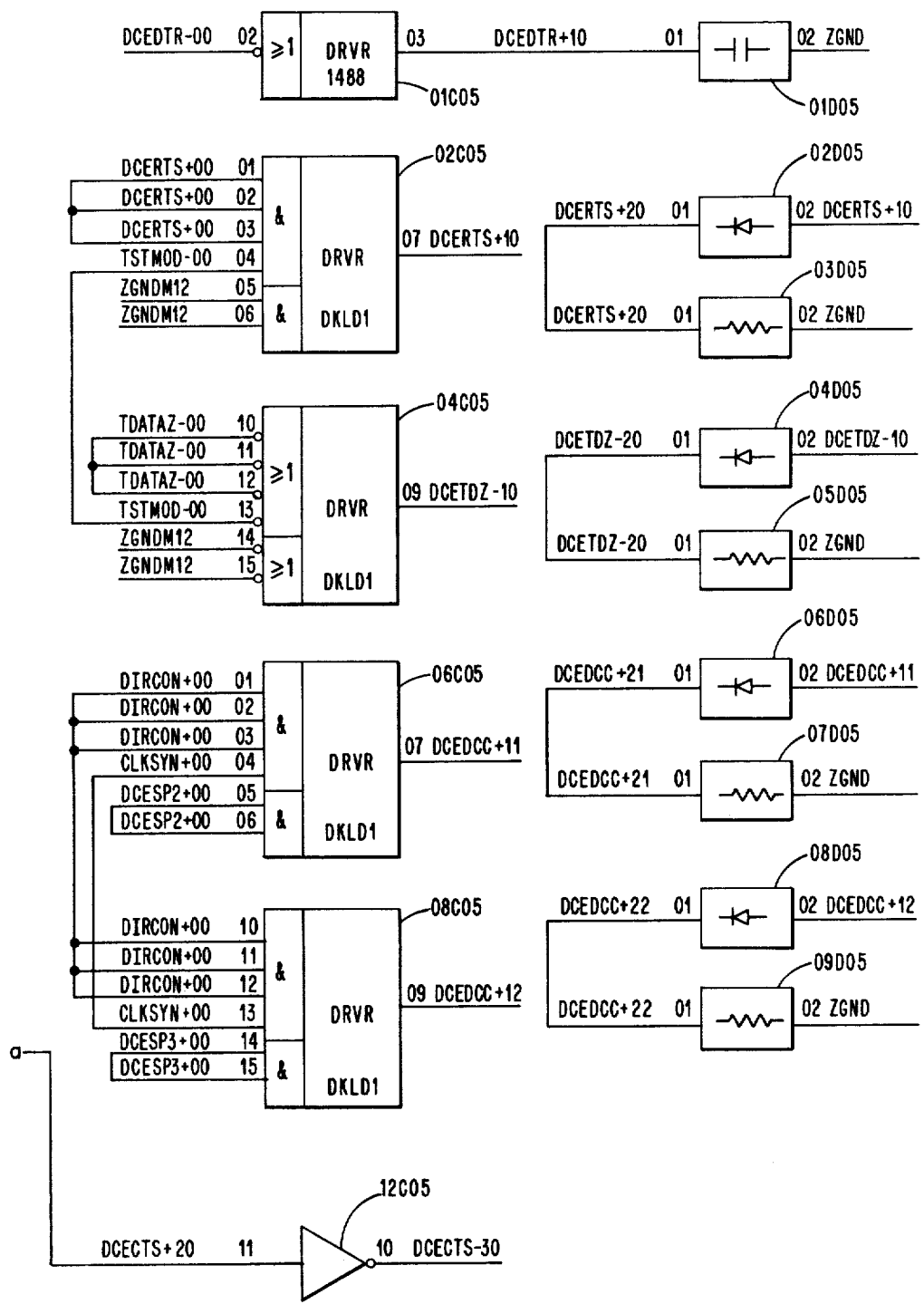

To complete the initialization operation, status information (FIG. 15g) from the local DCE is read by the MCLP through the BHCLA. Under the control of the MLCP, the bit 2 output of either the transmit address decoder 01A02 or the receiver address decoder 04A02 may be transitioned to a logic zero level. Such signals are applied to the OR gate 03D02 the output of which transitions to a logic zero to force the output of gate 02D02 to a logic zero. During this time period, the select inputs to the multiplexers 01B04 and 04B04 are at a logic one level to select the multiplexers to their one inputs. DCE status information is supplied by the local DCE to the connector 02D01, and through the connector is applied to the DIPS (dual in-line packages) 03A05 through 08A05 (FIG. 5).

Figure 4A:
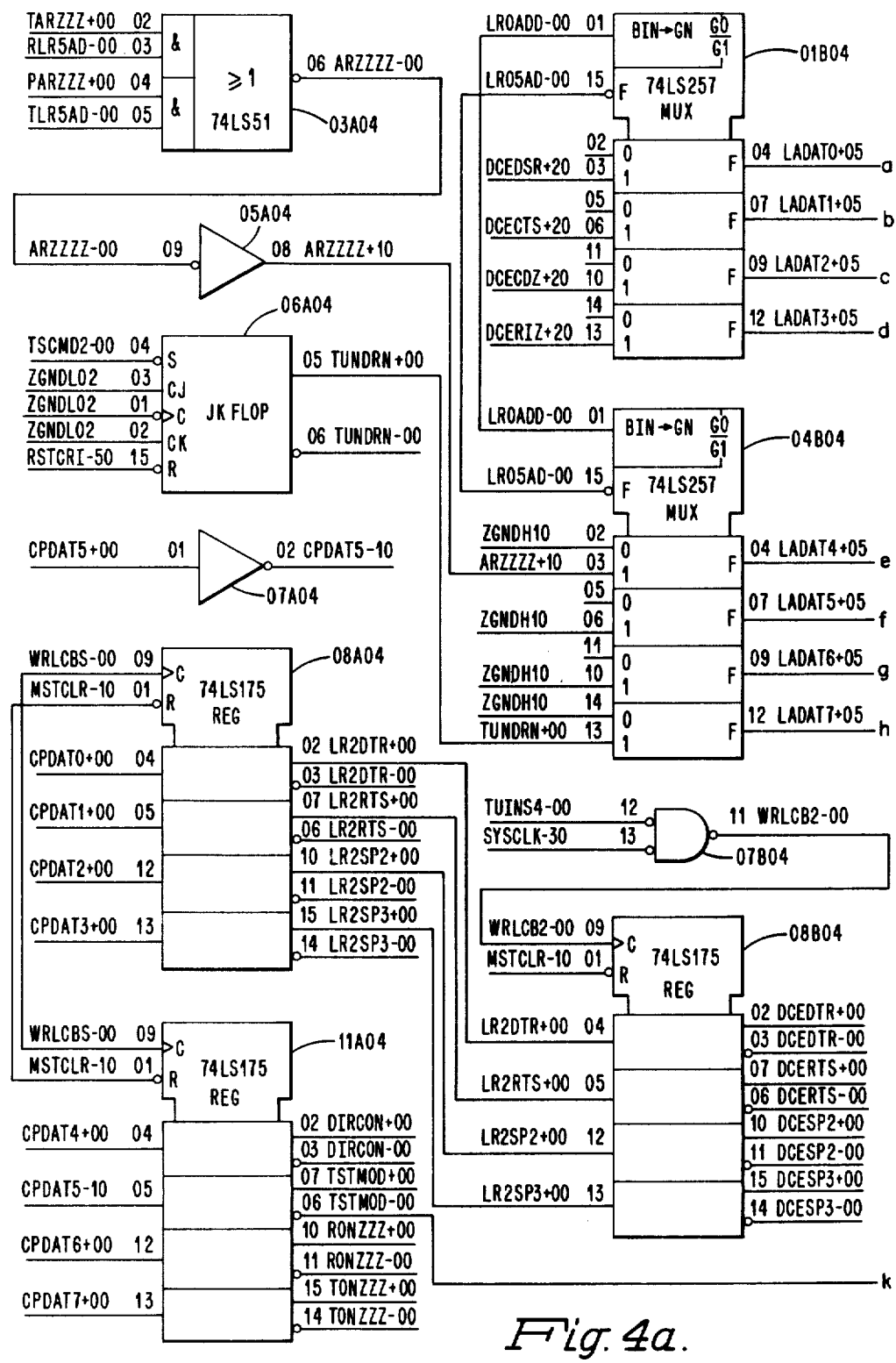

The DCE status information includes the DCERIZ, DCEDSR, DCECTS and DCECDZ signals which are applied through the connector 02D01 to the EIA RS-232-C receiver 01A05, a 24-K pull-up resistor 02A05, and BELL 301 and 303 type interface receivers 06A05 through 08A05, respectively. The output of receiver 01A05 is applied through the inverter 01B05 to one input of the multiplexer 01B04 (FIG. 4). The outputs of the BELL type receivers 06A05 through 08A05 are applied to the remaining three level one inputs of the multiplexer 01B04. When the output enable input of the multiplexer 01B04 transitions to a logic zero level, the level one inputs to the multiplexer are applied to the line adapter data lines 0–3 which are relayed back to the MLCP as before described. The MLCP thereupon examines the DCE status information to determine the operational status of the local DCE. Depending upon the current status of the local DCE, the MLCP initiates transmit and receive operations.

OPERATION-TRANSMIT

A transmit operation is initiated when the output of AND gate 12A06 (FIG. 6) transitions to a logic one level. When this occurs, the input registers of each of the FIFO memory circuits 01B06, 03B06, 05B06, and 07B06 are empty. The output of AND gate 12A06 is applied to an input of AND gate 11C06, thereby causing the output of the gate to transition to a logic one state. It is to be noted that bit 1 of the DCE control register 08A04, which stores the RTS bit fothe DCE control word (FIG. 15*f*), must be at the logic 1 level, and that the clear to send signal (FIG. 15*g*) from the DCE (at pin 25 of connector 02D01), which is also applied to bit 1 of the DCE status multiplexer 01B04, must be at the logic 1 level as applied to gate 11C06 in order to enable its output to go to the logic 1 level. The JK flip-flop 11D06 thereby is set to cause the outpt of AND gate 12D06 to transition to a logic zero state. The output of the AND gate 12D06 is applied to the pin 11 of connector 01B01, whereupon the MLCP is notified of the start of a transmit operation.

In response thereto, the MLCP issues the address and control signals, as before described, to the transmit address decoder 01A02. In response thereto, the bit 2 output of the decoder transitions to a logic zero state. It is to be understood that during this period the bit 2 output of the receiver address decoder 04A02 remains in the logic one state, as do all other outputs of address decoders 01A02 and 04A02.

The output of gate 11C06 also is applied to one input of the gate 03A04. As before stated the bit 2 output of the decoder 04A02 is at a logic one level which is applied to a second input of the gate. The output of the gate 03A04 transitions to a logic zero level which is applied through the inverter 05A04 to a one level input of state 1 of the multiplexer 04B04. Since a device ID is not being read by the MLCP during this time period, the select input to the multiplexer 04B04 is at a logic one level to select the multiplexer to its level one inputs. The stage one output of multiplexer 04B04 thus is at a logic one level which is applied through the wired AND tri-state node 05D04 to pin 5 of the connector 01C01. The MLCP is thereby notified that the input registers of the FIFOs of FIG. 6 are ready to receive transmit control and data information.

Figure 6A:
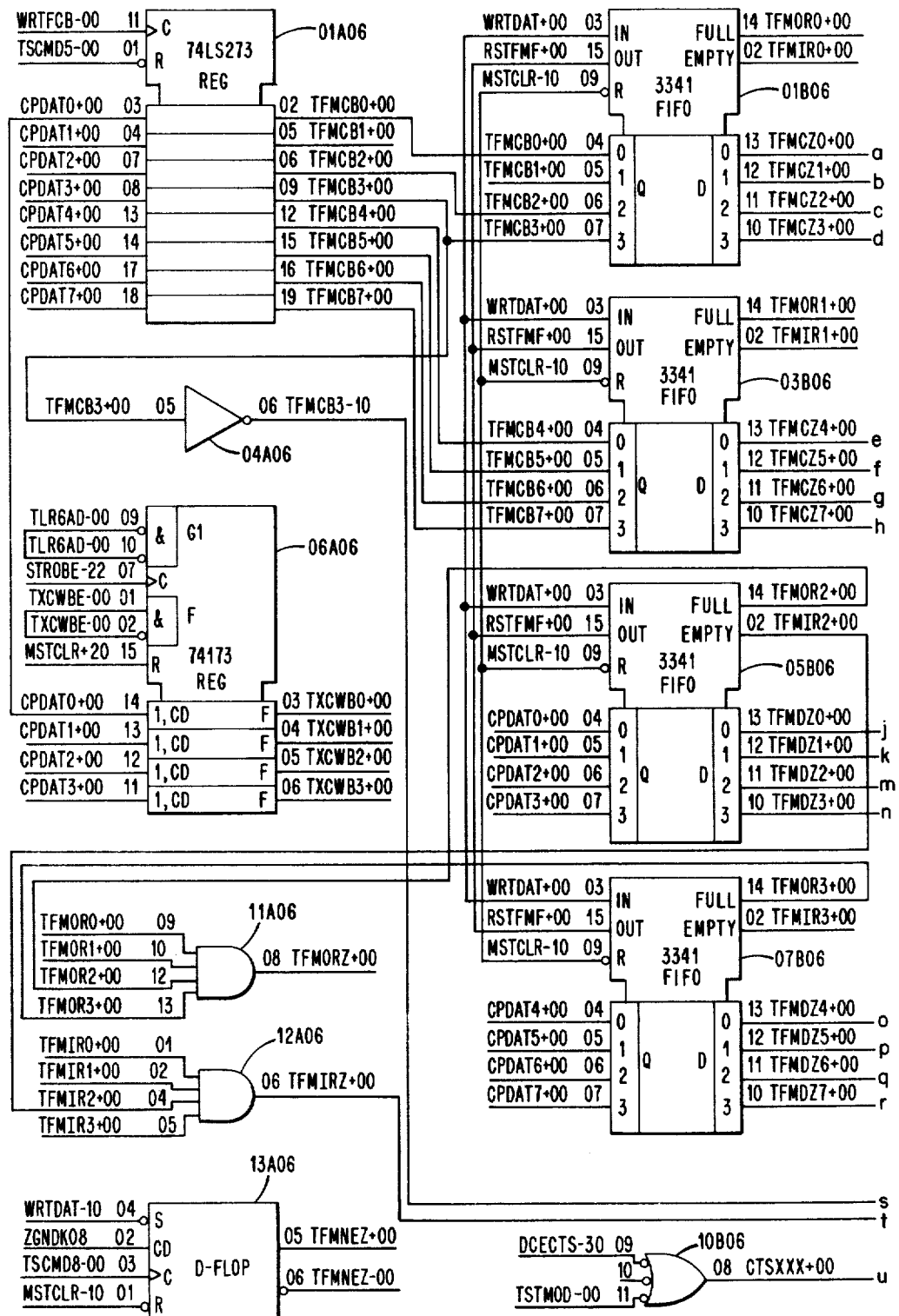
Figure 6B:
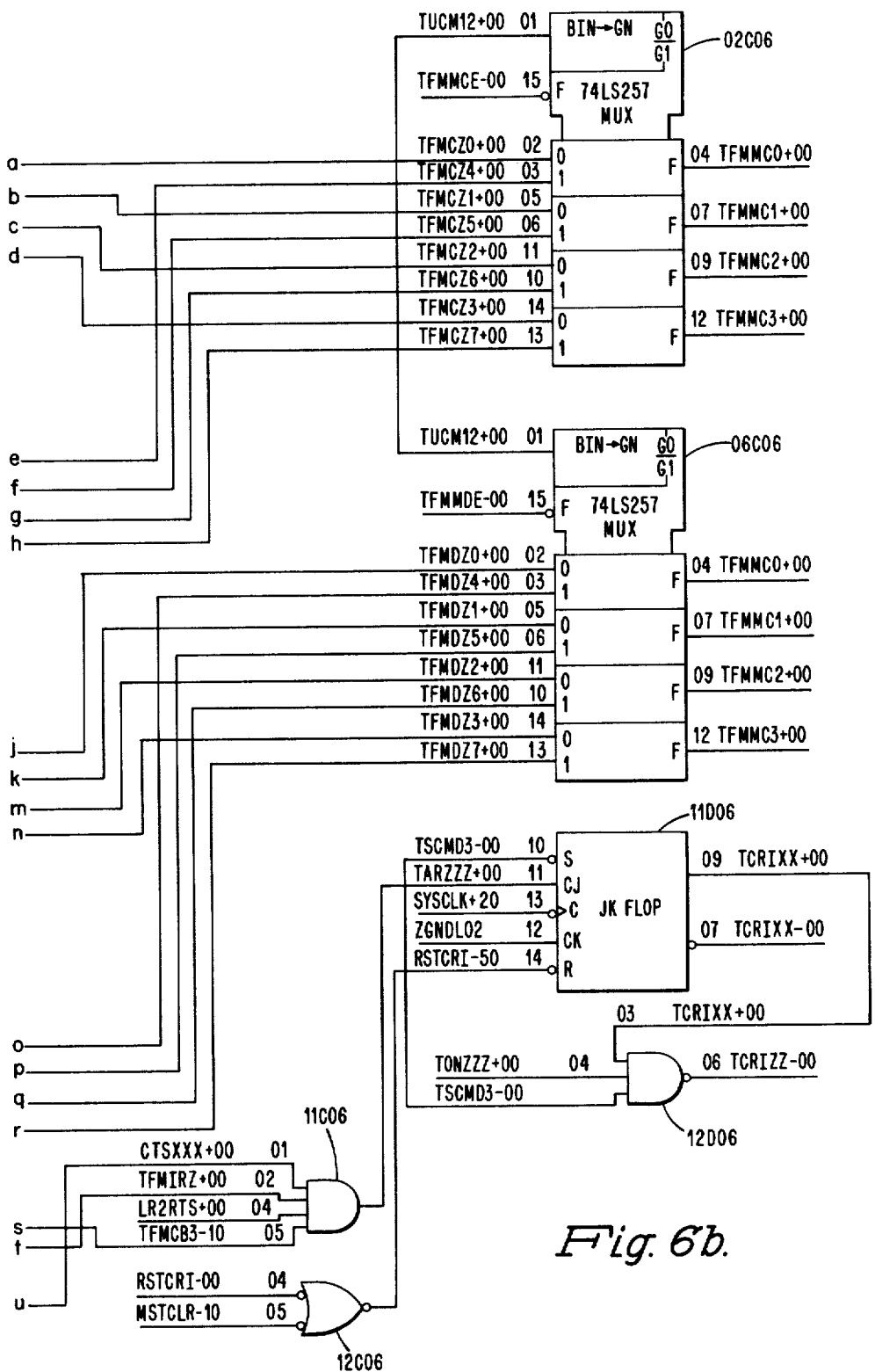

The MLCP thereupon loads the transmit extended control word (FIG. 15*a*) into the register (FIG. 6). More particularly, the MLCP applies this control data information by way of pins 22–25 of the connector 01C01 of FIG. 1 to the inputs of register 06A06. In addition, the MLCP applies address and control line information to the decoder 01A02 which transitions the bit 1 output of the decoder to a logic zero state and enables the inputs of the register 06A06. The MLCP further applies a strobe by way of pin 25 of the connector 01B01 to the clock input of the register 06A06 to load the register with the control data. It is to be noted that the information in the register 06A06 is used in the transmit operation as further described below. The MLCP next supplies address and control information to the decoder 01A02 to transition the bit 0 output of the decoder to a logic zero state which is gated through the AND gate 06B02 by a strobe from the MLCP. At the time of the strobe, the MLCP places additional transmit control information on data lines leading to the inputs of the register 01A06. The logic zero output of the gate 06B02 is applied to the clock input of the register 01A06 to load the register with a transmit control word (FIG. 15*b*). The outputs of the register 01A06 are applied to the inputs of the FIFOs 01B06 and 03B06. The FIFOs 01B06, 03B06, 05B06, and 07B06 form a FIFO transmit buffer which is 16 bits wide and 64 bits deep. The FIFOs 01B06 and 03B06 contain transmit control information, while the FIFOs 05B06 and 07B06 contain transmit data. Thus, for each data character supplied by the MLCP there is also a control character supplied by the MLCP.

In the event the bit 3 output of the register 01A06 is at a logic one level, the output is applied through the inverter 04A06 to force the output of gate 11C06 to a logic zero level. Further interrupts to the MLCP thereby are inhibited.

Henceforth, the loading of the register 01A06 as described above is referred to as the loading of the transmit control word register. The operation under which the MLCP loads the register 06A06 is referred to as the loading of the extended control word register. The operation regarding the reading of DCE status information (FIG. 15*g*) is henceforth referred as the status read operation.

More particularly, the status read information occurs when the MLCP causes the select input to multiplexers 01B04 and 04B04 to be at a logic one level, and the output enable input of the multiplexers to be at a logic zero level. At this time, the four DCE status bit signals applied to the level one inputs of the multiplexer 01B04 are applied through the multiplexer to the MLCP by way of the tri-state nodes 01D04 through 04D04. Concurrently, the level 1 inputs to the multiplexer 04B04 are applied through the tri-state nodes 05D04 through 08D04 to the MLCP. The output of inverter 05A04 is used in both transmit and receive operations, and shall be further described below. The next two level one inputs to the multiplexer 04B04 are always at a logic zero state. The last level one input to the multiplexer 04B04 is applied by the Q output of the JK flip-flop 06A04, and is used during transmit operations as shall be further described below.

The loading of a first data character from the MLCP will now be described. The MLCP supplies data to the CP data lines leading to the inputs of the FIFOs 05B06 and 07B06. Concurrently, the MLCP applies address and control signals to the decoder 01A02 to transition the bit 6 output of the decoder to a logic zero state which is applied through a NAND gate 01B02 to cause the output of inverter 01C02 to transition to a logic zero state.

The output of gate 01B02 further is applied to the load inputs of the transmit FIFO buffer of FIG. 6, thereby loading transmit data into the FIFOs 05B06 and 07B06. In addition, the control information previously loaded by the MLCP into the register 01A06 is loaded into the FIFOs 01B06 and 03B06. In this manner, a transmit control word is loaded into the transmit FIFO buffer each time a transmit data word is loaded into the buffer. Since the transmit control word also is stored in the register 01A06, the register need not be refreshed unless the MLCP requires a different control word for a different data word. That is, more than one data word may be used in conjunction with the same control word. Typically, the control word would not be changed until a last character of a transmit data message had been received. In this event, the bit 3 output of the register 01A06 would be set to a logic one level.

The output of inverter 01C02 (FIG. 2) further is applied to the set input of D-type flip-flop 13A06. The set condition of the flip-flop is sensed by the transmit micro-program to indicate that transmit and control information currently is stored in the transmit FIFO buffer. This sensing is accomplished by the TFMNE version of the TAMN instruction as indicated at line 62100 of Appendix A. The flip-flop 13A06 is reset by the RSTFMCB version of the SC instruction as exemplified at line 62200 of the transmit program. It is to be noted that when a subcommand is mentioned, it may in fact be combined with the branch instruction as in the case of the BRSC instruction of line 62200.

The MLCP thence continues to load the data characters into the transmit FIFO buffer of FIG. 6. The MLCP is able to load new data into the FIFOs only when the input registers of the FIFOs are empty. The MLCP thus repeats the above-described status read operation and then loads a data character. The condition of the FIFO input registers being empty is identified by the bit 0 output of the multiplexer 04B04, i.e., the TAR/RAR bit 4 FIG. 15g. That is, if the output is at a logic one level, the FIFO input registers are empty. If it is at logic zero level, however, the MLCP enters a WAIT state awaiting a time when the input registers to the FIFOs will be empty. The MLCP enters a WAIT state during a status read operation during which the bit 2 output of the decoder 01A02 is at a logic zero state which is applied to the AND gate 06B02. At this time, the MLCP sets the control line at pin 20 of the connector 01B01 to a logic zero state which is applied to a second input to the gate 04B02. The output of the gate thereby transitions to a logic zero state which is applied through the gate 12C06 to reset the JK flipflop 11D06. The output of AND gate 12D06 thereby is forced to a logic one state to inhibit interrupts to the MLCP. The MLCP thus enters a WAIT state.

During this time period, the transmit firmware program is removing transmit operation words from the transmit FIFO buffer, thereby freeing the input registers of the FIFOs. In this event, the input register empty output of the FIFOs transitions to a logic one which causes the output of AND 12A06 to transition to a logic one level which is applied through gate 11C06 to cause the flip-flop 11D06 to enter into a set condition. The output of gate 12D06 thus transitions to a logic zero level to interrupt the MLCP. The MLCP thereby is notified that a next data character may be loaded into the transmit FIFO buffer.

The above described process continues until the MLCP is ready to forward the last data character of a transmit data message. At this time, the MLCP initiates a load control word register operation during which the register 01A06 is loaded with an end-of-frame transmit control word (FIG. 15c) causing the bit 3 output of the register to transition to a logic one state. The MLCP then initiates a transmit FIFO buffer load operation in which the end-of-frame control word stored in the register 01A06 is loaded into the FIFOs 01B06 and 03B06, and the last data character of the transmit data message is loaded into the FIFOs 05B06 and 07B06. The logic one signal at the bit 3 output of register 01A06 is sensed by the transmit firmware to indicate a last data character being loaded into the transmit FIFO buffer. In addition, the bit 3 output of register 01A06 is applied as before described through the gate 11C06 to the flip-flop 11D06 to inhibit further interrupts to the MLCP.

The transmit FIFO buffer of FIG. 6 isolates the operation of the MLCP from that of the transmit control logic. The operation of the transmit control logic will now be described. Upon concluding the description of the transmit control logic, a description is given of a final status read by the MLCP to determine whether a message frame was successfully provided to the local DCE.

As before described, the transmit firmware resides in the transmit program control memory comprising the six PROMs 01C07, 04C07, 07C07, 10C07, 07D07, and 10D07 (FIG. 7). The PROMs are addressed by the transmit program counter comprising counters 01A07, 04A07 and 07A07. In normal sequence, the transmit program counter is incremented sequentially by the system clock. During the branch instruction, however, the transmit program counter may be loaded by information pointing to an address other than a next sequential address within the program.

The microinstruction control logic comprises the D-type flip-flop 09A08 (FIG. 8), the multiplexer 10A08, the decoder 09B08, and the decoder 09C08. Referring to the decoder 09B08, the instruction decoder, the bit 0 through 7 outputs of the decoder correspond to the octal number represented by the three bits in the WTFLD field of the transmit firmware program. Referring by way of example to the locations 19000 through 20800 of the transmit program, more particularly, line 20200 and 20300, it is seen that the three bits of the WTFLD field indicate an octal 5. Thus, when an RCRCR instruction is executed, the bit 5 output of the decoder transitions to a logic zero level while the remaining outputs of the decoder 09B08 remain in a logic one level. The decoder 09B08 is enabled by the flip-flop 09A08 which is normally in the _ set condition. The Q output 8pin 06) of the flip-flop thus is at a logic zero state. The flip-flip 09A08 may be reset as a result of the execution of a TAMN instruction. In this event, the _Q output of the flip-flop 09A08 transitions to a logic one state disabling the decoder 09B08. Thus, when the instruction following a TAMN instruction is executed, the outputs of the decoder 09B08 all remain in a logic one state. When a TAMN instruction is executed, the bit 1 output of the decoder 09B08 transitions to a logic zero state which is applied to the enable input of the multiplexer 10A08. During the execution of all instructions except a TAMN instruction, the bit 1 output of decoder 09B08 is at a logic one level. The D1 output of the multiplexer (pin 06) thus is at a logic one level which causes the flip-flop 09A08 to remain in a set condition. The Q output of the flip-flop thus is at a logic zero level and the next occurring firmware instruction is executed in the normal manner.

When a TAMN instruction is executed, however, the enable input to the multiplexer 10A08 is at a logic zero level. The multiplexer input selected by the select inputs to the multiplexer 10A08 may cause the D1 output of the multiplexer to transition to a logic zero level. Upon completion to the execution of the TAMN instruction, the logic zero state causes the flip-flop 09A08 to be reset. The Q output of the flip-flop thereupon transitions to a logic one level to cause the next instruction in the transmit firmware program to be ignored.

The decoder 09C08 is a subcommand decoder which generates subcommands. When a subcommand instruction is to be executed, the bit 2 output (pin 13) of the decoder 09B08 transitions to a logic zero level. In like manner, when a branch instruction is to be executed, the bit 3 output of the decoder transitions to a logic zero level. The bit two and bit 3 outputs of the decoder are applied to the gate 11C08, the output of which is applied to one enable input of the decoder 09C08. Thus, when a subcommand or a branch instruction is executed, the output of the gate 11C08 transitions to a logic zero level. If the bit 3 output of the PROM 01C07 (FIG. 7) is at a logic zero level also, one of 8 outputs of the decoder 09C08 transitions to a logic zero level as indicated by the three inputs to the decoder. The three inputs to the decoder 09C08 correspond with the three bits comprising the SCFLD field of the transmit firmware program as defined at lines 15900 through 17000. Thus, for example, when the STCRI version of the subcommand or the branch and subcommand instruction is executed, an octal code of three is applied to the input of the decoder 09C08, and the bit 8 of the decoder transitions to a logic zero level.

As shown in FIG. 16a, the transmit microprocessor consists basically of three parts, namely a 16 word by 4-bit RAM, a Q register and an arithmetic and logical unit (ALU). The RAM is used for the temporary storage of transmit data, transmit control information and transmit status. The Q register is used for the temporary storage of miscellaneous control information. Arithmetic and logical operations are performed by the ALU. A left/right shifter including registers 120 and 122 is also provided so that the results of the ALU operations may be shifted either left or right before being stored back into the RAM or in the Q register.

As previously discussed, the microprocessor is able to execute a number of different instruction types as determined by the data from the PROMS of FIG. 7 as applied to the nine instruction input lines of the microprocessor. Eight address lines from the transmit control program memory PROMS (FIG. 7) are applied to the A RAM address lines and the B RAM address lines of the microprocessor (FIG. 8) to specify the A and B port address of the RAM. Data into the processor is supplied from any of the following six sources: control memory 07D07, register 06A06, and the four FIFO memories 0B06, 03B06, 05B06, and 07B06 by means of the two selectors (multiplexers) 02C06 and 06C06. The process for reading data in each of these sources is further described below. It is noted that the data are provided to the micro-processor by means of the four wired AND circuits 01A08 through 07A08.

The microprocessor 01B08 has two outputs in addition to the shift outputs which were described above. The first of these outputs is data output bit 1 which is connected to flip-flop 02C08. The second output is the transmit ALU equals 0 output which is applied to the "6" input of multiplexer 10A08 and the inverter 13A08. The output of inverter 13A08 is applied to the "7" inputs of MUX 10A08. This connection to the multiplexer 10A08, which is the instruction TAMN multiplexer, provide a means for the microprogram to test the results of any operation within the microprocessor 01B08. An example of the ALUEZ version of the TAMN instruction is shown at line 35900 of Appendix A. In this instruction, the contents of RAM location E are logically ANDed with the program supplied hexadecimal constant 1. If the result of this operation is 0, then the branch instruction at line 36000 will be executed. If the result of the operation is not a 0, then the branch instruction at 36000 is ignored and the next meaningful instruction would be the MMP instruction at line 36100. An example of the ALUEZ version of the TAMN instruction is shown at line 36500. In this instruction, the contents of RAM location 4 are subtracted from the data on the data input lines to the microprocessor 01B08 which in this case is a constant of value hexadecimal C. If the result of this operation is a non-zero value, the instruction at line 36600 will be executed in the normal manner. If the result of the operation does equal 0, however, the instruction at line 36600 will be ignored and the next instruction that will be executed will be the instruction on line 36800.

The transmit microprogram is responsible for sending data on a bit-by-bit basis to the local DCE. The first type of data is the flag or abort sequences which are transmitted between frames, which are also known as interframe time fill. A flag sequence is defined as a 0 bit followed by six 1 bits, followed by a 0 bit, i.e. a hexadecimal 7E. An abort sequence is defined as seven or more 1 bits, i.e. a hexadecimal FF. These flag and abort sequences are generated by the transmit microprogram as specified by the MLCP by means of control information loaded into the extended control word register 06A06 (FIG. 6).

The second type of data is the start of frame flag, which is automatically generated by the transmit microprogram before sending the first data character of each frame. The third type of data is the data characters of the frame all of which are provided by the MLCP via FIFOs 05B06 and 07B06. The fourth type of data is the FCS data, which is generated by the transmit program by using the CRC register 03C08. This error-checking sequence is calculated using each data bit of the frame provided by the MLCP and is transmitted at the end of the frame after the last character provided by the MLCP has been transmitted. The fifth type of data is the closing or end-of-frame flag that is automatically generated by the transmit program and sent after the FCS has been transmitted. The sixth type of data that is sent is the abort sequence which is automatically generated and sent by the transmit program whenever an underrun situation occurs.

A new transmit data bit is sent to the local DCE at each transmit bit boundary, i.e. at each positive-going edge of the transmit clock from the local DCE, in the following manner. The transmit clock is received from the local DCE at pin 02 of connector 02D01 (FIG. 1). This signal is applied to input receiver 03A05. The output of this receiver is applied to the input of receiver 03B05. The output of receiver 03B05 is applied to the input of multiplexer 11C04 (FIG. 4). More particularly, it is applied to the zero input of circuit 1 of this multiplexer. The output (pin 04) of circuit 1 of this multiplexer is applied to flip-flops 01D08 and 02D08. Noting that the next transmit data bit is thereby shifted from flip-flop 02C08 as described below, and that the Q output (pin 09) of this flip-flop is applied to the data input of flip-flop 02D08, it is seen that the next transmit data bit is thereby shifted from flip-flop 02C08 into flip-flop 02D08 on the positive-going edge of the transmit clock signal. The Q output of 02D08 is applied to the input of driver 04C05 (FIG. 5). The output of this driver is connected to zener diode 04D05 and the output of the zener diode is connected to pin 6 of connector 02D01. Thus, the transmit data is provided to the local DCE.

As mentioned above, the transmit clock signal is also applied to the clock input of flip-flop 01D08. Since a pull-up resistor, which is a logic one level, is applied to the data input of this flip-flop, the Q output (pin 09) of this flip-flop goes to the logic one state with each positive-going transition of the transmit clock. This set condition of 01D08 is used to indicate to the transmit program that the previous transmit data bit has been shifted out of flip-flop 02C08 and into flip-flop 02D08, and therefore that it is time for the transmit program to load the next transmit data bit into flip-flop 02C08. The transmit program monitors flip-flop 01D08 by means of the TRDY version of the TAMN instruction as shown, for example, at line 29900 of the transmit program (Appendix A). Here the set condition of flip-flop 01D08 will result in the ignoring of the branch instruction at line 30000 and instead cause execution of the instruction at 30300. Upon the detection of the set condition of the ready flip-flop 01D08, the transmit microprogram resets this flip-flop by means of the RSTRDY version of the SC or BRSC instruction as shown for example at line 30300. After resetting the transmit ready flip-flop in this manner, the transmit program provides the next bit of transmit data to flip-flop 02C08 as discussed below.

At each transmit bit time, a new transmit data bit must be loaded into flip-flop 02C08. This is accomplished by means of the WRTBB version of the SC instruction such as shown, for example, at line 35600 of the transmit program. When this instruction is executed, the next transmit data bit, which is stored in the rightmost bit position of RAM location E, is applied to data out bit 1 of the microprocessor 01B08. This bit is in turn applied to the data input of data flip-flop 02C08. This particular SC instruction causes the one output of decoder 09C08 to transition to the logic zero state and then back to the logic one state. This signal is applied to the clock input of the transmit bit buffer flip-flop 02C08, and causes the next transmit data bit to be stored in this flip-flop upon execution of this instruction. This operation whereby a new transmit data bit is loaded into flip-flop 02C08 is hereafter referred to as the loading of the transmit bit buffer.

While waiting for the MLCP to provide transmit data for the frame, the transmit microprogram generates and sends fill characters of either flag or abort sequences. This is done one bit at a time by loading the appropriate data bit into flip-flop 02C08 at each bit boundary as explained above. Whether flags or aborts are sent is determined by the MLCP, and is explained further below.

The size of each byte is controlled by a 4-byte counter stored within one of the 60 RAM locations of the transmit microprocessor 01B08. This counter is initially loaded to a count of eight by an MMP instruction which copies the constant field bits of the control memory 07D07 (FIG. 7) through the wired AND circuits 01A08 through 07 08 to the data inputs of the microprocessor. See line 52800, for example, of the Appendix A transmit microprogram. At each bit time, this counter is decremented by one (e.g. line 50900), and tested by the ALUEZ version of the TAMN instruction to see if a value of zero has been reached indicating that a transmit byte boundary has occurred (e.g. line 51000). The occurrence of the all-zero condition is hereafter referred to as a transmit byte boundary.

At each byte boundary, the microprogram must generate and store the next flag or abort fill character, which will be shifted into the transmit bit buffer flip-flop 02C08 on the next 8 subsequent bit times. Whether a flag or an abort is to be generated is specified by bit 3 of the 4-bit extended transmit control word stored in register 06A06. The contents of this register are read into the transmit microprocessor 01B08 by means of the TXCW version of the RER instruction (e.g. line 65600). When an RER instruction is executed, the seven outputs of decoder 09B08 transition to the logic zero level which is applied to one input of gate 05D08. During the TXCW version of the RER instruction, the output of PROM 01C07 which is applied to gate 05D08 is also at the logic zero level. The output of gate 05D08 is attached to the output enable inputs F of register 06A06. The resulting logic zero level of this signal enables the output of register 06A06. These outputs are attached to the four wired AND functions 01A08 through 07A08 which in turn connect to the data input port of the microprocessor 01B08. In this manner, the control word previously provided by the MLCP is loaded into the transmit microprocessor for further use. It is noted that during the execution of the RER instruction, the output of inverter 13C08, which is attached to an output enable pin 08 of PROM 07D07, is at the logic one state, which inhibits the outputs of this PROM. In other words, data from this PROM is applied to the data inputs of the transmit microprocessor at all times except during the RER instruction.

After the extended control word has been read into the microprocessor as described above, the TIFM bit (bit 3-FIG. 15a) is examined to determine whether a flag or an abort sequence is to be generated. The bit is tested by the TAMN instruction (e.g. line 65700). A flag or an abort is then generated as shown in line 65900 through 66600, and stored in a location of the microprocessor internal RAM. The flag or abort sequence thus generated is sent out bit-by-bit on the succeeding bit boundaries (e.g. line 50800). After each bit is output, the register of the RAM is shifted right one bit position as exemplified by lines 51600 through 51800 of the transmit program.

This procedure involving the generation of flag or abort sequences and then the transmission of same is repeated until the MLCP supplies transmit data for the frame as will be described below. It is noted that this general procedure described above with regard to the shifting out of data characters and to the byte-size control of these characters is the same for all data. The only significant difference that may occur in the case of certain types of data supplied by the MLCP is that in some cases the character size may be less than 8 bits. In this case, the byte-size counter within the RAM is initialized to the proper value instead of 8 at each byte boundary.

At each byte boundary, the transmit program checks to see if the previous interrupt has been completed. This is accomplished by means of the TCRI version of the TAMN instruction as exemplified at line 60900 of Appendix A. This instruction provides a means for testing the transmit interrupt flip-flop 11D06 (FIG. 6). If the previous interrupt has in fact been completed, then the instruction following this TAMN instruction will be executed (e.g., line 61000). If the previous interrupt has not been completed, then the following instructions would be ignored and the second-following instruction will be executed instead (e.g. line 61100). It is to be understood that the MLCP has loaded a 1 bit into bit position three (pin 09) of register 01A06 which, after being inverted by gate 04A06, becomes a logic zero at the input to gate 11C06 of FIG. 6 and hence holds the output of this gate at the logic zero state thus preventing the interrupt flip-flop 11D06 from setting. When, at a byte boundary, the transmit program finds that the previous interrupt has been completed, the transmit program executes the RSTFMCB version of the SC instruction (e.g. line 61900). Execution of this intruction causes the bit 5 output of decoder 09B08 to transition to the logic zero level. This signal is applied to the reset input of the above-mentioned register 01A06 and resets the entire register to the logic 0 state. This results in the bit 3 output going to the logic zero state which, after being inverted by inverter 04A06, becomes a logic 1 at the input to gate 11C06. The output of gate 11C06 now transitions to the logic one level which causes flip-flop 11D06 to set and generate an interrupt to the MLCP in the manner previously described. Since the MLCP responds to this interrupt by again setting bit 3 of register 01A06, thus blocking interrupts beyond this first interrupt, it is seen that an interrupt is generated to the MLCP each byte time. When the MLCP is ready to provide data for the frame, it will respond to this inter-frame interrupt by loading data into the transmit FIFO buffers 05B06 and 07B06 (FIG. 6) as previously described, instead of loading a one into bit 3 of register 01A06.

At each byte boundary between frames, the transmit program tests the transmit FIFO buffer memory to see if control information for data for a frame has been provided. When data is available at the outputs of the FIFO, the full outputs of each of the four FIFOs 01B06 through 07B06 are at the logic one level and are applied to gate 11A06. The output of this gate is at the logic one level when the output register of the FIFO has data in it. This is tested by the transmit program by means of the TFMOR version of the TAMN instruction (e.g., line 53900 of Appendix A). If the output register is not ready, an additional flag or abort sequence is generated and transmitted as discussed above.

When the transmit FIFO memory of FIG. 6 is found to have data available, the microprogram reads the control information and transmit data into the internal RAM of the transmit microprocessor. Since the data path of the transmit control logic is only 4 bits wide, the loading of the 16-bit transmit data and control information requires four separate instructions. Four versions of the RER instruction are used, namely, the TCWL, TCWR, TDL, and TDR versions (e.g., lines 58400 through 58700 of the transmit program). When the control word is being read, that is when either a TCWL or TCWR instruction is being executed, the output of gate 06D08, is connected to the output enable input of MUX 02C06 of FIG. 6, is at the logic zero level, thus enabling data from either FIFO 01B06 or 03B06 to be loaded into the transmit microprocessor 01B08 via the four wired AND circuits 01A08, 03A08, 05A08, and 07A08.

Furthermore, during the TCWL instruction, the select input to MUX 02C06 is at the logic zero level, thus selecting the bit zero inputs which are connected to the left-half of the control word, namely FIFO 01B06. When a TCWL version of the RER instruction is being executed, the select input to MUX 02C06 is at the logic one level, thus enabling the bit 1 inputs, which are attached to the FIFO 03B06. When data is being read from the FIFO, as exemplified by execution of the TDL or TDR versions of the RER instruction, the output of gate 07D08, which is attached to selector 06C06, is at the logic zero level, thus transferring the data in either FIFO 05B06 or 07B06 to the transmit microprocessor. Furthermore, when the TDL instruction is being executed, the select input to MUX 06C06 is at the logic zero state, thus selecting the bit 0 inputs which are attached to FIFO 05B06. When the TDR instruction is being executed, the select input to MUX 06C06 is at the logic one level, and the bit 1 inputs from FIFO 07B06 are enabled.

After the data and control information has been read into the microprocessor, an output strobe must be issued to the transmit FIFO in order to reset the output registers, and allow the next data and control words to advance into the output registers. This is accomplished by means of the RSTFMOR version of the SC instruction, (e.g., line 58800). Upon execution of this instruction, the "2" output of decoder 09B08 and the "6" output of decoder 09C08, both transition to the logic zero state thus setting flip-flop 09D08. The Q output (pin 05) of this flip-flop, which is applied to the four transmit FIFOs buffers, transitions to the logic one level and resets the output registers of the four FIFOs. This flip-flop will be reset as soon as another instruction is executed. After this operation, new transmit data and control information can advance to the output registers of the FIFOs.

The transmit program uses the TAMN instruction to examine the control word associated with each transmit data character. The TEOF bit (bit 3-FIG. 15c) is the end-of-frame control bit, and is always found reset until the MLCP has provided the last character of the frame. Other bits in the control word are used to specify the format of the frame. The parameters that are specified include whether or not the frame (FIG. 15h) contains an extended address field, an extended control field, a logical control field, or a test control byte. In addition, three bits specify the byte-size of the test field portion of the frame. These bits are used when the frame does not have a test control byte, because in that case the byte-size information is embedded within the frame itself and is extracted at the appropriate time by the transmit program, and then used later on at the appropriate time to control the size of each of the test field bytes. It is emphasized that the availability of these control functions and the processing performed by the transmit control program significantly reduces the requirements imposed upon the MLC Processor. In this manner, a greater system throughout can be accomplished. It is noted again that after the MLCP has provided the initial control word, it is not necessary to provide and further control information until the last character of the frame.

After the transmit control program has detected the presence of the first character of a frame, it generates and transmits an opening flag sequence before transmitting this first character. It also initializes the transmit CRC of the SC instruction (e.g., line 59400 of the Appendix A). Execution of this instruction causes the bit 7 output of decoder 09C08 which is attached to the set input of CRC generator 03C08, to transition to the logic zero state which presets the CRC generator to the all-ones condition.

As the frame is sent, each bit between the opening and closing flag is applied to the CRC register by means of the UDSCR instruction (e.g, line 36600). When this instruction is executed, output 5 of decoder 09B08 remains at the logic one level but output 6 (pin 09) transitions to the logic zero level. These signals are applied through gate 07B08 to gate 07C08 and to the enable input of the CRC generator. The system clock input to gate 07C08 causes a logic one to occur on its output which is applied to the clock input of the CRC generator. Noting that the output of the data bit buffer flip-flop 02C08 is attached to the data input of the CRC generator, and because the enable input is at the logic one state as mentioned above, the clock input causes the new transmit data bit to be shifted into the CRC generator.

The transmit program monitors the data stream as it is sent to the local DCE, and generates and inserts a zero data bit any time a string of five contiguous one bits occurs, as required by the HDLC protocol. Refer to lines 35900 through 36100 and 36700 through 37500 of the Appendix A program.

After the transmit program has finished sending the opening flag of the frame, it sends the first data character that was obtained from the transmit FIFO as described above. After this first data character has been transmitted, the program again checks the FIFO output register by means of the TFMOR version of the TAMN instruction to determine if another character is available. Assuming that it is, the program then reads the control word and the data character into the RAM of the transmit microprocessor as described above. Assuming that bit 3 (TEOF) of the control word, the end-of-frame indicator bit, is not set, the transmit program sends out a second character in the same manner as described above. This process is then repeated for each character of the frame.

If, while in the process of sending a frame as described above, the output of the FIFO is found to be not ready, an underrun situation is said to exist. When this occurs, the program executes a STUNDRN version of the SC instruction which causes the transmit underrun flip-flop 06A04 (FIG. 4) to enter the set condition, (e.g., line 129600). Later, when the MLCP reads the final status at end of frame, it will be notified of the underrun condition by means of the TUNDRN signal applied to the fourth bit of multiplexer 04B04 by flip-flop 06A04. Meanwhile, the transmit control program generates a single abort sequence and transmits it bit by bit to the local DCE. A frame thus aborted notifies the remote DTE of the error condition at the sending DTE. After the single abort sequence has been transmitted, the transmit program continues to generate and send flag sequences while waiting for an end-of-frame condition to occur and for all previous interrupts to the MLCP to be completed. This feature of the BHCLA of sending one abort sequence only, then followed by flag sequences, is an important function because it properly aborts the message but does not place the transmit line in the vital state. Note that this is performed entirely by the BHCLA transmit logic without requiring any interaction from the already overloaded MLCP.

Each character of the frame is taken from the FIFO by the transmit program and serially shifted bit by bit to the local DCE as described above. Each character is monitored as required, primarily for purposes of byte-size control of the text field portion of the message. For example, if the frame contains a test control byte TCB (FIG. 15h), then the program will monitor the frame first through the address field bytes, and then through the control field bytes. Then upon receipt of the test control byte, the byte-size information is extracted from this byte and stored within a location of the microprocessor RAM. The program then monitors the logical control field LCF, if applicable, and then, upon receipt of the first text control byte of the frame, switches byte sizes from 8-bits (which applies to the address, control, test control byte, and logical control field portions of the frame) to the byte-size specified by the test control byte. This procedure is repeated as long as the end of frame indicator bit of the control word is found to be in the reset condition.

The MLCP can specify further format changes through use of the transmit control word (FIG. 15b). The TCFX bit (bit 0) of the control word, when in the set (1) state, indicates the presence in the frame of an extended control field. The TAFX bit (bit 1), when set, indicates the presence of an extended address field. The TTCB bit (bit 2), when set, indicates the presence in the frame of a text control byte TCB (FIG. 15h) and the TLCF bit (bit 7), when set, indicates the presence of the logical control field LCF. The TBS bits (bits 4, 5, and 6) specify the byte size of the text field portion of the frame. The TEOF (bit 3) is normally reset and is set to denote the last character of the frame. These control bits i the control word are transferred to the control word register 10A06 through FIFOs 10B06 and 03B06 and are read and acted on by the transmit program.

The MLCP can specify a "bit stream mode" of operation by entering the code 011 in the TBS control word bit positions. This mode of operation provides for the transmission of data from, say, one computer memory to another computer memory, where the data does not follow any particular character structure (e.g., as during a program or memory dump). In this situation it is desirous to send the eight-bit data bytes high-order, or right-most bit first. When bit stream mode is specified, either directly by the MLCP through the transmit control word, or indirectly by the contents of the text control byte in the data stream itself, the transmit control program "flips" each character before transmitting it to the local DCE. This is done by the instructions shown at lines 88600–91600 of the Appendix A microprogram listing.

A further feature of significance involving the use of MCLP-supplied control words lies in the use of the TBFM bit in the extended control word (FIG. 15a). Normally, as soon as data loaded into the input of the FIFO memory by the MLCP reaches the output of the FIFO and is sensed by the transmit control program, the program sends an opening flag and then begins transmission of the frame. This is not always desirable because now the MLCP must continue to supply characters at a rapid rate to keep pace with the high speed transmission line or suffer the occurrence of an underrun error.

However, in accordance with the invention where the MLCP sets the TBFM bit in the extruded control word stored in register 06A06, in transmit program senses this condition and sends flag sequences but does not remove and send any actual data from the FIFO. This mode of operation continues as long as the TBFM bit is set. The MLCP can then load up to sixty-four characters into the FIFO buffer at a pace suited to its prevailing situation. That is, when the MLCP has other operations to perform and is not solely dedicated to the BHCLA, it may load the transmit FIFO as a low-priority function without having to be concerned about underrun. Conversely, when the MLCP can accommodate the high data transfer rate, it resets the TBFM bit to allow the program to start transmission of the frame immediately.

When the end-of-frame bit TEOF in the control word is found to be set (FIG. 15c), the last data character of the message is present. The first step in ending a frame is the transmission of the last data character. The transmission of this character is similar to the transmission of all previous characters except that this byte may be a partial byte as indicated by the TPLB control bit and the character size of this byte may be any size from one bit through 8 bits as determined by TLBS bits 4, 5, and 6 of the end-of-fram control word.

The next step at end-of-frame is the transmission of the 16-bit CRC sequence which was calculated for the frame, and now is residing within the CRC generator 03C08. The first 8 CRC bits are read into the microprocessor one bit at a time, complemented, stored in the internal RAM of the microprocessor, and then shifted out one bit at a time to the local DCE in the same manner as the other transmit data characters. This process is then repeated for the remaining eight bits of the CRC register. The actual reading of the CRC register into the transmit microprocessor is accomplished by means of the RCRCR instruction as shown at lines 114200 through 115000 of the Appendix A transmit program.

This instruction is similar to the UCRCR instruction previously described except that in this case the bit 5 output of decoder 09B08, which is applied to the enable input of the CRC generator 03C08, transitions to the logic 0 state, which allows the calculated CRC sequence to be shifted out instead of causing a new calculation to be performed. After the entire complemented CRC sequence, which is referred to in the HDLC protocol as the FCS sequence, has been transmitted, a closing flag sequence is generated, stored and shifted out one bit at a time by the transmit control program. Then a final interrupt is generated to the MLCP as described below.

The paragraph above describes the normal end-of-frame operation. The transmit control logic, however, provides for a number of variations and additions to this normal procedure. These variations are selected by the MLCP and specified to the transmit control logic by means of the transmit control word associated with the last transmit data character, FIG. 15c. That is, after the program has read the last data character and associated control word from the transmit FIFO buffer memory, it examines these bits to see if a special operation is required. First, the TNFCS control bit specifies whether or not the calculated CRC sequence should be sent. That is, the user may wish to generate his own checking sequence, in which case it can be provided to the transmit control logic as part of the transmit data stream. Second, the user may wish to end the frame with an abort sequence instead of with a flag sequence in order to provide the frame abort procedure. This is effected when the TA bit is set to the 1 state. And third, a method is provided such so that the receive logic may be issued a resynchronization command from the transmitter as soon as the transmitter completes transmission of the frame. This is effected when the TRR control bit is set to the 1 state. This allows the user to resynchronize the receiver as soon as the transmitter has completed the transmission of the frame in anticipation of a message being sent back to the receiver from the remote DTE transmitter. This receiver resynchronization is accomplished by means of the SRCRSYN version of the SC instruction as shown for example at line 118900 of the Appendix A transmit program.

At the end of the frame the transmit program generates an interrupt to the MLCP. This is accomplished by means of the STCRI version of the SC instruction (e.g., line 132700). Execution of this instruction causes the bit 3 output of decoder 09C08, which is applied to the set input of flip-flop 11D06, to transition to the logic 0 level momentarily, and thus to put this flip-flop in the set condition and hence generate a transmit interrupt as previously described. Note that the interrupt is generated, that is, flip-flop 11D06 is set, even if not all of the inputs to gate 11C06 are at the logic one level. More particularly, even if clear-to-send from the local DCE has gone to the off condition, the interrupt will still be generated. In response to this interrupt, the MLCP reads the DCE status in the manner previously described.

At this time, the MLCP examines the bit 4 output (pin 12) of multiplexer 04B04 which is applied through wired AND node 08D04 to pin 9 of connector 01C01, which reflects the condition of the underrun flip-flop 06A04 at this time in order to determine whether the frame was transmitted properly or if an underrun error condition occured. Now the MLCP performs a transmit WAIT operation which causes the output of gate 12C06, which is attached to both the interrupt flip-flop 11D06 and to the underrun flip-flop 06A04, to transition to the logic zero state and thus reset these two flip-flops. This then removes the interrupt condition from the MLCP.

The transmit control program is now in the interframe condition again. As has been previously discussed, in this condition, flags or abort sequences are transmitted while waiting for the MLCP to provide the first data character of a new frame. An interrupt is normally generated to the MLCP at each byte boundary. If the MLCP wishes to terminate transmit operations rather than to send another frame, these interrupts generated at each byte interval may be used as a timer. More particularly, the MLCP would wait for three such interrupts, for example, before resetting the request to send control line to the local DCE. This would insure that the message just transmitted was completely received by the receiver at the remote DTE.

Operation—Receive

The receive operation beings when the MLCP loads a receive control word (FIG. 15d) into registers 01A10 and 05A10 (FIG. 10). This pair of registers is hereafter referred to as the receive control word register. In loading this register the MLCP first puts the applicable control information on the eight CPDAT lines. The MLCP then sets up the six address and control lines to the receive address decoder 04A02 to cause the bit 1 output thereof, which is applied to an enable input of the receive control word register, to transition to the logic zero level. The MLCP next issues a strobe signal which is applied to the clock inputs of the receive control word register and thereby loads the control information on the input data lines into the control word register.

The MLCP now initializes the receive control logic by performing what is defined as a receive resynchronization operation. The MLCP sets up the six address and control lines to the receiver address decoder 04A02 to cause the bit 4 output, which is applied to gate 07B02, to transition to the logic zero level. The output of this gate is applied to an input of gate 07C02. The MLCP then issues a strobe signal which is applied to a second input of gate 07C02 and causes a positive going pulse to occur on the output of that gate. That signal is in turn applied to flip-flop 07D02 and causes it to set. The output of this flip-flop is sensed by the receive control logic as described below. This resynchronization operation can be performed at any time, and it can also be performed in a similar manner by the MLCP through the transmit address decoder 01A02.

This completes the initial set-up operation of the receiver portion of the BHCLA by the MLCP. The receiver control logic and receive control program of Appendix B will now be discussed to show how they provide receive data and receive status information for the MLCP. Then the description will return to the MLCP aspect to show how interrupts to the MLCP are generated, and how the MLCP responds to these interrupts by reading the received data character and status word. It is to be understood that in the following discussion all program and line references refer to the receive program of Appendix B unless otherwise stated. Also any references to the microprocessor refer to the receive microprocessor pair 01C10 and 07C10 (FIG. 10), which will be described below, unless otherwise specified. Similarly, any reference to the FIFO refers to the combination of the four receive FIFO memories, 01B12, 03B12, 06B12, and 08B12, which will be described below, unless otherwise stated.

First an introduction to the receiver control logic is provided. This control logic consists basically of four parts, namely the program address counter, the program control memory, the instruction execution logic, and the microprocessor pair. The receive program address counters comprise counter register 01A09, 04A09, and 07A09, and their operation has been previously described. The receive control memory comprises PROMs 01C09, 04C09, 07C09, 10C09, 04D09, 07D09, and 10D09, and their functionality has also been described previously. The instruction execution logic comprises the basic instruction decoder 06A11 (FIG. 11), the subcommand generator decoder 08C11, and the test and modify next (TAMN) multiplexer 09A11, and flip-flop 08A11. Each of these functions has been partially described previously. The operation of these elements is virtually identical to the operation of the equivalent elements of the transmit control logic (i.e., the transmit basic instruction decoder 09B08, the transmit subcommand decoder 09C08, and the transmit TAMN multiplexer 10A08, and flip-flop 09A08).

The eight bit receive microprocessor circuitry which comprises four-bit microprocessor 01C10 and four-bit microprocessor 07C10, have likewise been previously described. More particularly, first the transmit microprocessor was described, and then the receive microprocessor was described with reference to its similarities and differences to the transmit microprocessor. An eight-bit data byte is provided to the eight data input lines of the microprocessor pair via the wired-AND nodes 01B10 through 08B10 from the receive control word registers 01A10 and 05A10 during AR instructions, and from PROMs 04D09 and 07D09 during all other instructions. The eight data output lines of the receive microprocessor paid are applied to the receive FIFO memory buffer 04A12, where receive data and receive status bytes are temporarily stored before being loaded into the appropriate portion of the receive FIFO memories of FIG. 12a. In addition, the high order bit of microprocessor 01C10, that is, data bit 0, is also applied to the data input pin of the receive CRC generator circuit 04C11. The ALU operation result output from each of the two four-bit microprocessors is wired-ANDed at node 06D10 and are then applied to the TAMN multiplexer 09A11. This signal is also applied to the inverter gate 13A11, whose output is applied to another input of the TAMN multiplexer. It is noted that the ALU-output-equals-zero signal from both microprocessors must both be true as indicated by the logic one state before the composite signal attains the logic one level indicating that the total output of both microprocessors is in fact zero. The shift in/out pins are connected as previously described.

The receive control program monitors the receive resynchronization flip-flop 07D02 (FIG. 2), which may be set by either the MLCP directly or by the transmit control program as described above, to see if a resynchronization command has been received. Testing of this flip-flop is accomplished by means of the RCRSYN version of the TAMN instruction, such as exemplified at line 27800 of Appendix B. If the flip-flop is reset, the branch at line 27900 is ignored, and the program continues on to the instruction at line 28200. If set however, the branch at 27900 is executed, and the program continues at line 30000. Here the necessary internal initialization for synchronization is performed, and an RSRCRSYN subcommand instruction is executed to reset the resynchronization flip-flop (e.g., see line 31700 of Appendix B).

The process for inputting each receive data bit is described here. Data is received from the local DCE via pin of connector 02D01 (FIG. 1). This signal is routed through receiver circuit 05A05 to receiver circuit 05B05, then to multiplexer 11C04, and finally to the data input of flip-flop 02C11 (FIG. 11). The receive clock is received from the local DCE via pin 10 of connector 02D01. This signal is routed through receiver circuit 04A05, to receiver circuit 04B05, then through multiplexer 11C04 and inverter 12D04 to the clock inputs of flip-flops 01C11 and 02C11 (FIG. 11). Both of these flip-flops are thus triggered by the negative-going transition of the receive clock as viewed at the pin 10 of the connector 02D01. In the case of flip-flop 02C11, the next receive data bit mentioned above is thus loaded into this flip-flop. In the case of flip-flop 01C11, this flip-flop is set to indicate the presence of a new receive data bit in flip-flop 02C11. The program senses this condition by means of the RRDY version of the test instruction as shown at Appendix B line 26700. When ready flip-flop 01C11 is found set, before branching to process the new bit, the program resets this flip-flop by means of the RSRRDY subcommand instruction at line 27100. As previously stated, it is noted again that the subcommand instruction may be combined with the branch instruction to form a BRSC instruction as shown at this line 271001.

Having determined that a new receive data bit is available for processing by means of the RRDY test instruction as described above, the receive control program next shifts the data bit into the microprocessor. This is accomplished by the SRQF version of the MMP instruction (line 37000). When this instruction is executed, the input to inverter 03B11 is at a logic zero level and hence the output, which is applied to AND gate 03C11, is at a logic one. The other input to gate 03C11 is also at a logic one at this time, and the output, which is applied to gate 02D11, is at a logic one. The output of flip-flop 02C11, which is coupled to the other input of gate 02D11, is now enabled throught this gate and applied to the left shift input of the Q register of microprocessor 01C10 (FIGS. 10b and 16b).

Noting that the bit 7 and 8 instruction inputs to the microprocessor pair specify a right shift operation at this time, the current data bit is shifted into the Q register of the receive microprocessor pair. More particularly, the right shift operation is performed because the bit three output of PROM 10C09 at pin 1 is at a logic one level, and the bit two output at PROM pin 12 is at a logic zero level, the right shift operation is executed. In this manner each new receive data bit is shifted into the receive microprocessor. This is hereafter referred to as an input next receive data bit operation.

As receive operations begin, each data bit is shifted into the microprocessor as described above. Each new bit is stored along with the previous seven bits in a location within the internal RAM of the microprocessor. These eight bits are examined each bit time to see if they comprise a flag sequence, 01111110 (Appendix B line 39900). Detection of a flag sequence indicates that character synchronization has been achieved. This flag sequence and any additional flag sequences are discarded by the receive program while searching for the first non-flag, non-abort (11111111) character. The first such character found is the first character of a frame.

The control program reads the receive control word registers 01A10 and 05A10 at various times to determine the format of the frame as specified by the MLCP. This inputting is accomplished by the RER instruction (e.g., line 73900). Execution of this instruction causes the bit 7 output of instruction decoder 06A11 to transition to the logic zero level. This signal is applied to an input of inverter 09B11, whose output is supplied to PROMs 04D09 and 07D09. The resulting logic level 1 at the enable inputs of these PROMs forces their outputs to the high impedance state. Note that during the execution of all other instructions, the outputs of these PROMs, which contain the constant field of the instruction, are enabled. The bit 7 output of decoder 06A11, which is at the logic zero state, is also applied to the output enable inputs of receive control word registers 01A10 and 05A10. The receive control word is thus enabled through wired-ANDed nodes 01B10 through 08B10 to the input data ports of the receive microprocessors. It is noted that the control word registers are inhibited during all other instructions.

This control information obtained by the RER instruction above is examined (as required) by the TAMN instruction to determine the format of the frame (e.g., line 74000). The control information provided by the MLCP for processing by the receive control program specifies the format of the frame and includes information regarding the address field (RAFX bit), control field (RCFX bit), logical control field (RLCF bit), text control byte (RTCB bit) and byte size (RBS bits) for the text field portion of the frame (FIG. 15d). The receive program processes each frame as indicated by these control bits, in a manner similar to the transmit operation heretofore described. Also an additional control bit RFCSIE allows for the inputting of the received FCS sequence rather than the more normal case where the CRC is checked entirely by the BHCLA. Additional information regarding all of this is provided below.

The BHCLA provides for error checking of each message via a CRC mechanism. This logic comprises CRC circuit 04C11 and circuits 06B11, 07B11, 06C11, and 04D11 (FIG. 11). At the start of each frame, the PSRFCSR subcommand is executed to initialize the CRC generator 04C11 to the all-ones state. (e.g., Appendix B line 69500). Execution of this subcommand causes the bit 7 output of subcommand decoder 08C11, which is applied to the set input of the CRC generator 04C11, to momentarily transition to the logic zero level thus setting all of the CRC generator bits. Then as each bit of the message is received, an FUCSR instruction is executed to load the new bit into the CRC generator (e.g., line 38600). During this instruction, the data bit to be applied to the CRC generator is enabled to output bit 0 on pin 39 of microprocessor 01C10 which is then applied to the data input pin of the CRC generator. The bit 6 output of instruction decoder 06A11 transitions to the logic zero level, and is applied through gate 06B11 to gate 06C11 to pass the next system clock pulse through gate 06C11 to the clock input of the CRC generator. Since the bit 5 output of the instruction decoder which is applied to the output enable input of the CRC generator is at a logic one level during this instruction, the CRC generator is updated, rather than shifted out.

After the first non-flag, non-abort character is received, receive data bits are shifted further into the internal RAM of the microprocessor as described above. Because frames of less than thirty-two bits are illegal or invalid frames, the extra shifting, storage, and delay is required in order to allow the program to completely discard any such short frames without transferring any data or status information to the MLCP. Four of the eight-bit RAM locations are combined to form a logical thirty-two bit shift register, and are shifted as shown at lines 37600 through 38400. Any zero data bits inserted by the remote transmitter for transparency purposes (as specified by the HDLC protocol) are stripped from the message by the receive control logic program.

Figure 12A:
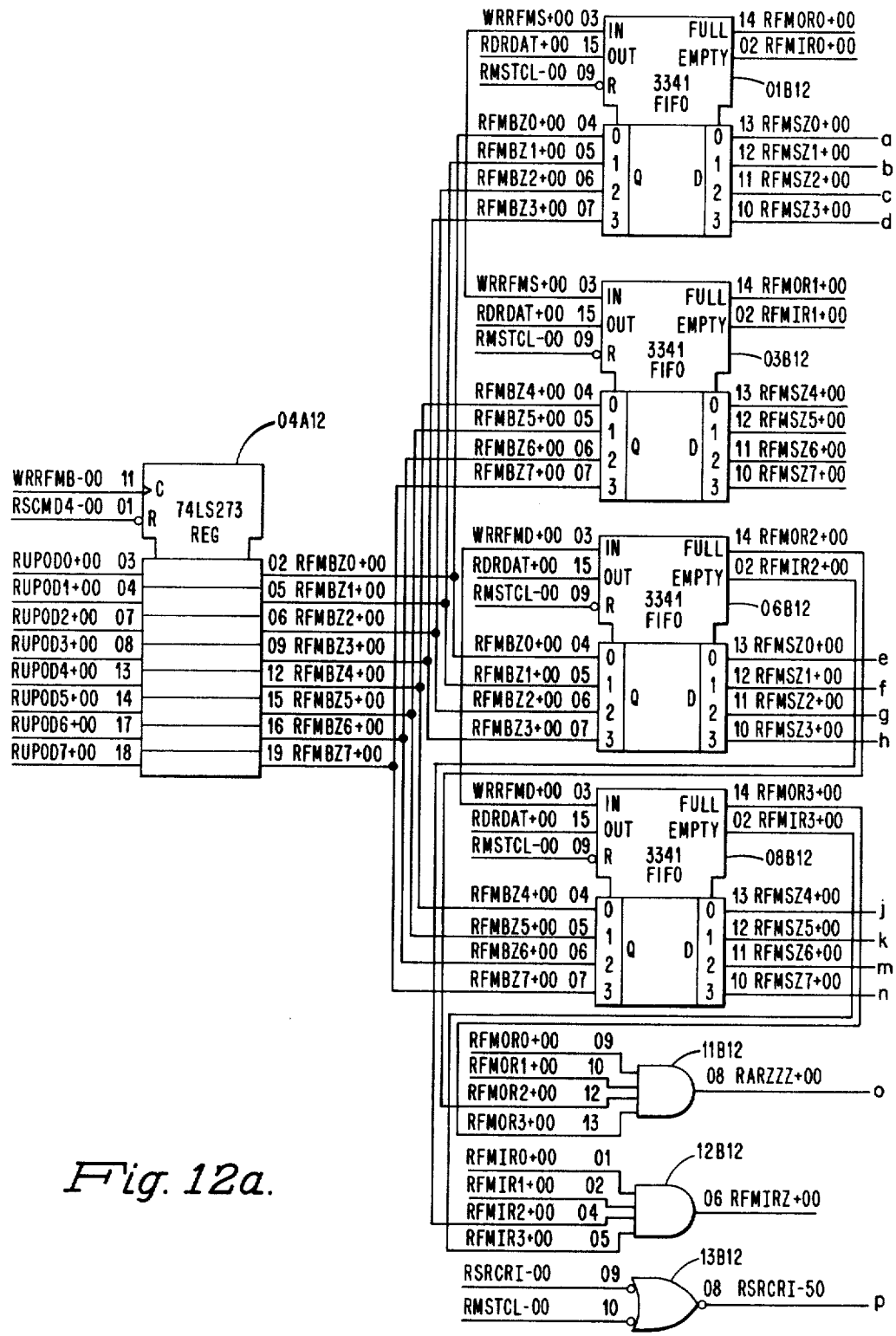
Figure 12B:
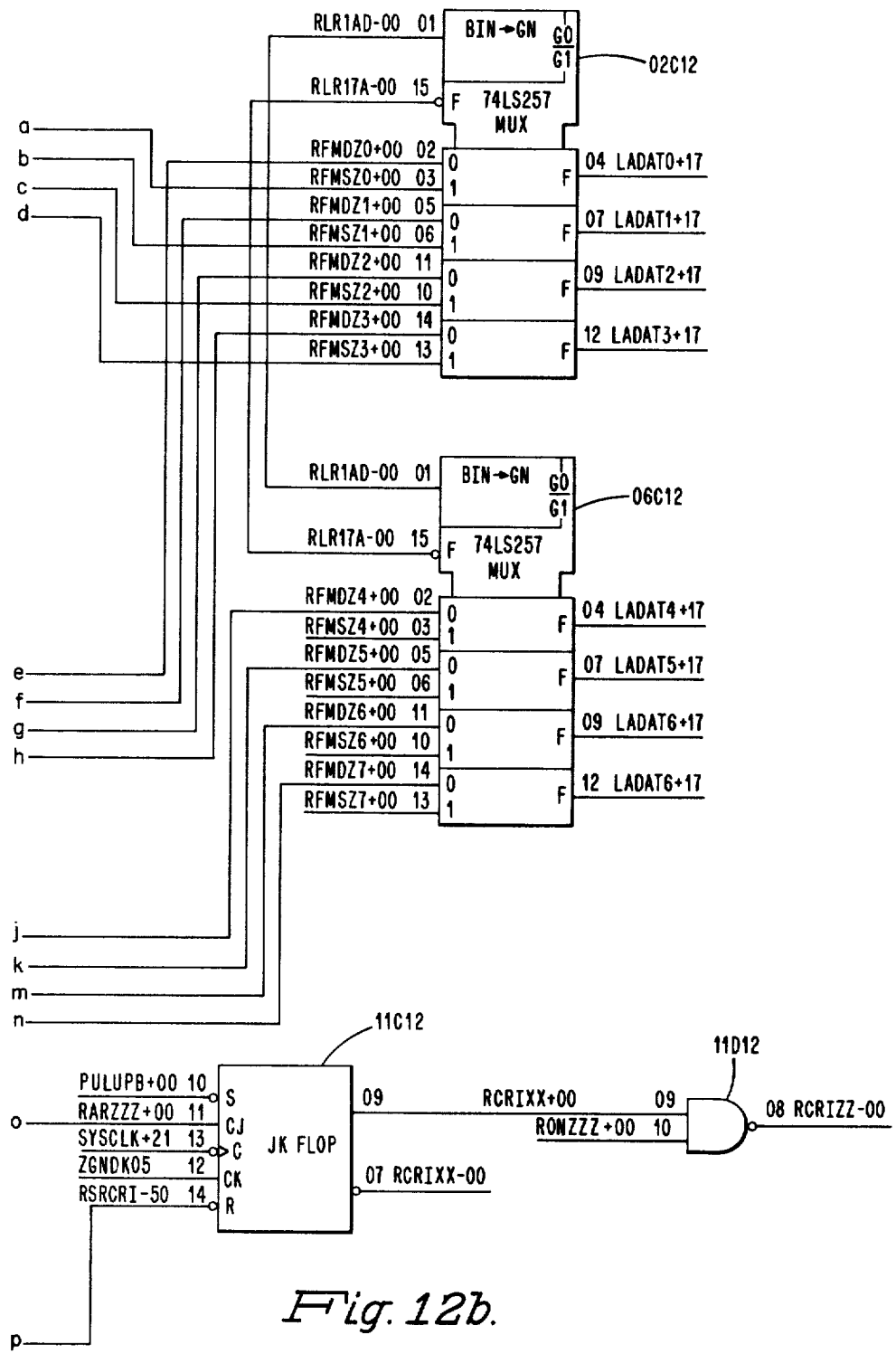

The receiver FIFO memory comprises four sixteen word by four bits per word FIFO circuits 01B12 through 08B12, which are cascaded to form a sixty-four word by sixteen bits per word FIFO memory. FIFOs 01B12 and 03B12 are used to store receive status information and FIFOs 06B12 and 08B12 are used to store received data. Information is copied into each FIFO pair from the register 04A12 whose eight outputs are applied to the data inputs of the two FIFO pairs (FIG. 12a). This FIFO memory buffer register 04A12 is in turn loaded directly from the eight bit receive microprocessor.

After thirty-two bits of the frame have been received, thus indicating a valid frame, the first character of the message is loaded into the receive FIFO memory in the following manner. First the receive program must test the FIFOs to see if their input registers are empty. The ready condition of the input register of each FIFO is signified by a logic one on its empty output. The empty outputs of each of the four FIFOs 01B12, 03B12, 06B12, and 08B12 are combined at AND gate 12B12. The output of this gate thus goes to the logic one level when the FIFOs are available. This signal, and hence the availability of the FIFOs, is tested by the RFMIR version of the test instruction (e.g., Appendix B line 77600).

It is noted that, as will be discussed subsequently, data and status information loaded by the receive control program into the input of the FIFO memory are normally removed periodically from the bottom of the FIFO by the MLCP, and hence the input registers are normally empty. In the event that the input registers are not available, either now or at any time during the processing of the frame, an overrun condition is said to exist. In this event, the control program waits until end of frame occurs and the input registers are empty, and then loads a status word, with a bit set to indicate the overrun condition, into the status portion of the FIFO. Another bit in this status word is set to indicate the end of frame situation, and the third bit is set if the frame was aborted, as described below. The MLCP will thus be informed of the overrun error, i.e., the missing data condition. No attempt is made to transfer additional receive data for the current frame to the MLCP, because any such data would be meaningless and would only increase the processing load on the already overburdened MLCP.

After the program has determined that the input registers of the FIFO are available, it proceeds to load the receive data character and associated status word into the FIFO memory. This is a two-step process for both the status word and the data. That is, first the status or data is loaded into the register 04A12 (hereinafter referred to as the receive FIFO memory buffer), and then it is copied into the appropriate pair of FIFOs.

The status word associated with each data character has a value of all logic zeros. This is generated by means of the RSRFMB subcommand instruction (e.g., line 165100). When this instruction is executed, the bit 4 output of subcommand decoder 08C11, which is applied to the reset input of the receive FIFO memory buffer, transitions to the logic zero level which resets this register to the all logic zero state.

This all zero status word is now transferred to the status FIFOs 01B12 and 03B12 by means of the WRRFMS subcommand instruction (e.g., line 165200). When this instruction is executed, the bit 2 output of subcommand decoder 08C11, which is applied to the set input of flip-flop 08D11, transitions to the logic zero level which places this flip-flop in the set condition thereby transitioning the Q output (pin 05) to the logic one level. Upon the execution of the next non-subcommand instruction, the CK input to this flip-flop is at the logic one level causing the Q output to transition back to the logic zero level upon application of the next system clock. This logic zero to logic one to logic zero sequence of the Q output of flop 08D11, which is applied to the load inputs of status FIFOs 01B12 and 03B12, causes the all zero status condition previously loaded into the register 04A12 to be transferred into the status portion of the FIFO.

The received data character is now transferred from the internal RAM of the receive microprocessor first to the FIFO buffer and then to the data portion of the FIFO memory. The transfer to the buffer is accomplished by the WRRFMBD subcommand instruction (e.g., line 165500). When this instruction is executed, the assembled received character is enabled onto the eight data output ports of the receive microprocessor pair 01C10 and 07C10, which are in turn applied to the data input of the eight bit receive FIFO memory buffer 04A12. At the same time the bit 5 output of the subcommand decoder 08C11, which is applied to one input of gate 10D11, transitions first to the logic zero level and then back to the logic one level, that is, a negative-going pulse is generated. This pulse applied to gate 10D11 causes its output, which is applied to the clock (i.e., load) input of the FIFO memory buffer, to execute similar transitions which load the data character into the FIFO memory buffer.

The received data character thus loaded into the FIFO buffer is now transferred to the receive data FIFOs 06B12 and 08B12 by means of the WRRFMD version of the subcommand instruction (e.g., line 165600). Execution of this instruction causes the bit 3 output of subcommand decoder 08C11, which is connected to flip-flop 09D11, to transition to the logic zero state and to put this flip-flop in the set state whereby the Q output transitions to the logic one level. Upon the execution of the next non-subcommand instruction, the CK input to this flip-flop is at the logic one level causing the Q output to transition back to the logic zero level upon application of the next system clock. This sequence of transitions of the Q output, which is applied to the load inputs of receive data FIFOs 06B12 and 08B12, causes the received data character previously stored in register 04A12 to be transferred into the data portion of the receive FIFO.

The remainder of the frame is now processed by the receive control program in a manner similar to that described above. More particularly, each data bit received from the local DCE is shifted into the microprocessor, applied to the CRC register, combined with other bits and assembled into characters, processed as required, and loaded into the FIFO along with the all zero status word. All zero data bits inserted for transparency by the remote transmitter are stripped by the program (see, for example, Appendix B lines 34000 through 35100 and 41000 through 41400).

The frame is processed under control of the receive control word (FIG. 15d) loaded by the MLCP into registers 01A10 and 05A10 (FIG. 10) to determine the size of each data character in a manner similar to the transmit description previously given (since transmit and receive messages have the same format). More particularly, the RCFX bit 0 in the set condition specifies a extended control field format, the set state of the RAFX bit 1 specifies the extended address field format, the set condition of RTCB bit 2 indicates the presence of a text control byte, the set condition of RCLF bit 7 indicates the presence of a logical control field, RBS bits 4, 5, and 6 indicate the byte size of the text field bytes, and RFCSIE bit 3 specifies whether or not the received FCS should be input at the end of the message as is discussed further below. The above bit references are with respect to microprocessor signals RUPID0 through RUPID7, and may be translated back to registers 01A10 and 05A10, if desired. These bits also refer to the CPDAT 0 through CPDAT 7 bits, the data bits from the MLCP on connector 01C01 (FIG. 1). Received data characters of less than eight bits are justified within the RAM of the microprocessor by the receive control program before being loaded into the FIFO for transfer to the MLCP (lines 156300 through 158500). It the bit stream mode (as described above for the transmit operation) is in effect, each character is "flipped" before being loaded into the FIFO (lines 160000 through 163900). This procedure continues until an end of frame condition occurs as described below.

In the HDLC protocol, the end of a frame is specified by one of two unique bit patterns in the data stream. More particularly, a string of seven continuous one bits indicates an aborted frame, whereas the 01111110 sequence specifies the end of a normal or non-aborted frame. The receive control program examines each data bit, in conjunction with previously received data bits, in search of the above described sequences (see, for example, Appendix B lines 39800 through 40400). It is noted that either sequence may occur at any time, not only on a character boundary. When end of frame occurs, the receive program performs a series of ending operations and generates a non-zero status word containing information about the frame just received, and loads the status byte into the status FIFOs as described below.

When an abort sequence is detected, this condition is reported to the MLCP by means of a special bit RA, reserved to indicate the abort condition, in the receive status word (FIG. 15e). The receive program also sets an end of frame bit REOF and stores this completed status byte in the RAM of the receive microprocessor. Similarly, if overrun (heretofore described) had occurred during the frame, the bit RO reserved to indicate this error condition is set. The receive program completes this operation by transferring the receive status word to the status portion of the FIFO (as described below).

If an additional eight 1-bits are received, an idol link state exists. That is, receipt of 15 contiguous one bits indicates the idol state. This condition is reported to the MCLP via a status transfer operation similar to the one described just above in which the abort bit RA is set, but the end of frame bit REOF is reset. It is to be understood that any time a status byte is loaded into the status portion of the FIFO, a data character, even if it is a dummy character, is also supplied to the data portion of the FIFO in order to completely fill one entire sixteen-bit FIFO location.

Frames are normally ended by a flag sequence as described above (FIG. 15h). The sixteen bits preceding this flag sequence are the FCS error checking bits, which are stored within the RAM of the receive microprocessor for possible future use as described below. The bits just preceding the FCS bits comprise the last data character of the frame. Detection of the end of frame flag sequence by the receive control program initiates a series of operations including the processing of the last data character, the checking of the CRC residue, the generation of an end of frame status word, and optionally the transfer of the received FCS sequence to the MLCP.

The last byte of the frame is processed by the control program as follows. First the number of bits of this character received when the closing flag was detected are counted, and this count is compared with the byte size now in effect to determine whether the last character was a full byte or only a partial byte. One eight-bit location of the microrpocessors RAM is used to temporarily store the ending receive status word for each frame. Bit position 7 of this word (RPLB bit-FIG. 15e.) is set by the receive control program to indicate a partial last byte or left in the reset state to indicate a full byte (lines 132900 through 133200). The program also generates and loads a unique value into the RLBS bit positions of this status byte to indicate the number of bits in this last character (program lines 133400 through 1391900).

The receive control program then performs the following steps, all of which are similar to procedures heretofore described. If the last byte contains less than eight bits, it is right-justified within the microprocessor RAM (lines 194200 through 196300). If bit stream mode is in effect, the character is "flipped" (lines 204100 through 208000). Finally, this last byte is loaded into the FIFO memory (lines 232900 and 233000).

The receive control program now completes the end of frame status word, the generation of which was started above, and loads it into the FIFO as follows. It is to be noted that the cases of the aborted frame and overrun condition, which were discussed previously, do not apply here and hence the associated status bits RA and RO are left in the reset state. The program sets the end of frame indicator bit REOF. The only remaining status bit, the FCS error indicator RFCSE, is updated as discussed below.

To check the integrity of the frame, the CRC sequence, which was generated based on all bits of the frame between the opening and closing flags (except for zero bits inserted for transparency), must be examined. First the receive control program reads the CRC residue from the CRC generator 04C11 where the calculation has been occurring. This is accomplished by means of a series of sixteen RFCSR instructions (program lines 186600 through 190300 and 192200 through 192900). The execution of each RFCSR instruction shifts one bit of the accumulated CRC sequence from the CRC generator into the receive microprocessor.

More particularly, the output of the CRC generator is applied to one input of inverting AND gate 04D11. The output of this gate is applied through wired-AND node 12D10 to the rightmost bit of register logically located within RAM of the receive microprocessor. During this instruction, the bit 5 output of instruction decoder 06A11, which is applied to inverter 07B11, goes to the logic zero level. The output of inverter 07B11 which attaches to the gate 04D11 mentioned above, transitions to the logic one level to transfer the data from the output of the CRC generator to the microprocessor as described above. When the RFCSR instruction is executed, the shift control inputs of the receive microprocessor (instruction input bits 6, 7, and 8), specify a left-shift operation to input the bit. During this instruction the bit 5 output of instruction decoder 06A11, which is applied to gate 06B11, transitions to the logic zero level. The output of this gate, which is applied to gate 06C11, goes to the logic one level enabling the next system clock to be applied through this gate to the clock input of the CRC generator to shift out the next CRC bit. Since the bit 6 output of the instruction decoder 06A11, which is applied to the enable input of the CRC generator, is at the logic one level, the CRC generator performs a shift/out operation instead of a CRC update operation.

The CRC residue, having been shifted into the microprocessor, is now examined by the receive control program to determine if an error-free frame has been received. It is noted that the residue is read into the microprocessor and checked eight bits at a time, rather than in its entirety in one operation. The actual residue for a good frame is F0B8 hexadecimal. But since the residue was first inverted by gate 04D11, and then shifted into the microprocessor from right to left instead of from left to right, the value for an error free frame as seen within the microprocessor is E2F0 hexadecimal. The FCS error indicator bit RFCSE in the status word described above is set by the program if this value is not detected, and left reset if it is (program lines 190400 through 190700 and 193000 through 193300).

The receive control program has now completed the generation of the end of frame status word. The program now transfers this status byte to the status FIFOs 01B12 and 03B12 (FIG. 12) via a two-step process using the receive FIFO buffer 04A12 (program lines 232600 and 232700). First the WRRFMBS subcommand is executed to transfer the status word from the RAM of the receive microprocessor to the receive FIFO buffer 04A12. More particularly, when this instruction is executed, the status word located in RAM location 5 (where it was just assembled) is enabled onto the output data lines of the microprocessor, which are applied to the data inputs of the FIFO buffer. The bit 5 output of the subcommand decoder 08C11, which is applied to gate 10D11, transitions to the logic zero level during this instruction, and then returns to the logic one level at the end of the instruction. The output of this gate, which is attached to FIFO buffer 04A12, also transitions similarly to load the status word into the FIFO buffer. Next the WRRFMS subcommand is executed (as previously described) to transfer the status word from the FIFO buffer 04A12 into the status FIFOs 01B12 and 03B12.

This completes the receive control logic operation for the normal situation. If the user wishes to examine the actual FSC sequence received from the remote transmitter, however, the MLCP sets the RFCSIE bit (bit 4) of receive control word register 01A10. The control program examines this bit when it begins end of frame processing (program line 187100). If found set, the above described checking of the CRC residue in the CRC register 04C11 is not performed. Instead, the received sixteen bit FCS sequence, which has been stored in the RAM of the microprocessor by the control program, is then loaded into the data portion of the FIFO one 8-bit byte at a time in two separate operations (program lines 211500 through 212500, 213400 through 214400, and 232900 through 233000).

It is to be understood that in the above description the availability of the input registers of the FIFO is always checked by the RFMIR test instruction before any attempt is made to load data and status into the FIFO memory. If these registers are not available at the beginning of a frame or during a frame, an underrun situation exists as previously described. At the end of a frame, however, that is, after the closing flag has been received, the receive control program waits, if required to, until the FIFO becomes available, and then supplies the final data character and end of frame status (and FSC bytes, if required) to the FIFO. In this manner, a frame, once received by the receive program, will not be overrun and destroyed by any following frames.

Additional data received from the local DCE are now synchronized to the flag sequence, assembled into characters, and processed in the same manner as above. That is, any subsequent frames are processed in the same manner as just discussed. It is to be understood that the closing flag for one frame may also serve as the opening flag for the next frame.

This completes the description of the receive control logic and receive control program. The receive FIFO memory effectively isolates this control functionality from the MLCP interrupt functionality. That is, data and status loaded into the input of the FIFO memory as described above, ripple their way to the output of the FIFO, cause the generation of an interrupt to the MLCP, and are then removed by the MLCP for processing therein. This interreaction with the MLCP is described below.

Receive data and status loaded into the input register of the receive FIFO memory by the receive control program as described above ripples its way to the output register of the FIFO. The FULL output signal of each receive FIFO 01B12, 03B12, 06B12, and 08B12 goes to the logic one level to indicate that the output of this particular four bit slice of the total sixteen-bit data/status word is ready. The output ready signal from each of the four FIFOs is applied to an input of AND gate 11B12. The output of this gate goes to the logic one level whenever a complete sixteen-bit data/status word is available to be transferred to the MLCP. When this signal, which is applied to the CJ input of flip-flop 11C12 is at a logic one level, it causes this flip-flop to go to the set state upon application of the next system clock. When the Q output of this flip-flop, which is attached to an input of gate 11D12, is at the logic one state, it causes the output of gate 11D12, which is applied to pin 9 of connector 01B01, to transition to the logic zero level. The logic zero state of this signal serves as an interrupt signal to the MLCP to notify it that receive data and status are ready for transfer.

As described above, the change of the signal on pin 9 of connector 01B01 from a logic one to a logic zero indicates to the MLCP that status and data is available in the receive FIFO. The MLCP responds to this interrupt by first reading the receive status word and then the receive data character from the appropriate sections of the receive FIFO memory as described below. First it is noted that the eight data outputs of the status FIFOs 01B12 and 03B12 are applied to the "1" data inputs of the multiplexer 02C12 and 06C12, and that the eight data outputs of the receive data FIFOs 06B12 and 08B12 are applied to the "zero" data inputs of those multiplexers. When the select input at pin 1 of the multiplexers is at the logic zero level, the receive data inputs are selected by the multiplexer, and when the select input is at the logic one level, the status inputs are selected. The eight outputs of these multiplexers are applied to the eight wired-AND nodes 01D04 through 08D04 (FIG. 4), and from there to pins 1 through 6, 8 and 9 of connector 01C01, the pins through which the MLCP receives data and status information from the MLCP.

The outputs of the aforementioned multiplexers are normally in the high impedance state, but when the MLCP reads receive data or receive status from the receive FIFOs, the "F" input pin, which is the output enable pin, transitions to the logic zero level allowing information from the selected FIFO outputs to be transferred to the MLCP. The MLCP reads receive status by applying address and control signals to the receive address decoder 04A02. This causes the bit zero output to transition to the logic zero level, while the bit 6 output remains at the logic one level. Since the bit zero output is applied to gate 04D02, its output, which is applied to the output enable input of multiplexers 02C12 and 06C12, also transitions to the logic zero level thus activating these multiplexers. Since the select input to these multiplexers, which is attached to the bit 6 output of decoder 04A02, is at the logic one level, the outputs of the status FIFOs 01B12 and 03B12 are selected and status information is provided to the MLCP.

The MLCP next reads the received data character in a manner similar to that described above except that the address and control lines to the receive address decoder cause the bit 6 output to transition to the logic zero level and the bit zero output to remain at the logic one level. Since the bit 6 output is also applied to gate 04D02 in the same manner as the bit zero output was above, the 02C12 and 06C12 multiplexers are activated. But since the select input to these multiplexers is at the logic zero level, the outputs of the FIFOs 06B12 and 08B12 are selected and received data is provided to the MLCP. The bit 6 output of decoder 04A02 is also applied to gate 02B02. Upon activation of the strobe signal by the MLCP which is applied to the second input of this gate, a positive going pulse is generated at the output of this gate. This signal is applied to the "OUT" inputs of the four receive data and status FIFOs 01B12, 03B12, 06B12, and 08B12 and notifies the FIFOs that the sixteen bits of information have been removed from the output registers. This allows the next data in the four FIFOs to advance to the output registers. It is noted that, as described above, the output of AND gate 11B12 is at the logic one state whenever output data is available in the FIFOs.

The MLCP has thus responded to the first receive interrupt by transferring the receive status and data. The all-zero value of the status indicates that the associated data character was a valid character, that end of frame did not occur, and that no overrun or abort condition occurred. The MLCP now applies address and control signals to receive address decoder 04A02 to force the bit 2 output to the zero level. The MLCP now performs one of the two operations described below.

First the MLCP may transition the pin 20 signal of connector 01B01 to the logic zero level. Noting that this signal and the bit 2 output of 04A02 above are both applied to the inputs of gate 05B02, the output of this gate, which is applied to an input of gate 13B12, transitions to the logic zero level. The output of gate 13B12, which is coupled to the reset input of interrupt flip-flop 11C12, also goes to the logic zero state and resets this flip-flop thus removing the interrupt signal from the MLCP, at least momentarily. The MLCP has thus entered the WAIT state. Since the output of the gate 11B12 is applied to the CJ input of the interrupt flip-flop 11C12, this flip-flop will be set again by the occurrence of the system clock as soon as data is available at the output of the FIFO as described above. This will again interrupt the MLCP to cause a repeat of the above read status and data operation.

Second, the MLCP may perform a DCE status read operation similar to the one described previously for the transmit operation. It is to be noted that the bit 2 output of decoder 04A02 is at the logic zero level, whereas the other outputs of decoders 01A02 and 04A02, in particular the bit 2 output of 01A02, are at the logic one level. The bit two output of 04A02 is applied to an input of gate 03D02. The logic zero output of 03D02 is applied to an input of gate 02D02. The logic zero output of 02D02 is applied to the output enable input of multiplexer 04B04, an enables the output of inverter 05A04 to pin 5 of connector 01C01.

It is to be noted that both inputs of gate 01D02, which are supplied by decoders 01A02 and 04A02, are at the logic one level thus causing its output, which is applied to the select input of multiplexer 04B04 to be at the logic one level. This selects the signals at its "one" inputs (rather than at its "zero" outputs) which includes the output of inverter 05A04. Furthermore, the two inputs to selector 03A04 are such that the output ready signal from gate 11B12, which is also applied to selector 03A04 is enabled through 03A04 to inverter 05A04 and thence onto the MLCP. The MLCP tests this bit to determine if another character and associated status words are available at the outputs of the FIFO. If they are, the MLCP repeats the receive status and data transfer described above. If not, the MLCP performs the operation described above which resets the interrupt flip-flop and thereby enters the WAIT state. The BHCLA will interrupt the MLCP when the FIFO output becomes ready again.

The MLCP continues to repeat the above specified operations. Each time an interrupt is received for the FIFO ready indicator of the DCE status word is found set, the MLCP first reads the received status word, examines it, then inputs the receive data character. More particularly, the MLCP examines the end of frame indicator bit REOF (bit 3) of the receive status word. This bit remains reset until the last characater of the frame is presented. At this time, the MLCP examines the receive status word in more detail to determine if the frame was aborted or if overrun occurred, and if not as is the normal case, if there was an FCS error, if there was a partial last byte, and how many bits are valid in the associated last byte of the message. These status bits are of course the same bits that were described above in the receive control logic description.

After this last interrupt for the current frame has been acknowledged, another interrupt may occur. When the MLCP inputs the receive status word and examines it, the all zero value will indicate the start of a new frame, or, possibly, the abort bit or overrun bit may be set to indicate the idle link state or a completely missed frame overrun condition. When additional frames are received and processed by the receive control logic, they are loaded into the FIFO memory as described above, and generate interrupts to the MLCP. The all zero status word indicates the presence of frame data. The MLCP continues to respond to interrupts by transferring status and data as long as they are forthcoming. The MLCP may command the receive control logic to discard all status and data in the FIFO at any time by executing the receive resynchronization procedure described at the beginning at this receiver description section. Or the MLCP may inhibit interrupts from the receive FIFOs by turning the receiver off, that is to say, by loading a logic zero into bit 6 of DCE control register 08A04/-11A04 (as heretofore described). The logic zero state of this bit, which is applied to gate 11D12, inhibits further receive interrupts from occurring by holding the output of this gate at the logic one state. Transmit interrupts may be inhibited in a similar manner. That is, if the MLCP turns the transmitter off by loading a logic zero into bit 7 of DCE control register 08A04/11A04, which is applied to one input of gate 12D06, the output of this gate, which is the transmit interrupt signal to the MLCP, is held in the logic one state thus preventing interrupts from occurring.

It will be apparent to those skilled in the art that various modifications and variations can be made to the embodiment of the invention as hereinabove described without departing from the spirit and scope of the invention.

APPENDIX A

```
100     PARAMETERS;
200     MODEL 3HCLA-TRANSMIT-FIRMWARE;
300
400     \TRANSMIT FIRMWARE REVISION NOTES.
500         THE F/W REV LEVEL IS GENERATED AT INIT002.
600         THE CURRENT REV IS 1.\
700
800     \TABBING NOTES.
900         TAB CHARACTER    COLON.
1000        TAB COLUMNS..... 7,12,19,27,44.\
1100
1200    ROMDEF MAIN,24,1024,,,$$ROS;
1300
1400
1500
1600
1700    BRCHFLD  BRADDR,ABS,2/10;
1800
1900
2000
2100
2200        \ CONSTANT FIELDS \
2300
2400    CNSTFLD WTFLD,16/3        \ROS WORD TYPE\;
2500    CNSTFLD KFLD,20/4         \ROS CONSTANT-4 BITS\;
2600    CNSTFLD ISCFLD,12/1       \INHIBIT SUBCOMMAND IF = 1\;
2700    CNSTFLD IFWFLD,0/2        \INHIBIT FILE WRITE IF = 0\;
2800    CNSTFLD ALLBITS,0/24      \TO SET UNUSED LOCATIONS TO ZERO\;
2900
3000
3100
3200
3300        \ VARIABLE FIELDS \
3400    ARGDEF   FAFLD    (12/4)
3500
3600    A0 /0#    A1 /1#    A2 /2#    A3 /3#
3700    A4 /4#    A5 /5#    A6 /6#    A7 /7#
3800    A8 /8#    A9 /9#    AA /A#    AB /B#
3900    AC /C#    AD /D#    AE /E#    AF /F#   ;
4000
4100
4200
4300
4400    ARGDEF   FBFLD    (8/4)
4500
4600    B0 /0#    B1 /1#    B2 /2#    B3 /3#
4700    B4 /4#    B5 /5#    B6 /6#    B7 /7#
4800    B8 /8#    B9 /9#    BA /A#    BB /B#
4900    BC /C#    BD /D#    BE /E#    BF /F#   ;
5000
5100
5200
5300
5400    ARGDEF   OPFLD    (2/6, 19/1)
5500
5600        \ LOGICAL FUNCTIONS \
5700
5800    AORB     /060C      \A LOGICAL OR B\
5900    AORB     /062C      \A LOGICAL OR B\
6000    AANDQ    /100C      \A AND Q\
6100    AANDB    /102C      \A AND B\
6200    ANOTANDQ /120C      \ANOT AND Q\
6300    ANOTANDB /122C      \ANOT AND B\
6400    AXORQ    /140C      \A EXCLUSIVE OR Q\
6500    AXORB    /142C      \A EXCLUSIVE OR B\
6600    AXNORQ   /160C      \A EXCLUSIVE NOR Q\
6700    AXNORB   /162C      \A EXCLUSIVE NOR B\
6800
6900    DORA     /072C      \D OR A\
7000    DORQ     /074C      \D OR Q\
7100    DANDA    /112C      \D AND A\
7200    DANDQ    /114C      \D AND Q\
7300    DNOTANDA /132C      \DNOT AND A\
7400    DNOTANDQ /134C      \DNOT AND Q\
7500    DXORA    /152C      \D EXCLUSIVE OR A\
7600    DXORQ    /154C      \D EXCLUSIVE OR Q\
7700    DXNORA   /172C      \D EXCLUSIVE NOR A\
7800    DXNORQ   /174C      \D EXCLUSIVE NOR Q\
7900
8000    NOTQ     /164C      \Q INVERTED\
8100    NOTB     /166C      \B INVERTED\
8200    NOTA     /170C      \A INVERTED\
8300    NOTD     /176C      \D INVERTED\
8400
8500    ALUZ     /104C      \FORCE ALU OUTPUT TO ZERO\
8600
8700
8800        \ ARITHMETIC FUNCTIONS \
8900
9000    APQ      /000C      \A + Q\
9100    APB      /002C      \A + B\
9200    DPA      /012C      \D + A\
9300    DPQ      /014C      \D + Q\
9400
9500    Q        /004C      \PASS Q\
```

```
9500      9          /006C       \PASS B\
9700      A          /010C       \PASS A\
9800      D          /016C       \PASS D\
9900
10000     Q1C        /044C       \Q 1'S COMPLEMENT\
10100     B1C        /046C       \B 1'S COMPLEMENT\
10200     A1C        /050C       \A 1'S COMPLEMENT\
10300     D1C        /036C       \D 1'S COMPLEMENT\
10400
10500     Q2C        /045C       \Q 2'S COMPLEMENT\
10600     B2C        /047C       \B 2'S COMPLEMENT\
10700     A2C        /051C       \A 2'S COMPLEMENT\
10800     D2C        /037C       \D 2'S COMPLEMENT\
10900
11000     QM1        /024C       \Q - 1\
11100     BM1        /026C       \B - 1\
11200     AM1        /030C       \A - 1\
11300     DM1        /056C       \D - 1\
11400
11500     QP1        /005C       \Q + 1\
11600     BP1        /007C       \B + 1\
11700     AP1        /011C       \A + 1\
11800     DP1        /017C       \D + 1\
11900
12000     QMA        /021C       \Q - A\
12100     BMA        /023C       \B - A\
12200     AMD        /033C       \A - D\
12300     QMD        /035C       \Q - D\
12400     AMQ        /041C       \A - Q\
12500     AMB        /043C       \A - B\
12600     DMA        /053C       \D - A\
12700     DMQ        /055C       \D - Q\  ;
12800
12900
13000
13100
13200     ARGDEF     FDFLD       (0/2)
13300
13400     QR         /0C
13500     FR         /1C
13600     SRQF       /2C
13700     SLQF       /3C     ;
13800
13900
14000
14100
14200          \ TEST FUNCTIONS \
14300
14400     ARGDEF     TSTFLD      (8/4)
14500
14600          \ BRANCH AND/OR EXECUTE NEXT IF... \
14700
14800     TRDY       /00C        \NEXT TRX BIT NOT READY\
14900     TCRI       /01C        \NO TRX CRI PENDING\
15000     TFMOR      /02C        \TRX FIFO MEMORY OUTPUT NOT READY\
15100     TFMNE      /03C        \TRX FIFO MEMORY EMPTY\
15200     TALUB0     /04C        \TRX ALU BIT 0 =0\
15300     ALUNEZ     /06C        \TRX ALU OUTPUT NOT =0\
15400     ALUEZ      /07C        \TRX ALU OUTPUT =0\     ;
15500
15600
15700
15800
15900          \ SUBCOMMANDS \
16000
16100     ARGDEF     SCFLD       (13/3)
16200
16300     RSTRDY     /0          \RESET TRX BIT READY FF\
16400     WRTBB      /1          \WRITE TRX BIT BUFFER\
16500     STUNDRN    /2          \SET TRANSMIT UNDERRUN\
16600     STCRI      /3          \SET TRX CRI FF\
16700     SRCRSYN    /4          \SET RECEIVE RESYNC FF\
16800     RSTFMCI    /5          \RESET TRX FIFO MEMORY CONTROL BUFFER\
16900     RSTFMOR    /6          \RESET TRX FIFO MEMORY OUTPUT READY\
17000     PSTCRCR    /7          \PRESET TRX CRC REGISTER\   ;
17100
17200
17300
17400
17500          \ EXTERNAL REGISTER SELECTION CONTROL \
17600
17700     ARGDEF     XRFLD       (12/4)
17800
17900     TXCW       /3H         \TRX EXTENDED CONTROL WORD\
18000     TCWL       /5H         \TRX CONTROL WORD LEFT HALF\
18100     TCWR       /DH         \TRX CONTROL WORD RIGHT HALF\
18200     TDL        /6H         \TRX DATA LEFT HALF\
18300     TDR        /EH         \TRX DATA RIGHT HALF\    ;
18400
18500
18600
18700
18800     DICTIONARY;
18900
19000     MICRO RWP   (KFLD,FAFLD,FBFLD,OPFLD,FDFLD)
```

```
19100                  (WTFLD/0);
19200     MICRO TAMN   (KFLD,FAFLD,TSTFLD,OPFLD,FDFLD)
19300                  (WTFLD/1);
19400     MICRO SC     (KFLD,SCFLD,FBFLD,OPFLD,FDFLD)
19500                  (WTFLD/2,ISCFLD/0);
19600     MICRO BR     (BRADDR)
19700                  (WTFLD/3,ISCFLD/1,IFWFLD/0);
19800     MICRO BRSC   (BRADDR,SCFLD)
19900                  (WTFLD/3,ISCFLD/0,IFWFLD/0);
20000     MICRO UDSCR  (KFLD,FAFLD,FBFLD,OPFLD,FDFLD)
20100                  (WTFLD/4);
20200     MICRO RCRCR  (KFLD,FAFLD,FBFLD,OPFLD,FDFLD)
20300                  (WTFLD/5);
20400     MICRO UCRCR  (KFLD,FAFLD,FBFLD,OPFLD,FDFLD)
20500                  (WTFLD/6);
20600     MICRO RER    (XRFLD,FBFLD,OPFLD,FDFLD)
20700                  (WTFLD/7,KFLD/F#);
20800     MICRO ZERO   (ALLBITS/000000#);
20900
21000
21100  SKIP HOF;
21200        MICROPROGRAM;
21300
21400        ZEROS;
21500
21600
21700          \**************************************\
21800          \**                                  **\
21900          \**  TRANSMIT INITIALIZATION CONTROL ROUTINE  **\
22000          \**                                  **\
22100          \**************************************\
22200
22300  $INIT000  (000#)                                                   000  0018 60
22400            BR    ($INIT001)           \BR TO ADDRESS 1\;
22500  $INIT001  MMP   (0#,A0,B0,D,QR)      \DISPLAY ENGR REV LSB'S\;     001  0700 00
22600    $       MMP   (0#,A0,B0,D,QR)      \DISPLAY ENGR REV MSB'S\;     002  0700 00
22700  $INIT002  MMP   (1#,A0,B3,D,FR)      \GEN FIRMWARE REV LSB'S\;     003  4730 01
22800    $       MMP   (0#,A0,B4,D,FR)      \GEN FIRMWARE REV MSB'S\;     004  4740 00
22900            \(NOTE.  CURRENT F/R REV IS 1 (000,00001).)\
23000    $       SC    (0,STCRI,B0,Q,QR)    \SET TCRI\;                   005  0203 40
23100  $INIT003  UDSCR (0,A0,B0,Q,QR)       \UPDATE DATA SET CNTRL REG\;  006  0200 80
23200    $       TAMN  (0,A0,TCRI,Q,QR)     \TEST TCRI\;                  007  0210 20
23300    $       BR    ($INIT004)           \CONTINUE WHEN TCRI RESET\;   008  00A8 60
23400    $       BR    ($INIT003)           \BR TO *-3 IF SET\;           009  0068 60
23500
23600            \FIRST CRI HAS BEEN ANSWERED\
23700  $INIT004  UDSCR (0,A0,B0,Q,QR)       \UPDATE DATA SET CNTRL REG\;  00A  0200 80
23800    $       TAMN  (0,A0,TFMOR,Q,QR)    \TEST FIFO READY\;            00B  0220 20
23900    $       BR    ($INIT004)           \BR TO *-2 IF NOT SET\;       00C  00A8 60
24000
24100            \FIFO OUTPUT IS READY  (TFMOR IS SET)\
24200    $       RER   (TCWL,B0,D,FR)       \READ TCWB.LH TO TFR2\;       00D  47D5 EF
24300    $       RER   (TCWR,B0,D,FR)       \READ TCWB.RH TO F0\;         00E  47D0 EF
24400    $       TAMN  (1#,A0,ALUEZ,DANDA,QR) \EXTRACT AND TEST BIT 7\;   00F  2570 21
24500    $       BR    ($INIT200)           \BI =0 (NO F/W RPRT)\;        010  0228 60
24600
24700
24800            \FIRMWARE REVISION REPORT REQUESTED  (TCWB BIT 7 =1)\
24900
25000            \TEST FIRMWARE REVISION LEVEL COUNTER\
25100  $INIT010  TAMN  (0,A3,ALUEZ,A,QR)    \TEST F/W REV CNTR RIGHT =0\; 011  0473 20
25200    $       BR    ($INIT015)           \BR IF =0\;                   012  0148 60
25300    $       BRSC  ($INIT020,STUNDRN)   \SET TUNDRN, BR IF >0\;       013  0172 60
25400  $INIT015  TAMN  (0,A4,ALUEZ,A,QR)    \TST F/W REV CNTR MSB =0\;    014  0474 20
25500    $       BR    ($INIT080)           \BR IF =0\;                   015  0218 60
25600    $       BRSC  ($INIT020,STUNDRN)   \SET TUNDRN, BR IF >0\;       016  0172 60
25700
25800            \FIRMWARE REVISION COUNTER NOT =0\
25900  $INIT020  SC    (0,STCRI,B0,Q,QR)    \SET TCRI\;                   017  0203 40
26000    $       MMP   (0,A3,93,B#1,FR)     \DECREMENT REV CNTR RIGHT\;   018  4B33 00
26100    $       TAMN  (F#,A3,ALUEZ,DMA,QR) \TEST REV CNTR RIGHT =F#\;    019  1573 3F
26200    $       BR    ($INIT024)           \BR IF =F#\;                  01A  01C8 60
26300    $       BR    ($INIT025)           \BR IF <F#\;                  01B  01D8 60
26400  $INIT024  MMP   (0,A4,B4,B#1,FR)     \DECREMENT REV CNTR LEFT\;    01C  4044 00
26500  $INIT025  UDSCR (0,A0,B0,Q,QR)       \UPDATE DATA SET CNTRL REG\;  01D  0200 80
26600    $       TAMN  (0,A0,TCRI,Q,QR)     \TEST CRI\;                   01E  0210 20
26700    ?       ??    (?INIT010)           \? ? ? ? ? ?? ?????\;         01F  01?? 60
26800    $       BR    ($INIT025)           \BR TO *-3 IF SET\;           020  01D8 60
26900
27000            \FIRMWARE REVISION COUNTER =0\
27100  $INIT080  SC    (0,STCRI,B0,Q,QR)    \SET TCRI\;                   021  0203 40
27200
27300
27400            \INITIALIZATION CONTINUED\
27500  $INIT200  SC    (0,RSTFMCB,90,Q,QR)  \RESET TFMCB AND TFMNE\;      022  0205 40
27600    $       SC    (0,RSTFMOR,80,Q,QR)  \RESET TFMOR\;                023  0206 40
27700    $       MMP   (F#,AF,BF,D,FR)      \ABORT TO TSR.LH\;            024  47FF 0F
27800    $       MMP   (F#,AE,BE,D,FR)      \ABORT TO TSR.RH\;            025  47EE 0F
27900    $       MMP   (0#,AC,BC,D,FR)      \SET TFF0,TFF1,TEOFFLG,       026  47CC 00
28000                                        TSOFFLG =0,0,0,0\;
28100    $       SC    (0#,RSTRDY,B8,D,FR)  \SET TISC =0, RESET READY\;   027  47B0 40
28200    $       MMP   (8,A5,B5,D,FR)       \SET TBSC =8\;                028  4755 08
28300    $       MMP   (0#,A4,B4,D,FR)      \SET TSRCSTATE =IDLE\;        029  4744 00
28400    $       MMP   (0#,A3,B3,D,FR)      \SET TFRCSTATE =OFF.          02A  4733 00
28500                                        SET TFRCFLG =0\;
```

```
28600  $        BR       (STEXEC00)              \DONE\;                              028  02C8 60
28700
28800
28900  SKIP HOF;
29000
29100
29200           \***************************\
29300           \**                       **\
29400           \**  TRANSMIT EXECUTIVE   **\
29500           \**                       **\
29600           \***************************\
29700
29800
29900  STEXEC00  TAMN    (0,A0,TRDY,0,QR)         \TEST TREADY\;                      02C  0200 20
30000  $         BR      (STEXEC05)               \CONTINUE IF RESET\;                02D  02F8 60
30100
30200           \NEXT BIT READY (TREADY SET)\
30300  $         +RSC    (STSRC000,RSTRDY)        \RESET TREADY. GO TO TSRC\;         02E  0390 60
30400
30500           \NEXT BIT NOT READY (TREADY RESET)\
30600  STEXEC05  TAMN    (0,A4,ALUNEZ,A,QR)       \TEST TSRCSTATE =IDLE\;             02F  0464 20
30700  $         BR      (STEXEC20)               \BI NOT =IDLE\;                     030  0368 60
30800
30900           \TSRCSTATE =IDLE\
31000  $         TAMN    (2#,AC,ALUNEZ,DANDA,QR)  \TEST TEOFFLG\;                     031  256C 22
31100  $         BR      (STEXEC20)               \BI =1\;                            032  0368 60
31200
31300           \TEOFFLG =0\
31400  $         TAMN    (4#,A3,ALUNEZ,DANDA,QR)  \TEST TFRCSTATE BIT 0\;             033  2563 24
31500  $         BR      (STEXEC20)               \BI =1 . (TFRCSTATE                 034  0368 60
31600                                              =EOF WAIT OR =RPRT UHDRN\;
31700
31800           \TSRCSTATE =IDLE, TEOFFLG =0, AND
31900           TFRCSTATE =OFF OR =NORMAL EOF\
32000  $         UDSCR   (0,A0,B0,0,QR)           \UPDATE DATA SET CNTRL REG\;        035  0200 80
32100
32200           \(TEST TFRCSTATE)\
32300  STEXEC20  TAMN    (7#,A3,ALUEZ,DANDA,QR)   \TEST TFRCSTATE =OFF\;              036  2573 27
32400  $         BR      (STEXEC00)               \DONE IF =OFF\;                     037  02C8 60
32500
32600           \TFRCSTATE NOT =OFF\
32700  $         BR      (STFRC000)               \GO TO TFRC\;                       038  1E68 60
32800
32900
33000  SKIP HOF;
33100
33200
33300           \*****************************************\
33400           \**                                     **\
33500           \**  TRANSMIT SHIFT REGISTER CONTROL ROUTINE  **\
33600           \**                                     **\
33700           \*****************************************\
33800
33900
34000
34100           \******  INITIAL PROCESSING  ******\
34200
34300
34400  STSRC000  TAMN    (0,A4,ALUEZ,A,QR)        \TST TSRCSTATE =IDLE\;              039  0474 20
34500  $         BR      (SIDLE000)               \BI =IDLE\;                         03A  0938 60
34600
34700
34800           \ NOT IDLE STATE - PRELIMINARY PROCESSING CONTINUED \
34900
35000  $         TAMN    (5,A6,ALUEZ,DMA,QR)      \TST TSC =5\;                       03B  1576 35
35100  $         BR      (STSRC060)               \BI =5\;                            03C  043B 60
35200
35300
35400           \ TSC DOES NOT EQUAL FIVE AT ENTRY \
35500
35600  $         SC      (0,WRT0B,BE,B,QR)        \WRITE BIT BUFFER\;                 03D  03E1 40
35700  $         MMP     (0,A5,B5,BM1,FR)         \DECREMENT TOSC\;                   03E  4B55 00
35800           \ UPDATE TSC \
35900  $         TAMN    (1,AE,ALUEZ,DANDA,QR)    \EXTRACT TSR07, TEST\;              03F  257E 21
36000  $         BR      (STSRC030)               \BI =0\;                            040  0438 60
36100  $         MMP     (0,A6,U6,AP1,FR)         \INCREMENT TSC\;                    041  4466 10
36200  $         BR      (STSRC040)               \BR TO CONTINUE\;                   042  0448 60
36300
36400  STSRC030  MMP     (0,A6,B6,D,FR)           \TSR07 =0. SET TSC =0\;             043  4766 00
36500  STSRC040  TAMN    (C#,A4,ALUNEZ,DMA,QR)    \TST TSRCSTATE =FCS-2\;             044  1564 3C
36600  $         UCRCR   (0,A0,B0,0,QR)           \UPDATE CRC REG IF NOT\;            045  0200 C0
36700           \ TEST UPDATED TSC \
36800  $         TAMN    (5,A6,ALUEZ,DMA,QR)      \TST UPDATED TSC =5\;               046  1576 35
36900  $         BR      (STEXEC00)               \DONE IF TSC =5\;                   047  02C8 60
37000  $         BR      (STSRC070)               \TSC N=5. BR TO CONT\;              048  04B8 60
37100
37200
37300           \ TSC EQUALS FIVE AT ENTRY \
37400  STSRC060  SC      (0,WRT9B,B0,ALUZ,QR)     \WRITE ZERO TO BIT BFR\;            049  2201 40
37500  $         MMP     (0,A6,B6,D,FR)           \SET TSC =0\;                       04A  4766 00
37600
37700
37800           \ TEST FOR BYTE BOUNDARY \
37900  STSRC070  TAMN    (0,A5,ALUEZ,A,QR)        \TST TBSC =0\;                      04B  0475 20
38000  $         BR      (STSRC200)               \BI =0(BYTE BNDRY)\;                04C  0518 60
```

```
38100
38200
38300            \3.1 NOT BYTE BOUNDARY  3.1\
38400
38500   $   MMP     (0,AF,3F,A,QR)                  \TSR.LH TO 29\;           04D   04FF 00
38700   $   MMP     (0,AF,3F,0,FR)                  \RESTORE TSR.LH\;         04F   42FF 00
38800   $   BR      ($TEXEC00)                      \DONE\;                   050   02C8 60
38900
39000
39100            \3.2 BYTE BOUNDARY  3.2\
39200
39300  $TSRC200  TAMN  (1#,A9,ALUNEZ,DANDA,QR)     \TEST TEOFS =1\;          051   2569 21
39400   $   BR      ($EOFP000)                      \BI =1 (END OF FRAME)\;   052   1C88 60
39500
39600            \NOT END OF FRAME  (TEOFS =0)\
39700
39800   $   TAMN    (0,A9,TFMOR,0,QR)               \TST NEXT BYTE READY\;    053   0220 20
39900   $   BR      ($TSRC400)                      \BI NOT READY\;           054   0888 60
40000
40100
40200            \4.1 NEXT DATA BYTE READY  4.1\
40300
40400   $   RER     (TCWL,B9,0,FR)                  \READ TCWB.LH TO TCWJS.LH\;   055   4795 EF
40500   $   RER     (TCWR,B8,0,FR)                  \READ TCWB.RH TO TCWJS.RH\;   056   478D EF
40600   $   RER     (TDL,BF,0,FR)                   \READ TDB.LH TO TSR.LH\;  057   47F6 EF
40700   $   RER     (TDR,BE,0,FR)                   \READ TDB.RH TO TSR.RH\;  058   47EE EF
40800   $   SC      (0,RSTFMOR,B0,0,QR)             \RESET TFMOR\;            059   0206 40
40900   $   TAMN    (1#,A9,ALUEZ,DANDA,QR)          \EXTRACT AND TEST TEOFS\; 05A   2579 21
41000   $   BR      ($TSRC301)                      \BI =0 (NOT EOF)\;        05B   0848 60
41100            \TEOFS =1\
41200   $   TAMN    (8#,AD,ALUEZ,DANDA,QR)          \TEST TMMS\;              05C   257D 28
41300   $   BR      ($TSRC210)                      \BI =0 (MLCP MODE)\;      05D   0608 60
41400            \HMLC MODE  (TMMS =1)\
41500   $   TAMN    (2#,A9,ALUNEZ,DANDA,QR)         \TEST TTCBS\;             05E   2569 22
41600   $   BR      ($TSRC300)                      \BI =1\;                  05F   0838 60
41700            \LAST BYTE\
41800  $TSRC210  TAMN  (8#,A9,ALUNEZ,DANDA,QR)     \EXTRACT AND TEST TAS\;   060   2569 28
41900   $   BR      ($TSRC250)                      \BI =1 (ABORTED FRAME)\;  061   0718 60
42000            \NOT AN ABORTED FRAME  (TAS =0)\
42100   $   TAMN    (1#,A8,ALUNEZ,DANDA,QR)         \TEST TPLBS\;             062   2568 21
42200   $   BR      ($TSRC260)                      \BI =1 (LAST BYTE PARTIAL)\;  063   0788 60
42300
42400
42500            \NOT END OF FRAME, OR IF EOF NO ABORT OR PARTIAL BYTE\
42600            \(BRANCH PER TSRCSTATE TO CONTINUE)\
42700  $TSRC240  TAMN  (6,A4,ALUEZ,DMA,QR)         \TSRCSTATE =TEXT\;        064   1574 36
42800   $   BR      ($TEXT000)                      \BI =TEXT\;               065   1328 60
42900   $   TAMN    (2,A4,ALUEZ,DMA,QR)             \TST TSRCSTATE =CNTRL\;   066   1574 32
43000   $   BR      ($CNTR000)                      \BI =CNTRL\;              067   0F68 60
43100   $   TAMN    (3,A4,ALUEZ,DMA,QR)             \TST TSRCSTATE =CNTRLX\;  068   1574 33
43200   $   BR      ($CNTX000)                      \BI =CNTRLX\;             069   1158 60
43300   $   TAMN    (4,A4,ALUEZ,DMA,QR)             \TST TSPCSTATE =TCB\;     06A   1574 34
43400   $   BR      ($TCB0000)                      \BI =TCB\;                06B   1178 60
43500   $   TAMN    (5,A4,ALUEZ,DMA,QR)             \TST TSRCSTATE =LCF\;     06C   1574 35
43600   $   BR      ($LCF0000)                      \BI =LCF\;                06D   12C8 60
43700   $   TAMN    (1,A4,ALUEZ,DMA,QR)             \TST TSRCSTATE =ADRSX\;   06E   1574 31
43800   $   BR      ($ADRSX00)                      \BI =ADRSX\;              06F   0F08 60
43900  $TSRCXXX  BR  ($TSRCXXX)                    \ERROR HALT\;             070   0708 60
44000
44100            \ABORTED FRAME  (TEOFS =1, TAS =1)\
44200  $TSRC250  MMP  (8,A5,B5,0,FR)               \SET TBSC =4\;            071   4795 08
44300   $   MMP     (F#,AF,BF,0,FR)                 \HALF ABORT TO TSR.LH\;   072   47FF 0F
44400   $   MMP     (F#,AE,BE,0,FR)                 \HALF ABORT TO TSR.RH\;   073   47EE 0F
44500   $   MMP     (2#,AC,BC,0,FR)                 \SET TFF0,TFF1,TEOFFLG,   074   47CC 02
44600                                                TSOFFLG =0,0,1,0\;
44700   $   MMP     (4,AB,BB,0,FR)                  \SET TISC =4\;            075   47BB 04
44800   $   MMP     (0#,A4,B4,0,FR)                 \SET TSRCSTATE =IDLE\;    076   4744 00
44900   $   MMP     (1#,A3,B3,0,FR)                 \SET TFRCSTATE =NORMAL EOF,  077   4733 01
45000                                                SET TFRCFLG =0\;
45100   $   TAMN    (4#,A7,ALUEZ,DANDA,QR)          \TEST TRRS =0\;           078   2579 24
45200   $   BR      ($TEXEC00)                      \DONE IF =0 (NO RC RESYNC)\;  079   02C8 60
45300            \RESYNC RECEIVER  (TRRS =1)\;
45400   $   BRSC    ($TEXEC00,SRCRSYN)              \SET RC RESYNC. DONE\;    07A   02C4 60
45500
45600            \LAST BYTE, NO ABORT, AND LAST BYTE PARTIAL
45700             (TEOFS =1, TAS =0, TPLBS =1)\
45800  $TSRC260  TAMN  (6#,A4,ALUNEZ,DMA,QR)       \TEST TSRCSTATE =TEXT\;   07B   1564 36
45900   $   BR      ($TSRC265)                      \BI NOT =TEXT\;           07C   0808 60
46000            \TSRCSTATE =TEXT\
46100   $   MMP     (C#,AC,B0,DANDA,FR)             \EXTRACT TFF TO F0\;      07D   650C 0C
46200   $   TAMN    (C#,A0,ALUEZ,DMA,QR)            \TEST TFF =11\;           07E   1570 3C
46300   $   BR      ($TEXT400)                      \GO TO TEXT CODING IF =11    07F   1488 60
46400                                                (BIT STREAM MODE)\;
46500
46600            \TSRCSTATE NOT =TEXT, OR NOT BIT STREAM MODE\
46700  $TSRC265  TAMN  (8#,AD,ALUEZ,DANDA,QR)      \TEST TMMS\;              080   2570 28
46800   $   BR      ($DTBSH00)                      \GO TO DTBSH SUBR IF =0   081   17A8 60
46900                                                (MLCP MODE)\;
47000   $   BR      ($DTBSD00)                      \GO TO DTBSD SUBR IF =1   082   1AB8 60
47100                                                (HMLC MODE)\;
47200
47300
47400            \NOT LAST BYTE\
47500  $TSRC300  MMP  (C#,A9,B9,DANDA,FR)          \SET TTCBS,TEOFS =0,0\;   083   6599 0C
47600  $TSRC301  TAMN (0,AD,TCR1,0,QR)             \TEST TCR1\;              084   0210 20
47700   $   BR      ($TSRC305)                      \BI RESET\;               085   0878 60
```

```
47800
47900              \TCRI SET\
48000      $     BR      ($TSRC240)           \GO TO CONT PER TSRCSTATE\;      086  0648 60
48100
48200              \TCRI RESET\
48300  STSRC305   RER     (TXCW,B1,0,FR)       \READ TXCW TO F1\;               087  4713 EF
48400      $     TAMN    (4#,A1,ALUNEZ,DANDA,QR) \TEST TSDMIC\;                 088  2561 24
48500      $     BRSC    (STSRC240,STCRI)     \SET TCRI,  BI =1\;               089  0643 60
48600      $     BR      (STSRC240)           \BI =0\;                         08A  0648 60
48700
48800           \4.2  NEXT DATA BYTE NOT READY  (UNDERRUN)  4.2\
48900
49000  STSRC400   MMP    (4#,A3,B3,0,FR)      \SET TFRCSTATE =EOF WAIT,        08B  4733 04
49100                                          SET TFRCFLG =0\;
49200      $     MMP    (F#,AF,BF,0,FR)       \HALF ABORT TO TSR.LH\;          08C  47FF 0F
49300      $     MMP    (F#,AE,BE,0,FR)       \HALF ABORT TO TSR.RH\;          08D  47EE 0F
49400      $     MMP    (8,A5,B5,0,FR)        \SET TBSC =8\;                   08E  4755 08
49500      $     MMP    (4,AB,BB,0,FR)        \SET TISC =4\;                   08F  47BB 04
49600      $     MMP    (2#,AC,BC,0,FR)       \SET TFF0,TFF1,TEOFFLG,          090  47CC 02
49700
49800
49900      $     BR      (STEXEC00)           \DONE\;                          092  02C8 60
50000
50100
50200
50300
50400
50500
50600             \******  IDLE STATE  ******\
50700
50800  SIDLE000   SC     (0,WRIBB,BE,0,QR)    \WRITE BIT BUFFER\;              093  05E1 40
50900      $     MMP    (0,A5,B5,BM1,FR)      \DECREMENT TBSC\;                094  4855 00
51000      $     TAMN   (0,A5,ALUEZ,A,QR)     \TST TBSC =0\;                   095  0475 20
51100      $     BR     (SIDLE020)            \BI =0(BYTE BNDRY)\;             096  0VE8 60
51200
51300
51400             \ NOT BYTE BOUNDARY \
51500
51600      $     MMP    (0,AF,BF,A,QR)        \TSR.LH TO QR\;                  097  04FF 00
51700      $     MMP    (0,AE,BE,A,SRQF)      \SHIFT TSR\;                     098  84EE 00
51800      $     MMP    (0,AF,BF,Q,FR)        \RESTORE TSR.LH\;                099  42FF 00
51900      $     TAMN   (4,A5,ALUNEZ,DMA,QR)  \TST TBSC =4\;                   09A  1565 34
52000      $     BR     (STEXEC00)            \DONE IF NOT =4\;                09B  02C8 60
52100             \TBSC =4\
52200      $     MMP    (8#,A3,B3,DORA,FR)    \SET TFRCFLG =1\;                09C  5D33 08
52300      $     BR     (STEXEC00)            \DONE\;                          09D  02C8 60
52400
52500
52600             \ BYTE BOUNDARY \
52700
52800  SIDLE020   MMP    (8,A5,B5,0,FR)       \SET TBSC =8\;                   09E  4755 08
52900      $     TAMN   (0,AB,ALUEZ,A,QR)     \TST TISC =0\;                   09F  0478 20
53000      $     BR     (SIDLE030)            \BI =0\;                         0A0  0A3B 60
53100             \TISC NOT=0\
53200      $     MMP    (0,AB,BB,BM1,FR)      \DECREMENT TISC\;                0A1  48BB 00
53300      $     BR     (SIDLE600)            \BR TO CONTINUE\;                0A2  0E58 60
53400             \TISC =0\
53500  SIDLE030   MMP    (0#,AC,BC,DANDA,FR)  \SET TEOFFLG =0\;                0A3  65CC 0D
53600      $     TAMN   (7#,A3,ALUNEZ,DANDA,QR) \TST TFRCSTATE =OFF\;          0A4  2563 27
53700      $     BR     (SIDLE600)            \BI NOT =OFF\;                   0A5  0E58 60
53800             \TFRCSTATE =OFF\
53900      $     TAMN   (0,A0,TFMOR,Q,QR)     \TST FIFO READY\;                0A6  0220 20
54000      $     BR     (SIDLE400)            \BI FIFO NOT READY\;             0A7  0D08 60
54100             \FIFO OUTPUT READY\
54200      $     RER    (TCWL,B1,0,FR)        \READ TCWB.LH TO F1\;            0A8  4715 EF
54300      $     TAMN   (1#,A1,ALUEZ,DANDA,QR) \EXTRACT AND TEST TEOF\;        0A9  2571 21
54400      $     BR     (SIDLE040)            \BI =0\;                         0AA  0B28 60
54500             \TEOF =1\
54600      $     TAMN   (8#,AD,ALUEZ,DANDA,QR) \TEST TMMS\;                    0AB  257D 29
54700      $     BR     (SIDLE035)            \BI =0 (MLCP MODE)\;             0AC  0AF8 60
54800             \HMLC MODE  (TMMS =1)\
54900      $     TAMN   (2#,A1,ALUNEZ,DANDA,QR) \TEST TTCB\;                   0AD  2561 22
55000      $     BR     (SIDLE500)            \BI =1\;                         0AE  0DA8 60
55100             \STILL BETWEEN FRAMES\
55200  SIDLE035   MMP    (E#,A1,BB,DANDA,FR)  \EXTRACT IDLE COUNT TO TISC\;    0AF  65B1 0E
55300      $     MMP    (8#,AC,BC,DORA,FR)    \SET TEFO =1\;                   0B0  5DCC 0A
55400      $     BRSC   (SIDLE510,OSTEMQP)    \RST FIFO OUTPUT RDY, DA\;       0B1  0E74 50
55500             \TEOF =0\
55600  SIDLE040   RER    (TXCW,B0,0,FR)       \READ TXCW TO F0\;               0B2  4703 EF
55700      $     TAMN   (2#,A0,ALUNEZ,DANDA,QR) \EXTRACT AND TEST TBFM\;       0B3  2560 22
55800      $     BR     (SIDLE050)            \BI =1 (START OF FRAME           0B4  0B78 60
55900                                          BEING DELAYED)\;
56000             \START OF FRAME NOT BEING DELAYED (TBFM =0)\
56100      $     TAMN   (1#,AC,ALUNEZ,DANDA,QR) \TEST TSOFFLG\;                0B5  256C 21
56200      $     BR     (SIDLE205)            \BI =1 (STARTING FLAG SENT)\;    0B6  0BB8 60
56300
56400             \ READY TO START FRAME \
56500
56600             \START OF FRAME BEING DELAYED (TBFM =1), OR
56700              STARTING FLAG NOT SENT (TSOFFLG =0)\
56800
56900  SIDLE050   MMP    (7,AF,BF,0,FR)       \HALF FLAG TO TSR.LH\;           0B7  47FF 07
57000      $     MMP    (E#,AE,BE,0,FR)       \HALF FLAG TO TSR.RH\;           0B8  47EE 0E
57100      $     MMP    (1#,AC,BC,DORA,FR)    \SET TSOFFLG =1\;                0B9  5DCC 01
57200      $     BR     (STEXEC00)            \DONE\;                          0BA  02C8 60
57300
57400
```

```
57500              \START OF FRAME NOT BEING (FURTHER) DELAYED (TBFM =0), AND
57600               STARTING FLAG HAS BEEN SENT (TSOFFLG =1)\
57700                                                                                       088  2570 28
57800    $IDLE205  TAMN    (8#,A0,ALUEZ,DANDA,QR)   \TEST TMMS\;                             08C  0CD8 60
57900    $         BR      ($IDLE210)               \BI =0 (MLCP MODE)\;
58000              \HMLC MODE  (TMMS =1)\                                                    08D  0210 20
58100    $         TAMN    (0,A0,TCRI,Q,QR)         \TEST TCRI\;                             08E  0C08 60
58200    $         BN      ($IDLE210)               \BI RESET\;                              08F  0078 60
58300    $         BR      ($IDLE050)               \BI SET\;
58400    $IDLE210  RER     (TCWL,B9,D,FR)           \READ TCWB.LH TO TCWBS.LH\;              0C0  4795 EF
58500    $IDLE215  RER     (TDL,AF,D,FR)            \LEFT HALF DATA TO TSR.LH\;              0C1  47F6 EF
58600    $         RER     (TDR,BE,D,FR)            \RIGHT HALF DATA TO TSR.RH\;             0C2  47EE EF
58700    $         RER     (TCWR,B8,D,FR)           \READ TCWB.RH TO TCWBS.RH\;              0C3  47B0 EF
58800    $         SC      (0#,RSTFMOR,BC,D,FR)     \RESET TFMOR.                            0C4  47C6 40
58900                                                SET TFF0,TFF1,TEOFFLG,
59000                                                TSOFFLG =0,0,0,0\;
59100    $         RER     (TXCW,B0,D,FR)           \READ TXCW TO F0\;                       0C5  4703 EF
59200    $         TAMN    (4#,A0,ALUNEZ,DANDA,QR)  \TEST TSDMIC\;                           0C6  2560 24
59300    $         SC      (0,STCRI,B0,Q,QR)        \SET TCRI IF =1\;                        0C7  0203 40
59400    $         SC      (0,PSTCRCR,86,D,FR)      \SET CRC REG TO ALL ONES.                0C8  4767 40
59500                                                SET TSC =0\;
59600    $         TAMN    (4#,A2,ALUNEZ,DANDA,QR)  \EXTRACT TAFXS,TST\;                     0C9  2569 24
59700    $         TAMN    (1,AE,ALUNEZ,DANDA,QR)   \AFXST. XTRACT TSR07,TST\;               0CA  256E 21
59800    $         BR      ($IDLE240)               \BI TAFXS RST OR TSR07 =1\;              0CB  0CEB 60
59900              \ ADRS EXT FORMAT AND MORE ADRS BYTES TO FOLLOW  \
60000    $         MMP     (1,A4,B4,D,FR)           \SET TSRCSTATE =ADRSX\;                  0CC  4744 01
60100    $         BR      ($TEXEC00)               \DONE\;                                  0CD  02C8 60
60200              \ NOT ADRS EXT FORMAT OR NO MORE ADRS BYTES TO FOLLOW \
60300    $IDLE240  MMP     (2,A4,B4,D,FR)           \SET TSRCSTATE =CNTRL\;                  0CE  4744 02
60400    $         BR      ($TEXEC00)               \DONE\;                                  0CF  02C8 60
60500
60600
60700              \ NOT READY TO START NEW FRAME  \
60800              \FIFO OUTPUT NOT READY\                                                   0D0  0210 20
60900    $IDLE400  TAMN    (0,A0,TCRI,Q,QR)         \TST TCRI SET\;
61000    $         BR      ($IDLE420)               \BI TCRI NOT SET\;
61100    $         BR      ($IDLE610)               \BI CRI SET\;                            0D2  0E78 60
61200
61300              \TCRI NOT SET\
61400    $IDLE420  TAMN    (9#,AC,ALUEZ,DANDA,QR)   \EXTRACT AND TEST FFF0\;                 0D3  257C 28
61500    $         BR      ($IDLE450)               \BI =0\;                                 0D4  0D78 60
61600              \FFF0 =1\
61700              \(CAUSE TCRI TO SET)\
61800    $         MMP     (7#,AC,BC,DANDA,FR)      \SET TFF0 =0\;                           0D5  65CC 07
61900    $         BRSC    ($IDLE610,RSTFMCB)       \RESET TFMC3,TFMNE. BR\;                 0D6  0E75 60
62000              \FFF0 =0\
62100    $IDLE450  TAMN    (0,A0,TFMNE,Q,QR)        \TST FIFO EMPTY\;                        0D7  0230 20
62200    $         BRSC    ($IDLE610,RSTFMCB)       \RST TFMCN,BR IF FIFO MT\;               0D8  0E75 60
62300    $         BN      ($IDLE610)               \BI FIFO NOT EMPTY\;                    0D9  0E78 60
62400
62500
62600              \HSLC SLOW-DOWN MODE\
62700              \(FIRST BYTE IN FIFO  (TEOF =1, TTCB =1))\
62800    $IDLE500  TAMN    (0,A0,TCRI,Q,QR)         \TEST TCRI\;                             0DA  0210 20
62900    $         BR      ($IDLE505)               \BI RESET\;                              0DB  0DD8 60
63000
63100              \TCRI SET\
63200    $         BR      ($IDLE050)               \GO TO LOAD FLAG\;                       0DC  0D78 60
63300
63400              \TCRI RESET\
63500    $IDLE505  RER     (TXCW,B1,D,FR)           \READ TXCW TO F1\;                       0DD  4713 EF
63600    $         TAMN    (2#,A1,ALUNEZ,DANDA,QR)  \TEST TBFM\;                             0DE  2561 22
63700    $         BRSC    ($IDLE050,STCRI)         \SET TCRI, GO TO LOAD FLAG               0DF  0D73 60
63800                                                IF BUFFER FILL MODE
63900                                                (TBFM =1)\;
64000              \NOT IN BUFFER FILL MODE (TBFM =0)\
64100    $IDLE520  TAMN    (1#,AC,ALUEZ,DANDA,QR)   \TEST TSOFFLG\;                          0E0  257C 21
64200    $         BR      ($IDLE050)               \BI =0 (STARTING                         0E1  0D78 60
64300                                                FLAG NOT YET SENT)\;
64400              \STARTING FLAG HAS BEEN SENT  (TSOFFLG =1)\
64500    $         RER     (TCWL,B9,D,FR)           \READ TCWB.LH TO TCWBS.LH\;              0E2  4795 EF
64600    $         MMP     (C#,A9,B9,DANDA,FR)      \SET TTCBS,TEOFS =0,0\;                  0E3  6599 0C
64700    $         BR      ($IDLE215)               \CONTINUE ABOVE\;                        0E4  0C18 60
64800
64900
65000              \ LOAD NEXT INTERFRAME FILL CHARACTER  \
65100
65200    $IDLE600  TAMN    (4#,A3,ALUNEZ,DANDA,QR)  \TEST TFRCSTATE BIT 0\;                  0E5  2563 24
65300    $         BR      ($IDLE630)               \BI =1 (TFRCSTATE =EOF                   0E6  0ED8 60
65400                                                WAIT, =RPRT UNDRN, OR
65500                                                =RESET UNDRN)\;
65600    $IDLE610  RER     (TXCW,B0,D,FR)           \READ TXCWB TO WORK0\;                   0E7  4703 EF
65700    $         TAMN    (1#,A0,ALUNEZ,DANDA,QR)  \EXTRACT TIFM, TEST\;                    0E8  2560 21
65800    $         BR      ($IDLE630)               \BI =1\;                                 0E9  0ED8 60
65900              \ ABORT FILL MODE (TIFM =0)  \
66000    $IDLE620  MMP     (F#,AF,BF,D,FR)          \HALF ABORT TO TSR.LH\;                  0EA  47FF 0F
66100    $         MMP     (F#,AE,BE,D,FR)          \HALF ABORT TO TSR.RH\;                  0EB  47EE 0F
66200    $         BR      ($TFXEC00)               \DONE\;                                  0EC  02C8 60
66300              \ FLAG FILL MODE (TIFM =1)  \
66400    $IDLE630  MMP     (7,AF,BF,D,FR)           \HALF FLAG TO TSR.LH\;                   0ED  47FF 07
66500    $         MMP     (E#,AE,BE,D,FR)          \HALF FLAG TO TSR.RH\;                   0EE  47EE 0E
66600    $         BR      ($TFXEC00)               \DONE\;
66700
66800
```

```
66900
67000
67100
67200        \****** ADDRESS EXTENSION STATE ******\
67300
67400        \NTH (N =2,3,....) ADDRESS FIELD OCTET IN TSR\
67500 $ADRSX00  MMP   (8,A5,B5,D,FR)      \SET TBSC =8\;          0F0  4755 08
67600   $      TAMN  (1#,AE,ALUNEZ,DANDA,QR) \EXTRACT AND TEST TSR07\; 0F1  256E 21
67700   $      BR    ($ADRSX20)          \BI =1\;                0F2  0F48 60
67800
67900        \ANOTHER ADDRESS OCTET TO FOLLOW (TSR07 =0)\
68000   $      BR    ($TEXEC00)          \DONE\;                 0F3  02C8 60
68100
68200        \LAST ADDRESS OCTET (TSR07 =1)\
68300 $ADRSX20  MMP   (2#,A4,B4,D,FR)     \SET TSRCSTATE =CNTRL\; 0F4  4744 02
68400   $      BR    ($TEXEC00)          \DONE\;                 0F5  02C8 60
68500
68600
68700
68800
68900        \****** CONTROL STATE ******\
69000
69100        \(FIRST) CONTROL FIELD OCTET IN TSR\
69200 $CNTR000  MMP   (8,A5,B5,D,FR)      \SET TBSC =8\;          0F6  4755 08
69300   $      TAMN  (1,AE,ALUEZ,DANDA,QR) \EXTRACT AND TEST TSR BIT 7\; 0F7 257F 21
69400   $      BR    ($CNTR020)          \BI TSR BIT 7 =0\;      0F8  0FC8 60
69500
69600        \NOT AN I-FORMAT FRAME (LOW-ORDER (FIRST) BIT OF
69700         (FIRST) CONTROL FIELD BYTE =1)\
69800   $      MMP   (3#,AC,BC,DANDA,FR) \SET TFF =00\;          0F9  65CC 03
69900   $      MMP   (6,A4,B4,D,FR)      \SET TSRCSTATE =TEXT\;  0FA  4744 06
70000   $      BR    ($TEXEC00)          \DONE\;                 0FB  02C8 60
70100
70200        \I-FORMAT FRAME (LOW-ORDER (FIRST) BIT OF (FIRST)
70300         CONTROL FIELD BYTE =0)\
70400 $CNTR020  TAMN  (8#,A9,ALUEZ,DANDA,QR) \EXTRACT AND TEST TCFXS\; 0FC 2579 28
70500   $      BR    ($CNTRS00)          \BI =0\;                0FD  1008 60
70600
70700        \EXTENDED CONTROL FIELD FORMAT FRAME (TCFXS =1)\
70800   $      MMP   (3#,A4,B4,D,FR)     \SET TSRCSTATE =CNTRX\; 0FE  4744 03
70900   $      BR    ($TEXEC00)          \DONE\;                 0FF  02C8 60
71000
71100        \** SHARED CODING (CNTRL AND CNTRL EXTENSION STATES) **\
71200 $CNTRS00  MMP   (E#,A8,B1,DANDA,FR) \EXTRACT TBSS TO F1\;   100  6518 0E
71300   $      TAMN  (6#,A1,ALUNEZ,DMA,QR) \TEST TBSS =011\;     101  1561 36
71400   $      BR    ($CNTRS05)          \BI NOT =011\;          102  1068 60
71500
71600        \BIT STREAM MODE (TBSS =011)\
71700   $      MMP   (C#,AC,BC,DORA,FR)  \SET TFF =11\;          103  5DCC 0C
71800   $      MMP   (6#,A4,B4,D,FR)     \SET TSRCSTATE =TEXT\;  104  4744 06
71900   $      BR    ($TEXEC00)          \DONE\;                 105  02C8 60
72000
72100        \NOT BIT STREAM MODE (TBSS NOT =011)\
72200 $CNTRS05
72300   $      BR    ($CNTRS10)          \BI =1\;                107  10C8 60
72400        \TTCBS =0\
72500   $      TAMN  (8#,AD,ALUEZ,DANDA,QR) \TEST TMMS\;         108  257D 28
72600   $      BR    ($CNTRS20)          \BI =0\;                109  10E8 60
72700        \HMLC MODE (TMMS =1)\
72800   $      TAMN  (4#,A1,ALUNEZ,DMA,QR) \TEST TBSS =010\;     10A  1561 34
72900   $      BR    ($CNTRS20)          \BI NOT =010\;          10B  10E8 60
73000
73100        \TEXT CONTROL BYTE FORMAT FRAME
73200         (TTCBS =1, OR TMMS =1 AND TBSS =010)\
73300 $CNTRS10  MMP   (4#,A4,B4,D,FR)     \SET TSRCSTATE =TCB\;   10C  4744 04
73400   $      BR    ($TEXEC00)          \DONE\;                 10D  02C8 60
73500
73600        \NOT TEXT CONTROL BYTE FORMAT FRAME\
73700 $CNTRS20  MMP   (4#,AC,BC,DORA,FR)  \SET TFF =01\;          10E  5DCC 04
73800   $      TAMN  (1#,A8,ALUEZ,DANDA,QR) \TEST TLCFS\;        10F  2573 21
73900   $      BR    ($CNTRS40)          \BI =0\;                110  1138 60
74000
74100        \LOGICAL CONTROL FIELD FORMAT FRAME (TLCFS =1)\
74200   $      MMP   (5#,A4,B4,D,FR)     \SET TSRCSTATE =LCF\;   111  4744 05
74300   $      BR    ($TEXEC00)          \DONE\;                 112  02C8 60
74400
74500        \NEITHER TEXT CONTROL BYTE FORMAT FRAME, NOR
74600         LOGICAL CONTROL FIELD FORMAT FRAME\
74700 $CNTRS40  MMP   (6#,A4,B4,D,FR)     \SET TSRCSTATE =TEXT\;  113  4744 06
74800   $      BR    ($TEXEC00)          \DONE\;                 114  02C8 60
74900
75000
75100
75200
75300        \****** CONTROL EXTENSION STATE ******\
75400
75500        \SECOND CONTROL FIELD OCTET IN TSR\
75600 $CNTX000  MMP   (8,A5,B5,D,FR)      \SET TBSC =8\;          115  4755 08
75700   $      BR    ($CNTRS00)          \GO TO SHARED CODING ABOVE\; 116 1008 60
75800
75900
76000
76100
76200        \****** TEXT CONTROL BYTE STATE ******\
76300
```

```
76400              \TEXT CONTROL BYTE (OCTET) IN TSR\
76500              \(SAVE TCB AND CHECK FOR BIT STREAM MODE)\
76600   $TCB0000   MMP   (8,A5,B5,D,FR)          \SET TBSC =8\;           117  4755 08
76700   $          MMP   (0,AE,B2,A,FR)          \COPY TSR.RH TO TCB.RH\; 118  442E 00
76800   $          MMP   (7#,A2,B0,DANDA,FR)     \EXTRACT TCB.BS FROM     119  6502 07
76900                                             TCB.RH TO WORK0\;
77000   $          TAMN  (3,A0,ALUEZ,DMA,QR)     \TEST TCB.BS =011(3)\;   11A  1570 33
77100   $          BR    ($TCB0020)              \BI =011\;               11B  11EB 60
77200
77300              \NOT BIT STREAM MODE  (TCB.BS NOT=011)\
77400   $          MMP   (8#,AC,0C,DORA,FR)      \SET TFF =10\;           11C  50CC 08
77500   $          BR    ($TCB0050)              \BR TO BELOW\;           11D  11F8 60
77600
77700              \BIT STREAM MODE  (TCB.BS =011)\
77800   $TCB0020   MMP   (8#,AC,0C,DORA,FR)      \...                      ...
77900
78000              \(DETERMINE NEXT TSRCSTATE)\
78100   $TCB0030   TAMN  (8#,AF,ALUEZ,DANDA,QR)  \EXTRACT AND TEST TSR00\; 11F  256F 28
78200   $          BR    ($TCB0050)              \BI =1  (NO LCF TO FOLLOW)\; 120 12A8 60
78300
78400              \TSR BIT 0 =0\
78500   $          TAMN  (1#,A8,ALUEZ,DANDA,QR)  \EXTRACT AND TEST TLCFS\; 121  2568 21
78600   $          BR    ($TCB0040)              \BI =1\;                  122  1288 60
78700
78800              \TLCFS =0\
78900   $          TAMN  (8#,AD,ALUEZ,DANDA,QR)  \TEST TMMS\;              123  257D 28
79000   $          BR    ($TCB0050)              \BI =0 (BLCP MODE)\;      124  12A8 60
79100
79200              \HMLC MODE  (TMMS =1)\
79300   $          MMP   (E#,A8,B0,DANDA,FR)     \EXTRACT TBSS TO WORK0\;  125  6508 0E
79400   $          TAMN  (4#,A0,ALUEZ,DMA,QR)    \TEST TBSS =010\;         126  1560 34
79500   $          BR    ($TCB0050)              \BI NOT =010 (NO LCF)\;   127  12A8 60
79600
79700              \LOGICAL CONTROL FIELD FORMAT FRAME
79800                (TSR00 =0, AND EITHER TLCFS =1 OR
79900                 TMMS =1 AND TBSS =010)\
80000   $TCB0040   MMP   (5#,A4,B4,0,FR)         \SET TSRCSTATE =LCF\;     128  4744 05
80100   $          BR    ($TEXEC00)              \DONE\;                   129  02C8 60
80200
80300              \NOT LOGICAL CONTROL FIELD FORMAT FRAME\
80400   $TCB0050   MMP   (6#,A4,B4,0,FR)         \SET TSRCSTATE =TEXT\;    12A  4744 06
80500   $          BR    ($TEXEC00)              \DONE\;                   12B  02C8 60
80600
80700
80800
80900
81000              \****** LOGICAL CONTROL FIELD STATE ******\
81100
81200              \AN LCF OCTET IN TSR\
81300   $LCF0000   MMP   (8,A5,B5,0,FR)          \SET TBSC =8\;            12C  4755 08
81400   $          TAMN  (8#,AF,ALUEZ,DANDA,QR)  \EXTRACT AND TEST TSR00\; 12D  256F 28
81500   $          BR    ($LCF0020)              \BI =1\;                  12E  1308 60
81600
81700              \ANOTHER LCF OCTET TO FOLLOW. (TSR00 =0)\
81800   $          BR    ($TEXEC00)              \DONE\;                   12F  02C8 60
81900
82000              \LAST LCF OCTET (TSR00 =1)\
82100   $LCF0020   MMP   (6#,A4,B4,0,FR)         \SET TSRCSTATE =TEXT\;    130  4744 06
82200   $          BR    ($TEXEC00)              \DONE\;                   131  02C8 60
82300
82400
82500
82600
82700              \****** TEXT STATE ******\
82800
82900   $TEXT000   TAMN  (8#,AC,ALUEZ,DANDA,QR)  \EXTRACT AND TEST TFF0\;  132  256C 28
83000   $          BR    ($TEXT020)              \BI =1\;                  133  1378 60
83100
83200              \TFF0 =0\
83300   $          TAMN  (4#,AC,ALUEZ,DANDA,QR)  \EXTRACT AND TEST TFF1\;  134  257C 24
83400   $          BR    ($TEXT100)              \BI =0 (TFF =00)\;        135  13A8 60
83500   $          BR    ($TEXT200)              \BI =1 (TFF =01)\;        136  13C8 60
83600
83700              \TFF0 =1\
83800   $TEXT020   TAMN  (4#,AC,ALUEZ,DANDA,QR)  \EXTRACT AND TEST TFF1\;  137  257C 24
83900   $          BR    ($TEXT300)              \BI =0 (TFF =10)\;        138  13F8 60
84000   $          BR    ($TEXT400)              \BI =1 (TFF =11)\;        139  1488 60
84100
84200
84300              \** NOT AN I-FORMAT FRAME  (TFF =00) **\
84400
84500   $TEXT100   MMP   (8,A5,B5,0,FR)          \SET TBSC =8\;            13A  4755 08
84600   $          BR    ($TEXEC00)              \DONE\;                   13B  02C8 60
84700
84800
84900              \** I-FORMAT FRAME WITH NO TCB  (TFF =01) **\
85000
85100   $TEXT200   TAMN  (8#,AD,ALUEZ,DANDA,QR)  \TEST TMMS\;              13C  257D 28
85200   $          BR    ($DTBSM00)              \GO TO DTBSM SUBR IF =0   13D  17A8 60
85300                                             (BLCP MODE)\;
85400   $          BR    ($DTBSH00)              \GO TO DTBSH SUBR IF =1   13E  1A48 60
85500                                             (HMLC MODE)\;
85600
85700
85800              \** I-FORMAT FRAME, WITH TCB, BUT
```

```
85900                   NOT BIT STREAM MODE  (TFF =1)  **\
86000
86100           \(DECODE BYTE SIZE FROM TCB AND SET INTO TBSC)\
86200  STEXT300  MMP   (7#,A2,B5,DANDA,FR)   \EXTRACT TCB.BS FROM         13F  6552 07
86300                                         TCB.RH TO TBSC\;
86400  $        TAMN   (4#,A5,ALUNEZ,DANBA,OR) \EXTRACT AND TEST          140  2565 24
86500                                         BIT 0 OF TCB.BS\;
86600  $        BR     (STEXT350)            \BI =1\;                    141  14A8 60
86700
86800           \TCB.BS =0XX\
86900  $        TAMN   (8#,AD,ALUNEZ,DANDA,OR) \TEST TMMS\;               142  256D 28
87000  $        BR     (STEXT330)            \BI =1  (HMLC MODE)\;       143  146B 60
87100           \MLCP MODE (TMMS =0), OR TCB.BS NOT =001\
87200  STEXT320 MMP    (8,A5,B5,D,FR)        \SET TBSC =3\;              144  4755 08
87300  $        BR     (STEXEC00)            \DONE\;                     145  02C8 60
87400           \HMLC MODE  (TMMS =1)\
87500  STEXT330 TAMN   (1,A5,ALUNEZ,DMA,OR)  \TEST TCB.BS =001\;         146  1565 31
87600  $        BR     (STEXT320)            \BI NOT =001\;              147  144B 60
87700           \HMLC MODE AND TCB.BS =001\
87800  $        MMP    (6,A5,B5,D,FR)        \SET TBSC =6\;              148  4755 06
87900  $        BR     (STEXEC00)            \DONE\;                     149  02C8 60
88000
88100           \TCB.BS =1XX\
88200           \(TBSC ALREADY SET UP)\
88300  STEXT350 BR     (STEXEC00)            \DONE\;                     14A  02C8 60
88400
88500
88600           \**  I-FORMAT FRAME, AND BIT STREAM MODE  (TFF =11)  **\
88700
88800           \(FLIP TSR)\
88900  STEXT400 MMP    (0,A0,B0,D,FR)        \SET WORK0 =0\;             14B  4700 00
89000  $        MMP    (0,A1,B1,D,FR)        \SET WORK1 =0\;             14C  4711 00
89100  $        TAMN   (8#,AF,ALUEZ,DANDA,OR) \EXTRACT AND TEST TSR00\;   14D  257F 28
89200  $        BR     (STEXT801)            \BI =0\;                    14E  150B 60
89300  $        MMP    (1#,A0,B0,DORA,FR)    \TSR00 =1. SET WORK0.3 =1\; 14F  5000 01
89400  STEXT801 TAMN   (4#,AF,ALUEZ,DANDA,OR) \EXTRACT AND TEST TSR01\;   150  257F 24
89500  $        BR     (STEXT802)            \BI =0\;                    151  153B 60
89600  $        MMP    (2#,A0,B0,DORA,FR)    \TSR01 =1. SET WORK0.2 =1\; 152  5000 02
89700  STEXT802 TAMN   (2#,AF,ALUEZ,DANDA,OR) \EXTRACT AND TEST TSR02\;   153  257F 22
89800  $        BR     (STEXT803)            \BI =0\;                    154  1568 60
89900  $        MMP    (4#,A0,B0,DORA,FR)    \TSR02 =1. SET WORK0.1 =1\; 155  5000 04
90000  STEXT803 TAMN   (1#,AF,ALUEZ,DANDA,OR) \EXTRACT AND TEST TSR03\;   156  257F 21
90100  $        BR     (STEXT804)            \BI =0\;                    157  159B 60
90200  $        MMP    (8#,A0,B0,DORA,FR)    \TSR03 =1. SET WORK0.0 =1\; 158  5000 08
90300  STEXT804 TAMN   (8#,AE,ALUEZ,DANDA,OR) \EXTRACT AND TEST TSR04\;   159  257E 28
90400  $        BR     (STEXT805)            \BI =0\;                    15A  15C8 60
90500  $        MMP    (1#,A1,B1,DORA,FR)    \TSR04 =1. SET WORK1.3 =1\; 15B  5011 01
90600  STEXT805 TAMN   (4#,AE,ALUEZ,DANDA,OR) \EXTRACT AND TEST TSR05\;   15C  257E 24
90700  $        BR     (STEXT806)            \BI =0\;                    15D  15F8 60
90800  $        MMP    (2#,A1,B1,DORA,FR)    \TSR05 =1. SET WORK1.2 =1\; 15E  5011 02
90900  STEXT806 TAMN   (2#,AE,ALUEZ,DANDA,OR) \EXTRACT AND TEST TSR06\;   15F  257E 22
91000  $        BR     (STEXT807)            \BI =0\;                    160  1628 60
91100  $        MMP    (4#,A1,B1,DORA,FR)    \TSR06 =1. SET WORK1.1 =1\; 161  5011 04
91200  STEXT807 TAMN   (1#,AE,ALUEZ,DANDA,OR) \EXTRACT AND TEST TSR07\;   162  257E 21
91300  $        BR     (STEXT420)            \BI =0\;                    163  1658 60
91400  $        MMP    (8#,A1,B1,DORA,FR)    \TSR07 =1. SET WORK1.0 =1\; 164  5011 08
91500  STEXT420 MMP    (0,A1,BF,A,FR)        \COPY WORK1 TO TSR.LH\;     165  44F1 00
91600  $        MMP    (0,A0,BE,A,FR)        \COPY WORK0 TO TSR.RH\;     166  44E0 00
91700  $        TAMN   (8#,AD,ALUEZ,DANDA,OR) \TEST TMMS\;                167  257D 28
91800  $        BR     (STEXT425)            \BI =0  (MLCP MODE)\;       168  160B 60
91900           \HMLC MODE  (TMMS =1)\
92000  $        MMP    (0,AF,BF,A,QR)        \MOVE TSR.LH TO QR\;        169  04FF 00
92100  $        MMP    (0,AE,BE,A,SRUF)      \SHIFT TSR RIGHT (ONCE)\;   16A  84EE 00
92200  $        MMP    (0,AE,BE,A,SRQF)      \SHIFT TSR RIGHT (TWICE)\;  16B  84EE 00
92300  $        MMP    (3#,AF,BF,DANDQ,FR)   \SET TSR.LH BITS 0,1 =0,0.  16C  66FF 03
92400                                         RESTORE TSR.LH.
92500                                         CONTINUE\;
92600
92700           \(SET UP TBSC)\
92800  STEXT425 TAMN   (1#,A9,ALUNEZ,DANDA,OR) \TEST TEOFS\;              16D  2569 21
92900  $        BR     (STEXT440)            \BI =1 (LAST BYTE)\;        16E  1758 60
93000
93100           \NOT LAST BYTE (TEOFS =0), OR
93200             FULL BYTE IF LAST BYTE (TPLBS =0)\
93300  STEXT430 TAMN   (8#,AD,ALUNEZ,DANDA,OR) \TEST TMMS\;               16F  2560 28
93400  $        BR     (STEXT432)            \BI =1\;                    170  173B 60
93500           \MLCP MODE  (TMMS =0)\
93600  $        MMP    (8,A5,B5,D,FR)        \SET TBSC =8\;              171  4755 08
93700  $        BR     (STEXEC00)            \DONE\;                     172  02C8 60
93800           \HMLC MODE  (TMMS =1)\
93900  STEXT432 MMP    (6,A5,B5,D,FR)        \SET TBSC =6\;              173  4755 06
94000  $        BR     (STEXEC00)            \DONE\;                     174  02C8 60
94100
94200           \LAST BYTE  (TEOFS =1)\
94300  STEXT440 TAMN   (1#,AB,ALUEZ,DANDA,OR) \TEST TPLBS\;               175  257B 21
94400  $        BR     (STEXT430)            \BI =0 (FULL BYTE)\;        176  16FB 60
94500           \PARTIAL BYTE  (TPLBS =1)\
94600  $        TAMN   (8#,AD,ALUEZ,DANDA,OR) \TEST TMMS\;                177  257D 28
94700  $        BR     (SDTBSM00)            \GO TO DTBSM SUBR IF =0     178  17AB 60
94800                                         (MLCP MODE)\;
94900  $        BR     (SDTBSD00)            \GO TO DTBSD SUBR IF =1     179  1AB8 60
95000                                         (HMLC MODE)\;
```

```
95400
95500         \......                      ......\
95600         \......  TSRC SUBROUTINES    ......\
95700         \......                      ......\
95800
95900
96000
96100         \****  DECODE TBSS - MLCP MODE SUBROUTINE  ****\
96200
96300         \(DECODE MLCP BYTE SIZE FROM TBSS AND SET INTO TBSC)\
96400 SDTBSM00 TAMN  (8#,A8,ALUNEZ,DANDA,QR) \EXTRACT AND TEST TBSS.2\;   17A  2568 28
96500 $        BR    (SDTBSM40)              \BI =1  (TBSS =1XX)\;        17B  1928 60
96600
96700
96800        \TBSS =0XX\
96900 $       TAMN  (4#,A8,ALUNEZ,DANDA,QR) \EXTRACT AND TEST TBSS.1\;    17C  2568 24
97000 $       BR    (SDTBSM30)              \BI =1  (TBSS =01X)\;         17D  1888 60
97100
97200        \TBSS =00X\
97300 $       TAMN  (2#,A8,ALUNEZ,DANDA,QR) \EXTRACT AND TEST TBSS.0\;    17E  2568 22
97400 $       BR    (SDTBSM25)              \BI =1  (TBSS =001)\;         17F  1828 60
97500
97600        \BYTE SIZE =5 (TBSS =000)\
97700 $       MMP   (5,A5,B5,D,FR)          \SET TBSC =5\;                180  4755 05
97800 $       BR    (STEXEC00)              \DONE\;                       181  02C8 60
97900
98000        \BYTE SIZE =1 (TBSS =001)\
98100 SDTBSM25 TAMN (1#,A9,ALUEZ,DANDA,QR)  \EXTRACT AND TEST TEOFS\;     182  2579 21
98200 $       BR    (SDTBSM62)              \BI =0 (NOT LAST BYTE)\;      183  1A08 60
98300        \LAST BYTE (TEOFS =1)\
98400 $       TAMN  (1#,A8,ALUEZ,DANDA,QR)  \TEST TPLBS\;                 184  2578 21
98500 $       BR    (SDTBSM62)              \BI =0 (FULL BYTE)\;          185  1A08 60
98600        \PARTIAL LAST BYTE (TPLBS =1)\
98700 $       MMP   (1,A5,B5,D,FR)          \SET TBSC =1\;                186  4755 01
98800 $       BR    (STEXEC00)              \DONE\;                       187  02C8 60
98900
99000        \TBSS =01X\
99100 SDTBSM30 TAMN (2#,A8,ALUNEZ,DANDA,QR) \EXTRACT AND TEST TBSS.0\;    188  2568 22
99200 $       BR    (SDTBSM35)              \BI =1 .(TBSS =011)\;         189  18C8 60
99300
99400        \BYTE SIZE =6 (TBSS =010)\
99500 $       MMP   (6,A5,B5,D,FR)          \SET TBSC =6\;                18A  4755 06
99600 $       BR    (STEXEC00)              \DONE\;                       18B  02C8 60
99700
99800        \BYTE SIZE =2 (TBSS =011)\
99900 SDTBSM35 TAMN (1#,A9,ALUEZ,DANDA,QR)  \EXTRACT AND TEST TEOFS\;     18C  2579 21
100000 $      BR    (SDTBSM62)              \BI =0 (NOT LAST BYTE)\;      18D  1A08 60
100100       \LAST BYTE (TEOFS =1)\
100200 $      TAMN  (1#,A8,ALUEZ,DANDA,QR)  \TEST TPLBS\;                 18E  2578 21
100300 $      BR    (SDTBSM62)              \BI =0 (FULL BYTE)\;          18F  1A08 60
100400       \PARTIAL LAST BYTE (TPLBS =1)\
100500 $      MMP   (2,A5,B5,D,FR)          \SET TBSC =2\;                190  4755 02
100600 $      BR    (STEXEC00)              \DONE\;                       191  02C8 60
100700
100800
100900       \TBSS =1XX\
101000 SDTBSM40 TAMN (4#,A8,ALUNEZ,DANDA,QR) \EXTRACT AND TEST TBSS.1\;   192  2568 24
101100 $      BR    (SDTBSM60)              \BI =1 (TBSS =11X)\;          193  19E8 60
101200
101300       \TBSS =10X\
101400 $      TAMN  (2#,A8,ALUNEZ,DANDA,QR) \EXTRACT AND TEST TBSS.0\;    194  2568 22
101500 $      BR    (SDTBSM55)              \BI =1 (TBSS =101)\;          195  1988 60
101600
101700       \BYTE SIZE =7 (TBSS =100)\
101800 $      MMP   (7,A5,B5,D,FR)          \SET TBSC =7\;                196  4755 07
101900 $      BR    (STEXEC00)              \DONE\;                       197  02C8 60
102000
102100       \BYTE SIZE =3 (TBSS =101)\
102200 SDTBSM55 TAMN (1#,A9,ALUEZ,DANDA,QR) \EXTRACT AND TEST TEOFS\;     198  2579 21
102300 $      BR    (SDTBSM62)              \BI =0 (NOT LAST BYTE)\;      199  1A08 60
102400       \LAST BYTE (TEOFS =1)\
102500 $      TAMN  (1#,A8,ALUEZ,DANDA,QR)  \TEST TPLBS\;                 19A  2578 21
102600 $      BR    (SDTBSM62)              \BI =0 (FULL BYTE)\;          19B  1A08 60
102700       \PARTIAL LAST BYTE (TPLBS =1)\
102800 $      MMP   (3,A5,B5,D,FR)          \SET TBSC =3\;                19C  4755 03
102900 $      BR    (STEXEC00)              \DONE\;                       19D  02C8 60
103000
103100       \TBSS =11X\
103200 SDTBSM60 TAMN (2#,A8,ALUNEZ,DANDA,QR) \EXTRACT AND TEST TBSS.0\;   19E  2568 22
103300 $      BR    (SDTBSM65)              \BI =1 (TBSS =111)\;          19F  1A28 60
103400
103500       \BYTE SIZE =8 (TBSS =110)\
103600 SDTBSM62 MMP (8,A5,B5,D,FR)          \SET TBSC =8\;                1A0  4755 08
103700 $      BR    (STEXEC00)              \DONE\;                       1A1  02C8 60
103800
103900       \BYTE SIZE =4 (TBSS =111)\
104000 SDTBSM65 MMP (4,A5,B5,D,FR)          \SET TBSC =4\;                1A2  4755 04
104100 $      BR    (STEXEC00)              \DONE\;                       1A3  02C8 60
104200
104300
104400
104500       \****  DECODE TBSS - HMLC MODE SUBROUTINE  ****\
104600
104700       \(DECODE HMLC BYTE SIZE FROM TBSS AND SET INTO TBSC)\
```

```
104800   SDTBSH00   MMP    (0,AB,B5,A,SRQF)              \COPY TCWRS.RH TO TBSC         1A4   8458 00
104900                                                    AND SHIFT RIGHT 1 BIT\;
105000   $          MMP    (7#,A5,B5,DANDA,FR)           \EXTRACT TBSS IN TBSC\;        1A5   6555 07
105100   $          TAMN   (4#,A5,ALUNEZ,DANDA,QR)       \TEST TBSS BIT 0\;             1A6   2565 24
105200   $          JR     (SDTBSH20)                    \BI =1\;                       1A7   1AA8 60
105300
105400              \8-BIT MODE  (TBSS =0XX)\
105500   $          MMP    (8,A5,B5,D,FR)                \SET TBSC =8\;                 1A8   4755 08
105600   $          BR     (STEXEC00)                    \DONE\;                        1A9   02C8 60
105700
105800              \16-BIT MODE  (TBSS =1XX)\
105900              \(TBSC ALREADY SET UP)\
106000   SDTBSH20   BR     (STEXEC00)                    \DONE\;                        1AA   02C8 60
106100
106200
106300
106400              \****  DETERMINE TR BYTE SIZE FROM DATA SUBROUTINE   ****\
106500
106600              \(DETERMINE BYTE SIZE FROM DATA IN TSR AND SET INTO TBSC)\
106700   SDTBSD00   TAMN   (0,AF,ALUEZ,A,QR)             \TEST TSR.LH =0000\;           1AB   047F 20
106800   $          BR     (SDTBSD40)                    \BI =0000\;                    1AC   1B38 60
106900
107000              \TSR BITS 0,1,2,3 NOT =0000\
107100   $          TAMN   (C#,AF,ALUEZ,DANDA,QR)        \TEST TSR BITS 0,1\;           1AD   257F 2C
107200   $          JR     (SDTBSD20)                    \BI =00\;                      1AE   1858 60
107300
107400              \TSR BITS 0,1 NOT =00\
107500   $          TAMN   (8#,AF,ALUEZ,DANDA,QR)        \TEST TSR BIT 0\;              1AF   257F 28
107600   $          JR     (SDTBSD10)                    \BI =0\;                       1B0   1838 60
107700
107800              \LEFTMOST 1 IS IN BIT 0.  BYTE SIZE =7\
107900   $          MMP    (7,A5,B5,D,FR)                \SET TBSC =7\;                 1B1   4755 07
108000   $          BR     (STEXEC00)                    \DONE\;                        1B2   02C8 60
108100
108200              \LEFTMOST 1 IS IN BIT 1. BYTE SIZE =6\
108300   SDTBSD10   MMP    (6,A5,B5,D,FR)                \SET TBSC =6\;                 1B3   4755 06
108400   $          BR     (STEXEC00)                    \DONE\;                        1B4   02C8 60
108500
108600              \TSR BITS 0,1 =00\
108700   SDTBSD20   TAMN   (2#,AF,ALUEZ,DANDA,QR)        \TEST TSR BIT 2\;              1B5   257F 22
108800   $          BR     (SDTBSD30)                    \BI =0\;                       1B6   1898 60
108900
109000              \LEFTMOST 1 IS IN BIT 2.  BYTE SIZE =5\
109100   $          MMP    (5,A5,B5,D,FR)                \SET TBSC =5\;                 1B7   4755 05
109200   $          JR     (STEXEC00)                    \DONE\;                        1B8   02C8 60
109300
109400              \LEFTMOST 1 IS IN BIT 3.  BYTE SIZE =4\
109500   SDTBSD30   MMP    (4,A5,B5,D,FR)                \SET TBSC =4\;                 1B9   4755 04
109600   $          BR     (STEXEC00)                    \DONE\;                        1BA   02C8 60
109700
109800              \TSR BITS 0,1,2,3 =0000\
109900   SDTBSD40   TAMN   (C#,AE,ALUEZ,DANDA,QR)        \TEST TSR BITS 4,5\;           1BB   257E 2C
110000   $          BR     (SDTBSD60)                    \BI =00\;                      1BC   1C38 60
110100
110200              \TSR BITS 4,5 NOT =00\
110300   $          TAMN   (8#,AE,ALUEZ,DANDA,QR)        \TEST TSR BIT 4\;              1BD   257E 28
110400   $          BR     (SDTBSD50)                    \BI =0\;                       1BE   1C18 60
110500
110600              \LEFTMOST 1 IS IN BIT 4.  BYTE SIZE =3\
110700   $          MMP    (3,A5,B5,D,FR)                \SET TBSC =3\;                 1BF   4755 03
110800   $          BR     (STEXEC00)                    \DONE\;                        1C0   C2C8 60
110900
111000              \LEFTMOST 1 IS IN BIT 5.  BYTE SIZE =2\
111100   SDTBSD50   MMP    (2,A5,B5,D,FR)                \SET TBSC =2\;                 1C1   4755 02
111200   $          BR     (STEXEC00)                    \DONE\;                        1C2   C2C8 60
111300
111400              \TSR BITS 4,5 =00\
111500   SDTBSD60   TAMN   (2#,AE,ALUEZ,DANDA,QR)        \TEST TSR BIT 6\;              1C3   257E 22
111600   $          BR     (SDTBSD70)                    \BI =0\;                       1C4   1C78 60
111700
111800              \LEFTMOST 1 IS IN BIT 6.  BYTE SIZE =1\
111900   $          MMP    (1,A5,B5,D,FR)                \SET TBSC =1\;                 1C5   4755 01
112000   $          BR     (STEXEC00)                    \DONE\;                        1C6   02C8 60
112100
112200              \NO 1'S IN BITS 0 THRU 6\
112300   SDTBSD70   BR     (STSRC400)                    \ERROR - TREAT AS UNDERRUN\;   1C7   088A 60
112400
112500
112600
112700
112800              \******  END OF FRAME PROCESSING  ******\
112900
113000              \(INITIAL PROCESSING)\
113100   SEOFP000   MMP    (8,A5,B5,D,FR)                \SET TBSC =8\;                 1C8   4755 08
113200   $          TAMN   (D#,A4,ALUEZ,DMA,QR)          \TEST TSRCSTATE =LAST\;        1C9   1574 3D
113300   $          JR     (SEOFP420)                    \BI =LAST\;                    1CA   1DE8 60
113400
113500              \TSRCSTATE NOT =LAST\
113600   $          TAMN   (2#,A9,ALUNEZ,DANDA,QR)       \EXTRACT AND TEST TNFCSS\;     1CB   2569 22
113700   $          BR     (SEOFP400)                    \BI =1 (DON'T SEND FCS)\;      1CC   1DD8 60
113800
113900              \TSRCSTATE NOT=LAST, AND FCS IS TO BE SENT (TNFCSS =0)\
114000
114100              \(READ NEXT HALF CRC REGISTER TO TSR)\
114200   $          RCRCR  (0,AE,BF,A,SRQF)              \SHIFT TO 1ST CRC BIT\;        1CD   84EE A0
```

```
114300  $        RCRCR    (0,AE,BE,A,SRQF)         \SHIFT IN 2ND CRC BIT\;         1CE  84EE A0
114400  $        RCRCR    (0,AE,BE,A,SRQF)         \SHIFT IN 3RD CRC BIT\;         1CF  84EE A0
114500  $        RCRCR    (0,AE,BE,A,SRQF)         \SHIFT IN 4TH CRC BIT\;         1D0  84EE A0
114600  $        RCRCR    (0,AE,BE,A,SRQF)         \SHIFT IN 5TH CRC BIT\;         1D1  84EE A0
114700  $        RCRCR    (0,AE,BE,A,SRQF)         \SHIFT IN 6TH CRC BIT\;         1D2  84EE A0
114800  $        RCRCR    (0,AE,BE,A,SRQF)         \SHIFT IN 7TH CRC BIT\;         1D3  84EE A0
114900  $        RCRCR    (0,AE,BE,A,SRQF)         \SHIFT IN 8TH CRC BIT\;         1D4  84EE A0
115000  $        MMP      (0,AF,BF,Q,FR)           \LEFT HALF BYTE TO TSR.LH\;     1D5  42FF 00
115100
115200           \(CONTINUE PER TSRCSTATE)\
115300  $        TAMN     (C#,A4,ALUEZ,DMA,QR)     \TEST TSRCSTATE =FCS-2\;        1D6  1574 3C
115400  $        BR       (SEOFP300)               \01 =FCS-2\;                    1D7  1DB8 60
115500
115600
115700           \**  FIRST ENTRY  **\
115800
115900           \TSRCSTATE NEITHER =LAST NOR =FCS-2, AND FCS IS TO BE SENT\
116000  $        MMP      (C#,A4,B4,D,FR)          \SET TSRCSTATE =FCS-2\;         1D8  4744 0C
116100  $        MMP      (1#,A3,B3,D,FR)          \SET TFRCSTATE =NORMAL EOF,     1D9  4733 01
116200                                              SET TFRCFLG =0\;
116300  $        BR       (STEXEC00)               \DONE\;                         1DA  02C8 60
116400
116500
116600           \**  TSRCSTATE =FCS-2  **\
116700
116800  SEOFP300 MMP      (0#,A4,B4,D,FR)          \SET TSRCSTATE =LAST\;          1DB  4744 0D
116900  $        BR       (STEXEC00)               \DONE\;                         1DC  02C8 60
117000
117100
117200           \**  FCS IS NOT TO BE SENT  (TNFCSS =1)  **\
117300
117400  SEOFP400 MMP      (1#,A3,B3,D,FR)          \SET TFRCSTATE =NORMAL EOF,     1DD  4733 01
117500                                              SET TFRCFLG =0,
117600                                              CONTINUE BELOW\;
117700
117800           \**  TSRCSTATE =LAST  **\
117900
118000  SEOFP420 MMP      (7,AF,BF,D,FR)           \HALF FLAG TO TSR.LH\;          1DE  47FF 07
118100  $        MMP      (E#,AE,BE,D,FR)          \HALF FLAG TO TSR.RH\;          1DF  47EE 0E
118200  $        MMP      (2#,AC,BC,D,FR)          \SET TFF0,TFF1,TEOFFLG,         1E0  47CC 02
118300                                              TSOFFLG =0,0,1,0\;
118400  $        MMP      (4,AB,BB,D,FR)           \SET TISC =4\;                  1E1  47BB 04
118500  $        MMP      (0,A4,B4,D,FR)           \SET TSRCSTATE =IDLE\;          1E2  4744 00
118600  $        TAMN     (4#,A9,ALUEZ,DANDA,QR)   \TEST TRRS =0\;                 1E3  2579 24
118700  $        BR       (STEXEC00)               \DONE IF =0 (NO RC RESYNC)\;    1E4  02C8 60
118800           \RESYNC RECEIVER  (TRRS =1)\
118900  $        BRSC     (STEXEC00,SRCRSYN)       \SET RC RESYNC. DONE\;          1E5  02C4 60
119000
119100  SKIP HOF;
119200
119300           \******************************************\
119400           \**                                      **\
119500           \**  TRANSMIT FRAME REPORT CONTROL ROUTINE **\
119600           \**                                      **\
119700           \******************************************\
119800
119900
120000           \******  INITIAL PROCESSING AND STATE SELECTION  ******\
120100
120200           \TFRCSTATE NOT =OFF, BRANCH PER TFRCSTATE\
120300  STFRC000 TAMN     (4#,A3,ALUEZ,DANDA,QR)   \TEST TFRCSTATE BIT 0\;         1E6  2563 24
120400  $        BR       (STFRC040)               \BI =1\;                        1E7  1F08 60
120500           \BIT 0 =0\
120600  $        TAMN     (2#,A3,ALUEZ,DANDA,QR)   \TEST BIT 1\;                   1E8  2563 22
120700  $        BR       (STFRC010)               \BI =1\;                        1E9  1EDB 60
120800           \BIT 0 =0, BIT 1 =0\
120900  $        TAMN     (1#,A3,ALUEZ,DANDA,QR)   \TEST BIT 2\;                   1EA  2573 21
121000  STFRC005 BR       (STFRC005)               \000 = ERROR HALT\;             1EB  1EBB 60
121100  $        BR       (SNEOF000)               \001 =NORMAL EOF\;              1EC  2248 60
121200           \BIT 0 =0, BIT 1 =1\
121300  STFRC010 TAMN     (1#,A3,ALUEZ,DANDA,QR)   \TEST BIT 2\;                   1ED  2573 21
121400  STFRC011 BR       (STFRC011)               \010 = ERROR HALT\;             1EE  1EE8 60
121500  STFRC012 BR       (STFRC012)               \011 = ERROR HALT\;             1EF  1EF8 60
121600           \BIT 0 =1\
121700  STFRC040 TAMN     (2#,A3,ALUEZ,DANDA,QR)   \TEST BIT 1\;                   1F0  2563 22
121800  $        BR       (STFRC060)               \BI =1\;                        1F1  1F58 60
121900           \BIT 0 =1, BIT 1 =0\
122000  $        TAMN     (1#,A3,ALUEZ,DANDA,QR)   \TEST BIT 2\;                   1F2  2573 21
122100  $        BR       (SEOFW000)               \100 =EOF WAIT\;                1F3  1F88 60
122200  $        BR       (SRPTU000)               \101 =REPORT UNDRN\;            1F4  2198 60
122300           \BIT 0 =1, BIT 1 =1\
122400  STFRC060 TAMN     (1#,A3,ALUEZ,DANDA,QR)   \TEST BIT 2\;                   1F5  2573 21
122500  STFRC061 BR       (STFRC061)               \110 = ERROR HALT\;             1F6  1F68 60
122600  $        BR       (SRSTU000)               \111 =RESET UNDERRUN\;          1F7  21F8 60
122700
122800
122900
123000           \******  END OF FRAME WAIT STATE  ******\
123100
123200  SEOFW000 TAMN     (8#,A3,ALUEZ,DANDA,QR)   \EXTRACT AND TEST TFRCFLG\;     1F8  2573 28
123300  $        BR       (STEXEC00)               \DONE IF TFRCFLG =0\;           1F9  02C8 60
123400           \TFRCFLG =1\
123500  $        TAMN     (0,A0,TFMOR,0,QR)        \TEST FOR NEXT BYTE READY\;     1FA  0220 20
123600  $        BR       (SEOFW300)               \BI NOT READY\;                 1FB  2168 60
123700           \NEXT BYTE READY  (TFMOR SET)\
```

```
123800    $           MMP    (7#,A3,B3,DANDA,FR)      \SET TFRCFLG =0\;           1FC   6533 07
123900    $           RER    (TCWR,B8,D,FR)           \READ TCWB.RH TO TCWBS.RH\; 1FD   47BD EF
124000    $           RER    (TCWL,B9,D,FR)           \READ TCWB.LH TO TCWBS.LH\; 1FE   4795 EF
124100    $           TAMN   (1#,A9,ALUNEZ,DANDA,QR)  \TEST TEOFS =1\;            1FF   2569 21
124200    $           BR     ($EOFW050)               \BI =1\;                    200   2048 60
124300                \TEOFS =0\
124400    $           TAMN   (5#,AD,ALUNEZ,DANDA,QR)  \TEST TMMS\;                201   256D 28
124500    $           BR     ($EOFW200)               \BI =1 (HMLC MODE)\;        202   2008 60
124600                \HLCP MODE   (TMMS =0)\
124800                \TEOFS =1\
124900    $EOFW050    TAMN   (8#,AD,ALUEZ,DANDA,QR)   \TEST TMMS\;                204   2570 28
125000    $           BR     ($EOFW100)               \BI =0 (MLCP MODE)\;        205   2088 60
125100                \HMLC MODE   (TMMS =1)\
125200    $           TAMN   (2#,A9,ALUNEZ,DANDA,QR)  \TEST TTCUS\;               206   2569 22
125300    $           BR     ($EOFW200)               \BI =1\;                    207   2008 60
125400
125500                \END OF FRAME\
125600    $EOFW100    MMP    (5#,A3,B3,D,FR)          \SET TFRCSTATE =RPRT UNDRN  208   4735 05
125700                                                 (SET TFRCFLG =0)\;
125800    $           SC     (0,RSTFMOR,B0,Q,QR)      \RESET TFMOR\;              209   0206 40
125900    $           TAMN   (4#,A9,ALUEZ,DANDA,QR)   \TEST TRRS =0\;             20A   2579 24
126000    $           BR     ($TEXEC00)               \DONE IF =0 (NO RC RESYNC)\; 20B  02C8 60
126100                \RESYNC RECEIVER  (TRRS =1)\
126200    $           BRSC   ($TEXEC00,SRCRSYN)       \SET RC RESYNC, DONE\;      20C   02C4 60
126300
126400
126500                \HMLC SLOW-DOWN MODE (AND NOT LAST BYTE)\
126600    $EOFW200    MMP    (C#,A9,B7,DANDA,FR)      \SET TTCBS,TEOFS =0,0\;     20D   6599 0C
126700    $           TAMN   (0,A0,TCRI,Q,QR)         \TEST TCRI\;                20E   0210 20
126800    $           BR     ($EOFW205)               \BI RESET\;                 20F   2118 60
126900
127000                \TCRI SET\
127100    $           BR     ($TEXEC00)               \DONE\;                     210   02C8 60
127200
127300                \TCRI RESET\
127400    $EOFW205    SC     (0,RSTFMOR,90,Q,QR)      \RESET TFMOR\;              211   0206 40
127500    $           RER    (TXCW,B0,D,FR)           \READ TXCW TO FO\;          212   4703 EF
127600    $           TAMN   (4#,A0,ALUNEZ,DANDA,QR)  \TEST TSDMIC\;              213   2560 24
127700    $           BRSC   ($TEXEC00,STCRI)         \SET TCRI, DONE             214   02C3 60
127800                                                 IF TSDMIC =1\;
127900    $           BR     ($TEXEC00)               \DONE IF TSDMIC =0\;        215   02C8 60
128000
128100
128200                \NEXT BYTE NOT READY  (TFMOR RESET)\
128300    $EOFW300    TAMN   (1#,A9,ALUEZ,DANDA,QR)   \TEST TEOFS\;               216   2579 21
128400    $           BR     ($TEXEC00)               \DONE IF =0 (NOT EOF)\;     217   02C8 60
128500    $           BR     ($EOFW050)               \BI =1 (EOF)\;              218   2048 60
128600
128700
128800
128900                \****** REPORT UNDERRUN STATE ******\
129000
129100    $RPTU000    TAMN   (0,A0,TCRI,Q,QR)         \TEST CRI SET\;             219   0210 20
129200    $           BR     ($RPTU020)               \BR IF CRI RESET\;          21A   21C8 60
129300    $           BR     ($TEXEC00)               \DONE IF CRI SET\;          21B   02C8 60
129400
129500                \NO CRI PENDING\
129600    $RPTU020    SC     (0,STUNDRN,B0,Q,QR)      \SET TUNDRN\;               21C   0202 40
129700    $           SC     (7#,RSTFMC9,B3,D,FR)     \SET TFRCSTATE =RST UNDRN.  21D   4735 47
129800                                                 SET TFRCFLG =0.
129900                                                 RESET TFMC8 AND TFMNE\;
130000    $           BRSC   ($TEXEC00,STCRI)         \SET TCRI, DONE\;           21E   02C3 60
130100
130200
130300
130400                \****** RESET UNDERRUN STATE ******\
130500
130600    $RSTU000    TAMN   (0,A0,TCRI,Q,QR)         \TEST CRI SET\;             21F   0210 20
130700    $           BR     ($RSTU020)               \BR IF CRI RESET\;          220   2228 60
130800    $           BR     ($TEXEC00)               \DONE IF CRI SET\;          221   02C8 60
130900
131000                \NO CRI PENDING\
131100    $RSTU020    MMP    (0,A3,35,D,FR)           \SET TFRCSTATE =OFF         222   4733 00
131200                                                 SET TFRCFLG =0\;
131300    $           BR     ($TEXEC00)               \DONE\;                     223   02C8 60
131400
131500
131600
131700                \****** NORMAL END OF FRAME STATE ******\
131800
131900    $NEOF000    TAMN   (0,A0,TCRI,Q,QR)         \TEST TCRI\;                224   0210 20
132000    $           BR     ($NEOF005)               \BI TCRI RESET\;            225   2278 60
132100    $           BR     ($TEXEC00)               \DONE IF TCRI SET\;         226   02C8 60
132200
132300                \NO CRI PENDING\
132400    $NEOF005    SC     (0#,RSTFMC8,B3,D,FR)     \SET TFRCSTATE =OFF.        227   4735 40
132500                                                 SET TFRCFLG =0.
132600                                                 RESET TFMC8 AND TFMNE\;
132700    $           BRSC   ($TEXEC00,STCRI)         \SET TCRI, DONE\;           228   02C3 60
                                                      THERE ARE NO SEVERE MESSAGES IN THE ABOVE FILE.
                                                      THERE ARE NO WARNING MESSAGES IN THE ABOVE FILE.
```

APPENDIX B

```
 100      PARAMETERS;
 200      PCDEL BHCLA-RECEIVE-FIRMWARE;
 300
 400      \RECEIVE FIRMWARE REVISION LEVEL NOTES.
 500           THE F/W REV LEVEL IS GENERATED AT INIT002.
 600           THE CURRENT REV IS 1.\
 700
 800      \TABBING NOTES.
 900           TAB CHARACTER... COLON.
1000           TAB COLUMNS..... 7,12,19,27,44.\
1100
1200      RCMDEF MAIN,28,1024,,$$RCS;
1300
1400
1500
1600
1700      BRCHFLD   BRADDR,ABS,2/10;
1800
1900
2000
2100
2200      \ CONSTANT FIELDS \
2300
2400      CNSTFLD  WTFLD,16/3       \ROS WORD TYPE\;
2500      CNSTFLD  KFLD,20/8        \RCS CONSTANT-E BITS\;
2600      CNSTFLD  ISCFLD,12/1      \INHIBIT SUBCOMMAND IF = 1\;
2700      CNSTFLD  IFWFLD,0/2       \INHIBIT FILE WRITE IF = 0\;
2800      CNSTFLD  ALLBITS,0/28     \TO SET UNUSED LOCATIONS TO ZERO\;
2900
3000
3100
3200
3300      \ VARIABLE FIELDS \
3400      ARGDEF    FAFLD   (12/4)
3500
3600      AC /0#    A1 /1#    A2 /2#    A3 /3#
3700      A4 /4#    A5 /5#    A6 /6#    A7 /7#
3800      A8 /8#    A9 /9#    AA /A#    AE /B#
3900      AC /C#    AD /D#    AE /E#    AF /F#    ;
4000
4100
4200
4300
4400      ARGDEF    FBFLD   (8/4)
4500
4600      BC /0#    B1 /1#    B2 /2#    B3 /3#
4700      B4 /4#    B5 /5#    B6 /6#    B7 /7#
4800      B8 /8#    B9 /9#    BA /A#    HB /B#
4900      BC /C#    BD /D#    BE /E#    BF /F#    ;
5000
5100
5200
5300
5400      ARGDEF    OPFLD   (2/6, 19/1)
5500
5600      \ LOGICAL FUNCTIONS \
5700
5800      ACRQ     /060C     \A LOGICAL OR C\
5900      ACRB     /062C     \A LOGICAL OR B\
6000      AANDQ    /100C     \A AND Q\
6100      AANDB    /102C     \A AND B\
6200      ANOTANDQ /120C     \ANOT AND Q\
6300      ANOTANDB /122C     \ANOT AND B\
6400      AXORQ    /140C     \A EXCLUSIVE OR Q\
6500      AXORB    /142C     \A EXCLUSIVE OR B\
6600      AXNORQ   /160C     \A EXCLUSIVE NOR Q\
6700      AXNORB   /162C     \A EXCLUSIVE NOR B\
6800
6900      DORA     /072C     \D OR A\
7000      DORQ     /074C     \D OR Q\
7100      DANDA    /112C     \D AND A\
7200      DANDQ    /114C     \D AND Q\
7300      DNOTANDA /132C     \DNOT AND A\
7400      DNOTANDQ /134C     \DNOT AND Q\
7500      DXORA    /152C     \D EXCLUSIVE OR A\
7600      DXORQ    /154C     \D EXCLUSIVE OR Q\
7700      DXNORA   /172C     \D EXCLUSIVE NOR A\
7800      DXNORQ   /174C     \D EXCLUSIVE NOR Q\
7900
8000      NOTQ     /164C     \Q INVERTED\
8100      NOTB     /166C     \B INVERTED\
8200      NOTA     /170C     \A INVERTED\
8300      NOTD     /176C     \D INVERTED\
8400
8500      ALUZ     /104C     \FORCE ALU OUTPUT TO ZERO\
8600
8700
8800      \ ARITHMETIC FUNCTIONS \
8900
9000      AFQ      /000C     \A + Q\
9100      AFB      /002C     \A + B\
9200      DPA      /012C     \D + A\
```

```
9300        CFQ         /014C       \D + Q\
9400
9500        Q           /004C       \PASS Q\
9600        B           /006C       \PASS B\
9700        A           /010C       \PASS A\
9800        D           /016C       \PASS D\
9900
10000       Q1C         /044C       \Q 1'S COMPLEMENT\
10100       B1C         /046C       \B 1'S COMPLEMENT\
10200       A1C         /050C       \A 1'S COMPLEMENT\
10300       D1C         /036C       \D 1'S COMPLEMENT\
10400
10500       Q2C         /045C       \Q 2'S COMPLEMENT\
10600       B2C         /047C       \B 2'S COMPLEMENT\
10700       A2C         /051C       \A 2'S COMPLEMENT\
10800       D2C         /037C       \D 2'S COMPLEMENT\
10900
11000       QM1         /024C       \Q - 1\
11100       BM1         /026C       \B - 1\
11200       AM1         /030C       \A - 1\
11300       DM1         /056C       \D - 1\
11400
11500       QP1         /005C       \Q + 1\
11600       BP1         /007C       \B + 1\
11700       AP1         /011C       \A + 1\
11800       CP1         /017C       \D + 1\
11900
12000       QMA         /021C       \Q - A\
12100       BMA         /023C       \B - A\
12200       AMD         /033C       \A - D\
12300       QMD         /035C       \Q - D\
12400       AMQ         /041C       \A - Q\
12500       AMB         /043C       \A - B\
12600       DMA         /053C       \D - A\
12700       DMQ         /055C       \D - Q\       ;
12800
12900
13000
13100
13200       ARGDEF      FDFLD       (0/2)
13300
13400       GR      /0C
13500       FR      /1C
13600       SRQF    /2C
13700       SLQF    /3C    ;
13800
13900
14000
14100
14200           \  TEST FUNCTIONS  \
14300
14400       ARGDEF      TSTFLD      (8/4)     .
14500
14600           \  BRANCH AND/OR EXECUTE NEXT IF...  \
14700
14800       RRDY        /00C        \NEXT RCX BIT NOT READY\
14900       RCRI        /01C        \NO RCX CRI PENDING\
15000       RFMIR       /02C        \RCX FIFO MEMORY INPUT NOT READY\
15100       RCFF        /03C        \RCXR IS OFF\
15200       RCRSYN      /04C        \RCXR RESYNC FF IS SET\
15300       ALUNEZ      /06C        \RCX ALU OUTPUT NOT =C\
15400       ALUEZ       /07C        \RCX ALU OUTPUT =C\       ;
15500
15600
15700
15800
15900           \  SUBCOMMANDS  \
16000
16100       ARGDEF      SCFLD       (13/3)
16200
16300       RSRRDY      /0          \RESET RCX BIT READY FF\
16400       RSRCSYN     /1          \RESET RECEIVE RESYNC FF\
16500       WRFMS       /2          \WRITE RCX FIFO MEMORY WITH STATUS\
16600       WRFMD       /3          \WRITE RCX FIFO MEMORY WITH DATA\
16700       RSWFMB      /4          \RESET RCX FIFO MEMORY BUFFER\
16800       WRRFMBS     /5          \WRITE RCX FIFO MEMORY BUFFER WITH STATUS\
16900       WRRFMBD     /6          \WRITE RCX FIFO MEMORY BUFFER WITH DATA\
17000       PSRFCSR     /7          \PRESET RCX FCS REGISTER\       ;
17100
17200
17300
17400
17500       DICTIONARY;
17600
17700       MICRO MMP       (KFLD,FAFLD,FBFLD,OFFLD,FDFLD)
17800                       (WTFLD/0);
17900       MICRO TAPN      (KFLD,FAFLD,TSTFLD,OPFLD,FDFLD)
18000                       (WTFLD/1);
18100       MICRO SC        (KFLD,SCFLD,FBFLD,OFFLD,FDFLD)
18200                       (WTFLD/2,ISCFLD/0);
18300       MICRO BR        (BRADDR)
18400                       (WTFLD/3,ISCFLD/1,IFWFLD/C);
18500       MICRO BRSC      (BRADDR,SCFLD)
18600                       (WTFLD/3,ISCFLD/0,IFWFLD/C);
18700       MICRO RFCSR     (KFLD,FAFLD,FBFLD,OFFLD,FDFLD)
18800                       (WTFLD/5);
```

```
18900           MICRO UFCSR  (KFLD,FAFLD,FBFLD,OFFLD,FDFLD)
19000                        (WTFLD/6);
19100           MICRO RER    (KFLD,FAFLD,FBFLD,OFFLD,FDFLD)
19200                        (WTFLD/7,KFLD/FF#);
19300           MICRO ZERO   (ALLBITS/00000000#);
19400
19500
19600   SKIP HCF;
19700       MICROPROGRAM;
19800
19900       $$ROS;
20000
20100
20200
20300
20400           \****************************************\
20500           \**                                    **\
20600           \**  RECEIVE INITIALIZATION CONTROL ROUTINE  **\
20700           \**                                    **\
20800           \****************************************\
20900
21000
21100   SINIT000  (00C#)                                                     000  0018 6CC
21200           BR       (SINIT001)            \ER TO ADDRESS 1\;
21300   SINIT001  MMP    (CC#,A0,B0,D,QR)      \DISPLAY ENGR REV\;           001  C7C0 CCC
21400   SINIT002  MMF    (01#,A6,B6,D,FR)      \EEM F/W REV LEVEL TO RDB\;   002  4766 CC1
21500           \(NOTE. CURRENT F/W REV IS 1 (00C,CCCC1).)\
21600   SINIT020  RER    (FF#,A0,B0,D,FR)      \READ CONTROL WORD TO FD\;    003  47C0 EFF
21700   $       TAMA     (C,A0,ALUEZ,A,QR)     \TEST CONTROL WORD =0\;       004  0470 200
21800   $       BR       (SINIT020)            \GO TO *-2 IF STILL =0\;      005  CC38 6CC
21900
22000           \CONTROL WORD READY (NOT =0)\
22100   $       SC       (0,RSRCRSYN,B0,Q,QR)  \RESET RCRSYN\;               006  C2C1 4C0
22200   $       RER      (FF#,A8,B8,D,FR)      \READ CONTROL WORD TO RFR2\;  007  47B8 EFF
22300   $       TAMA     (01#,A8,ALUEZ,DANDA,QR) \TEST CONTROL WORD BIT 7\;  008  2578 2C1
22400   $       BR       (SINIT400)            \EI =0 (NO REV RPRT RQRD)\;   009  C128 6CC
22500
22600           \FIRMWARE REVISION LEVEL REPORT REQUIRED  (CW BIT 7 =1)\
22700   SINIT040  TAMA   (C,A0,RFMIR,Q,QR)     \TEST FIFO MEMORY READY\;     00A  C220 2C0
22800   $       BR       (SINIT040)            \ER TO *-1 IF NOT READY\;     00B  CCAB 6CC
22900           \FIFO MEMORY AVAILABLE  (RFMIR SET)\
23000   $       MMP      (FD#,A5,B5,D,FR)      \SET RSD =FD\;                00C  4755 CFD
23100   $       SC       (0,WRRFMBS,B5,A,FR)   \COPY RSB TO FIFO BUFFER\;    00D  4455 4C0
23200   $       SC       (0,WRRFMS,B0,Q,QR)    \CCPY FIFO BFR TO FIFO/STAT\; 00E  C2C2 4C0
23300   $       MMP      (0,A0,B0,Q,QR)        \NOP FOR DELAY\;              00F  C2C0 C00
23400   $       SC       (C,WRRFMBD,B6,A,FR)   \COPY RDB TO FIFO BUFFER\;    010  4466 4C0
23500   $       SC       (C,WRRFMD,B0,Q,QR)    \CCPY FIFO BFR TO FIFO/DATA\; 011  C2C3 400
23600
23700
23800           \NO FIRMWARE REVISION LEVEL REPORT REQUIRED, OR
23900             FIRMWARE REVISION LEVEL REPORT COMPLETED\
24000   SINIT400  MMP    (0,AF,BF,D,FR)        \SET RSRDD/07 =0\;            012  47FF CC0
24100   $       MMR      (8,AA,BA,D,FR)        \SET RBSR =8\;                013  47AA CC8
24200   $       MMP      (F8#,A8,B8,DANDA,FR)  \SET RSC =C\;                 014  65B8 CF8
24300   $       MMP      (0,A7,B7,D,FR)        \SET RBSC =0\;                015  4777 000
24400   $       MMP      (CC#,A5,B5,D,FR)      \SET RSB =0\;                 016  4755 CCC
24500   $       MMP      (CC#,A9,B9,D,FR)      \SET RILSFLG,ROSD,            017  4799 CC0
24600                                            RSRB,RBSPFLG,RDHBT,
24700                                            RFUS,REOFFLG,RILS
24800                                             =C,0,0,0,0,0,0,0\;
24900   $       MMP      (2C#,A4,B4,D,FR)      \SET RSRCSTATE =FIRST\;       018  4744 C20
25000   $       MMP      (CC#,A2,B2,D,FR)      \SET RDTCSTATE =OFF.          019  4722 CC0
25100                                            SET RBSR4 =0\;
25200   $       MMP      (CC#,A3,B3,D,FR)      \SET RFCSTATE =OFF\;          01A  4733 CC0
25300   $       BRSC     (SREXEC00,RSRRDY)     \RESET RRDY. DONE\;           01B  C1C0 6C0
25400
25500
25600   SKIP HCF;
25700
25800
25900           \**********************\
26000           \**                  **\
26100           \**  RECEIVE EXECUTIVE  **\
26200           \**                  **\
26300           \**********************\
26400
26500
26600
26700   SREXEC00  TAMA   (0,A0,RRDY,Q,QR)      \TEST RREADY\;                01C  0200 200
26800   $       BR       (1REXEC05)            \EI RESET\;                   01D  01F8 6CC
26900
27000           \NEXT BIT READY  (RREADY SET)\
27100   $       BRSC     (SRSRC000,RSRRDY)     \RESET RREADY. GO TO RSRC\;   01E  C3C0 6C0
27200
27300           \NEXT BIT NOT READY  (RREADY RESET)\
27400   SREXEC05  TAMA   (FC#,A2,ALUNEZ,DANDA,QR) \TEST RDTCSTATE =OFF\;     01F  2562 2F0
27500   $       BR       (SRDTC000)            \GO TO RDTC IF NOT =OFF\;     020  21F8 600
27600
27700           \RDTCSTATE =OFF\
27800   $       TAMA     (0,A0,RCRSYN,Q,QR)    \TEST RCRSYN\;                021  0240 200
27900   $       BR       (SRRC0000)            \GO TO RRC IF SET\;           022  0268 600
28000
28100           \NO RECEIVE RESYNC REQUIRED  (RCRSYN RESET)\
28200   $       TAMA     (C,A3,ALUNEZ,A,QR)    \TEST RFCSTATE =OFF\;         023  0463 200
28300   $       BR       (SRFC0000)            \GO TO RFC IF NOT =OFF\;      024  269B 600
```

```
28400
28500              \RFCSTATE =OFF\
28600    $        BR       ($REXEC00)              \DCNE\;                        025  C1C8 600
28700
28800
28900    SKIP HOF;
29000
29100
29200              \*****************************\
29300              \**                          **\
29400              \**  RECEIVE RESYNC CONTROL  **\
29500              \**                          **\
29600              \*****************************\
29700
29800
29900
30000    $RRC0000  MMP      (CC#,A2,B2,D,FR)        \SET PDTCSTATE =OFF.           026  4722 000
30100                                                SET RBSR4 =0\;
30200    $        MMP      (CC#,A3,B3,D,FR)        \SET RFCSTATE =OFF\;            027  4733 C00
30300    $        MMP      (CC#,A5,B5,D,FR)        \SET RS0 =C\;                   028  4755 CCC
30400    $        MMP      (CC#,A9,B9,D,FR)        \SET RILSFLG,ROSD,              029  4799 000
30500                                               RSRB,RDSMFLG,RDHBT,
30600                                               RFUS,REOFFLG,RILS
30700                                               =0,0,0,0,C,0,C,0\;
30800              \(CONTINUE PER RSRCSTATE)\
30900    $        TAPN     (20#,A4,ALUNEZ,DANDA,QR) \TEST RSRCSTATE BIT 2\;         02A  2564 220
31000    $        BR       ($RRC0020)              \BI =1\;                        02B  02F8 600
31100
31200              \RSRCSTATE BIT 2 =0\
31300              \RSRCSTATE =ADRS EXT A, =ADRS EXT B, =CNTRL A, =CNTRL B,
31400               =CNTRL EXT, =TCB, =LCF, =TEXT, =OVRN WAIT, OR =OVRN\
31500    $        MMP      (21#,A4,B4,D,FR)        \SET RSRCSTATE =OUTASYNC\;      02C  4744 C21
31600    $        MMP      (8,AA,BA,D,FR)          \SET RBSR =8\;                  02D  47AA 0C8
31700    $        BRSC     ($REXEC00,RSRCRSYN)     \RESET RCRSYN.  DONE\;          02E  C1C1 6C0
31800
31900              \RSRCSTATE BIT 2 =1\
32000              \RSRCSTATE =FIRST, =OUTASYNC, =ABORT,
32100               =INSYNC, OR =ADDRESS\
32200    $RRC0020  BRSC    ($REXEC00,RSRCRSYN)     \RESET RCRSYN.  DONE\;          02F  C1C1 6CC
32300
32400
32500    SKIP HOF;
32600
32700
32800              \*****************************\
32900              \**                          **\
33000              \**  RECEIVE SHIFT REGISTER CCNTRCL ROUTINE  **\
33100              \**                          **\
33200              \*****************************\
33300
33400
33500
33600
33700              \**  INITIAL PROCESSING AND STATE SELECTION  **\
33800
33900
34000              \TEST ENTRY VALUE OF R5C\
34100    $RSRC000  MMP      (C7#,A8,B0,DANDA,FR)   \EXTRACT R5C TO FC\;            C30  65C8 CC7
34200    $        TAPA     (5,A0,ALUNEZ,DMA,QR)    \TST R5C =5\;                   C31  1560 305
34300    $        BR       ($RSRC005)              \BI R5C NOT =5\;                C32  C358 600
34400
34500              \R5C =5 AT ENTRY\
34600    $        MMP      (F0#,A8,B8,DANDA,FR)    \SET R5C =C\;                   C33  6588 CF8
34700    $        BR       ($RSRC010)              \GC TO SHARED CODING BELOW\;    C34  03F8 600
34800
34900              \R5C NOT =5 AT ENTRY\
35000    $RSRC005  TAPN     (4C#,A4,ALUNEZ,DANDA,QR) \TST RSRCSTATE BIT 1\;         C35  2564 240
35100    $        BR       ($RSRC100)              \BI =1\;                        C36  C438 6C0
35200
35300              \RSRCSTATE BIT 1 =0  (RSRCSTATE =FIRST, =OUTASYNC, =ABORT,
35400               =INSYNC, =CVRN WAIT, OR =OVRN)\
35500    $        MMP      (0,A7,B7,AP1,FR)        \INCREMENT RDSC\;               037  4477 100
35600    $        TAPN     (0A#,A4,ALUNEZ,DMA,QR)  \TEST RSRCSTATE =OVRN WAIT\;    038  1564 30A
35700    $        BR       ($RSRC010)              \BI NOT =OVRN WAIT\;            039  03F8 600
35800
35900              \RSRCSTATE =OVERRUN WAIT\;
36000              \(UPDATE R5C)\
36100    $        TAPN     (C1#,AF,ALUNEZ,DANDA,QR) \TEST RSRC7\;                  03A  256F 2C1
36200    $        BR       ($RSRC008)              \BI =1\;                        03B  03E8 600
36300              \RSRC7 =0\
36400    $        MMP      (F0#,A8,B8,DANDA,FR)    \SET R5C =C\;                   03C  6588 0F8
36500    $        BR       ($RSRC010)              \GC TO SHARED CODING BELOW\;    03D  C3F8 6CC
36600              \RSRC7 =1\
36700    $RSRC008  MMP     (0,A8,B8,AP1,FR)        \INCREMENT R5C\;                03E  4488 100
36800              \SHARED CODING  (SHIFT RSR0C/07 AND INPUT NEXT DATA BIT)\
36900    $RSRC010  MPF     (C,AF,BF,A,QR)          \MCVE RSR0C/07 TO QR\;          03F  C4FF CCC
37000    $        MMP      (0,A0,B0,A,SR0F)        \SHIFT IN NEXT BIT\;            040  84C0 000
37100    $        PPP      (0,AF,BF,Q,FR)          \SAVE UPDATED RSR00/07\;        041  42FF CC0
37200    $        BR       ($RSRC200)              \CCNTINUE BELOW\;               042  C518 600
37300
37400              \RSRCSTATE BIT 1 =1  (ENTIRE SHIFT REGISTER
37500               MUST BE SHIFTED)\
37600              \(SHIFT RSR00 THRU RSR31 AND INPUT NEW BIT)\
37700    $RSRC100  MMP     (0,A0,B0,A,QR)          \MCVE RSR16/23 TO QR\;          043  04D0 CC0
37800    $        MMP     (0,AC,BC,A,SR0F)         \SHIFT INTC RSR24/31\;          044  84CC CC0
```

```
37900  $          MPP     (O,AE,BE,A,QR)          \MOVE RSROP/15 TO QR\;           045  C4EE CC0
38000  $          MMP     (O,AD,BD,A,SRQF)        \SHIFT INTO RSR16/23\;           046  84C0 C00
38100  $          PPP     (C,AF,BF,A,QR)          \MOVE RSROC/07 TO QR\;           047  C4FF CC0
38200  $          PPF     (C,AE,BE,A,SRQF)        \SHIFT INTO RSR08/15.            048  84EE C00
38300                                              SHIFT IN NEXT BIT\;
38400  $          MPP     (C,AF,BF,O,FR)          \SAVE UPDATED RSR00/07\;         049  42FF C00
38500             \(CONTINUE)\
38600  $          UFCSR   (C,AE,BE,A,FR)          \UPDATE FCS REGISTER\;           04A  44EE CC0
38700  $          PPP     (O,A7,B7,AP1,FR)        \INCREMENT RSC\;                 04B  4477 1C0
38800             \UPDATE RSC\
38900  $          TAPA    (8C#,AE,ALUNEZ,DANDA,QR) \TEST RSROP\;                   04C  256E 280
39000  $          BR      ($RSRC120)              \PI =1\;                         04D  C5C8 600
39100             \RSRC8 =0\
39200  $          PPP     (F8#,A8,B8,DANDA,FR)    \SET RSC =0\;                    04E  6583 0F8
39300  $          BR      ($RSRC200)              \CONTINUE BELOW\;                04F  C518 6CC
39400             \RSRC8 =1\
39500  $RSRC120   MMP     (O,A8,B8,AP1,FR)        \INCREMENT RSC.                  050  44F8 1C0
39600                                              CONTINUE BELOW\;
39700
39800             \TEST FOR FLAG SEQUENCE IN RSRCC/C7\
39900  $RSRC200   TAPA    (7E#,AF,ALUEZ,DMA,QR)   \TST FOR FLAG IN RSR00/07\;      051  157F 37E
40000  $          BR      ($RSRC600)              \BI RSR CONTAINS FLAG\;          052  0A28 600
40100             \TEST FOR ABORT SEQUENCE IN RSROC/C7\
40200  $          PPF     (FE#,AF,BO,DANDA,FR)    \EXTRACT BITS 0 THRU 6\;         053  65CF CFE
40300  $          TAPA    (FE#,AO,ALUEZ,DMA,QR)   \TST FOR ABORT\;                 054  1570 3FE
40400  $          BR      ($RSRC800)              \BI RSR CONTAINS ABORT\;         055  0A88 60C
40500
40600
40700
40800             \ AC FLAG OR ABORT RECEIVED \
40900
41000             \TEST UPDATED RSC\
41100  $          MPP     (07#,A8,B0,DANDA,FR)    \EXTRACT RSC TO FO\;             056  65C8 C07
41200  $          TAPA    (5,AO,ALUEZ,DMA,QR)     \TST RSC =5\;                    057  1570 3C5
41300  $          BR      ($REXEC00)              \DONE IF =5\;                    058  01C8 6CC
41400             \RSC NOT =5. TEST FOR BYTE BOUNDARY\
41500  $          TAPA    (O,AA,ALUEZ,AMB,QR)     \TST RBSC(F7) = RPSR(FA)\;       059  117A 300
41600  $          BR      ($RSRC400)              \BI EQUAL(BYTE BADRY)\;          05A  C5C8 6CC
41700  $          BR      ($REXEC00)              \DONE IF NOT EQUAL\;             05B  01C8 600
41800
41900
42000             \ BYTE BOUNDARY. BRANCH PER RSRCSTATE \
42100
42200  $RSRC400   TAPA    (8C#,A4,ALUEZ,DANDA,QR) \TST RSRCSTATE BIT 0\;           05C  2574 280
42300  $          BR      ($RSRC450)              \BI BIT 0 =0\;                   05D  07C8 600
42400             \BIT 0=1\
42500  $          TAPA    (C8#,A4,ALUEZ,DANDA,QR) \TST BIT 4\;                     05E  2574 2C8
42600  $          BR      ($RSRC430)              \BI BIT 4 =0\;                   05F  C688 600
42700             \BIT 0 =1, BIT 4 =1\
42800  $          TAPA    (2,A4,ALUEZ,DANDA,QR)   \TST BIT 6\;                     060  2574 2C2
42900  $          BR      ($RSRC420)              \BI BIT 6 =0\;                   061  C658 600
43000             \BIT 0 =1, BIT 4 =1, BIT 6 =1\
43100  $          TAPA    (1,A4,ALUEZ,DANDA,QR)   \TST BIT 7\;                     062  2574 2C1
43200  $          BR      ($LCF0000)              \BI BIT 7 =0(LCF)\;              063  1978 600
43300  $          BR      ($TEXT000)              \BI BIT 7 =1(TEXT)\;             064  1A68 600
43400             \BIT 0 =1, BIT 4 =1, BIT 6 =0\
43500  $RSRC420   TAPA    (1,A4,ALUEZ,DANDA,QR)   \TST BIT 7\;                     065  2574 201
43600  $          BR      ($CNTX000)              \BI BIT 7 =0(CNTRLX)\;           066  1698 600
43700  $          BR      ($TCB0000)              \BI BIT 7 =1(TCB)\;              067  1728 600
43800             \BIT 0 =1, BIT 4 =0\
43900  $RSRC430   TAPA    (2,A4,ALUEZ,DANDA,QR)   \TST BIT 6\;                     068  2574 2C2
44000  $          BR      ($RSRC440)              \BI BIT 6 =0\;                   069  0608 600
44100             \BIT 0 =1, BIT 4 =0, BIT 6 =1\
44200  $          TAPA    (1,A4,ALUEZ,DANDA,QR)   \TST BIT 7\;                     06A  2574 2C1
44300  $          BR      ($CNTAU00)              \BI BIT 7 =0(CNTRL/A)\;          06B  12F8 6CC
44400  $          BR      ($CNTB000)              \BI BIT 7 =1(CNTRL/B)\;          06C  16C8 600
44500             \BIT 0 =1, BIT 4 =0, BIT 6 =0\
44600  $RSRC440   TAPA    (1,A4,ALUEZ,DANDA,QR)   \TST BIT 7\;                     06D  2574 2C1
44700  $          BR      ($ADXA000)              \BI BIT 7 =0(ADRSX/A)\;          06E  1058 6CC
44800  $          BR      ($ADXB000)              \BI BIT 7 =1(ADRSX/B)\;          06F  1218 600
44900             \BIT 0 =0\
45000  $RSRC450   TAPA    (C8#,A4,ALUEZ,DANDA,QR) \TST BIT 4\;                     070  2574 2C8
45100  $          BR      ($RSRC480)              \BI BIT 4 =0\;                   071  07A8 600
45200             \BIT 0 =0, BIT 4 =1\
45300  $          TAPA    (2,A4,ALUEZ,DANDA,QR)   \TST BIT 6\;                     072  2574 202
45400  $          BR      ($RSRC470)              \BI BIT 6 =0\;                   073  0778 600
45500             \BIT 0 =0, BIT 4 =1, BIT 6 =1\
45600  $          TAPA    (1,A4,ALUEZ,DANDA,QR)   \TST BIT 7\;                     074  2574 2C1
45700  $          BR      ($OVRW000)              \BI BIT 7 =0(OVRN WAIT)\;        075  18C8 600
45800  $          BR      ($CVRN000)              \BI BIT 7 =1(OVRN)\;             076  1888 600
45900             \BIT 0 =0, BIT 4 =1, BIT 6 =0\
46000  $RSRC470   TAPA    (1,A4,ALUEZ,DANDA,QR)   \TST BIT 7\;                     077  2574 201
46100  $          BR      ($ADRW000)              \BI BIT 7 =0(ADDRESS WAIT)\;     078  0F48 600
46200  $          BR      ($ADRS000)              \BI BIT 7 =1(ADDRESS)\;          079  0F78 600
46300             \BIT 0 =0, BIT 4 =0\
46400  $RSRC480   TAPA    (2,A4,ALUEZ,DANDA,QR)   \TST BIT 6\;                     07A  2574 2C2
46500  $          BR      ($RSRC490)              \BI BIT 6 =0\;                   07B  07F8 600
46600             \BIT 0 =0, BIT 4 =0, BIT 6 =1\
46700  $          TAPA    (1,A4,ALUEZ,DANDA,QR)   \TST BIT 7\;                     07C  2574 2C1
46800  $          BR      ($ABRT000)              \BI BIT 7 =0(ABORT)\;            07D  0D78 6C0
46900  $          BR      ($INSC000)              \BI BIT 7 =1(INSYNC)\;           07E  0E78 600
47000             \BIT 0 =0, BIT 4 =0, BIT 6 =0\
47100  $RSRC490   TAPA    (1,A4,ALUEZ,DANDA,QR)   \TST BIT 7\;                     07F  2574 201
47200  $          BR      ($FRST000)              \BI BIT 7 =0(FIRST)\;            080  0CE8 600
```

```
47300   $         BR      ($OUTA000)          \BI BIT 7 =1(OUTASYNC)\;           081  0038 600
47400
47500
47600
47700           \ FLAG SEQUENCE RECEIVED. BRANCH PER RSRCSTATE \
47800
47900   SRSRC600  TAPA    (8C#,A4,ALUEZ,DANDA,QR)  \TST RSRCSTATE BIT 0\;        082  2574 280
48000   $         BR      ($RSRC650)          \BI BIT 0 =0\;                     083  0968 600
48100           \BIT 0 =1\
48200   $         TAPA    (08#,A4,ALUEZ,DANDA,QR)  \TST BIT 4\;                  084  2574 208
48300   $         BR      ($RSRC630)          \BI BIT 4 =0\;                     085  0AE8 600
48400           \BIT 0 =1, BIT 4 =1\
48500   $         TAPA    (2,A4,ALUEZ,DANDA,QR)    \TST BIT 6\;                  086  2574 202
48600   $         BR      ($RSRC620)          \BI BIT 6 =0\;                     087  CBB8 6CO
48700           \BIT 0 =1, BIT 4 =1, BIT 6 =1\
48800   $         TAPA    (1,A4,ALUEZ,DANDA,QR)    \TST BIT 7\;                  088  2574 2C1
48900   $         BR      ($LCF0600)          \BI BIT 7 =0(LCF)\;                089  1A48 6CO
49000   $         BR      ($TEXT600)          \BI BIT 7 =1(TEXT)\;               08A  1AE8 6CO
49100           \BIT 0 =1, BIT 4 =1, BIT 6 =0\
49200   SRSRC620  TAPA    (1,A4,ALUEZ,DANDA,QR)    \TST BIT 7\;                  08B  2574 201
49300   $         BR      ($CNTX600)          \BI BIT 7 =0(CNTRLX)\;             08C  ....  ...
49400   $         BR      ($CB0600)           \BI BIT 7 =1(ICB)\;                08D  1958 600
49500           \BIT 0 =1, BIT 4 =0\
49600   SRSRC630  TAPA    (2,A4,ALUEZ,DANDA,QR)    \TST BIT 6\;                  08E  2574 202
49700   $         BR      ($RSRC640)          \BI BIT 6 =0\;                     08F  0938 6CO
49800           \BIT 0 =1, BIT 4 =0, BIT 6 =1\
49900   $         TAPA    (1,A4,ALUEZ,DANDA,QR)    \TST BIT 7\;                  090  2574 201
50000   $         BR      ($CNTA600)          \BI BIT 7 =0(CNTRL/A)\;            091  15E8 6CC
50100   $         BR      ($CNTB600)          \BI BIT 7 =1(CNTRL/B)\;            092  1678 6CO
50200           \BIT 0 =1, BIT 4 =0, BIT 6 =0\
50300   SRSRC640  TAPA    (1,A4,ALUEZ,DANDA,QR)    \TST BIT 7\;                  093  2574 201
50400   $         BR      ($ADXA600)          \BI BIT 7 =0(ADRSX/A)\;            094  1158 6CC
50500   $         BR      ($ADXB600)          \BI BIT 7 =1(ADRSX/B)\;            095  12C8 6CC
50600           \BIT 0 =C\
50700   SRSRC650  TAPA    (C8#,A4,ALUEZ,DANDA,QR)  \TST BIT 4\;                  096  2574 208
50800   $         BR      ($RSRC680)          \BI BIT 4 =0\;                     097  CAC8 600
50900           \BIT 0 =0, BIT 4 =1\
51000   $         TAPA    (2,A4,ALUEZ,DANDA,QR)    \TST BIT 6\;                  098  2574 202
51100   $         BR      ($RSRC670)          \BI BIT 6 =0\;                     099  09C8 600
51200           \BIT 0 =C, BIT 4 =1, BIT 6 =1\
51300   $         TAPA    (1,A4,ALUEZ,DANDA,QR)    \TST BIT 7\;                  09A  2574 2C1
51400   $         BR      ($OVRW600)          \BI BIT 7 =0(OVRN WAIT)\;          09B  1948 600
51500   $         BR      ($OVRN600)          \BI BIT 7 =1(OVRN)\;               09C  1AA8 600
51600           \BIT 0 =0, BIT 4 =1, BIT 6 =0\
51700   SRSRC670  TAPA    (1,A4,ALUEZ,DANDA,QR)    \TST BIT 7\;                  09D  2574 2C1
51800   $         BR      ($ADRW600)          \BI BIT 7 =0(ADDRESS WAIT)\;       09E  0F58 600
51900   $         BR      ($ADRS600)          \BI BIT 7 =1(ADDRESS)\;            09F  1038 6CO
52000           \BIT 0 =0, BIT 4 =0\
52100   SRSRC680  TAPA    (2,A4,ALUEZ,DANDA,QR)    \TST BIT 6\;                  0A0  2574 2C2
52200   $         BR      ($RSRC690)          \BI BIT 6 =0\;                     0A1  0A58 600
52300           \BIT 0 =0, BIT 4 =0, BIT 6 =1\
52400   $         TAPA    (1,A4,ALUEZ,DANDA,QR)    \TST BIT 7\;                  0A2  2574 2C1
52500   $         BR      ($ABRT600)          \BI BIT 7 =0(ABORT)\;              0A3  C0A8 6CO
52600   $         BR      ($INSC600)          \BI BIT 7 =1(INSYNC)\;             0A4  0F28 600
52700           \BIT 0 =0, BIT 4 =0, BIT 6 =0\
52800   SRSRC690  TAPA    (1,A4,ALUEZ,DANDA,QR)    \TST BIT 7\;                  0A5  2574 201
52900   $         BR      ($FRST600)          \BI BIT 7 =0(FIRST)\;              0A6  0018 600
53000   $         BR      ($0UTA600)          \BI BIT 7 =1(OUTASYNC)\;           0A7  0058 600
53100
53200
53300
53400           \ ABORT SEQUENCE RECEIVED. BRANCH PER RSRCSTATE \
53500
53600   SRSRC800  TAPA    (8C#,A4,ALUEZ,DANDA,QR)  \TST RSRCSTATE BIT 0\;        0A8  2574 280
53700   $         BR      ($RSRC850)          \BI BIT 0 =0\;                     0A9  08C8 600
53800           \BIT 0 =1\
53900   $         TAPA    (CE#,A4,ALUEZ,DANDA,QR)  \TST BIT 4\;                  0AA  2574 2C8
54000   $         BR      ($RSRC830)          \BI BIT 4 =0\;                     0AB  0B48 600
54100           \BIT 0 =1, BIT 4 =1\
54200   $         TAPA    (2,A4,ALUEZ,DANDA,QR)    \TST BIT 6\;                  0AC  2574 202
54300   $         BR      ($RSRC820)          \BI BIT 6 =0\;                     0AD  0A18 600
54400           \BIT 0 =1, BIT 4 =1, BIT 6 =1\
54500   $         TAPA    (1,A4,ALUEZ,DANDA,QR)    \TST BIT 7\;                  0AE  2574 201
54600   $         BR      ($LCF0800)          \BI BIT 7 =0(LCF)\;                0AF  1A58 6CO
54700   $         BR      ($TEXT800)          \BI BIT 7 =1(TEXT)\;               0B0  1AF8 6CO
54800           \BIT 0 =1, BIT 4 =1, BIT 6 =0\
54900   SRSRC820  TAPA    (1,A4,ALUEZ,DANDA,QR)    \TST BIT 7\;                  0B1  2574 201
55000   $         BR      ($CNTX800)          \BI BIT 7 =0(CNTRLX)\;             0B2  1718 6CO
55100   $         BR      ($ICB0800)          \BI BIT 7 =1(ICB)\;                0B3  1968 6CO
55200           \BIT 0 =1, BIT 4 =0\
55300   SRSRC830  TAPA    (2,A4,ALUEZ,DANDA,QR)    \TST BIT 6\;                  0B4  2574 202
55400   $         BR      ($RSRC840)          \BI BIT 6 =0\;                     0B5  0858 6CC
55500           \BIT 0 =1, BIT 4 =0, BIT 6 =1\
55600   $         TAPA    (1,A4,ALUEZ,DANDA,QR)    \TST BIT 7\;                  0B6  2574 201
55700   $         BR      ($CNTA800)          \BI BIT 7 =0(CNTRL/A)\;            0B7  15F8 6CO
55800   $         BR      ($CNTB800)          \BI BIT 7 =1(CNTRL/B)\;            0B8  1688 6CO
55900           \BIT 0 =1, BIT 4 =0, BIT 6 =0\
56000   SRSRC840  TAPA    (1,A4,ALUEZ,DANDA,QR)    \TST BIT 7\;                  0B9  2574 201
56100   $         BR      ($ADXA800)          \BI BIT 7 =0(ADRSX/A)\;            0BA  12C8 6CO
56200   $         BR      ($ADXB800)          \BI BIT 7 =1(ADRSX/B)\;            0BB  12C8 6CO
56300           \BIT 0 =0\
56400   SRSRC850  TAPA    (0E#,A4,ALUEZ,DANDA,QR)  \TST BIT 4\;                  0BC  2574 2C8
56500   $         BR      ($RSRC880)          \BI BIT 4 =0\;                     0BD  CC68 6CO
56600           \BIT 0 =0, BIT 4 =1\
56700   $         TAPA    (2,A4,ALUEZ,DANDA,QR)    \TST BIT 6\;                  0BE  2574 202
```

```
56800    S          BR      ($RSRC870)              \EI BIT 6 =0\;                      0BF   0C38 6CC
56900                       \BIT 0 =0, BIT 4 =1, BIT 6 =1\
57000    S          TAPA    (1,A4,ALUEZ,DANDA,QR)   \TST BIT 7\;                        0C0   2574 2C1
57100    S          BR      ($CVRW800)              \EI BIT 7 =0(OVRN WAIT)\;           0C1   1B78 6CC
57200    S          BR      ($CVRW800)              \EI BIT 7 =1(OVRN)\;                0C2   1C18 6C0
57300                       \BIT 0 =0, BIT 4 =1, BIT 6 =0\
57400    $RSRC870   TAPA    (1,A4,ALUEZ,DANDA,QR)   \TST BIT 7\;                        0C3   2574 2C1
57500    S          BR      ($ADRW800)              \EI BIT 7 =0(ADDRESS WAIT)\;        0C4   CF68 6CC
57600    S          BR      ($ADRS800)              \EI BIT 7 =1(ADDRESS)\;             0C5   1048 600
57700                       \BIT 0 =0, BIT 4 =0\
57800    $RSRC880   TAPA    (2,A4,ALUEZ,DANDA,QR)   \TST BIT 6\;                        0C6   2574 2C2
57900    S          BR      ($RSRC890)              \EI BIT 6 =0\;                      0C7   CCE8 6CC
58000                       \BIT 0 =0, BIT 4 =0, BIT 6 =1\
58100    S          TAPA    (1,A4,ALUEZ,DANDA,QR)   \TST BIT 7\;                        0C8   2574 201
58200    S          BR      ($ABRT800)              \EI BIT 7 =0(ABORT)\;               0C9   CDB8 6CC
58300    S          BR      ($INSC800)              \EI BIT 7 =1(INSYNC)\;              0CA   CF38 6C0
58400                       \BIT 0 =0, BIT 4 =0, BIT 6 =0\
58500    $RSRC890   TAPA    (1,A4,ALUEZ,DANDA,QR)   \TST BIT 7\;                        0CB   2574 2C1
58600    S          BR      ($FRST800)              \EI BIT 7 =0(FIRST)\;               0CC   0D28 600
58700    S          BR      ($CUTA800)              \EI BIT 7 =1(OUTASYNC)\;            0CD   CD68 6C0
58800
58900
59000
59100
59200
59300
59400                       \****** FIRST STATE ******\
59500
59600
59700                       \** BYTE BOUNDARY **\
59800
59900    $FRST000   MMP     (C,A7,B7,D,FR)          \SET RBSC =0\;                      0CE   4777 0C0
60000    S          MMP     (21#,A4,B4,D,FR)        \SET RSRCSTATE =OUTASYNC\;          0CF   4744 C21
60100    S          BR      ($REXEC00)              \DONE\;                             0D0   C1C8 6C0
60200
60300
60400                       \** FLAG RECEIVED **\
60500
60600    $FRST6C0   BR      ($FRST000)              \BRANCH\;                           0D1   CCE8 600
60700
60800
60900                       \** ABORT RECEIVED **\
61000
61100    $FRST8C0   BR      ($SETA000)              \BR TO SET ABORT SUBR\;             0D2   1C98 6C0
61200
61300
61400
61500
61600                       \****** CUTASYNC STATE ******\
61700
61800
61900                       \** BYTE BOUNDARY **\
62000
62100    $OUTAC00   MMP     (C,A7,B7,D,FR)          \SET RBSC =0\;                      0D3   4777 CC0
62200    S          BR      ($REXEC00)              \DONE\;                             0D4   C1C8 6C0
62300
62400
62500                       \** FLAG RECEIVED **\
62600
62700    $OUTA6C0   BR      ($SETI000)              \BR TO SET INSYNC SUBR\;            0D5   1F48 6CC
62800
62900
63000                       \       ABORT RECEIVED **\
63100
63200    $OUTA8C0   BR      ($SETA000)              \BR TO SET ABORT SUBR\;             0D6   1C98 600
63300
63400
63500
63600
63700                       \****** ABORT STATE ******\
63800             *
63900
64000                       \** BYTE BOUNDARY **\
64100
64200    $ABRTC00   MMP     (C,A7,B7,D,FR)          \SET RBSC =0\;                      0D7   4777 CC0
64300    S          MMP     (21#,A4,B4,D,FR)        \SET RSRCSTATE =OUTASYNC\;          0D8   4744 C21
64400    S          BR      ($REXEC00)              \DONE\;                             0D9   C1C8 600
64500
64600
64700                       \** FLAG RECEIVED **\
64800
64900    $ABRT6C0   BR      ($SETI000)              \BR TO SET INSYNC SUBR\;            0DA   1F48 6CC
65000
65100
65200                       \** ABORT RECEIVED **\
65300
65400    $ABRT8C0   TAPA    (8,A7,ALUNEZ,DMA,QR)    \TST RBSC =8\;                      0DB   1567 308
65500    S          BR      ($REXEC00)              \DONE IF NOT =8\;                   0CC   C1C8 6CC
65600                       \BYTE BOUNDARY\
65700    S          MMP     (0,A7,B7,D,FR)          \=8. SET RBSC =0\;                  0DD   4777 000
65800    S          TAPA    (C1#,AF,ALUEZ,DANDA,QR) \EXTRACT RSRQ7, TST\;               0DE   257F 2C1
65900    S          BR      ($REXEC00)              \DONE IF =0\;                       0DF   01C8 6CC
66000                       \IDLE LINK STATE\
66100    S          TAPA    (01#,A9,ALUNEZ,DANDA,QR)\=1. EXTRACT RILS, TST\;            0E0   2569 201
```

```
66200   S          BR      (SREXEC00)              \DONE IF =1\;                    0E1   01C8 600
66300                      \IDLE LINK STATE NOT PREVIOUSLY REPORTED (RILS =0)\
66400   S          MMP     (81#,A9,B9,DORA,FR)     \SET RILSFLG,RILS =1,1\;         0E2   5D59 0A1
66500   S          TAMA    (0,A3,ALUNEZ,A,QR)      \TEST RFCSTATE =OFF\;            0E3   0463 2CC
66600   S          BR      (SREXEC00)              \DONE IF NOT =OFF\;              0E4   01C8 600
66700                      \RFCSTATE =OFF\
66800   S          MMP     (CC#,A3,B3,D,FR)        \SET RFCSTATE =IDLE              0E5   4733 CC0
66900                                               LINK - MISSED FRAMES\;
67000   S          BR      (SREXEC00)              \DONE\;                          0E6   01C8 600
67100
67200
67300
67400
67500                      \****** INSYNC STATE ******\
67600
67700
67800                      \** BYTE BOUNDARY **\
67900
68000   SINSC000   MMP     (F8#,A8,B8,DANDA,FR)    \SET RSC =0\;                    0E7   6588 CF9
68100   S          MPP     (C,A7,B7,D,FR)          \SET RBSC =0\;                   0E8   4777 C00
68200   S          PPP     (F7#,A9,B9,DANDA,FR)    \SET RDMHT =0\;                  0E9   6599 0F7
68300   S          TAMA    (2C#,A9,ALUEZ,DANDA,QR) \EXTRACT RSRB, TST\;             0EA   2579 220
68400   S          BR      (SINSC020)              \BI =0\;                         0EB   0EF8 6C0
68500
68600                      \SHIFT AND FCS REGISTERS BUSY FROM PREVIOUS
68700                       FRAME = OVERRUN (RSRB =1)\
68800   S          PPP     (2C#,AA,BA,D,FR)        \SET RPSR =32\;                  0EC   47AA C20
68900   S          PPP     (CA#,A4,B4,D,FR)        \SET RSRCSTATE =OVRN WAIT\;      0ED   4744 CCA
69000   S          BR      (SREXEC00)              \DONE\;                          0EE   01C8 600
69100
69200                      \SHIFT AND FCS REGISTERS AVAILABLE (RSRB =0)\
69300   SINSC020   PPP     (18#,AA,BA,D,FR)        \SET RPSR =24\;                  0EF   47AA C18
69400   S          PPP     (69#,A4,B4,D,FR)        \SET RSRCSTATE =ADDRESS\;        0F0   4744 C69
69500   S          BRSC    (SREXEC00,PSRFCSR)      \PRESET FCS REG, DONE\;          0F1   01C7 600
69600
69700
69800                      \** FLAG RECEIVED **\
69900
70000   SINSC600   BR      (SSETI000)              \BR TO SET INSYNC SUBR\;         0F2   1F48 600
70100
70200
70300                      \** ABORT RECEIVED **\
70400
70500   SINSC800   BR      (SSETA000)              \BR TO SET ABORT SUBR\;          0F3   1C98 600
70600
70700
70800
70900
71000                      \****** ADDRESS WAIT STATE ******\
71100
71200
71300                      \** BYTE BOUNDARY **\
71400
71500   SADRW0C0   BR      (SADRW000)              \HALT\;                          0F4   CF48 6CC
71600
71700
71800                      \** FLAG RECEIVED **\
71900
72000   SADRW6C0   BR      (SADRW600)              \HALT\;                          0F5   CF58 6C0
72100
72200
72300                      \** ABORT RECEIVED **\
72400
72500   SADRW8C0   BR      (SADRW800)              \HALT\;                          0F6   CF68 600
72600
72700
72800
72900
73000                      \****** ADDRESS STATE ******\
73100
73200
73300                      \** BYTE BOUNDARY **\
73400
73500                      \(FIRST) ADDRESS FIELD OCTET IN RSR24/31\
73600   SADRS0C0   MMP     (8,AA,BA,D,FR)          \SET RBSR =8\;                   0F7   47AA CC8
73700   S          PPP     (0,A7,B7,D,FR)          \SET RBSC =0\;                   0F8   4777 CC0
73800   S          PPP     (0,AC,B1,A,FR)          \CCPY RSR24/31 TO RDB2\;         0F9   441C CC0
73900   S          RER     (FF#,A0,B0,D,FR)        \READ CONTROL WORD TO F0\;       0FA   47C0 EFF
74000   S          TAMA    (4C#,A0,ALUEZ,DANDA,QR) \EXTRACT RAFX,TST\;              0FB   2570 240
74100   S          BR      (SADRS020)              \BI =0\;                         0FC   1018 600
74200
74300                      \EXTENDED ADDRESS FIELD FORMAT FRAME (RAFX =1)\
74400   S          TAMA    (C1#,AC,ALUNEZ,DANDA,QR)\EXTRACT RSR31,TST\;             0FD   256C 2C1
74500   S          BR      (SADRS020)              \BI =1(LAST ADRS BYTE)\;         0FE   1018 600
74600                      \ANOTHER ADDRESS FIELD OCTET TO FOLLOW (RSR31 =0)\
74700   S          MPP     (CC#,A4,B4,D,FR)        \SET RSRCSTATE =ADRS EXT A\;     0FF   4744 CC0
74800   S          BR      (SREXEC00)              \DONE\;                          100   01C8 600
74900
75000                      \BASIC ADDRESS FIELD FORMAT FRAME (RAFX =0), OR
75100                       LAST ADDRESS FIELD OCTET (RSR31 =1)\
75200   SADRS020   MMP     (C2#,A4,B4,D,FR)        \SET RSRCSTATE =CNTRL A\;        101   4744 0C2
75300   S          BR      (SREXEC00)              \DONE\;                          102   01C8 600
75400
75500
75600                      \** FLAG RECEIVED **\
```

```
75700
75800    SADRS6C0    BR      ($SET1000)                  \BR TO SET INSYNC SUBR\;              103   1F48 600
75900
76000
761C0            \**  ABORT RECEIVED  **\
76200
76300    SADRS8C0    BR      ($SETA000)                  \BR TO SET ABORT SUBR\;               104   1C98 6CC
76400
76500
76600
76700
76800            \******  ADDRESS EXTENSION A STATE  ******\
76900
77000
77100            \**  BYTE BOUNDARY  **\
77200
77300            \SECOND ADDRESS FIELD OCTET IN RSR24/31\
77400    SADXA000    MMP     (0,A7,B7,0,FR)              \SET RBSC =0\;                        105   4777 000
77500    $           TAMN    (0,A3,ALUEZ,A,QR)           \TEST RFCSTATE =OFF(0)\;              106   0473 2CC
77600    $           TAMN    (0,A0,RFMIR,C,QR)           \IF =OFF, TEST FIFO READY\;           107   C220 2C0
77700    $           BR      ($ADXA500)                  \BI RFCSTATE NOT =OFF OR              108   1148 600
77800                                                    FIFO MEMORY NOT AVAILABLE\;
77900
78000
78100            \RFCSTATE =OFF AND FIFO MEMORY AVAILABLE\
78200    $           MMP     (CE#,A9,B9,DCRA,FR)         \SET RDHBT =1\;                       109   5D59 C08
78300    $           MMP     (6E#,A9,09,DANDA,FR)        \SET RHSMFLG,RILSFLG,RTLS             10A   6599 C4E
78400                                                    =0,0,0\;
78500    $           MMP     (C,A1,B6,A,FR)              \CCPY RDB2 TO RDB\;                   10B   4461 CCC
78600    $           MMP     (C,AC,B1,A,FR)              \CCPY RSR24/31 TO RDB2\;              1CC   441C CCC
78700    $           MMP     (2C#,A2,B2,0,FR)            \SET RDTCSTATE =BGN FRAME\;           10D   4722 C20
78800    $           TAMN    (01#,AC,ALUNEZ,DANDA,QR)    \EXTRACT AND TEST RSR31\;             10E   256C 2C1
78900    $           BR      ($ADXA020)                  \BI =1\;                              1CF   1128 6C0
79000
79100            \ANOTHER ADDRESS FIELD OCTET TO FOLLOW (RSR31 =0)\
79200    $           MMP     (C1#,A4,B4,0,FR)            \SET RSRCSTATE =ADRS EXT B\;          110   4744 CC1
79300    $           OR      ($REXEC00)                  \DONE\;                               111   C1C8 6C0
79400
79500            \LAST ADDRESS FIELD OCTET (RSR31 =1)\
79600    SADXA020    MMP     (C3#,A4,B4,0,FR)            \SET RSRCSTATE =CNTRL B\;             112   4744 0C3
79700    $           BR      ($REXEC00)                  \DONE\;                               113   C1C8 6C0
79800
79900
80000            \RFCSTATE NOT =OFF OR FIFO MEMORY NOT AVAILABLE = OVERRUN\
80100    SADXA5C0    BR      ($SET0000)                  \BR TO SET OVRN SUBR\;                114   1F68 600
80200
80300
80400
80500            \**  FLAG RECEIVED  **\
80600
807C0    SADXA6C0    BR      ($ADXA620)                  \BR TO SHARED CODING BELOW\;          115   1168 600
80800
80900
81000            \*  ADRS EXT A, CNTRL A STATES CONTINUED  *\
81100
81200            \(FLAG RECEIVED)\
81300
81400    SADXA620    TAMN    (8,A7,ALUNEZ,DMA,QR)        \TST RBSC =8\;                        116   1567 3C8
81500    $           BR      ($SET1000)                  \GO TO SET INSYNC SUBR IF             117   1F48 6C0
81600                                                    <8 (FRAME <32 BITS)\;
81700
81800            \FRAME CONTAINS 32 BITS (RBSC =8)\
81900    $           TAMN    (0,A3,ALUEZ,A,QR)           \TST RFCSTATE =OFF(0)\;               118   0473 2CC
82000    $           BR      ($ADXA640)                  \BI =OFF\;                            119   11C8 600
82100
82200            \OVERRUN  (RFCSTATE NOT =OFF)\
82300    $           MMP     (40#,A9,B9,DORA,FR)         \SET ROSD =1\;                        11A   5099 C40
82400    $           BR      ($SET1000)                  \BR TO SET INSYNC SUBR\;              11B   1F48 600
82500
82600            \RFCSTATE =OFF\
82700    SADXA640    MMP     (C,A1,B6,A,FR)              \CCPY RDB2 TO RDB\;                   11C   4461 CCC
82800    $           MMP     (3C#,A2,B2,0,FR)            \SET RDTCSTATE =LOAD FIFO\;           11D   4722 C30
82900    $           MMP     (7E#,A9,B9,DANDA,FR)        \SET RILSFLG,RILS =C,0\;              11E   6599 C7E
83000    $           BR      ($EOFF000)                  \BR TO EOFF SUBR\;                    11F   1CE8 6CC
83100
83200
83300
83400            \**  ABORT RECEIVED  **\
83500
83600    SADXA8C0    BR      ($SETA000)                  \BR TO SET ABRT SUBR\;                120   1C98 6C0
83700
83800
83900
84000
84100            \******  ADDRESS EXTENSION B STATE  ******\
84200
84300
84400            \**  BYTE BOUNDARY  **\
84500
84600            \NTH (N =3,4,...) ADDRESS FIELD OCTET IN RSR24/31\
84700    SADXB0C0    MMP     (0,A7,B7,0,FR)              \SET RBSC =0\;                        121   4777 CCC
84800    $           TAMN    (0,A2,ALUEZ,A,QR)           \TEST RDTCSTATE =OFF(0)\;             122   0472 2CC
84900    $           BR      ($ADXB020)                  \BI =OFF\;                            123   1258 600
85000
85100            \RCE NOT AVAILABLE = OVERRUN (RDTCSTATE NOT =OFF)\
```

```
85200   $           BR       ($SET0000)              \BR TO SET OVRN SUBR\;           124   1F68 6CC
85300
85400               \ACE AVAILABLE  (RDTCSTATE =OFF)\
85500   $ADXBC20    MMP      (C,AC,B6,A,FR)          \CCPY RSR24/31 TO RDA\;          125   446C CCC
85600   $           MPP      (3C#,A2,B2,D,FR)        \SET RDTCSTATE =LOAD FIFO\;      126   4722 030
85700   $           TAPA     (C1#,AC,ALUEZ,DANDA,QR) \EXTRACT AND TEST RSR31\;        127   256C 201
85800   $           BR       ($ADXB040)              \BI =1\;                         128   12A9 6CC
85900
86000               \ANOTHER ADDRESS FIELD OCTET TO FOLLOW  (RSR31 =0)\
86100   $           BR       ($REXEC00)              \DONE\;                          129   01C8 60C
86200
86300               \LAST ADDRESS FIELD OCTET  (RSR31 =1)\
86400   $ADXBC40    PPP      (C3#,A4,B4,D,FR)        \SET RSRCSTATE =CNTRL 0\;        12A   4744 CC3
86500   $           BR       ($REXEC00)              \DONE\;                          12B   01C8 600
86600
86700
86800               \** FLAG RECEIVED **\
86900
87000   $ADXB6C0    BR       ($EOFF000)              \BR TO EOFF SUBR\;               12C   1C88 600
87100
87200
87300               \** ABORT RECEIVED **\
87400
87500   $ADXP8C0    BR       ($EOFA000)              \BR TO EOFA SUBR\;               12D   1C68 6CC
87600
87700
87800
87900
88000               \****** CONTROL A STATE ******\
88100
88200
88300               \** BYTE BOUNDARY **\
88400
88500               \(FIRST) CONTROL FIELD OCTET IN RSR24/31\
88600   $CNTA000    PPP      (0,A7,07,D,FR)          \SET RBSC =0\;                   12E   4777 000
88700   $           TAPA     (C,A3,ALUEZ,A,QR)       \TEST RFCSTATE =OFF(0)\;         12F   C473 2C0
88800   $           TAPA     (C,A0,RFMIR,C,QR)       \IF =OFF, TEST FIFO READY\;      130   C220 2CC
88900   $           BR       ($CNTA500)              \BI RFCSTATE NOT =OFF OR         131   1508 600
89000                                                 FIFO MEMORY NOT AVAILABLE\;
89100
89200               \RFCSTATE =OFF AND FIFO MEMORY AVAILABLE\
89300   $           PPF      (C8#,A9,89,DORA,FR)     \SET RDHBT =1\;                  132   5099 CC8
89400   $           PPF      (6E#,A9,89,DANDA,FR)    \SET RBSMFLG,RILSFLG,RILS        133   6599 06E
89500                                                 =0,0,0\;
89600   $           PPF      (C,A1,B6,A,FR)          \CCPY RDB2 TO RDB\;              134   4461 CCC
89700   $           PPF      (C,AC,B1,A,FR)          \CCPY RSR24/31 TO RD62\;         135   441C CCC
89800   $           PPF      (2C#,A2,B2,D,FR)        \SET RDTCSTATE =BGN FRAME,       136   4722 C20
89900                                                 CONTINUE WITH
90000                                                 SHARED CODING BELOW\;
90100
90200
90300               \* CONTROL STATES SHARED CODING *\
90400
90500   $CNTA2C0    TAPA     (D1#,AC,ALUEZ,DANDA,QR) \EXTRACT RSR31,TST\;             137   257C 2C1
90600   $           BR       ($CNTA220)              \BI =0\;                         138   1389 6C0
90700
90800               \ACT AN INFORMATION TRANSFER FORMAT FRAME  (RSR31 =1)\
90900   $           PPP      (CB#,A4,B4,D,FR)        \SET RSRCSTATE =TEXT\;           139   4744 0C8
91000   $           BR       ($REXEC00)              \DONE\;                          13A   C1C8 6CC
91100
91200               \INFORMATION TRANSFER FORMAT FRAME  (RSR31 =0)\
91300   $CNTA220    RER      (FF#,A0,B0,D,FR)        \READ CONTROL WORD TO FO\;       13B   47C0 EFF
91400   $           TAPA     (8C#,A0,ALUEZ,DANDA,QR) \EXTRACT RCFX,TST\;              13C   2570 29C
91500   $           BR       ($CNTA305)              \BI =0\;                         13D   1418 6CC
91600
91700               \EXTENDED CONTROL FIELD FORMAT FRAME  (RCFX =1)\
91800   $           PPF      (CE#,A4,B4,D,FR)        \SET RSRCSTATE =CNTRL EXT\;      13E   4744 CC8
91900   $           BR       ($REXEC00)              \DONE\;                          13F   C1C8 600
92000
92100               \NON-EXTENDED CONTROL FIELD FORMAT FRAME AND/OR
92200                 NO MORE CONTROL FIELD OCTETS TO FOLLOW\
92300               \ENTRY POINT S2\
92400   $CNTA300    RER      (FF#,A0,B0,D,FR)        \READ CONTROL WORD TO FO\;       140   47C0 EFF
92500   $CNTA305    MPP      (0E#,A0,B0,DANDA,QR)    \EXTRACT RBS TO QR\;             141   25C0 0CE
92600   $           TAPA     (C6#,A0,ALUEZ,DMQ,QR)   \TEST RBS =011\;                 142   1670 306
92700   $           BR       ($CNTA400)              \BI =C11 (BIT STREAM MODE)\;     143   1568 6CC
92800
92900               \RBS DOES NOT SPECIFY BIT STREAM MODE  (RBS NOT =011)\
93000   $           TAPA     (2C#,A0,ALUEZ,DANDA,QR) \TEST RTCB\;                     144   2560 220
93100   $           BR       ($CNTA320)              \BI =1 (TCB FORMAT)\;            145   1488 600
93200   $           TAPA     (8C#,A8,ALUEZ,DANDA,QR) \TEST RMMS\;                     146   2578 280
93300   $           BR       ($CNTA340)              \BI =0  (MLCP MODE)\;            147   1408 600
93400               \HMLC MODE (RMMS =1)\
93500   $           PPF      (0E#,A0,B0,DANDA,QR)    \EXTRACT RBS TO QR\;             148   25C0 0CE
93600   $           TAPA     (C4#,A0,ALUEZ,DMQ,QR)   \TEST RBS =C1C\;                 149   1660 3C4
93700   $           BR       ($CNTA340)              \BI NOT =010\;                   14A   1408 600
93800
93900               \TEST CONTROL BYTE FORMAT FRAME  (RTCB =1, OR
94000                HMLC MODE (RMMS =1) AND RES =C1C)\
94100   $CNTA320    MPP      (C9#,A4,B4,D,FR)        \SET RSRCSTATE =TCB\;            14B   4744 0C9
94200   $           BR       ($REXEC00)              \DONE\;                          14C   C1C8 6C0
94300
94400               \ACT TEXT CONTROL BYTE FORMAT FRAME\
94500   $CNTA340    TAPA     (D1#,A0,ALUEZ,DANDA,QR) \TEST RLCF\;                     14D   2570 2C1
```

```
94600  $           BR     ($CNTA350)                  \EI =0 (NCT LCF FCRMAT)\;           14E  1528 6CC
94700
94800              \LOGICAL CONTROL FIELD FORMAT FRAME  (RLCF =1)\
94900  $           MMP    (CC#,A8,BB,D,FR)            \SET RBSR2 =0\;                     14F  47PR 000
95000  $           PPP    (CA#,A4,B4,D,FR)            \SET RSRCSTATE =LCF\;               150  4744 0CA
95100  $           BR     ($REXEC00)                  \DCNE\;                             151  C1C8 600
95200
95300              \NOT LOGICAL CONTROL FIELD FORMAT FRAME.  (RLCF =0)\
95400              \SHARED CODING.  BYTE SIZE SPECIFIED BY RBS\
95500  SCNTA350    MMP    (CB#,A4,B4,D,FR)            \SET RSRCSTATE =TEXT\;              152  4744 CCB
95600  $           TAPN   (80#,A8,ALUEZ,DANDA,QR)     \TEST RPMS\;                        153  2578 280
95700  $           BR     ($DRBSM00)                  \EI =0  (MLCP MODE)\;               154  1FF8 400
95800  $           BR     ($DRBSH00)                  \EI =1  (HPLC MODE)\;               155  2178 600
95900
96000
96100              \RBS SPECIFIES BIT STREAM MODE  (RBS =011)\
96200  SCNTA4C0    MMP    (CE#,A4,B4,D,FR)            \SET RSRCSTATE =TEXT\;              156  4744 0CB
96300              \SHARED CODING.  BIT STREAM MODE\
96400  SCNTA4C5    MMP    (1C#,A9,B9,D0RA,FR)         \SET RBSMFLG =1\;                   157  5D59 C10
96500  $           TAPN   (80#,A8,ALUEZ,DANDA,GR)     \TEST RMMS\;                        158  2578 280
96600  $           BR     ($REXEC00)                  \DONE IF =0  (MLCP MODE             159  01C8 600
96700                                                  (RBSR ALREADY SET =8))\;
96800              \HPLC MODE  (RPMS =1)\
96900  $           PPP    (6,AA,BA,D,FR)              \SET RBSR =6\;                      15A  47AA 0C6
97000  $           PPP    (0#,AC,BC,D,FR)             \CLEAR RSR24/31 TO 0\;              15B  47CC 000
97100  $           BR     ($REXEC00)                  \DCNE\;                             15C  01C8 600
97200
97300
97400
97500
97600              \RFCSTATE NOT =OFF OR FIFO MEMORY NOT AVAILABLE = OVERRUN\
97700  SCNTA500    BR     ($SET0000)                  \BR TO SET OVRN SUBR\;              15D  1F68 600
97800
97900
98000              \** FLAG RECEIVED  **\
98100
98200  SCNTA6C0    BR     ($ADXA620)                  \BR TO SHARED CODING                15E  1168 6CC
98300                                                  IN ADRS EXT A STATE\;
98400
98500
98600              \** ABORT RECEIVED  **\
98700
98800  SCNTA800    BR     ($SETA000)                  \BR TO SET ABORT SUBR\;             15F  1C98 600
98900
99000
99100
992CC
99300              \****** CONTROL B STATE  ******\
99400
99500
99600              \** BYTE BOUNDARY  **\
99700
99800              \(FIRST) CONTROL FIELD OCTET IN RSR24/31\
99900  SCNTBC00    MMP    (0,A7,B7,D,FR)              \SET RBSC =0\;                      160  4777 000
100000 $           TAPN   (0,A2,ALUEZ,A,QR)           \TEST RDTCSTATE =OFF\;              161  0472 2CC
100100 $           BR     ($CNTB020)                  \PI =OFF\;                          162  1648 6C0
100200
100300             \RDE NCT AVAILABLE = OVERRUN  (RDTCSTATE NOT =OFF)\
100400 $           BR     ($SET0000)                  \BR TO SET OVRN SUBR\;              163  1F68 600
100500
100600             \RDE AVAILABLE  (RDTCSTATE =OFF)\
100700 SCNTB020    PPP    (0,AC,B6,A,FR)              \COPY RSR24/31 TO RDB\;             164  446C CCC
100800 $           PPP    (3C#,A2,B2,D,FR)            \SET RDTCSTATE =LOAD FIFO\;         165  4722 C3C
100900 $           BR     ($CNTA200)                  \BR TO SHARED CODING IN             166  1378 6C0
101000                                                 CONTROL A STATE\;
101100
101200
101300             \** FLAG RECEIVED  **\
101400
101500 SCNTB6C0    BR     ($EOFF000)                  \BR TO EOFF SUBR\;                  167  1CB8 600
101600
101700
101800             \** ABORT RECEIVED  **\
101900
102000 SCNTB8C0    BR     ($EOFA000)                  \BR TO EOFA SUBR\;                  168  1C68 6CC
102100
102200
102300
102400
102500             \****** CONTROL EXTENSION STATE  ******\
102600
102700
102800             \** BYTE BOUNDARY  **\
102900             \SECOND CONTROL FIELD OCTET IN RSR24/31\
103000 SCNTXCC0    MMP    (0,A7,B7,D,FR)              \SET RBSC =0\;                      169  4777 0C0
103100 $           TAPN   (0,A2,ALUEZ,A,QR)           \TEST RDCSTATE =OFF\;               16A  0472 2C0
103200 $           BR     ($CNTX020)                  \BI =OFF\;                          16B  1608 600
103300
103400             \RDE NOT AVAILABLE = OVERRUN  (RDTCSTATE NOT =OFF)\
103500 $           BR     ($SET0000)                  \BR TO SET OVRN SUBR\;              16C  1F68 600
103600
103700             \RDE AVAILABLE  (RDTCSTATE =OFF)\
103800 SCNTX020    MMP    (0,AC,B6,A,FR)              \COPY RSR24/31 TO RDB\;             16D  446C 000
103900 $           MMP    (3C#,A2,B2,D,FR)            \SET RDTCSTATE =LOAD FIFO\;         16E  4722 030
104000 $           BR     ($CNTA300)                  \BR TO SHARED CODING IN             16F  14C8 600
```

```
                                                    CONTROL A STATE,
                                                    ENTRY POINT S2\;

\** FLAG RECEIVED **\

SCNTX6C0    BR      (SEOFF000)              \BR TO EOFF SUBR\;            170   1CE8 600

\** ADOPT RECEIVED **\

SCNTX8C0    BR      (SEOFA000)              \BR TO EOFA SUBR\;            171   1CE8 600

\****** TEXT CONTROL BYTE STATE ******\

\** BYTE BOUNDARY **\

\TEXT CONTROL BYTE IN RSR24/31\
STCB0CC0    MMP     (C,A7,B7,D,FR)          \SET RBSC =0\;                172   4777 CCC
     $      TAPA    (C,A2,ALUEZ,A,QR)       \TEST RDTCSTATE =OFF\;        173   0472 2C0
     $      BR      (STCB0020)              \BI =OFF\;                    174   1CE8 6C0

\RDE NOT AVAILABLE = OVERRUN (RDTCSTATE NOT =OFF)\
     $      BR      (SSET0000)              \BR TO SET OVRN SUBR\;        175   1FE8 6C0

\RCE AVAILABLE (RDTCSTATE =OFF)\
STCB0C20    MMP     (C,AC,B6,A,FR)          \CCFY RSR24/31 TO RDB\;       176   44CC CC0
     $      MMP     (3C#,A2,B2,D,FR)        \SET RDTCSTATE =LOAD FIFO\;   177   4722 030
     $      MMP     (C,AC,B8,A,FR)          \CCFY RSR24/31 TO RBSR2\;     178   44AC 000
     $      TAPA    (80#,AC,ALUNEZ,DANDA,QR) \EXTRACT AND TEST RSR24\;    179   25EC 280
     $      BR      (STCB0200)              \BR TO SHARED CODING BELOW    17A   1868 600
                                             IF =1 (LAST LCF OCTET)\;

\RSR24 =0\
     $      RER     (FF#,A0,B0,D,FR)        \READ CONTROL WORD TO F0\;    17B   4700 EFF
     $      TAPA    (01#,A0,ALUNEZ,CANDA,QR) \EXTRACT AND TEST RLCF\;     17C   25E0 2C1
     $      BR      (STCB0100)              \BI =1 (LCF FORMAT)\;         17D   1E58 600

\RLCF =0\
     $      TAPA    (8C#,A8,ALUEZ,DANDA,QR) \TEST RMMS\;                  17E   2578 280
     $      BR      (STCB0200)              \BI =0 (MLCP MODE)\;          17F   1868 6C0

\HMLC MODE (RMMS =1)\
     $      MMP     (CE#,A0,B0,DANDA,QR)    \EXTRACT RBS TO QR\;          180   25C0 0CE
     $      TAPA    (04#,A0,ALUNEZ,DMQ,QR)  \TEST RBS =010\;              181   1660 304
     $      BR      (STCB0200)              \BI NOT =C10 (NOT LCF         182   1868 6C0
                                             FORMAT)\;

\LOGICAL CONTROL FIELD FORMAT FRAME AND MORE OCTETS TO
             FOLLOW   (RSR24 =0, AND EITHER RLCF =1 OR
             RMMS =1 AND RBS =C10)\
STCB0100    MMP     (80#,A8,B8,DORA,FR)     \SET RBSR2 BIT 0 =1\;         183   5088 080
     $      MMP     (CA#,A4,B4,D,FR)        \SET RSRCSTATE =LCF\;         184   4744 0CA
     $      BR      (SREXEC00)              \DONE\;                       185   01C8 600

\* TCB STATE AND LCF STATE SHARED CODING *\

\TEXT CONTROL BYTE SPECIFIED TEXT FIELD BYTE SIZE\

STCB02C0    MMP     (CB#,A4,B4,D,FR)        \SET RSRCSTATE =TEXT\;        186   4744 0CB
     $      MMP     (07#,AB,B0,DANDA,FR)    \EXTRACT TCB.BS FROM TCB      187   65CB 007
                                             (IN RBSR2) TO F0\;
     $      TAPA    (C3#,A0,ALUEZ,D*A,QR)   \TEST TCB.BS =011\;           188   1570 3C3
     $      BR      (STCB0250)              \BI =011 (BIT STREAM MODE)\;  189   1948 6C0

\NORMAL MODE (BYTE SIZE BITS IN TCB NOT =C11)\
     $      TAPA    (04#,A0,ALUNEZ,DANDA,QR) \TEST TCB.BS =1XX\;          18A   25E0 2C4
     $      BR      (STCB0240)              \BI =1XX\;                    18B   1928 6C0

\TCB.BS =CXX\
     $      TAPA    (8C#,A8,ALUEZ,DANDA,QR) \TEST RMMS\;                  18C   2578 280
     $      BR      (SREXEC00)              \DONE IF =0 (MLCP MODE)\;     18D   01C8 6C0
            \HMLC MODE  (RMMS =1)\
     $      TAPA    (1,A0,ALUNEZ,DMA,QR)    \TEST TCB.BS =001\;           18E   1560 301
     $      BR      (SREXEC00)              \DONE IF NOT =CC1\;           18F   C1C8 6C0
            \HMLC MODE AND TCB.BS =CC1\
     $      MMP     (6,AA,BA,D,FR)          \SET RBSR =6\;                190   47AA CC6
     $      BR      (SREXEC00)              \DONE\;                       191   C1C8 600

\TCB.BS =1XX\
STCB0240    MMP     (0,A0,BA,A,FR)          \CCFY TCB.BS TO RBSR\;        192   44A0 CC0
     $      BR      (SREXEC00)              \DONE\;                       193   C1C8 6CC

\BIT STREAM MODE (BYTE SIZE BITS IN TCB =C11)\
STCB0250    BR      (SCNTA405)              \GO TO SHARED CODING          194   1578 600
                                             IN CONTROL A STATE\;

\** FLAG RECEIVED **\
```

```
113600
113700   STC806C0   BR       (SEOFF000)              \ER TO EOFF SUBR\;             195   1CE8 6C0
113800
113900
114000              \** ABORT RECEIVED **\
114100
114200   STC808C0   BR       (SEOFA000)              \BR TO EOFA SUBR\;             196   1CE8 6C0
114300
114400
114500
114600
114700              \****** LOGICAL CONTROL FIELD STATE ******\
114800
114900
115000              \** BYTE BOUNDARY **\
115100              \AN LCF OCTET IS IN RSR24/31\
115200   SLCF0CC0   MMP      (C,A7,B7,D,FR)          \SET RBSC =0\;                 197   4777 C00
115300   $          TAMN     (0,A2,ALUEZ,A,QR)       \TEST RDTCSTATE =OFF\;         198   0472 200
115400   $          BR       (SLCF0020)              \BI =OFF\;                     199   1988 600
115500
115600              \RDE NOT AVAILABLE = OVERRUN (RDTCSTATE NOT =OFF)\
115700   $          BR       (SSET0000)              \ER TO SET OVRN SUBR\;         19A   1F68 6C0
115800
115900              \RDE AVAILABLE (RDTCSTATE =OFF)\
116000   SLCF0C20   MMP      (0,AC,B6,A,FR)          \CCPY RSR24/31 TO RDB\;        19B   446C CC0
116100   $          PPP      (3C#,A2,B2,D,FR)        \SET RDTCSTATE =LOAD FIFO\;    19C   4722 030
116200   $          TAMN     (8C#,AC,ALUNEZ,CANDA,QR)\EXTRACT AND TEST RSR24\;      19D   256C 280
116300   $          BR       (SLCF0040)              \BI =1\;                       19E   1AC8 600
116400
116500              \ANOTHER LCF OCTET TO FOLLOW (RSR24 =0)\
116600   $          BR       (SREXEC00)              \DONE\;                        19F   01C8 6CC
116700
116800              \LAST LCF OCTET (RSR24 =1)\
116900   SLCF0C40   TAMN     (C,AB,ALUEZ,A,QR)       \TEST RBSR2 =0\;               1A0   C478 2C0
117000   $          BR       (SLCF0060)              \BI =0\;                       1A1   1A38 600
117100
117200              \TEXT FIELD BYTE SIZE SPECIFIED BY TCB (RBSR2 NOT =0)\
117300   $          BR       (STCB0200)              \ER TO SHARED CODING           1A2   1868 6C0
117400                                                 IN TCB STATE\;
117500
117600              \TEXT FIELD BYTE SIZE SPECIFIED BY PROGRAM (RBSR2 =0)\
117700   SLCF0C60   BR       (SCNTA350)              \GO TO SHARED CODING           1A3   1528 6CC
117800                                                 IN CONTROL A STATE\;
117900
118000
118100              \** FLAG RECEIVED **\
118200
118300   SLCF06C0   BR       (SEOFF000)              \ER TO EOFF SUBR\;             1A4   1CE8 6CC
118400
118500
118600              \** ABORT RECEIVED **\
118700
118800   SLCF08C0   BR       (SEOFA000)              \ER TO EOFA SUBR\;             1A5   1CE8 6C0
118900
119000
119100
119200
119300              \****** TEXT STATE ******\
119400
119500
119600              \** BYTE BOUNDARY **\
119700
119800              \TEXT FIELD BYTE (UN-RIGHT-JUSTIFIED) IN RSR24/31\
119900   STEXT0C0   TAMN     (0,A2,ALUEZ,A,QR)       \TST RDTCSTATE =OFF(0)\;       1A6   0472 2C0
120000   $          BR       (STEXT020)              \BI =OFF\;                     1A7   1A98 600
120100
120200              \RDE NOT AVAILABLE = OVERRUN (RDTCSTATE NOT =OFF)\
120300   $          BR       (SSET0000)              \GO TO SET OVRN SUBR\;         1A8   1F68 600
120400
120500              \RDE AVAILABLE (RDTCSTATE =OFF)\
120600   STEXTC20   PPP      (0,AC,96,A,FR)          \CCFY RSR24/31 TO RDB\;        1A9   446C CC0
120700   $          MMP      (0#,AC,BC,D,FR)         \CLEAR RSR24/31 TO 0\;         1AA   47CC 0C0
120800   $          PPP      (80#,A7,B2,DORA,FR)     \COPY RBSC TO RBSR4.           1AB   5D27 C80
120900                                                 SET RDTCSTATE =RGHT JSTFY\;
121000   $          MMP      (C,A7,B7,D,FR)          \SET RBSC =0\;                 1AC   4777 CCC
121100   $          BR       (SREXEC00)              \DONE\;                        1AD   C1C8 6C0
121200
121300
121400              \** FLAG RECEIVED **\
121500
121600   STEXT6C0   BR       (SEOFF000)              \BR TO EOFF SUBR\;             1AE   1CE8 6CC
121700
121800
121900              \** ABORT RECEIVED **\
122000
122100   STEXT8C0   BR       (SEOFA000)              \BR TO EOFA SUBR\;             1AF   1CE8 6C0
122200
122300
122400
122500
122600              \****** OVERRUN WAIT STATE ******\
122700
122800
122900              \** BYTE BOUNDARY **\
123000
123100              \FRAME CONTAINS MORE THAN 32 BITS\
```

```
123200  SOVRWCC0  MMP   (C,A7,B7,D,FR)        \SET RBSC =0\;                180  4777 000
123300  $         MMP   (8,AA,BA,D,FR)        \SET RBSR =8\;                181  47AA CCH
123400  $         MMP   (08#,A4,B4,D,FR)      \SET RSRCSTATE =OVERRUN\;     182  4744 CCH
123500  $         BR    ($REXEC00)            \DONE\;                       183  C1C8 6C0
123600
123700
123800           \** FLAG RECEIVED **\
123900
124000  SOVRW6C0  TAMA  (2C#,A7,ALUEZ,DMA,QR) \TST RBSC =32\;               184  1577 320
124100  $         BR    ($CVRN600)            \IF =32, BR TO SHARED         185  1BA8 6C0
124200                                         CODING IN OVERRUN STATE\;
124300           \FRAME CONTAINS LESS THAN 32 BITS\
124400  $         BR    ($SETI000)            \BR TO SET INSYNC SUBR\;      186  1F48 600
124500
124600
124700           \** ABORT RECEIVED **\
124800
124900           \INVALID FRAME\
125000  SOVRW8C0  BR    ($SETA000)            \BR TO SET ABORT SUBR\;       187  1C98 60C
125100
125200
125300
125400
125500           \****** OVERRUN STATE ******\
125600
125700
125800           \** BYTE BOUNDARY **\
125900
126000  SOVRNCC0  MMP   (C,A7,B7,D,FR)        \SET RBSC =0\;                188  4777 000
126100  $         BR    ($REXEC00)            \DONE\;                       189  01C8 60C
126200
126300
126400           \** FLAG RECEIVED **\
126500
126600  SOVRN6C0  TAMA  (0,A3,ALUEZ,A,QR)     \TST RFCSTATE =OFF(0)\;       18A  C473 200
126700  $         BR    ($CVRN620)            \BI =OFF\;                    18B  1BE5 6C0
126800
126900           \RFCSTATE NOT =OFF\
127000  $         MMP   (4C#,A9,B9,DORA,FR)   \SET ROSD =1\;                18C  5099 040
127100  $         BR    ($SETI000)            \BR TO SET INSYNC SUBR\;      18D  1F48 600
127200
127300           \RFCSTATE =OFF\
127400  SOVRN620  MMP   (7E#,A9,B9,DANDA,FR)  \SET RILSFLG,RILS =C,0\;      18E  6599 07E
127500  $         MMP   (C3#,A3,B3,0,FR)      \SET RFCSTATE =FLG OVRN\;     18F  4733 0C3
127600  $         BR    ($SETI000)            \BR TO SET INSYNC SUBR\;      1C0  1F48 600
127700
127800
127900           \** ABORT RECEIVED **\
128000
128100  SOVRN8C0  TAMA  (C#,A9,ALUEZ,DANDA,QR) \EXTRACT RDHDT,TST\;         1C1  2579 2C9
128200  $         BR    ($SETA000)            \BI =0 (NO DATA TRANSFERRED   1C2  1C98 6C0
128300                                         THIS FRAME)\;
128400           \DATA WAS TRANSFERRED THIS FRAME (RDHDT =1)\
128500  $         MMP   (7E#,A9,B9,DANDA,FR)  \SET RILSFLG,RILS =0,0\;      1C3  6599 07E
128600  $         MMP   (C2#,A3,B3,0,FR)      \SET RFCSTATE =ABRT OVRN\;    1C4  4733 0C2
128700  $         BR    ($SETA000)            \BR TO SET ABORT SUBR\;       1C5  1C98 6C0
128800
128900
129000
129100
129200
129300           \******                ******\
129400           \****** RSRC SUBROUTINES ******\
129500           \******                ******\
129600
129700
129800
129900
130000           \**** END OF FRAME ABORT SUBROUTINE ****\
130100
130200
130300  SEOFA0C0  MMP   (C1#,A3,B3,0,FR)      \SET RFCSTATE =ABORT\;        1C6  4733 0C1
130400  $         MMP   (22#,A4,B4,D,FR)      \SET RSRCSTATE =ABORT\;       1C7  4744 C22
130500  $         BR    ($EOFF100)            \CC TO SHARED CODING IN       1C8  1CC8 6C0
130600                                         EOFF SUBR\;
130700
130800
130900
131000
131100           \**** SET RSRCSTATE =ABORT SUBROUTINE ****\
131200
131300
131400  SSETA000  MMP   (22#,A4,B4,D,FR)      \SET RSRCSTATE =ABORT\;       1C9  4744 022
131500  $         BR    ($EOFF400)            \BR TO SHARED CODING IN       1CA  1FC8 6C0
131600                                         EOFF SUBROUTINE\;
131700
131800
131900
132000
132100           \**** END OF FRAME FLAG SUBROUTINE ****\
132200
132300
132400  SEOFF0C0  MMP   (8C#,A3,B3,0,FR)      \SET RFCSTATE =FLAG-0\;       1CB  4733 C80
132500  $         MMP   (23#,A4,B4,D,FR)      \SET RSRCSTATE =INSYNC\;      1CC  4744 023
132600
132700           \** EOFF SUBR AND EOFA SUBR SHARED CODING **\
```

```
132800            \(UPDATE RPLB)\
132900  SEOFF100  TAPA   (O,AA,ALUEZ,AMB,QR)        \TEST RBSC(F7) =RBSR(FA)\;      1CD  117A 3C0
133000  $         BR     (SEOFF200)                 \BI EQUAL (FULL BYTE)\;         1CE  1DC8 600
133100            \PARTIAL LAST BYTE  (RBSC ACT=RBSR)\
133200  $         PPF    (01#,A5,B5,DCRA,FR)        \SET RPLB =1\;                  1CF  5D55 CC1
133300
133400            \(SET RLBS =RBSC ENCODED)\
133500  SEOFF2C0  TAPA   (CB#,A7,ALUEZ,DANDA,QR)    \EXTRACT AND TEST RBSC.4\;      1D0  2577 2C8
133600  $         BR     (SEOFF210)                 \BI =0\;                        1D1  1D48 6CC
133700
133800            \RBSC =XXXX,1XXX   (LAST BYTE SIZE =8)\
133900  $         PPF    (0C#,A5,B5,DCRA,FR)        \SET RLBS =110\;                1D2  5D55 CCC
134000  $         BR     (SEOFF300)                 \CONTINUE BELOW\;               1D3  1EE8 6CC
134100
134200            \(RBSC =XXXX,0XXX)\
134300  SEOFF210  TAPA   (04#,A7,ALUNEZ,DANDA,QR)   \EXTRACT AND TEST RBSC.5\;      1D4  2567 204
134400  $         BR     (SEOFF240)                 \BI =1\;                        1D5  1EC8 6CC
134500
134600            \((RBSC =XXXX,00XX))\
134700  $         TAPA   (C2#,A7,ALUNEZ,DANDA,QR)   \EXTRACT AND TEST RBSC.6\;      1D6  2567 2C2
134800  $         BR     (SEOFF220)                 \BI =1\;                        1D7  1DA8 600
134900
135000            \RBSC =XXXX,000X,  (LAST BYTE SIZE =1)\
135100  $         PPF    (02#,A5,B5,DORA,FR)        \SET RLBS =001\;                1D8  5D55 002
135200  $         BR     (SEOFF300)                 \CONTINUE BELOW\;               1D9  1EE8 6CC
135300
135400            \(((RBSC =XXXX,001X)))\
135500  SEOFF220  TAPA   (C1#,A7,ALUNEZ,DANDA,QR)   \EXTRACT AND TEST RBSC.7\;      1DA  2567 201
135600  $         BR     (SEOFF230)                 \BI =1\;                        1DB  1DE8 600
135700
135800            \RBSC =XXXX,0010  (LAST BYTE SIZE =2)\
135900  $         MPP    (06#,A5,B5,DORA,FR)        \SET RLBS =011\;                1DC  5D55 0C6
136000  $         BR     (SEOFF300)                 \CONTINUE BELOW\;               1DD  1EE8 600
136100
136200            \RBSC =XXXX,0011  (LAST BYTE SIZE =3)\
136300  SEOFF230  PPF    (0A#,A5,B5,DORA,FR)        \SET RLBS =101\;                1DE  5D55 00A
136400  $         BR     (SEOFF300)                 \CONTINUE BELOW\;               1DF  1EE8 600
136500
136600            \((RESC =XXXX,01XX))\
136700  SEOFF240  TAPA   (02#,A7,ALUNEZ,DANDA,QR)   \EXTRACT AND TEST RBSC.6\;      1E0  2567 2C2
136800  $         BR     (SEOFF260)                 \BI =1\;                        1E1  1E28 6C0
136900
137000            \(((RBSC =XXXX,010X)))\
137100  $         TAPA   (C1#,A7,ALUNEZ,DANDA,QR)   \EXTRACT AND TEST RBSC.7\;      1E2  2567 201
137200  $         BR     (SEOFF250)                 \BI =1\;                        1E3  1E68 600
137300
137400            \RESC =XXXX,0100  (LAST BYTE SIZE =4)\
137500  $         MPP    (0E#,A5,B5,DORA,FR)        \SET RLBS =111\;                1E4  5D55 0CE
137600  $         BR     (SEOFF300)                 \CONTINUE BELOW\;               1E5  1EE8 600
137700
137800            \RESC =XXXX,0101  (LAST BYTE SIZE =5)\
137900  SEOFF250  MPP    (CC#,A5,B5,DORA,FR)        \SET RLBS =000\;                1E6  5D55 000
138000  $         BR     (SEOFF300)                 \CONTINUE BELOW\;               1E7  1EE8 60C
138100
138200            \(((RBSC =XXXX,011X)))\
138300  SEOFF260  TAPA   (C1#,A7,ALUNEZ,DANDA,QR)   \EXTRACT AND TEST RBSC.7\;      1E8  2567 2C1
138400  $         BR     (SEOFF270)                 \BI =1\;                        1E9  1EC8 6CC
138500
138600            \RBSC =XXXX,0110  (LAST BYTE SIZE =6)\
138700  $         MPP    (C4#,A5,B5,DORA,FR)        \SET RLBS =010\;                1EA  5D55 004
138800  $         BR     (SEOFF300)                 \CONTINUE BELOW\;               1EB  1EE8 6C0
138900
139000            \RBSC =XXXX,0111  (LAST BYTE SIZE =7)\
139100  SEOFF270  MPP    (C8#,A5,B5,DORA,FR)        \SET RLBS =100\;                1EC  5D55 C08
139200  $         BR     (SEOFF300)                 \CONTINUE BELOW\;               1ED  1EE8 600
139300
139400            \(CONTINUE)\
139500  SEOFF3C0  MPP    (22#,A9,B9,DORA,FR)        \SET REOFFLG,RSRU =1,1\;        1EE  5D99 022
139600  $         MMP    (0,A7,BB,A,FR)             \COPY RBSC TO RBSR2\;           1EF  44B7 000
139700
139800            \** MORE SHARED CODING **\
139900  SEOFF4C0  PPF    (C,A7,B7,D,FR)             \SET RBSC =C\;                  1F0  4777 0CC
140000  $         MMP    (B,AA,BA,D,FR)             \SET RBSR =B\;                  1F1  47AA CC8
140100  $         MMP    (FB#,AB,B8,DANDA,FR)       \SET RSC =0\;                   1F2  65B8 CFB
140200  $         BR     ($REXEC00)                 \DCNE\;                         1F3  01C8 600
140300
140400
140500
140600
140700            \**** SET RSRCSTATE =INSYNC SUBROUTINE ****\
140800
140900
141000  $SETIC00  MPP    (23#,A4,B4,D,FR)           \SET RSRCSTATE =INSYNC\;        1F4  4744 023
141100  $         BR     (SEOFF400)                 \GO TO SHARED CODING IN         1F5  1FC8 60C
141200                                              EOFF SUBROUTINE\;
141300
141400
141500
141600
141700            \**** SET RSRCSTATE =OVERRUN SUBROUTINE ****\
141800
141900
142000  $SETOC00  MMP    (0B#,A4,B4,D,FR)           \SET RSRCSTATE =OVERRUN\;       1F6  4744 0CB
142100  $         BR     (SEOFF400)                 \GO TO SHARED CODING IN         1F7  1FC8 6C0
142200                                              EOFF SUBROUTINE\;
```

```
142300
142400
142500
142600
142700            \****  DECODE RBS (MLCP MODE) SUBROUTINE  ****\
142800
142900
143000  $DRBSMCC  RER   (FF#,A0,B0,D,FR)            \READ CONTROL WORD TO F0\;        1F8  47C0 EFF
143100  $        TAPA  (C8#,A0,ALUNEZ,DANDA,QR)    \EXTRACT AND TEST RBS.0\;        1F9  2560 208
143200  $        BR    ($DRBSM50)                  \BI =1  (RBS =1XX)\;             1FA  2098 600
143300
143400
143500            \(RBS =0XX)\
143600  $        TAPA  (04#,A0,ALUNEZ,DANDA,QR)    \EXTRACT AND TEST RBS.1\;        1FB  2560 2C4
143700  $        BR    ($DRBSM40)                  \BI =1  (RBS =01X)\;             1FC  2038 6CC
143800
143900            \((RBS =0CX))\
144000  $        TAPA  (C2#,A0,ALUNEZ,DANDA,QR)    \EXTRACT AND TEST RBS.2\;        1FD  2560 2C2
144100  $        BR    ($DRBSM25)                  \BI =1  (RBS =001)\;             1FE  2018 6CC
144200
144300            \RBS =000  (BYTE SIZE =5)\
144400  $        MMP   (5,AA,BA,D,FR)              \SET RBSR =5\;                   1FF  47AA CC5
144500  $        BR    ($REXEC00)                  \DONE\;                          2C0  C1C8 6CC
144600
144700            \RBS =001  (BYTE SIZE =8 (DEFAULT))\
144800  $DRBSM25 MMP   (8,AA,BA,D,FR)              \SET RBSR =8\;                   2C1  47AA CC8
144900  $        BR    ($REXEC00)                  \DONE\;                          2C2  C1C8 6C0
145000
145100            \((RBS =C1X))\
145200  $DRBSM40 TAPA  (02#,A0,ALUNEZ,DANDA,QR)    \EXTRACT AND TEST RBS.2\;        203  2560 202
145300  $        BR    ($DRBSM45)                  \BI =1  (RBS =011)\;             204  2078 6C0
145400
145500            \RBS =010  (BYTE SIZE =6)\
145600  $        MMP   (6,AA,BA,D,FR)              \SET RBSR =6\;                   205  47AA CC6
145700  $        BR    ($REXEC00)                  \DONE\;                          206  01C8 6CC
145800
145900            \RBS =011  (BYTE SIZE =8 (DEFAULT))\
146000  $DRBSM45 MMP   (8,AA,BA,D,FR)              \SET RBSR =8\;                   2C7  47AA CC8
146100  $        BR    ($REXEC00)                  \DONE\;                          2C8  C1C8 6CC
146200
146300
146400            \(RBS =1XX)\
146500  $DRBSM50 TAPA  (C4#,A0,ALUNEZ,DANDA,QR)    \EXTRACT AND TEST RBS.1\;        2C9  2560 2C4
146600  $        BR    ($DRBSM80)                  \BI =1  (RBS =11X)\;             2CA  2118 6C0
146700
146800            \((RBS =1CX))\
146900  $        TAPA  (C2#,A0,ALUNEZ,DANDA,QR)    \EXTRACT AND TEST RBS.2\;        2CB  2560 2C2
147000  $        BR    ($DRBSM65)                  \BI =1  (RBS =101)\;             2CC  20F8 6C0
147100
147200            \RBS =100  (BYTE SIZE =7)\
147300  $        MMP   (7,AA,BA,D,FR)              \SET RBSR =7\;                   2CD  47AA 0C7
147400  $        BR    ($REXEC00)                  \DONE\;                          2CE  C1C8 6C0
147500
147600            \RBS =101  (BYTE SIZE =8 (DEFAULT))\
147700  $DRBSM65 MMP   (8,AA,BA,D,FR)              \SET RBSR =8\;                   2DF  47AA 008
147800  $        BR    ($REXEC00)                  \DONE\;                          210  01C8 6C0
147900
148000            \((RBS =11X))\
148100  $DRBSM80 TAPA  (C2#,A0,ALUNEZ,DANDA,QR)    \EXTRACT AND TEST RBS.2\;        211  2560 2C2
148200  $        BR    ($DRBSM85)                  \BI =1  (RBS =111)\;             212  2158 6C0
148300
148400            \RBS =110  (BYTE SIZE =8)\
148500  $        MMP   (8,AA,BA,D,FR)              \SET RBSR =8\;                   213  47AA CC8
148600  $        BR    ($REXEC00)                  \DONE\;                          214  01C8 6C0
148700
148800            \RBS =111  (BYTE SIZE =4)\
148900  $DRBSM85 MMP   (4,AA,BA,D,FR)              \SET RBSR =4\;                   215  47AA 0C4
149000  $        BR    ($REXEC00)                  \DONE\;                          216  01C8 600
149100
149200
149300
149400
149500            \****  DECODE RBS (HMLC MODE) SUBROUTINE  ****\
149600
149700
149800  $DRBSHC0 RER   (FF#,A0,B0,D,FR)            \READ CONTROL WORD TO F0\;        217  47C0 EFF
149900  $        TAPA  (C8#,A0,ALUEZ,DANDA,QR)     \TEST RBS BIT 0\;                 218  2570 208
150000  $        BR    ($DRBSH20)                  \PI =0 (8-BIT MODE)\;             219  21C8 6C0
150100
150200            \NOT 8-BIT MODE  (RBS =1XX)\
150300  $        MMP   (0,A0,BA,A,SROF)            \SHIFT CONTROL WORD RIGHT         21A  M4A0 0C0
150400                                              1 BIT AND LOAD INTO RBSR\;
150500  $        MMP   (7#,AA,BA,DANDA,FR)         \EXTRACT RBS IN RBSR\;            21B  65AA CC7
150600  $        BR    ($REXEC00)                  \DONE\;                           21C  01C8 6C0
150700
150800            \8-BIT MODE  (RBS =0XX)\
150900  $DRBSH20 MMP   (8,AA,BA,D,FR)              \SET RBSR =8\;                    21D  47AA CC8
151000  $        BR    ($REXEC00)                  \DONE\;                           21E  01C8 600
151100
151200
151300
151400
151500  SKIP HOF;
151600
151700
```

```
151800              \**********************************\
151900              \**                                **\
152000              \**  RECEIVE DATA TRANSFER CONTROL ROUTINE  **\
152100              \**                                **\
152200              \**********************************\
152300
152400
152500
152600
152700              \**  INITIAL PROCESSING AND STATE SELECTION  **\
152800
152900
153000              \RDTCSTATE NOT =OFF, BRANCH PER RDTCSTATE\
153100   SRDTC000   TAPA   (8C#,A2,ALUNEZ,DANDA,QR)   \EXTRACT AND TEST BIT 0\;          21F  2562 280
153200     $        BR     ($RGHT000)                 \BI BIT 0 =1 (RGHT JUSTIFY)\;      220  23C8 6CC
153300              \BIT 0 =0\
153400     $        TAPA   (4C#,A2,ALUEZ,DANDA,QR)    \EXTRACT AND TEST BIT 1\;          221  2572 240
153500     $        BR     (SRDTC040)                 \BI BIT 1 =0\;                     222  22C8 6CC
153600              \BIT 0 =0, BIT 1 =1\
153700     $        TAPA   (2C#,A2,ALUEZ,DANDA,QR)    \EXTRACT AND TEST BIT 2\;          223  2572 220
153800     $        BR     ($FLPL000)                 \BI BIT 2 =0 (FLIP/LH)\;           224  2428 6C8
153900     $        BR     ($FLPR000)                 \BI BIT 2 =1 (FLIP/RH)\;           225  2518 6C0
154000              \BIT 0 =0, BIT 1 =0\
154100   SRDTCC40   TAPA   (1C#,A2,ALUNEZ,DANDA,QR)   \EXTRACT AND TEST BIT 3\;          226  2562 21C
154200     $        BR     ($LOAD000)                 \BI BIT 3 =1 (LOAD FIFO)\;         227  26C8 6C0
154300     $        BR     ($BGNF000)                 \BI BIT 3 =0 (BGN OF FRAME)\;      228  2298 6C0
154400
154500
154600
154700
154800              \******  BEGINNING OF FRAME STATE  ******\
154900
155000
155100   SBGNFC00   SC     (C,RSRFMB,B0,0,QR)         \CLEAR FIFO BUFFER TO 0\;          229  02C4 4CC
155200     $        SC     (C,WRRFMS,B0,C,QR)         \COPY FIFO BFR TO FIFO/STAT\;      22A  C2C2 40C
155300     $        MMP    (3C#,A2,B2,D,FR)           \SET RDTCSTATE =LOAD FIFO.         22B  4722 03C
155400                                                 SET RBSR4 =0\;
155500     $        SC     (C,WRRFMBD,B6,A,FR)        \COPY RDB TO FIFO BUFFER\;         22C  4466 4C0
155600     $        SC     (C,WRRFMD,C,QR)            \COPY FIFO BFR TO FIFO/DATA\;      22D  C2C3 4CC
155700     $        MMP    (0,A1,B6,A,FR)             \COPY RDB2 TO RDB\;                22E  4461 00C
155800     $        BR     ($REXEC00)                 \DONE\;                            22F  01C8 600
155900
156000
156100
156200
156300              \******  RIGHT-JUSTIFY STATE  ******\
156400
156500
156600   SRGHTCC0   TAPA   (1C#,A9,ALUNEZ,DANDA,QR)   \TEST RBSMFLG\;                    230  2569 210
156700     $        BR     ($RGHT060)                 \BI =1 (BIT STREAM MODE)\;         231  24C8 6CC
156800              \NOT BIT STREAM MODE   (RBSMFLG =0)\
156900     $        TAPA   (88#,A2,ALUEZ,DMA,QR)      \TEST RBSR4 =8\;                   232  1572 388
157000     $        BR     ($RGHT040)                 \BI =8 (NO R-J REQUIRED)\;         233  23F8 6C0
157100
157200              \RIGHT-JUSTIFICATION REQUIRED   (RBSR4 NOT=8 AT ENTRY AND
157300                                                NOT BIT STREAM MODE)\
157400   SRGHTC20   MMP    (C,A6,B6,A,SRQF)           \SHIFT RDB RIGHT 1 BIT\;           234  8466 00C
157500     $        MMP    (7F#,A6,D6,DANDA,FR)       \SET RDB BIT 0 =C\;                235  6566 C7F
157600     $        MMP    (0,A2,B2,AP1,FR)           \INCREMENT RBSR4\;                 236  4422 100
157700     $        TAPA   (88#,A2,ALUEZ,DMA,QR)      \TEST RBSR4 =8\;                   237  1572 388
157800     $        BR     ($RGHT040)                 \BI =8 (R-J COMPLETE)\;            238  23E8 600
157900
158000              \MORE RIGHT-JUSTIFICATION REQUIRED\
158100     $        MMP    (0,A6,B6,A,SRQF)           \SHIFT RDB RIGHT 1 BIT\;           239  8466 CC0
158200     $        MMP    (7F#,A6,B6,DANDA,FR)       \SET RDB BIT 0 =C\;                23A  6566 C7F
158300     $        MMP    (0,A2,B2,AP1,FR)           \INCREMENT RBSR4\;                 23B  4422 100
158400     $        TAPA   (88#,A2,ALUEZ,DMA,QR)      \TEST RBSR4 =8\;                   23C  1562 388
158500     $        BR     ($REXEC00)                 \DONE IF NOT =8\;                  23D  01C8 600
158600
158700              \NOT BIT STREAM MODE AND NO R-J REQUIRED OR R-J COMPLETE\
158800   SRGHTC40   MMP    (3C#,A2,B2,D,FR)           \SET RDTCSTATE =LOAD FIFO.         23E  4722 C30
158900                                                 SET RBSR4 =0\;
159000     $        BR     ($REXEC00)                 \DONE\;                            23F  01C8 600
159100
159200              \BIT STREAM MODE   (RBSMFLG =1)\
159300   SRGHTC60   MMP    (4C#,A2,B2,D,FR)           \SET RDTCSTATE =FLIP/LH.           240  4722 C40
159400                                                 SET RBSR4 =0\;
159500     $        BR     ($REXEC00)                 \DONE\;                            241  01C8 600
159600
159700
159800
159900
160000              \******  FLIP LEFT HALF STATE  ******\
160100
160200
160300   SFLPLC00   MMP    (0,A1,B1,ALUZ,FR)          \SET RDB2 =0\;                     242  6211 CC0
160400     $        MMP    (6C#,A2,B2,D,FR)           \SET RDTCSTATE =FLIP/RH\;          243  4722 06C
160500     $        TAPA   (80#,A6,ALUEZ,DANDA,QR)    \EXTRACT AND TEST RDB.0\;          244  2576 280
160600     $        BR     ($FLPLB01)                 \BI =0\;                           245  2478 600
160700     $        MMP    (01#,A1,B1,DORA,FR)        \RDB.0 =1.  SET RDB2.7 =1\;        246  5011 001
160800   SFLPLB01   TAPA   (4C#,A6,ALUEZ,DANDA,QR)    \EXTRACT AND TEST RDB.1\;          247  2576 240
160900     $        BR     ($FLPLB02)                 \BI =0\;                           248  24A8 600
161000     $        MMP    (02#,A1,B1,DORA,FR)        \RDB.1 =1.  SET RDB2.6 =1\;        249  5011 002
161100   SFLPLB02   TAPA   (2C#,A6,ALUEZ,DANDA,QR)    \EXTRACT AND TEST RDB.2\;          24A  2576 220
161200     $        BR     ($FLPLB03)                 \BI =0\;                           24B  24C8 600
```

```
161300   $         MPP     (04#,A1,B1,DCRA,FR)      \RDB.2 =1.  SET RDB2.5 =1\;        24C  5011 0C4
161400   SFLPLBC3  TAMA    (1C#,A6,ALUEZ,DANDA,QR)  \EXTRACT AND TEST RDB.3\;          24D  2576 210
161500   $         BR      (SREXEC00)               \DCNE IF =0\;                      24E  01C8 600
161600   $         MPP     (CE#,A1,B1,DORA,FR)      \RDB.3 =1.  SET RDB2.4 =1\;        24F  5011 008
161700   $         BR      (SREXEC00)               \DCNE\;                            250  01C8 60C
161800
161900
162000
162100
162200                     \****** FLIP RIGHT HALF STATE ******\
162300
162400
162500   SFLPRCC0  TAMA    (CP#,A6,ALUEZ,DANDA,QR)  \EXTRACT AND TEST RDB.4\;          251  2576 208
162600   $         BR      (SFLPRB05)               \B1 =0\;                           252  2548 6CC
162700   $         MPP     (1C#,A1,B1,DCRA,FR)      \RDB.4 =1.  SET RDB2.3 =1\;        253  5011 C10
162800   SFLPREC5  TAMA    (04#,A6,ALUEZ,DANDA,QR)  \EXTRACT AND TEST RCB.5\;          254  2576 2C4
162900   $         BR      (SFLPRB06)               \B1 =0\;                           255  2578 6CC
163000   $         MMP     (20#,A1,B1,DCRA,FR)      \RDB.5 =1.  SET RDB2.2 =1\;        256  5011 C20
163100   SFLPREC6  TAMA    (C2#,A6,ALUEZ,DANDA,QR)  \EXTRACT AND TEST RCB.6\;          257  2576 2C2
163200   $         BR      (SFLPRB07)               \B1 =0\;                           258  25AB 6CC
163300   $         MPP     (4C#,A1,B1,DORA,FR)      \RDD.6 =1.  SET RDB2.1 =1\;        259  5011 040
163400   SFLPREC7  TAMA    (01#,A6,ALUEZ,DANDA,QR)  \EXTRACT AND TEST RDB.7\;          25A  2576 2C1
163500   $         BR      (SFLPRC20)               \B1 =0\;                           25B  2508 6CC
163600   $         MPP     (8C#,A1,B1,DCRA,FR)      \RCB.7 =1.  SET RDB2.0 =1\;        25C  5011 C80
163700   SFLPRC20  MPP     (C,A1,B6,A,FR)           \CCPY RDB2 TO RDB\;                25D  4461 CCC
163800   $         MPP     (30#,A2,B2,D,FR)         \SET RDTCSTATE =LOAD FIFO\;        25E  4722 C3C
163900   $         BR      (TREXEC00)               \DCNE\;                            25F  01C8 6C0
164000
164100
164200
164300
164400                     \****** LOAD FIFO STATE ******\
164500
164600
164700   SLOADCC0  TAMA    (C,AD,RFMIR,Q,QR)        \TEST FIFO READY\;                 260  0220 2CC
164800   $         BR      (SLOAD050)               \B1 FIFO NOT READY\;               261  2678 6C0
164900
165000                     \FIFC MEMORY AVAILABLE\
165100   $         SC      (C,RSRFM8,8C,Q,QR)       \CLEAR FIFO BUFFER TO 0\;          262  C2C4 400
165200   $         SC      (C,WRRFMS,80,Q,QR)       \CCPY FIFO BFR TO FIFO/STAT\;      263  C2C2 4C0
165300   $         MPP     (00#,A2,B2,D,FR)         \SET RDTCSTATE =OFF.               264  4722 0CC
165400                                                SET RBSR4 =C\;
165500   $         SC      (C,WRRFMBD,B6,A,FR)      \CCPY RDB TO FIFO BUFFER\;         265  4466 4CC
165600   $         BRSC    (SREXEC00,WRRFMD)        \CCPY FIFO BFR TO FIFO/DATA.       266  01C3 600
165700                                                DCNE\;
165800
165900                     \FIFC MEMORY NOT AVAILABLE\
166000   SLOADC50  MPP     (3C#,A2,B2,D,FR)         \SET RDTCSTATE =LOAD FIFO\;        267  4722 030
166100   $         BR      (SREXEC00)               \DCNE\;                            268  C1C8 6CC
166200
166300
166400   SKIP HCF;
166500
166600
166700                     \***********************************\
166800                     \**                               **\
166900                     \**  RECEIVE FLUSH CONTROL ROUTINE **\
167000                     \**                               **\
167100                     \***********************************\
167200
167300
167400
167500
167600                     \** INITIAL PROCESSING AND STATE SELECTION **\
167700
167800
167900                     \(RFCSTATE NOT =OFF.  CONTINUE PER RFCSTATE)\
168000   SRFCOCC0  TAMA    (4C#,A3,ALUEZ,DANDA,QR)  \XTRCT BIT 1, TST\;                269  2573 240
168100   $         BR      (SRFCU600)               \B1 BIT 1 =0(FLAG-A)\;             26A  2F48 6C0
168200
168300                     \NOT A FLAG-N STATE (BIT 1 =1)\
168400   $         TAMA    (C,AD,RFMIR,Q,QR)        \TST FIFO READY\;                  26B  0220 2C0
168500   $         BR      (SREXEC00)               \DCNE IF FIFO NOT READY\;          26C  01C8 600
168600                     \FIFC MEMORY AVAILABLE\
168700   $         TAMA    (2C#,A3,ALUEZ,DANDA,QR)  \EXTRACT BIT 2, TEST\;             26D  2573 220
168800   $         BR      (SRFC0800)               \B1 BIT 2 =0\;                     26E  2A18 600
168900
169000
169100
169200                     \** INPUT CRC TEST MODE STATES (RFCSTATE
169300                         BITS 0,1,2 =1,1,1)   **\
169400
169500   SRFC2CC0  TAMA    (08#,A3,ALUNEZ,CANDA,QR) \EXTRACT AND TEST BIT 4\;          26F  2563 2C8
169600   $         BR      (SRFC0250)               \B1 BIT 4 =1\;                     270  2938 600
169700
169800                     \RFCSTATE BIT 4 =0\
169900   $         TAMA    (C4#,A3,ALUNEZ,CANDA,QR) \EXTRACT AND TEST BIT 5\;          271  2563 204
170000   $         BR      (SRFC0240)               \B1 BIT 5 =1\;                     272  2788 600
170100
170200                     \RFCSTATE BIT 4 =0, BIT 5 =C\
170300   $         TAMA    (02#,A3,ALUNEZ,CANDA,QR) \EXTRACT AND TEST BIT 6\;          273  2563 2C2
170400   $         BR      (SRFC0220)               \B1 BIT 6 =1\;                     274  2788 6C0
170500
170600                     \RFCSTATE BIT 4 =0, BIT 5 =0, BIT 6 =0\
170700   $         TAMA    (C1#,A3,ALUEZ,DANDA,QR)  \EXTRACT AND TEST BIT 7\;          275  2573 2C1
170800   $         BR      (STST0000)               \B1 BIT 7 =0 (TEST-0)\;            276  34B5 600
```

```
170900    S         BR     ($TST1000)              \BI BIT 7 =1 (TEST-1)\;              277  3628 600
171000
171100              \RFCSTATE BIT 4 =0, BIT 5 =0, BIT 6 =1\
171200   SRFC0220   TAPA   (C1#,A3,ALUEZ,DANDA,QR) \EXTRACT AND TEST BIT 7\;            278  2573 2C1
171300    S         BR     ($TST2000)              \BI BIT 7 =0 (TEST-2)\;              279  3648 600
171400    S         BR     ($TST3000)              \BI BIT 7 =1 (TEST-3)\;              27A  3678 600
171500
171600              \RFCSTATE BIT 4 =0, BIT 5 =1\
171700   SRFC0240   TAPA   (C2#,A3,ALUNEZ,DANDA,QR) \EXTRACT AND TEST BIT 6\;           27B  2563 2C2
171800    S         BR     ($RFC0245)              \BI BIT 6 =1\;                       27C  2FC8 600
171900
172000              \RFCSTATE BIT 4 =0, BIT 5 =1, BIT 6 =0\
172100    S         TAPA   (C1#,A3,ALUEZ,DANDA,QR) \EXTRACT AND TEST BIT 7\;            27D  2573 2C1
172200    S         BR     ($TST4000)              \BI BIT 7 =0 (TEST-4)\;              27E  36A8 6C0
172300    S         BR     ($TST5000)              \BI BIT 7 =1 (TEST-5)\;              27F  3778 6C0
172400
172500              \RFCSTATE BIT 4 =0, BIT 5 =1, BIT 6 =1\
172600   SRFC0245   TAPA   (C1#,A3,ALUEZ,DANDA,QR) \EXTRACT AND TEST BIT 7\;            280  2573 201
172700    S         BR     ($TST6000)              \BI BIT 7 =0 (TEST-6)\;              281  3798 6CC
172800    S         BR     ($TST7000)              \BI BIT 7 =1 (TEST-7)\;              282  38F8 600
172900
173000              \RFCSTATE BIT 4 =1\
173100   SRFC0250   BR     ($RFC0250)              \ERROR HALT\;                        283  2838 6C0
173200
173300
173400
173500              \**    FLAG-N STATES   (RFCSTATE BITS 0,1 =1,0)    **\
173600
173700   SRFC0600   TAPA   (C8#,A3,ALUEZ,DANDA,QR) \EXTRACT AND TEST BIT 4\;            284  2563 2C8
173800    S         BR     ($RFC0650)              \BI BIT 4 =1\;                       285  29E8 6CC
173900
174000              \RFCSTATE BIT 4 =0\
174100    S         TAPA   (C4#,A3,ALUEZ,DANDA,QR) \EXTRACT AND TEST BIT 5\;            286  2563 204
174200    S         BR     ($RFC0640)              \BI BIT 5 =1\;                       287  29C8 600
174300
174400              \RFCSTATE BIT 4 =0, BIT 5 =0\
174500    S         TAPA   (C2#,A3,ALUEZ,DANDA,QR) \EXTRACT AND TEST BIT 6\;            288  2563 202
174600    S         BR     ($RFC0620)              \BI BIT 6 =1\;                       289  28C8 6CC
174700
174800              \RFCSTATE BIT 4 =0, BIT 5 =0, BIT 6 =0\
174900    S         TAPA   (C1#,A3,ALUEZ,DANDA,QR) \EXTRACT AND TEST BIT 7\;            28A  2573 2C1
175000    S         BR     ($FLG0000)              \BI BIT 7 =0 (FLAG-0)\;              28B  29A8 600
175100    S         BR     ($FLG1000)              \BI BIT 7 =1 (FLAG-1)\;              28C  2C68 6C0
175200
175300              \RFCSTATE BIT 4 =0, BIT 5 =0, BIT 6 =1\
175400   SRFC0620   TAPA   (C1#,A3,ALUEZ,DANDA,QR) \EXTRACT AND TEST BIT 7\;            28D  2573 2C1
175500    S         BR     ($FLG2000)              \BI BIT 7 =0 (FLAG-2)\;              28E  2D38 6CC
175600    S         BR     ($FLG3000)              \BI BIT 7 =1 (FLAG-3)\;              28F  2E18 6C0
175700
175800              \RFCSTATE BIT 4 =0, BIT 5 =1\
175900   SRFC0640   TAPA   (C2#,A3,ALUNEZ,DANDA,QR) \EXTRACT AND TEST BIT 6\;           290  2563 2C2
176000    S         BR     ($RFC0645)              \BI BIT 6 =1\;                       291  2958 600
176100
176200              \RFCSTATE BIT 4 =0, BIT 5 =1, BIT 6 =0\
176300    S         TAPA   (C1#,A3,ALUEZ,DANDA,QR) \EXTRACT AND TEST BIT 7\;            292  2573 2C1
176400    S         BR     ($FLG4000)              \BI BIT 7 =0 (FLAG-4)\;              293  3168 6C0
176500    S         BR     ($FLG5000)              \BI BIT 7 =1 (FLAG-5)\;              294  3258 6CC
176600
176700              \RFCSTATE BIT 4 =0, BIT 5 =1, BIT 6 =1\
176800   SRFC0645   TAPA   (C1#,A3,ALUEZ,DANDA,QR) \EXTRACT AND TEST BIT 7\;            295  2573 2C1
176900    S         BR     ($FLG6000)              \BI BIT 7 =0 (FLAG-6)\;              296  3348 6CC
177000    S         BR     ($FLG7000)              \BI BIT 7 =1 (FLAG-7)\;              297  33F8 6C0
177100
177200              \RFCSTATE BIT 4 =1\
177300   SRFC0650   TAPA   (C4#,A3,ALUEZ,DANDA,QR) \EXTRACT AND TEST BIT 5\;            298  2563 2C4
177400    S         BR     ($RFC0680)              \BI BIT 5 =1\;                       299  2AC8 6C0
177500
177600              \RFCSTATE BIT 4 =1, BIT 5 =0\
177700    S         TAPA   (C2#,A3,ALUNEZ,DANDA,QR) \EXTRACT AND TEST BIT 6\;           29A  2563 2C2
177800    S         BR     ($RFC0670)              \BI BIT 6 =1\;                       29B  29F8 600
177900
178000              \RFCSTATE BIT 4 =1, BIT 5 =0, BIT 6 =0\
178100    S         TAPA   (C1#,A3,ALUEZ,DANDA,QR) \EXTRACT AND TEST BIT 7\;            29C  2573 2C1
178200    S         BR     ($FLG8000)              \BI BIT 7 =0 (FLAG-8)\;              29D  3458 6CC
178300   SRFC0655   BR     ($RFC0655)              \ERROR HALT IF BIT 7 =1\;            29E  29E8 600
178400
178500              \RFCSTATE BIT 4 =1, BIT 5 =0, BIT 6 =1\
178600   SRFC0670   BR     ($RFC0670)              \ERROR HALT\;                        29F  29F8 6C0
178700
178800              \RFCSTATE BIT 4 =1, BIT 5 =1\
178900   SRFC0680   BR     ($RFC0680)              \ERROR HALT\;                        2A0  2AC8 6CC
179000
179100
179200
179300              \**    RFCSTATE BIT 2 =0    (AENORMAL STATES)   **\
179400
179500   SRFC0800   TAPA   (C2#,A3,ALUEZ,DANDA,QR) \XTRCT BIT 6, TST\;                  2A1  2573 202
179600    S         BR     ($RFC0820)              \BI BIT 6 =0\;                       2A2  2A68 600
179700              \BIT 6 =1\
179800    S         TAPA   (C1#,A3,ALUEZ,DANDA,QR) \XTRCT BIT 7, TST\;                  2A3  2573 2C1
179900    S         BR     ($AOVR000)              \BI BIT 7 =0(ABRT OVRN)\;            2A4  2868 600
180000    S         BR     ($FOVR000)              \BI BIT 7 =1(FLG OVRN)\;             2A5  2888 6C0
180100              \BIT 6 =0\
180200   SRFC0820   TAPA   (C1#,A3,ALUEZ,DANDA,QR) \XTRCT BIT 7, TST\;                  2A6  2573 2C1
180300    S         BR     ($ILMF000)              \BI BIT 7 =0(IL-MF)\;                2A7  2A98 6C0
```

```
180400   S           BR        (SABORT00)                    \BI BIT 7 =1(ABORT)\;              2A8   2AC8  6C0
180500
180600
180700
180800
180900
181000
181100               \****** IDLE LINK - MISSED FRAMES STATE ******\
181200
181300
181400   SILMFG00    MMP       (CC#,A9,B5,DANDA,FR)          \CCPY RILSFLG,ROSD                  2A9   6559  CC0
181500                                                       TO ABORT/IDLE,OVERRUN\;
181600   S           MMP       (3F#,A9,B9,DANDA,FR)          \SET RILSFLG,ROSD =0,0\;            2AA   6599  03F
181700   S           BR        (SRPTS005)                    \GC TO REPORT STATUS SUBR\;         2AB   38C8  6C0
181800
181900
182000
182100
182200               \****** ABORT STATE ******\
182300
182400
182500   SABORTC0    TAPA      (C8#,A8,ALUNEZ,DANDA,QR)      \TEST RICRCTMS\;                    2AC   2568  2C8
182600   S           BR        (SABORT20)                    \BI =1 (TEST MODE)\;                2AD   2B28  6C0
182700
182800               \NOT INPUT CRC TEST MODE (RICRCTMS =0)\
182900   S           MMP       (0,A6,B6,D,FR)                \SET RDB =0\;                       2AE   4766  0CC
183000   S           MMP       (DD#,A9,B9,DANDA,FR)          \SET REOFFLG,RSRB =0,0\;            2AF   6599  0CD
183100   S           MMP       (90#,A5,B5,D,FR)              \SET ECF,ABRT/IDLE =1,1\;           2B0   4755  09C
183200   S           BR        (SRPTS000)                    \BR TO REPORT STATUS SUBR\;         2B1   38B8  6C0
183300
183400               \INPUT CRC TEST MODE (RICRCTMS =1)\
183500   SABORT20    MMP       (EC#,A3,B3,D,FR)              \SET RFCSTATE =TEST-0\;             2B2   4733  0EC
183600   S           MMP       (0,AC,B6,A,FR)                \CCPY RSR24/31 TO RCB\;             2B3   446C  0C0
183700   S           MMP       (A0#,A5,B5,DORA,FR)           \SET ABRT/IDLE,FCSERR =1,1\;        2B4   5D55  0AC
183800   S           BR        (SREXEC00)                    \DONE\;                             2B5   01C8  6C0
183900
184000
184100
184200
184300               \****** ABORT OVERRUN STATE ******\
184400
184500
184600   SAOVRC00    MMP       (0C#,A5,B5,D,FR)              \SET EOF,ABRT,OVRN =1\;             2B6   4755  CDC
184700   S           BR        (SRPTS000)                    \BR TO REPORT STATUS SUBR\;         2B7   38B8  6C0
184800
184900
185000
185100
185200               \****** FLAG OVERRUN STATE ******\
185300
185400
185500   SFOVRC00    MMP       (5C#,A5,B5,D,FR)              \SET EOF,OVRN =1\;                  2B8   4755  05C
185600   S           BR        (SRPTS000)                    \BR TO REPORT STATUS SUBR\;         2B9   38B8  6C0
185700
185800
185900
186000
186100               \****** FLAG-0 STATE ******\
186200
186300
186400               \DETERMINE NEXT STATE\
186500
186600   SFLG0C00    MMP       (0,AC,B6,A,FR)                \COPY RSR24/31 TO RDP\;             2BA   446C  0C0
186700   S           TAPA      (C8#,A8,ALUNEZ,DANDA,QR)      \TEST RICRCTMS\;                    2BB   2568  2C8
186800   S           BR        (SFLG0020)                    \BI =1 (TEST MODE)\;                2BC   2C38  6C0
186900
187000               \NOT INPUT CRC TEST MODE (RICRCTMS =0)\
187100   S           TAPA      (1C#,A0,ALUNEZ,DANDA,QR)      \EXTRACT AND TEST RFCSIE\;          2BD   2560  210
187200   S           BR        (SFLG0015)                    \BI RFCSIE =1\;                     2BE   2C18  6C0
187300               \NCT RECEIVE FCS INPUT MODE (RFCSIE =0)\
187400   S           MMP       (81#,A3,B3,D,FR)              \SET RFCSTATE =FLAG-1\;             2BF   4733  081
187500   S           BR        (SREXEC00)                    \DONE\;                             2C0   01C8  6C0
187600               \RECEIVE FCS INPUT MODE (RFCSIE =1)\
187700   SFLG0015    MMP       (83#,A3,B3,D,FR)              \SET RFCSTATE =FLAG-3\;             2C1   4733  083
187800   S           BR        (SREXEC00)                    \DONE\;                             2C2   01C8  6C0
187900
188000               \INPUT CRC TEST MODE (RICRCTMS =1)\
188100   SFLG0C20    MMP       (EC#,A3,B3,D,FR)              \SET RFCSTATE =TEST-0\;             2C3   4733  0E0
188200   S           MMP       (2C#,A5,B5,DORA,FR)           \SET ABRT/IDLE,FCSERR =0,1\;        2C4   5D55  02C
188300   S           BR        (SREXEC00)                    \DONE\;                             2C5   01C8  6C0
188400
188500
188600
188700
188800               \****** FLAG-1 STATE ******\
188900
189000
189100               \CHECK FIRST HALF OF RESIDUE IN CRC REGISTER\
189200
189300   SFLG1C00    MMP       (82#,A3,B3,D,FR)              \SET RFCSTATE =FLAG-2\\;            2C6   4733  082
189400               \SHIFT IN RIGHT HALF CRC REGISTER (IN REVERSE ORDER
189500                AND ONES COMPLEMENTED)\
189600   S           RFCSR     (C,AC,B0,A,SLQF)              \SHIFT IN CRC REG BIT 15\;          2C7   C4C0  A00
189700   S           RFCSR     (0,A0,B0,A,SLQF)              \SHIFT IN CRC REG BIT 14\;          2C8   C4C0  AC0
189800   S           RFCSR     (0,A0,B0,A,SLQF)              \SHIFT IN CRC REG BIT 13\;          2C9   C4C0  A0C
189900   S           RFCSR     (0,A0,B0,A,SLQF)              \SHIFT IN CRC REG BIT 12\;          2CA   C4C0  ACC
```

```
190000  $       RFCSR   (C,A0,B0,A,SLQF)         \SHIFT IN CRC REG BIT 11\;           2CB  C4C0 ACC
190100  $       RFCSR   (C,A0,B0,A,SLQF)         \SHIFT IN CRC REG BIT 10\;           2CC  C4C0 ACC
190200  $       RFCSR   (C,A0,B0,A,SLQF)         \SHIFT IN CRC REG BIT 09\;           2CD  C4C0 ACC
190300  $       RFCSR   (C,A0,B0,A,SLQF)         \SHIFT IN CRC REG BIT 08\;           2CE  C4C0 ACC
190400  $       TAPA    (E2H,A0,ALUEZ,DMA,QR)    \TEST =E2(HEX)\;                     2CF  1570 3E2
190500  $       BR      ($REXEC00)               \DCNE IF =E2 (NO FCS ERROR)\;        2D0  01C8 600
190600          \FCS ERROR (RIGHT-HALF RESIDUE NCT =E8)\
190700  $       PPF     (2CH,A5,B5,DORA,FR)      \SET FCS ERR =1\;                    2D1  5D55 C2C
190800  $       BR      ($REXEC00)               \DCNE\;                              2D2  01C8 600
190900
191000
191100
191200
191300          \****** FLAG-2 STATE ******\
191400
191500
191600          \CHECK SECOND HALF OF RESIDUE IN CRC REGISTER\
191700
191800  $FLG2C00 MPF    (83H,A3,B3,0,FR)         \SET RFCSTATE =FLAG-3\;              2D3  4733 CE3
191900  $        MPP    (DFH,A9,B9,DANDA,FR)     \SET RSRB =0\;                       2D4  6599 0DF
192000          \SHIFT IN LEFT HALF CRC REGISTER (IN REVERSE ORDER
192100           AND ONES COMPLEMENTED)\
192200  $       RFCSR   (0,A0,B0,A,SLQF)         \SHIFT IN CRC REG BIT 07\;           2D5  C4C0 A00
192300  $       RFCSR   (0,A0,B0,A,SLQF)         \SHIFT IN CRC REG BIT 06\;           2D6  C4C0 ACC
192400  $       RFCSR   (0,A0,B0,A,SLQF)         \SHIFT IN CRC REG BIT 05\;           2D7  C4C0 A00
192500  $       RFCSR   (0,A0,B0,A,SLQF)         \SHIFT IN CRC REG BIT 04\;           2D8  C4C0 A00
192600  $       RFCSR   (0,A0,B0,A,SLQF)         \SHIFT IN CRC REG BIT 03\;           2D9  C4C0 A00
192700  $       RFCSR   (0,A0,B0,A,SLQF)         \SHIFT IN CRC REG BIT 02\;           2DA  C4C0 A00
192800  $       RFCSR   (0,A0,B0,A,SLQF)         \SHIFT IN CRC REG BIT 01\;           2DB  C4C0 A00
192900  $       RFCSR   (0,A0,B0,A,SLQF)         \SHIFT IN CRC REG BIT 00\;           2DC  C4C0 A00
193000  $       TAPA    (FCH,A0,ALUEZ,DMA,QR)    \TEST =F0(HEX)\;                     2DD  1570 3F0
193100  $       BR      ($REXEC00)               \DCNE IF =F0 (NO FCS ERROR)\;        2DE  01C8 600
193200          \FCS ERROR (LEFT-HALF RESIDUE NOT =F0)\
193300  $       MMP     (2CH,A5,B5,DORA,FR)      \SET FCS ERR =1\;                    2DF  5055 020
193400  $       BR      ($REXEC00)               \DCNE\;                              2E0  01C8 600
193500
193600
193700
193800
193900          \****** FLAG-3 STATE ******\
194000
194100
194200          \RIGHT-JUSTIFY LAST BYTE (IF REQUIRED)\
194300
194400  $FLG3000 TAPA   (8,AB,ALUFZ,DMA,QR)      \TEST RBSR2 =8\;                     2E1  1570 30B
194500  $        BR     ($FLG3040)               \BI =8 (NO R-J REQUIRED)\;           2E2  2EE8 6C0
194600
194700          \RBSR2 NCT =8 AT ENTRY\
194800  $FLG3C20 TAPA   (8CH,A8,ALUNEZ,DANDA,QR) \TEST RMMS\;                         2E3  25E3 280
194900  $        BR     ($FLG3100)               \BI =1 (HMLC MODE)\;                 2E4  2F5A 600
195000
195100
195200          \MLCP MODE (RMMS =0)\
195300  $       MMF     (0,A6,B6,A,SRQF)         \SHIFT RDB RIGHT 1 BIT\;             2E5  8466 000
195400  $       PPF     (7FH,A6,B6,DANDA,FR)     \SET RDB BIT 0 =0\;                  2E6  6566 07F
195500  $       PPP     (C,AB,BB,AP1,FR)         \INCREMENT RBSR2\;                   2E7  44B8 1CC
195600  $       TAPA    (8,AB,ALUEZ,DMA,QR)      \TEST RBSR2 =8\;                     2E8  1570 3C8
195700  $       BR      ($FLG3040)               \BI RBSR2 =8\;                       2E9  2EE8 600
195800          \MORE RIGHT-JUSTIFICATION REQUIRED (RBSR2 NOT =8)\
195900          \(SHARED CODING)\
196000  $FLG3038 PPF    (0,A6,B6,A,SRQF)         \SHIFT RDB RIGHT 1 BIT\;             2EA  8466 0C0
196100  $       PPF     (7FH,A6,B6,DANDA,FR)     \SET RDB BIT 0 =0\;                  2EB  6566 07F
196200  $       MPP     (0,AB,BB,AP1,FR)         \INCREMENT RBSR2\;                   2EC  44B8 100
196300  $       BR      ($REXEC00)               \DCNE\;                              2ED  01C8 6C0
196400
196500          \NC RIGHT-JUSTIFICATION REQUIRED, OR
196600           RIGHT-JUSTIFICATION COMPLETE\
196700  $FLG3C40 MMF    (FDH,A9,B9,DANDA,FR)     \SET REOFFLG =0\;                    2EE  6599 0FD
196800  $        TAPA   (1CH,A9,ALUNEZ,DANDA,QR) \EXTRACT AND TEST RBSMFLG\;          2EF  2569 210
196900  $        BR     ($FLG3060)               \BI RBSMFLG =1\;                     2F0  2F38 600
197000          \NCT IN BIT STREAM MODE (RBSMFLG=0)\
197100  $       MMP     (86H,A3,B3,0,FR)         \SET RFCSTATE =FLAG-6\;              2F1  4733 086
197200  $       BR      ($REXEC00)               \DONE\;                              2F2  C1C8 6CC
197300          \BIT STREAM MODE (RBSMFLG =1)\
197400  $FLG3C60 MMP    (84H,A3,B3,0,FR)         \SET RFCSTATE =FLAG-4\;              2F3  4733 084
197500  $        BR     ($REXEC00)               \DCNE\;                              2F4  C1C8 6CC
197600
197700
197800          \HMLC MODE (RMMS =1)\
197900  $FLG3100 TAMN   (1CH,A9,ALUNEZ,DANDA,QR) \TEST RBSMFLG\;                      2F5  2569 210
198000  $        BR     ($FLG3200)               \BI =1 (BIT STREAM MODE)\;           2F6  3058 600
198100
198200          \NCT BIT STREAM MODE (RBSMFLG =C)\
198300  $       PPP     (C,A6,B6,A,SRQF)         \SHIFT RDB RIGHT 1 BIT\;             2F7  8466 000
198400  $       TAPA    (C2H,A9,ALUEZ,DANDA,QR)  \TEST REOFFLG\;                      2F8  2579 202
198500  $       BR      ($FLG3120)               \BI =0 (NOT FIRST ENTRY)\;           2F9  2FFB 6C0
198600
198700          \FIRST ENTRY (REOFFLG =1)\
198800  $       PPF     (FDH,A9,B9,DANDA,FR)     \SET REOFFLG =0\;                    2FA  6599 0FD
198900  $       TAPA    (01H,A5,ALUEZ,DANDA,QR)  \TEST RPLB\;                         2FB  2575 2C1
199000  $       BR      ($FLG3120)               \BI =0 (FULL BYTE)\;                 2FC  2FFB 600
199100          \PARTIAL BYTE (RPLB =1)\
199200  $       PPF     (8CH,A6,B6,DORA,FR)      \SET RDB BIT 0 =1\;                  2FD  5066 030
199300  $       BR      ($FLG3125)               \CCNTINUE BELOW\;                    2FE  30C8 600
199400
199500          \NCT FIRST ENTRY (REOFFLG =0), OR FULL BYTE (RPLB =0)\
```

```
199600   SFLG3120   MMP    (7F#,A6,B6,DANDA,FR)      \SET RDB BIT 0 =0\;              2FF   6566  C7F
199700
199800              \(CONTINUE)\
199900   SFLG3125   MMP    (C,AB,BB,AP1,FR)          \INCREMENT RBSR2\;               300   4468  1CC
200000   $          TAPA   (8,A0,ALUNEZ,DMA,QR)      \TEST RBSR2 =8\;                 301   1568  308
200100   $          BR     ($FLG3038)                \BI NOT =8 (MORE R-J REQD)\;     302   2EA8  6CC
200200              \RIGHT-JUSTIFICATION COMPLETE    (RESR2 =8)\
200300   $          MMP    (86#,A3,B3,D,FR)          \SET RFCSTATE =FLAG-6\;          303   4733  086
200400   $          BR     ($REXEC00)                \DONE\;                          304   01C8  600
200500
200600              \BIT STREAM MODE   (RBSMFLG =1)\
200700   SFLG32C0   TAPA   (6,AB,ALUNEZ,DMA,QR)      \TEST RBSR2 =6\;                 305   1568  306
200800   $          BR     ($FLG3220)                \BI NOT =6 (R-J REQUIRED)\;      306   30E8  6C0
200900
201000              \NO RIGHT-JUSTIFICATION REQUIRED (RBSR2 =6 AT ENTRY)\
201100   $          MMP    (FC#,A9,B9,DANDA,FR)      \SET REOFFLG =0\;                3C7   6599  CFC
201200   SFLG3210   MMP    (FC#,A6,B6,DANDA,FR)      \SET RDB BITS 6,7 =0,0\;         3C8   6566  CFC
201300   $          MMP    (84#,A3,B3,D,FR)          \SET RFCSTATE =FLAG-4\;          309   4733  084
201400   $          BR     ($REXEC00)                \DONE\;                          3CA   01C8  600
201500
201600              \RIGHT-JUSTIFICATION REQUIRED    (RBSR2 NOT =6 AT ENTRY)\
201700   SFLG3220   MMP    (C,A6,B6,A,SRQF)          \SHIFT RDB RIGHT 1 BIT\;         3CB   8466  CC0
201800   $          TAPA   (02#,A9,ALUEZ,DANDA,QR)   \TEST REOFFLG\;                  30C   2579  2C2
201900   $          BR     ($FLG3230)                \BI =0 (NOT FIRST ENTRY)\;       30D   3118  600
202000
202100              \FIRST ENTRY  (RECFFLG =1)\
202200   $          MMP    (F0#,A9,B9,DANDA,FR)      \SET RECFFLG =0\;                3CE   6599  CF0
202300   $          MMP    (80#,A6,B6,DORA,FR)       \SET RDB BIT 0 =1\;              30F   5066  030
202400   $          BR     ($FLG3235)                \CONTINUE BELOW\;                310   3128  600
202500
202600              \NOT FIRST ENTRY  (RECFFLG =0)\
202700   SFLG3230   MMP    (7F#,A6,B6,DANDA,FR)      \SET RDB BIT 0 =0\;              311   6566  C7F
202800
202900              \(CONTINUE)\
203000   SFLG3235   MMP    (0,AB,BB,AP1,FR)          \INCREMENT RBSR2\;               312   4468  1CC
203100   $          TAPA   (6,AB,ALUNEZ,DMA,QR)      \TEST RBSR2 =6\;                 313   1568  3C6
203200   $          BR     ($FLG3038)                \BI NOT =6 (MORE R-J REQD)\;     314   2EA8  6C0
203300   $          BR     ($FLG3210)                \BI =6 (R-J COMPLETE)\;          315   30E8  6C0
203400
203500
203600
203700
203800              \****** FLAG-4 STATE ******\
203900
204000
204100              \FLIP LEFT HALF OF LAST DATA BYTE (BIT STREAM MODE)\
204200
204300   SFLG4CC0   MMP    (85#,A3,B3,D,FR)          \SET RFCSTATE =FLAG-5\;          316   4733  085
204400   $          MMP    (0,AB,BB,ALUZ,FR)         \SET RBSR2 =0\;                  317   62B8  0C0
204500   $          TAPA   (80#,A6,ALUEZ,DANDA,QR)   \EXTRACT AND TEST RDB.0\;        318   2576  280
204600   $          BR     ($FLG4B01)                \BI =0\;                         319   31B8  600
204700   $          MMP    (01#,AB,B0,DCRA,FR)       \RDB.0 =1.  SET RBSR2.7 =1\;     31A   5DB8  CC1
204800   SFLG4BC1   TAPA   (40#,A6,ALUEZ,DANDA,QR)   \EXTRACT AND TEST RDB.1\;        31B   2576  240
204900   $          BR     ($FLG4B02)                \BI =0\;                         31C   31E8  600
205000   $          MMP    (02#,AB,BB,DORA,FR)       \RDB.1 =1.  SET RBSR2.6 =1\;     31D   5DB9  0C2
205100   SFLG4BC2   TAPA   (2C#,A6,ALUEZ,DANDA,QR)   \EXTRACT AND TEST RDB.2\;        31E   2576  220
205200   $          BR     ($FLG4B03)                \BI =0\;                         31F   3218  6C0
205300   $          MMP    (04#,AB,BB,DORA,FR)       \RDB.2 =1.  SET RBSR2.5 =1\;     320   5DB8  004
205400   SFLG4BC3   TAPA   (10#,A6,ALUEZ,DANDA,QR)   \EXTRACT AND TEST RDB.3\;        321   2576  210
205500   $          BR     ($REXEC00)                \DONE IF =0\;                    322   C1C8  6C0
205600   $          MMP    (08#,AB,BB,DCRA,FR)       \RDB.3 =1.  SET RBSR2.4 =1\;     323   5DB8  CC8
205700   $          BR     ($REXEC00)                \DONE\;                          324   01C8  600
205800
205900
206000
206100
206200              \****** FLAG-5 STATE ******\
206300
206400
206500              \FLIP RIGHT HALF OF LAST DATA BYTE (BIT STREAM MODE)\;
206600
206700   SFLG5CC0   MMP    (86#,A3,B3,D,FR)          \SET RFCSTATE =FLAG-6\;          325   4733  086
206800   $          TAPA   (28#,A6,ALUEZ,DANDA,QR)   \EXTRACT AND TEST RDB.4\;        326   2576  2C8
206900   $          BR     ($FLG5B05)                \BI =0\;                         327   3298  6CC
207000   $          MMP    (1C#,AB,BB,DORA,FR)       \RDB.4 =1.  SET RBSR2.3 =1\;     328   5DB8  010
207100   SFLG5BC5   TAPA   (04#,A6,ALUEZ,DANDA,QR)   \EXTRACT AND TEST RDB.5\;        329   2576  2C4
207200   $          BR     ($FLG5B06)                \BI =0\;                         32A   32C8  6C0
207300   $          MMP    (2C#,AB,BB,DORA,FR)       \RDB.5 =1.  SET RBSR2.2 =1\;     32B   5DB9  02C
207400   SFLG5BC6   TAPA   (02#,A6,ALUEZ,DANDA,QR)   \EXTRACT AND TEST RDB.6\;        32C   2576  2C2
207500   $          BR     ($FLG5B07)                \BI =0\;                         32D   32F9  600
207600   $          MMP    (4C#,AB,BB,DORA,FR)       \RDB.6 =1.  SET RBSR2.1 =1\;     32E   5DB8  C40
207700   SFLG5B07   TAPA   (01#,A6,ALUEZ,DANDA,QR)   \EXTRACT AND TEST RDB.7\;        32F   2576  2C1
207800   $          BR     ($FLG5200)                \BI =0\;                         330   3328  6CC
207900   $          MMP    (8C#,AB,BB,DORA,FR)       \RDB.7 =1.  SET RBSR2.0 =1\;     331   5DB8  080
208000   SFLG5200   MMP    (0,AB,B6,A,FR)            \COPY RBSR2 TO RDB\;             332   4468  000
208100   $          BR     ($REXEC00)                \DONE\;                          333   C1C8  6C0
208200
208300
208400
208500
208600              \****** FLAG-6 STATE ******\
208700
208800
208900              \LOAD LAST DATA BYTE AND EOF STATUS INTO FIFO MEMORY\
209000
209100   SFLG6CC0   TAPA   (0,A0,RFMIR,Q,QR)         \TEST FIFO INPUT READY\;         334   C220  2C0
```

```
209200  $         BR      ($FLG6100)              \BI FIFO NOT READY\;              335  3308 600
209300
209400            \FIFO MEMORY AVAILABLE\
209500  $         MMP     (1C#,A5,B5,CCRA,FR)     \SET EOF =1\;                     336  5055 010
209600  $         RER     (FF#,A0,B0,D,FR)        \READ CONTROL WORD TO FO\;        337  4700 EFF
209700  $         TAMA    (1G#,A0,ALUNEZ,DANDA,QR) \EXTRACT AND TEST RFCSIE\;       338  2560 210
209800  $         BR      ($FLG6040)              \BI RFCSIE =1\;                   339  33BB 6C0
209900            \NOT IN FCS INPUT MODE (RFCSIE =C)\
210000  $         BR      ($RPTS000)              \BR TO REPORT STATUS SUBR\;       33A  3898 600
210100            \FCS INPUT MODE (RFCSIE =1)\
210200  SFLG6040  MMP     (87#,A3,B3,D,FR)        \SET RFCSTATE =FLAG-7\;           33B  4733 087
210300  $         BR      ($RPTS020)              \CC TO REPORT STATUS SUBR,        33C  3BE4 600
210400                                             ENTRY POINT B\;
210500
210600            \FIFO MEMORY NOT AVAILABLE\
210700  SFLG6100  MMP     (86#,A3,B3,D,FR)        \SET RFCSTATE =FLAG-6\;           33D  4733 086
210800  $         BR      ($REXEC00)              \PONE\;                           33E  C1C8 6CC
210900
211000
211100
211200            \****** FLAG-7 STATE ******\
211300
211400
211500            \LOAD 1ST HALF RCVD FCS SEG INTO FIFO (FCS INPUT MODE)\
211600
211700  SFLG7000  TAMA    (C,A0,RFMIR,Q,QR)       \TEST FIFO INPUT READY\;          33F  C220 200
211800  $         BR      ($REXEC00)              \DONE IF FIFO NOT READY\;         340  01C8 600
211900
212000            \FIFO MEMORY AVAILABLE\
212100  $         MMP     (1C#,A5,B5,D,FR)        \SET RSB =1C(HEX)\;               341  4755 01C
212200  $         MMP     (88#,A3,B3,D,FR)        \SET RFCSTATE =FLAG-8\;           342  4733 088
212300  $         MMP     (C,A0,D6,A,FR)          \COPY RSR16/23 (FCS.RH)           343  446D 0C0
212400                                             INTO RDB\;
212500  $         BR      ($RPTS020)              \CC TO REPORT STATUS SUBR,        344  3BE8 6C0
212600                                             ENTRY POINT B\;
212700
212800
212900
213000
213100            \****** FLAG-8 STATE ******\
213200
213300
213400            \LOAD 2ND HALF RCVD FCS SEG INTO FIFO (FCS INPUT MODE)\
213500
213600  SFLG8000  TAMA    (0,A0,RFMIR,Q,QR)       \TEST FIFO INPUT READY\;          345  0220 200
213700  $         BR      ($REXEC00)              \DONE IF FIFO NOT READY\;         346  01C8 6CC
213800
213900            \FIFO MEMORY AVAILABLE\
214000  $         MMP     (1C#,A5,B5,D,FR)        \SET RSB =1C(HEX)\;               347  4755 01C
214100  $         MMP     (DF#,A9,B9,DANDA,FR)    \SET RSRB =0\;                    348  6599 0DF
214200  $         MMP     (0,AE,B6,A,FR)          \COPY RSR08/15 (FCS.LH)           349  446E 0C0
214300                                             INTO RDB\;
214400  $         BR      ($RPTS000)              \GO TO REPORT STATUS SUBR\;       34A  3898 6C0
214500
214600
214700
214800
214900            \****** TEST-0 STATE ******\
215000
215100            \RIGHT-JUSTIFY LAST BYTE (IF REQUIRED)\
215200
215300  STST00C0  TAMA    (8,A8,ALUEZ,DMA,QR)     \TEST RBSR2 =8\;                  34B  1578 308
215400  $         BR      ($TST0040)              \BI RBSR2 =8\;                    34C  35FB 600
215500            \RIGHT-JUSTIFICATION REQUIRED (RBSR2 NOT =8)\
215600  $         MMP     (0,A6,B6,A,SRQF)        \SHIFT RDB RIGHT 1 BIT\;          34D  8466 000
215700  $         TAMA    (02#,A9,ALUEZ,DANDA,QR) \TEST REOFFLG\;                   34E  2579 2C2
215800  $         BR      ($TST0030)              \BI =1 (NOT FIRST ENTRY)\;        34F  3578 600
215900
216000            \FIRST ENTRY (REOFFLG =1)\
216100  $         MMP     (FD#,A9,B9,DANDA,FR)    \SET REOFFLG =0\;                 350  6599 0FD
216200  $         TAMA    (80#,A8,ALUEZ,DANDA,QR) \TEST RHMS\;                      351  2578 280
216300  $         BR      ($TST0030)              \BI =0 (HLCP MODE)\;              352  3578 600
216400
216500            \FIRST ENTRY (REOFFLG =1) AND HMLC MODE (RMMS =1)\
216600  $         TAMA    (01#,A5,ALUEZ,DANDA,QR) \TEST RPLB\;                      353  2575 2C1
216700  $         BR      ($TST0030)              \BI =0 (FULL BYTE)\;              354  3578 6CC
216800            \PARTIAL BYTE (RPLB =1)\
216900  $         MMP     (80#,A6,B6,DORA,FR)     \SET RDB BIT 0 =1\;               355  5066 080
217000  $         BR      ($TST0035)              \CONTINUE BELOW\;                 356  35B8 6C0
217100
217200            \NOT FIRST ENTRY (REOFFLG =C), OR HLCP MODE (RMMS =0), OR
217300             FULL BYTE (RPLB =0)\
217400  STST0030  MMP     (7F#,A6,B6,DANDA,FR)    \SET RDB BIT 0 =0\;               357  6566 07F
217500
217600            \(CONTINUE)\
217700  STST0035  MMP     (0,A8,BB,AP1,FR)        \INCREMENT RBSR2\;                358  4489 1C0
217800  $         TAMA    (8,A8,ALUEZ,DMA,QR)     \TEST RBSR2 =8\;                  359  1578 308
217900  $         BR      ($TST0040)              \BI RBSR2 =8\;                    35A  35FB 6CO
218000            \MORE RIGHT-JUSTIFICATION REQUIRED (RBSR2 NOT =8)\
218100  $         MMP     (0,A6,B6,A,SRQF)        \SHIFT RDB RIGHT 1 BIT\;          35B  8466 CCC
218200  $         MMP     (7F#,A6,B6,DANDA,FR)    \SET RDB BIT 0 =0\;               35C  6566 C7F
218300  $         MMP     (0,A8,BB,AP1,FR)        \INCREMENT RBSR2\;                35D  4489 100
218400  $         BR      ($REXEC00)              \DONE\;                           35E  C1C8 600
218500
218600            \NO RIGHT-JUSTIFICATION REQD OR RGHT-JUSTIFICATION COMPLETE\
218700  STST0040  MMP     (FD#,A9,B9,DANDA,FR)    \SET REOFFLG =0\;                 35F  6599 0FD
```

```
218800  $         MMP     (E1#,A3,B3,D,FR)              \SET RFCSTATE =TEST-1\;              360  4733 CE1
218900  $         BR      ($REXEC00)                    \DONE\;                              361  C1C8 6C0
219000
219100
219200
219300
219400             \****** TEST-1 STATE ******\
219500
219600
219700             \LOAD STATUS AND LAST DATA BYTE INTO FIFO\
219800
219900  STST1000  MMP     (E2#,A3,B3,D,FR)              \SET RFCSTATE =TEST-2\;              362  4733 0E2
220000  $         BR      ($RPTS020)                    \BR TO REPORT STATUS SUBR,           363  3EE8 6C0
220100                                                   ENTRY POINT 0\;
220200
220300
220400
220500
220600             \****** TEST-2 STATE ******\
220700
220800
220900             \LOAD RIGHT HALF RECEIVED FCS INTO FIFO\
221000
221100  STST2C00  MMP     (0,AD,B6,A,FR)                \COPY RSR16/23 INTO RDB\;            364  446D 000
221200  $         MMP     (E3#,A3,B3,D,FR)              \SET RFCSTATE =TEST-3\;              365  4733 CE3
221300  $         BR      ($LDIF000)                    \BR TO LDIF SUBR\;                   366  3938 6C0
221400
221500
221600
221700
221800             \****** TEST-3 STATE ******\
221900
222000
222100             \LOAD LEFT HALF RECEIVED FCS INTO FIFO\
222200
222300  STST3C00  MMP     (0,AE,B6,A,FR)                \COPY RSR08/15 INTO RDB\;            367  446E 0C0
222400  $         MMP     (E4#,A3,B3,D,FR)              \SET RFCSTATE =TEST-4\;              368  4733 CE4
222500  $         BR      ($LDIF000)                    \BR TO LDIF SUBR\;                   369  3938 6C0
222600
222700
222800
222900
223000             \****** TEST-4 STATE ******\
223100
223200
223300             \CHECK RIGHT HALF OF RESIDUE IN CRC REGISTER\
223400
223500  STST4C00  MMP     (E5#,A3,B3,D,FR)              \SET RFCSTATE =TEST-5\;              36A  4735 0E5
223600            \SHIFT RIGHT HALF CRC REGISTER (IN REVERSE ORDER
223700             AND ONES COMPLEMENTED) INTO RDB\
223800  $         RFCSR   (C,A6,B6,A,SLQF)              \SHIFT IN CRC REG BIT 15\;           36B  C466 AC0
223900  $         RFCSR   (0,A6,B6,A,SLQF)              \SHIFT IN CRC REG BIT 14\;           36C  C466 AC0
224000  $         RFCSR   (0,A6,B6,A,SLQF)              \SHIFT IN CRC REG BIT 13\;           36D  C466 AC0
224100  $         RFCSR   (0,A6,B6,A,SLQF)              \SHIFT IN CRC REG BIT 12\;           36E  C466 AC0
224200  $         RFCSR   (0,A6,B6,A,SLQF)              \SHIFT IN CRC REG BIT 11\;           36F  C466 AC0
224300  $         RFCSR   (C,A6,B6,A,SLQF)              \SHIFT IN CRC REG BIT 10\;           370  C466 AC0
224400  $         RFCSR   (0,A6,B6,A,SLQF)              \SHIFT IN CRC REG BIT 09\;           371  C466 AC0
224500  $         RFCSR   (0,A6,B6,A,SLQF)              \SHIFT IN CRC REG BIT 08\;           372  C466 A00
224600  $         TAMN    (E2#,A6,ALUE2,DMA,OR)         \TEST =E2(HEX)\;                     373  1576 3E2
224700  $         BR      ($REXEC00)                    \DONE IF =E2 (NO CRC ERROR)\;        374  01C8 600
224800            \CRC ERROR (RIGHT-HALF RESIDUE NOT =88)\
224900  $         MMP     (2C#,A5,B5,DORA,FR)           \SET FCS ERR =1\;                    375  5D55 020
225000  $         BR      ($REXEC00)                    \DONE\;                              376  C1C8 6C0
225100
225200
225300
225400
225500             \****** TEST-5 STATE ******\
225600
225700
225800             \LOAD RIGHT HALF OF CRC RESIDUE INTO FIFO\
225900
226000  STST5C00  MMP     (E6#,A3,B3,D,FR)              \SET RFCSTATE =TEST-6\;              377  4733 0E6
226100  $         BR      ($LDIF800)                    \BR TO LDIF SUBR\;                   378  3938 600
226200
226300
226400
226500
226600             \****** TEST-6 STATE ******\
226700
226800
226900             \CHECK LEFT HALF OF RESIDUE IN CRC REGISTER\
227000
227100  STST6C00  MMP     (E7#,A3,B3,D,FR)              \SET RFCSTATE =TEST-7\;              379  4733 0E7
227200  $         MMP     (0F#,A9,B9,DANDA,FR)          \SET RSRB =0\;                       37A  6599 C0F
227300            \SHIFT LEFT HALF CRC REGISTER (IN REVERSE ORDER
227400             AND ONES COMPLEMENTED) INTO RDB\
227500  $         RFCSR   (C,A6,B6,A,SLQF)              \SHIFT IN CRC REG BIT 07\;           37B  C466 AC0
227600  $         RFCSR   (C,A6,B6,A,SLQF)              \SHIFT IN CRC REG BIT 06\;           37C  C466 AC0
227700  $         RFCSR   (0,A6,B6,A,SLQF)              \SHIFT IN CRC REG BIT 05\;           37D  C466 AC0
227800  $         RFCSR   (C,A6,B6,A,SLQF)              \SHIFT IN CRC REG BIT 04\;           37E  C466 AC0
227900  $         RFCSR   (0,A6,B6,A,SLQF)              \SHIFT IN CRC REG BIT 03\;           37F  C466 A_0
228000  $         RFCSR   (C,A6,06,A,SLQF)              \SHIFT IN CRC REG BIT 02\;           380  C466 AC0
228100  $         RFCSR   (0,A6,B6,A,SLQF)              \SHIFT IN CRC REG BIT 01\;           381  C466 AC0
228200  $         RFCSR   (0,A6,B6,A,SLQF)              \SHIFT IN CRC REG BIT 00\;           382  C466 AC0
```

```
228300  $       TAPA    (FCN,A6,ALUEZ,DMA,QR)    \TEST =FO(HEX)\;               383  1576 3FC
228400  $       BR      ($REXEC00)               \DONE IF =F0 (NO CRC ERROR)\;  384  01C8 600
228500          \CRC ERROR  (LEFT-HALF RESIDUE NOT =F0)\
228600  $       MMP     (2CN,A5,B5,DORA,FR)      \SET FCS ERR =1\;              385  5D55 020
228700  $       BR      ($REXEC00)               \DONE\;                        386  C1C8 6C0
228800
228900
229000
229100
229200          \****** TEST-7 STATE ******\
229300
229400
229500          \LOAD FINAL STATUS AND
229600          LEFT HALF OF CRC RESIDUE INTO FIFO\
229700
229800  $TST7C00 MMP    (CCN,A5,B5,DORA,FR)      \SET ABRT/IDLE/OVRN =1,1\;     387  5D55 0CC
229900  $       BR      ($RPTS000)               \BR TO REPORT STATUS SUBR\;    388  3898 6CC
230000
230100
230200
230300
230400
230500          \******                  ******\
230600          \****** RFC SUBROUTINES  ******\
230700          \******                  ******\
230800
230900
231000
231100
231200          \**** REPORT STATUS SUBROUTINE ****\
231300
231400
231500  $RPTSC00 TAPA   (CCN,A9,ALUEZ,DANDA,QR)  \TEST RILSFLG,ROSD\;          389  2579 2CC
231600  $       BR      ($RPTS005)               \EI =0,0\;                    38A  38C8 6C0
231700          \RILSFLG OR ROSD =1\
231800  $       MMP     (CON,A3,B3,D,FR)         \SET RFCSTATE =IDLE           38B  4733 CC0
231900                                           LINK - MISSED FRAMES\;
232000  $       BR      ($RPTS020)               \CONTINUE BELOW\;             38C  38E8 6C0
232100          \RILSFLG,ROSD =0,0\
232200  $RPTSC05 MMP    (CCN,A3,B3,D,FR)         \SET RFCSTATE =OFF.           38D  4733 CCC
232300                                           CONTINUE\;
232400
232500          \ENTRY POINT 8\
232600  $RPTSC20 SC     (C,WRRFMBS,B5,A,FR)      \CCPY STAT BFR TO FIFO BFR\;  38E  4455 4CC
232700  $       SC      (0,WRRFMS,B0,0,QR)       \CCPY FIFO BFR TO FIFO/STAT\; 38F  02C2 400
232800  $       MMP     (0,A5,B5,D,FR)           \SET STATUS BUFFER =0\;       390  4755 CC0
232900  $       SC      (C,WRRFMBD,B6,A,FR)      \CCPY RDB TO FIFO BUFFER\;    391  4466 4C0
233000  $       BRSC    ($REXEC00,WRRFMD)        \CCPY FIFO BFR TO FIFO/DATA.  392  C1C3 60C
233100                                           DONE\;
233200
233300
233400
233500
233600          \**** LOAD DATA INTO FIFO SUBROUTINE ****\
233700
233800
233900  $LDIFC00 SC     (0,RSRFMB,B0,0,QR)       \CLEAR FIFO BUFFER TO 0\;     393  02C4 400
234000  $       SC      (0,WRRFMS,B0,C,QR)       \CCPY FIFO BFR TO FIFO/STAT\; 394  C2C2 4C0
234100  $       MMP     (C,A0,B0,0,QR)           \NOP/DELAY\;                  395  0200 000
234200  $       SC      (0,WRRFMBD,B6,A,FR)      \CCPY RDB TO FIFO BUFFER\;    396  4466 4C0
234300  $       BRSC    ($REXEC00,WRRFPD)        \CCPY FIFO BFR TO FIFO/DATA.  397  C1C3 600
234400                                           DONE\;
                         THERE ARE NO SEVERE MESSAGES IN THE ABOVE FILE.
                         THERE ARE NO WARNING MESSAGES IN THE ABOVE FILE.
```

What is claimed is:

1. In a data communication system having a communication processor for generating data characters to be transmitted on a communication channel and for generating control characters indicative of control functions to be performed in transitting said data characters, an adapter for interfacing said processor to said communication channel comprising, in combination:

means for receiving and storing a control character transferred from said processor at the start of a data transmit cycle;

buffer storage means for receiving and storing data characters transferred from said processor;

processing means for transmitting data characters stored in said buffer storage means in bit-serial fashion onto said communication channel;

means for generating a character size control code from said stored control character; and control means responsive to said character size control code for controlling said processing means to transmit onto said channel, for each transmitted character, a number of bits equal to the number represented by said control code.

2. The data communication system set forth in claim 1 further comprising:

means for performing a CRC error check on said data characters transmitted onto said communication channel; and means for transmitting a check sequence character onto said channel following the last data character of a frame of transmitted data characters.

3. The data communication system set forth in claim 2 further comprising:

means for transferring an end frame control character from said processor along with the last data character in said frame; and means for generating a CRC check inhibit control code from said end frame control character, said processing means being responsive to said inhibit control code to permit said data characters to be transmitted without said CRC error check.

4. In a data communication system having a communication processor for generating data characters to be transmitted on a communication channel and for generating control characters indicative of control functions to be performed in transmitting said data characters, an adapter for interfacing said processor to said communication channel comprising, in combination:

means for receiving and storing a control character transferred from said processor;

buffer storage means for receiving and storing data characters transferred from said processor;

processing means for transmitting data characters stored in said buffer storage means in bit-serial fashion onto said communication channel;

means for generating a bit stream mode control code from said stored control character; and control means responsive to said bit stream mode control code for controlling said processing means to transmit said stored data characters onto said channel in a high order bit first sequence.

5. In a data communication system having a communication processor for generating data characters to be transmitted on a communication channel and for generating control characters indicative of control functions to be performed in transmitting said data characters, an adapter for interfacing said processor to said communication channel comprising, in combination:

means for receiving and storing start frame and end frame control characters transferred from said processor at the beginning and end, respectively, of a data transmit cycle;

first-in first-out buffer storage means for receiving and storing data characters transferred from said processor;

processing means for transmitting data characters presented at the output of said buffer storage means in bit-serial fashion onto said communication channel;

status means for generating status and interrupt signals for transfer to said communication processor;

means for generating a buffer empty control signal if said buffer storage means is exhausted of said data characters before said end frame control character is received; and control means responsive to said buffer empty control signal for controlling said processing means to transmit fill characters onto said channel and to set said status means to indicate an underrun condition and to generate an interrupt command to said communication processor when said end frame control character is received.

6. The data communication system set forth in claim 5 wherein said fill characters comprise an abort sequence followed by a series of flag sequences.

7. In a communication system having a communication processor for processing data characters received from a communication channel and for generating control characters indicative of control functions to be performed during receipt of said data characters, an adapter for interfacing said processor to said communication channel comprising, in combination:

means for receiving and storing a control character transferred from said processor at the start of a data receive cycle;

processing means for receiving data from said communication channel in bit-serial fashion and for assembling said received bits into parallel-bit data characters;

means for transferring said assembled parallel-bit characters to said communication processor;

means for generating a character size control code from said stored data control character; and control means responsive to said character size control code for controlling said processing means to assemble said received data bits into parallel-bit characters having a number of bits equal to the number represented by said control code.

8. In a communication system having a communication processor for processing data characters received from a communication channel and for generating control characters indicative of control functions to be performed during receipt of said data characters, an adapter for interfacing said processor to said communication channel comprising, in combination:

processing means for receiving data from said communication channel in bit-serial fashion and for assembling said received bits into parallel-bit data characters;

first-in first-out buffer storage means for receiving and storing assembled bit-parallel data characters from said processing means;

means for loading a status character into said buffer storage means along with each said data character;

means for transferring data and status characters presented at the output of said buffer storage means to said communication processor;

means for entering an end of frame code into the status character accompanying the last data character of a received message frame;

means for generating a buffer full control signal if the available storage locations in said buffer storage means are exhausted before said last data character is entered therein; and control means responsive to said buffer full control signal for controlling said processing means to enter an overrun code into the status character accompanying said last data character, thereby providing an indication of an overrun condition to said communication processor.

9. In a communication system having a communication processor for processing data characters received from a communication channel and for generating control characters indicative of control functions to be performed during receipt of said data characters, an adapter for interfacing said processor to said communication channel comprising, in combination:

processing means for receiving data from said communication channel in bit-serial fashion and for assembling said received bits into parallel-bit data characters;

first-in first-out buffer storage means for receiving and storing assembled bit-parallel data characters from said processing means;

means for loading a status character into said buffer storage means along with each said data character;

means for transferring data and status characters presented to the output of said buffer storage means to said communication processor;

means for entering an end of frame code into the status character accompanying the last data character of a received message frame; and control means for controlling said processing means to determine the number of bits in said last data character and for entering a last character size control code into the status character accompanying said last data character, said control code designating the number of bits in said last character.

10. The communication system set forth in claim 9 further comprising:
additional control means for controlling said processsing means to enter a partial last character control code into the status character accompanying said last data character when the number of bits in said last data character is less than the number of bits in the preceding data characters.

11. In a data communication system having a communication processor for generating data characters to be transmitted on a communication channel and for generating control characters indicative of control functions to be performed in transmitting said data characters, an adapter for interfacing said processor to said communication channel comprising, in combination:
means for receiving and storing a control character transferred from said processor at the start of a data transmit cycle;
buffer storage means for receiving and storing data characters transferred from said processor, said characters being grouped into a frame including a text field and a control field;
processing means for transmitting data characters stored in said buffer storage means in bit-serial fashion onto said communication channel; and
means for generating a field size control code from said stored control character, said control code indicating to said processing means the size of said control field in said frame.

* * * * *